United States Patent
Birrittella et al.

(10) Patent No.: US 9,628,382 B2
(45) Date of Patent: Apr. 18, 2017

(54) RELIABLE TRANSPORT OF ETHERNET PACKET DATA WITH WIRE-SPEED AND PACKET DATA RATE MATCH

(71) Applicant: INTEL CORPORATION, Santa Clara, CA (US)

(72) Inventors: Mark S. Birrittella, Chippewa Falls, WI (US); Thomas D. Lovett, Portland, OR (US); Todd Rimmer, Exton, PA (US)

(73) Assignee: Intel Corporation, Santa Clara, CA (US)

(*) Notice: Subject to any disclaimer, the term of this patent is extended or adjusted under 35 U.S.C. 154(b) by 83 days.

(21) Appl. No.: 14/173,782

(22) Filed: Feb. 5, 2014

(65) Prior Publication Data
US 2015/0222533 A1    Aug. 6, 2015

(51) Int. Cl.
H04L 12/721 (2013.01)
H04L 12/741 (2013.01)
H04L 12/947 (2013.01)

(52) U.S. Cl.
CPC .............. H04L 45/66 (2013.01); H04L 45/74 (2013.01); H04L 49/25 (2013.01)

(58) Field of Classification Search
CPC .......... H04L 45/66; H04L 45/74; H04L 49/25
(Continued)

(56) References Cited
U.S. PATENT DOCUMENTS
4,442,502 A    4/1984  Friend et al.
4,791,652 A *  12/1988 McEachern ............... H04L 5/24
                                                       370/506
(Continued)

FOREIGN PATENT DOCUMENTS
WO    2015/085231 A1    6/2015
WO    2015/085254 A1    6/2015
(Continued)

OTHER PUBLICATIONS
International Search Report and Written Opinion received for PCT Patent Application No. PCT/US2014/068889, mailed on Feb. 27, 2015, 12 pages.
(Continued)

*Primary Examiner* — Mohammad Anwar
*Assistant Examiner* — Kokou R Detse
(74) *Attorney, Agent, or Firm* — Law Office of R. Alan Burnett, PS

(57) ABSTRACT

Method, apparatus, and systems for reliably transferring Ethernet packet data over a link layer and facilitating fabric-to-Ethernet and Ethernet-to-fabric gateway operations at matching wire speed and packet data rate. Ethernet header and payload data is extracted from Ethernet frames received at the gateway and encapsulated in fabric packets to be forwarded to a fabric endpoint hosting an entity to which the Ethernet packet is addressed. The fabric packets are divided into flits, which are bundled in groups to form link packets that are transferred over the fabric at the Link layer using a reliable transmission scheme employing implicit ACKnowledgements. At the endpoint, the fabric packet is regenerated, and the Ethernet packet data is de-encapsulated. The Ethernet frames received from and transmitted to an Ethernet network are encoded using 64b/66b encoding, having an overhead-to-data bit ratio of 1:32. Meanwhile, the link packets have the same ratio, including one overhead bit per flit and a 14-bit CRC plus a 2-bit credit return field or sideband used for credit-based flow control.

30 Claims, 57 Drawing Sheets

(58) Field of Classification Search
USPC .......................................................... 370/392
See application file for complete search history.

(56) References Cited

U.S. PATENT DOCUMENTS

| | | | |
|---|---|---|---|
| 4,967,344 | A | 10/1990 | Scavezze et al. |
| 5,193,149 | A | 3/1993 | Awiszio et al. |
| 5,218,680 | A | 6/1993 | Farrell et al. |
| 5,404,374 | A | 4/1995 | Mullins et al. |
| 5,577,023 | A | 11/1996 | Marum et al. |
| 6,416,471 | B1 | 7/2002 | Kumar et al. |
| 6,754,222 | B1 * | 6/2004 | Joung ................... H04L 49/107 370/412 |
| 6,785,862 | B1 | 8/2004 | Zhang et al. |
| 6,973,072 | B1 | 12/2005 | Muntz et al. |
| 7,187,307 | B1 | 3/2007 | Schmidt et al. |
| 7,983,173 | B2 | 7/2011 | Finn et al. |
| 8,200,901 | B1 | 6/2012 | Wentzlaff et al. |
| 8,599,863 | B2 | 12/2013 | Davis et al. |
| 2001/0022786 | A1 | 9/2001 | King et al. |
| 2002/0048258 | A1 * | 4/2002 | Oyama ................... H04L 47/10 370/229 |
| 2002/0051427 | A1 | 5/2002 | Carvey |
| 2002/0118640 | A1 | 8/2002 | Oberman et al. |
| 2003/0020764 | A1 * | 1/2003 | Germain ............. H04L 12/2602 715/853 |
| 2003/0076826 | A1 * | 4/2003 | Blasiak ............... H04L 12/1868 370/389 |
| 2003/0117958 | A1 * | 6/2003 | Nation ................... H04L 47/10 370/235 |
| 2003/0128664 | A1 | 7/2003 | Connor |
| 2003/0189892 | A1 | 10/2003 | Son et al. |
| 2005/0149795 | A1 | 7/2005 | Manoni et al. |
| 2005/0249123 | A1 | 11/2005 | Finn et al. |
| 2006/0013240 | A1 | 1/2006 | Ma et al. |
| 2007/0140240 | A1 | 6/2007 | Dally et al. |
| 2007/0150631 | A1 | 6/2007 | Druke et al. |
| 2007/0248086 | A1 * | 10/2007 | Petersen ................. H04L 49/15 370/389 |
| 2007/0299970 | A1 | 12/2007 | Huang et al. |
| 2008/0225958 | A1 | 9/2008 | Park et al. |
| 2008/0256281 | A1 | 10/2008 | Fahr et al. |
| 2008/0276032 | A1 | 11/2008 | Iida et al. |
| 2009/0086657 | A1 | 4/2009 | Alpert et al. |
| 2009/0190466 | A1 | 7/2009 | Girardi et al. |
| 2009/0252100 | A1 * | 10/2009 | Sridhara ............... H04L 1/1854 370/329 |
| 2010/0005345 | A1 | 1/2010 | Ferraiolo et al. |
| 2010/0005375 | A1 | 1/2010 | Dell et al. |
| 2010/0188972 | A1 | 7/2010 | Knapp et al. |
| 2011/0022935 | A1 | 1/2011 | McDaniel et al. |
| 2011/0032947 | A1 | 2/2011 | Brueggen |
| 2011/0317587 | A1 | 12/2011 | Lida et al. |
| 2012/0079156 | A1 | 3/2012 | Safranek et al. |
| 2012/0079160 | A1 | 3/2012 | Iyer et al. |
| 2012/0207165 | A1 | 8/2012 | Davis |
| 2012/0297042 | A1 * | 11/2012 | Davis ..................... H04L 45/60 709/223 |
| 2013/0103783 | A1 | 4/2013 | Mannava et al. |
| 2013/0246552 | A1 | 9/2013 | Underwood et al. |
| 2013/0286845 | A1 * | 10/2013 | Smith, Jr. ........... H04L 43/0894 370/235.1 |
| 2013/0306276 | A1 | 11/2013 | Duchesneau et al. |
| 2014/0112339 | A1 | 4/2014 | Safranek et al. |
| 2015/0063348 | A1 | 3/2015 | Chrysos et al. |
| 2015/0163014 | A1 | 6/2015 | Birrittella |
| 2015/0163019 | A1 | 6/2015 | Birrittella |
| 2015/0163170 | A1 | 6/2015 | Birrittella |

FOREIGN PATENT DOCUMENTS

| | | |
|---|---|---|
| WO | 2015/085255 A1 | 6/2015 |
| WO | 2015/119732 A1 | 8/2015 |

OTHER PUBLICATIONS

International Search Report and Written Opinion received for PCT Patent Application No. PCT/US2014/068930, mailed on Feb. 26, 2015, 15 pages.
International Search Report and Written Opinion received for PCT Patent Application No. PCT/US2014/068931, mailed on Feb. 26, 2015, 15 pages.
International Search Report and Written Opinion received for PCT Patent Application No. PCT/US2015/010304, mailed on Apr. 6, 2015, 16 pages.
International Preliminary Report on Patentability and Written Opinion Received for PCT Patent Application No. PCT/US2014/068889, mailed on Jun. 16, 2016, 9 pages.
International Preliminary Report on Patentability and Written Opinion Received for PCT Patent Application No. PCT/US2014/068930, mailed on Jun. 16, 2016, 12 pages.
International Preliminary Report on Patentability and Written Opinion Received for PCT Patent Application No. PCT/US2014/068931, mailed on Jun. 16, 2016, 12 pages.
International Preliminary Report on Patentability and Written Opinion Received for PCT Patent Application No. PCT/US2015/010304, mailed on Aug. 18, 2016, 12 pages.

* cited by examiner

VL1 interleaves VL0

Back to the remaining VL0 packet flits

| |
|---|
| Flit 0[64:0] |
| Flit 1[64:0] |
| Flit 2[64:0] |
| Flit 3[64:0] |
| Flit 4[64:0] |
| Flit 5[64:0] |
| Flit 6[64:0] |
| Flit 7[64:0] |
| Flit 8[64:0] |
| Flit 9[64:0] |
| Flit 10[64:0] |
| Flit 11[64:0] |
| Flit 12[64:0] |
| Flit 13[64:0] |
| Flit 14[64:0] |
| Flit 15[64:0] |
| LCRC[15:0] |

*Fig. 5*

| Flit 0[64:0] |
| --- |
| Flit 1[64:0] |
| Flit 2[64:0] |
| Flit 3[64:0] |
| Flit 4[64:0] |
| Flit 5[64:0] |
| Flit 6[64:0] |
| Flit 7[64:0] |
| Flit 8[64:0] |
| Flit 9[64:0] |
| Flit 10[64:0] |
| Flit 11[64:0] |
| Flit 12[64:0] |
| Flit 13[64:0] |
| Flit 14[64:0] |
| Flit 15[64:0] |

| LCRC[13:0] | C[1:0] |
| --- | --- |

*Fig. 6*

| |
|---|
| Flit 0[64:0] |
| Flit 1[64:0] |
| Flit 2[64:0] |
| Flit 3[64:0] |
| Flit 4[64:0] |
| Flit 5[64:0] |
| Flit 6[64:0] |
| Flit 7[64:0] |
| Flit 8[64:0] |
| Flit 9[64:0] |
| Flit 10[64:0] |
| Flit 11[64:0] |
| Flit 12[64:0] |
| Flit 13[64:0] |
| Flit 14[64:0] |
| Flit 15[64:0] |
| LCRC3[11:0] LCRC2[11:0] LCRC1[11:0] LCRC0[11:0] |

*Fig. 7*

Standard Detection LTP

| Flit 1[64:0]  | Flit 0[64:0]  |
|---|---|
| Flit 3[64:0]  | Flit 2[64:0]  |
| Flit 5[64:0]  | Flit 4[64:0]  |
| Flit 7[64:0]  | Flit 6[64:0]  |
| Flit 9[64:0]  | Flit 8[64:0]  |
| Flit 11[64:0] | Flit 10[64:0] |
| Flit 13[64:0] | Flit 12[64:0] |
| Flit 15[64:0] | Flit 14[64:0] |
|               | LCRC[15:0]    |

*Fig. 9a*

Enhanced Detection LTP

| Flit 1[64:0]  | Flit 0[64:0]  |
|---|---|
| Flit 3[64:0]  | Flit 2[64:0]  |
| Flit 5[64:0]  | Flit 4[64:0]  |
| Flit 7[64:0]  | Flit 6[64:0]  |
| Flit 9[64:0]  | Flit 8[64:0]  |
| Flit 11[64:0] | Flit 10[64:0] |
| Flit 13[64:0] | Flit 12[64:0] |
| Flit 15[64:0] | Flit 14[64:0] |
| LCRC3[11:0] | LCRC2[11:0] | LCRC1[11:0] | LCRC0[11:0] |

*Fig. 9b*

1402 (TYP)  VL0 starts
VL1 interleaves VL0. Push VL0.
VL2 interleaves VL1. Push VL1.
VL2 finishes interleaving. Pop VL1.
VL7 interleaves VL1. Push VL1
VL7 finishes interleaving. Pop VL0.
VL1 finishes interleaving. Pop VL0.
VL0 finishes

*Fig. 14*

1400 — 1500 — Active VL Reg.

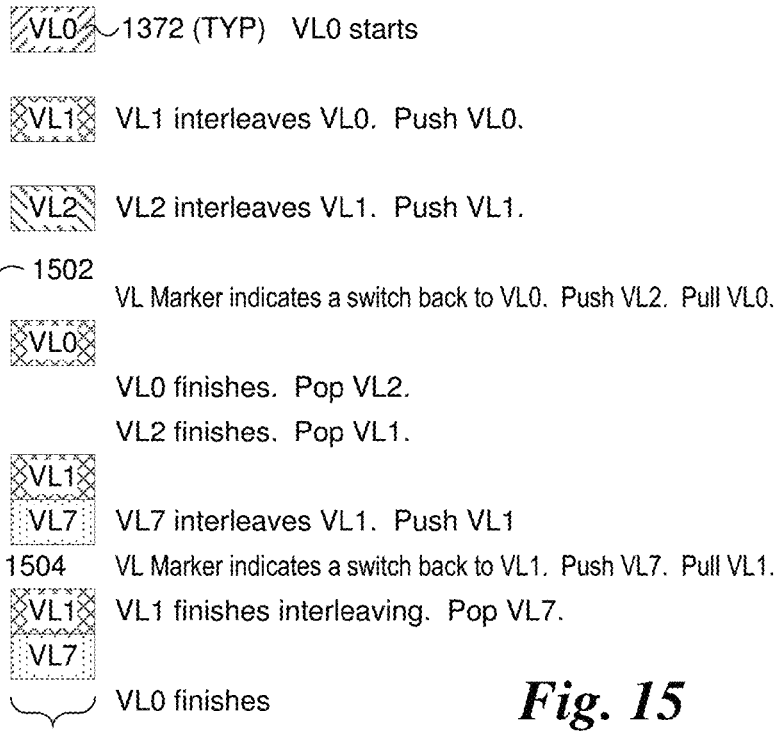

1372 (TYP)  VL0 starts
VL1 interleaves VL0. Push VL0.
VL2 interleaves VL1. Push VL1.
1502 — VL Marker indicates a switch back to VL0. Push VL2. Pull VL0.
VL0 finishes. Pop VL2.
VL2 finishes. Pop VL1.
VL7 interleaves VL1. Push VL1
1504 — VL Marker indicates a switch back to VL1. Push VL7. Pull VL1.
VL1 finishes interleaving. Pop VL7.
VL0 finishes

*Fig. 15*

Active VL Reg.

| LTP[1055:0] |||
|---|---|---|
| CRC[15:0] | {flit15,flit14,flit13,flit12,flit11,flit10,flit9,flit8,flit7,flit6,flit5,flit4,flit3,flit2,flit1,flit0} ||
| {xfr32,xfr31,xfr30,xfr29,xfr28,xfr27,xfr26,xfr25,xfr24,xfr23,xfr22,xfr21,xfr20,xfr19,xfr18,xfr17,xfr16, xfr15,xfr14,xfr13,xfr12,xfr11,xfr10,xfr9,xfr8,xfr7,xfr6,xfr5,xfr4,xfr3,xfr2,xfr1,xfr0} |||

*Fig. 19*

| Lane3[31:0] | Lane2[31:0] | Lane1[31:0] | Lane0[31:0] |
|---|---|---|---|
| xfr3 | xfr2 | xfr1 | xfr0 |
| xfr7 | xfr6 | xfr5 | xfr4 |
| xfr11 | xfr10 | xfr9 | xfr8 |
| xfr15 | xfr14 | xfr13 | xfr12 |
| xfr19 | xfr18 | xfr17 | xfr16 |
| xfr23 | xfr22 | xfr21 | xfr20 |
| xfr27 | xfr26 | xfr25 | xfr24 |
| xfr31 | xfr30 | xfr29 | xfr28 |
| xfr2 | xfr1 | xfr0 | xfr32 |
| xfr6 | xfr5 | xfr4 | xfr3 |
| xfr10 | xfr9 | xfr8 | xfr7 |
| xfr14 | xfr13 | xfr12 | xfr11 |
| xfr18 | xfr17 | xfr16 | xfr15 |
| xfr22 | xfr21 | xfr20 | xfr19 |
| xfr26 | xfr25 | xfr24 | xfr23 |
| xfr30 | xfr29 | xfr28 | xfr27 |
| xfr1 | xfr0 | xfr32 | xfr31 |
| xfr5 | xfr4 | xfr3 | xfr2 |
| xfr9 | xfr8 | xfr7 | xfr6 |
| xfr13 | xfr12 | xfr11 | xfr10 |
| xfr17 | xfr16 | xfr15 | xfr14 |
| xfr21 | xfr20 | xfr19 | xfr18 |
| xfr25 | xfr24 | xfr23 | xfr22 |
| xfr29 | xfr28 | xfr27 | xfr26 |
| xfr0 | xfr32 | xfr31 | xfr30 |
| xfr4 | xfr3 | xfr2 | xfr1 |
| xfr8 | xfr7 | xfr6 | xfr5 |
| xfr12 | xfr11 | xfr10 | xfr9 |
| xfr16 | xfr15 | xfr14 | xfr13 |
| xfr20 | xfr19 | xfr18 | xfr17 |
| xfr24 | xfr23 | xfr22 | xfr21 |
| xfr28 | xfr27 | xfr26 | xfr25 |
| xfr32 | xfr31 | xfr30 | xfr29 |

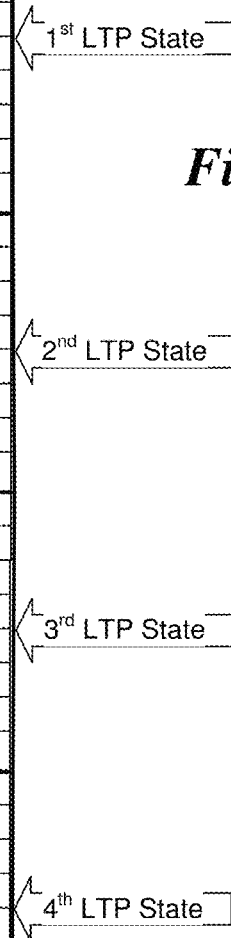

*Fig. 20*

| Lane3[31:0] | Lane2[31:0] | Lane1[31:0] | Lane0[31:0] | | |
|---|---|---|---|---|---|
| xfr3 | xfr2 | xfr1 | xfr0 | ···288··· | CRC-G0 |
| xfr7 | xfr6 | xfr5 | xfr4 | ···256··· | CRC-G1 |
| xfr11 | xfr10 | xfr9 | xfr8 | | |
| xfr15 | xfr14 | xfr13 | xfr12 | 1st LTP State | |
| xfr19 | xfr18 | xfr17 | xfr16 | | |
| xfr23 | xfr22 | xfr21 | xfr20 | ···256··· | CRC-G2 |
| xfr27 | xfr26 | xfr25 | xfr24 | | |
| xfr31 | xfr30 | xfr29 | xfr28 | ···256··· | CRC-G3 |
| xfr2 | xfr1 | xfr0 | xfr32 | | |
| xfr6 | xfr5 | xfr4 | xfr3 | ···288··· | CRC-G0 |
| xfr10 | xfr9 | xfr8 | xfr7 | ···256··· | CRC-G1 |
| xfr14 | xfr13 | xfr12 | xfr11 | | |
| xfr18 | xfr17 | xfr16 | xfr15 | 2nd LTP State | |
| xfr22 | xfr21 | xfr20 | xfr19 | | |
| xfr26 | xfr25 | xfr24 | xfr23 | ···256··· | CRC-G2 |
| xfr30 | xfr29 | xfr28 | xfr27 | ···256··· | CRC-G3 |
| xfr1 | xfr0 | xfr32 | xfr31 | | |
| xfr5 | xfr4 | xfr3 | xfr2 | ···288··· | CRC-G0 |
| xfr9 | xfr8 | xfr7 | xfr6 | | |
| xfr13 | xfr12 | xfr11 | xfr10 | ···256··· | CRC-G1 |
| xfr17 | xfr16 | xfr15 | xfr14 | | |
| xfr21 | xfr20 | xfr19 | xfr18 | 3rd LTP State | |
| xfr25 | xfr24 | xfr23 | xfr22 | ···256··· | CRC-G2 |
| xfr29 | xfr28 | xfr27 | xfr26 | | |
| xfr0 | xfr32 | xfr31 | xfr30 | ···256··· | CRC-G3 |
| xfr4 | xfr3 | xfr2 | xfr1 | ···288··· | CRC-G0 |
| xfr8 | xfr7 | xfr6 | xfr5 | | |
| xfr12 | xfr11 | xfr10 | xfr9 | ···256··· | CRC-G1 |
| xfr16 | xfr15 | xfr14 | xfr13 | | |
| xfr20 | xfr19 | xfr18 | xfr17 | 4th LTP State | |
| xfr24 | xfr23 | xfr22 | xfr21 | ···256··· | CRC-G2 |
| xfr28 | xfr27 | xfr26 | xfr25 | | |
| xfr32 | xfr31 | xfr30 | xfr29 | ···256··· | CRC-G3 |

*Fig. 24*

| CRC xfr Group | CRC-G0 | CRC-G1 | CRC-G2 | CRC-G3 |
|---|---|---|---|---|
| Bad LTP CRCs | 428 | 556 | 208 | 804 |
| ReTx LTP CRCs | 428 | 556 | X 516 | 804 |

| Lane3[31:0] | Lane2[31:0] | Lane1[31:0] | Lane0[31:0] | |
|---|---|---|---|---|
| xfr3 | xfr2 | xfr1 | xfr0 | 428 — CRC-G0 |
| xfr7 | xfr6 | xfr5 | xfr4 | 556 — CRC-G1 |
| xfr11 | xfr10 | xfr9 | xfr8 | |
| xfr15 | xfr14 | xfr13 | xfr12 | 1st LTP State |
| xfr19 | xfr18 | xfr17 | xfr16 | |
| xfr23 | xfr22 | xfr21 | xfr20 | 208 — CRC-G2 |
| xfr27 | xfr26 | xfr25 | xfr24 | 804 — CRC-G3 |
| xfr31 | xfr30 | xfr29 | xfr28 | |
| xfr2 | xfr1 | xfr0 | xfr32 | |
| xfr6 | xfr5 | xfr4 | xfr3 | |
| xfr10 | xfr9 | xfr8 | xfr7 | |
| xfr14 | xfr13 | xfr12 | xfr11 | |
| xfr18 | xfr17 | xfr16 | xfr15 | 2nd LTP State |
| xfr22 | xfr21 | xfr20 | xfr19 | |
| xfr26 | xfr25 | xfr24 | xfr23 | |
| xfr30 | xfr29 | xfr28 | xfr27 | |
| xfr1 | xfr0 | xfr32 | xfr31 | |
| xfr5 | xfr4 | xfr3 | xfr2 | 428 — CRC-G0 |
| xfr9 | xfr8 | xfr7 | xfr6 | |
| xfr13 | xfr12 | xfr11 | xfr10 | 556 — CRC-G1 |
| xfr17 | xfr16 | xfr15 | xfr14 | 3rd LTP State |
| xfr21 | xfr20 | xfr19 | xfr18 | |
| xfr25 | xfr24 | xfr23 | xfr22 | 516 — CRC-G2 |
| xfr29 | xfr28 | xfr27 | xfr26 | 804 — CRC-G3 |
| xfr0 | xfr32 | xfr31 | xfr30 | |
| xfr4 | xfr3 | xfr2 | xfr1 | |
| xfr8 | xfr7 | xfr6 | xfr5 | |
| xfr12 | xfr11 | xfr10 | xfr9 | |
| xfr16 | xfr15 | xfr14 | xfr13 | 4th LTP State |
| xfr20 | xfr19 | xfr18 | xfr17 | |
| xfr24 | xfr23 | xfr22 | xfr21 | |
| xfr28 | xfr27 | xfr26 | xfr25 | |
| xfr32 | xfr31 | xfr30 | xfr29 | |

*Fig. 25*

| Lane1[31:0] | Lane0[31:0] | | |
|---|---|---|---|
| xfr1 | xfr0 | | |
| xfr3 | xfr2 | | |
| xfr5 | xfr4 | | |
| xfr7 | xfr6 | | |
| xfr9 | xfr8 | | |
| xfr11 | xfr10 | 544 | CRC-G0 |
| xfr13 | xfr12 | | |
| xfr15 | xfr14 | | |
| xfr17 | xfr16 | 1st LTP State | |
| xfr19 | xfr18 | | |
| xfr21 | xfr20 | | |
| xfr23 | xfr22 | 512 | CRC-G1 |
| xfr25 | xfr24 | | |
| xfr27 | xfr26 | | |
| xfr29 | xfr28 | | |
| xfr31 | xfr30 | | |
| xfr0 | xfr32 | | |
| xfr2 | xfr1 | | |
| xfr4 | xfr3 | | |
| xfr6 | xfr5 | | |
| xfr8 | xfr7 | | |
| xfr10 | xfr9 | 544 | CRC-G0 |
| xfr12 | xfr11 | | |
| xfr14 | xfr13 | | |
| xfr16 | xfr15 | 2nd LTP State | |
| xfr18 | xfr17 | | |
| xfr20 | xfr19 | | |
| xfr22 | xfr21 | | |
| xfr24 | xfr23 | 512 | CRC-G1 |
| xfr26 | xfr25 | | |
| xfr28 | xfr27 | | |
| xfr30 | xfr29 | | |
| xfr32 | xfr31 | | |

*Fig. 27*

| Lane0[31:0] |
|:---:|
| xfr0 |
| xfr1 |
| xfr2 |
| xfr3 |
| xfr4 |
| xfr5 |
| xfr6 |
| xfr7 |
| xfr8 |
| xfr9 |
| xfr10 |
| xfr11 |
| xfr12 |
| xfr13 |
| xfr14 |
| xfr15 |
| xfr16 |
| xfr17 |
| xfr18 |
| xfr19 |
| xfr20 |
| xfr21 |
| xfr22 |
| xfr23 |
| xfr24 |
| xfr25 |
| xfr26 |
| xfr27 |
| xfr28 |
| xfr29 |
| xfr30 |
| xfr31 |
| xfr32 |

|  | Preempted VL | | | |
|---|---|---|---|---|
| Preempting VL | 0 | 1 | 2 | 3 |
| 0 | x | 0 | 0 | 0 |
| 1 | 1 | x | 1 | 0 |
| 2 | 1 | 1 | x | 0 |
| 3 | 1 | 1 | 1 | x |
| 15 | 0 | 0 | 0 | 0 |

*Fig. 35*

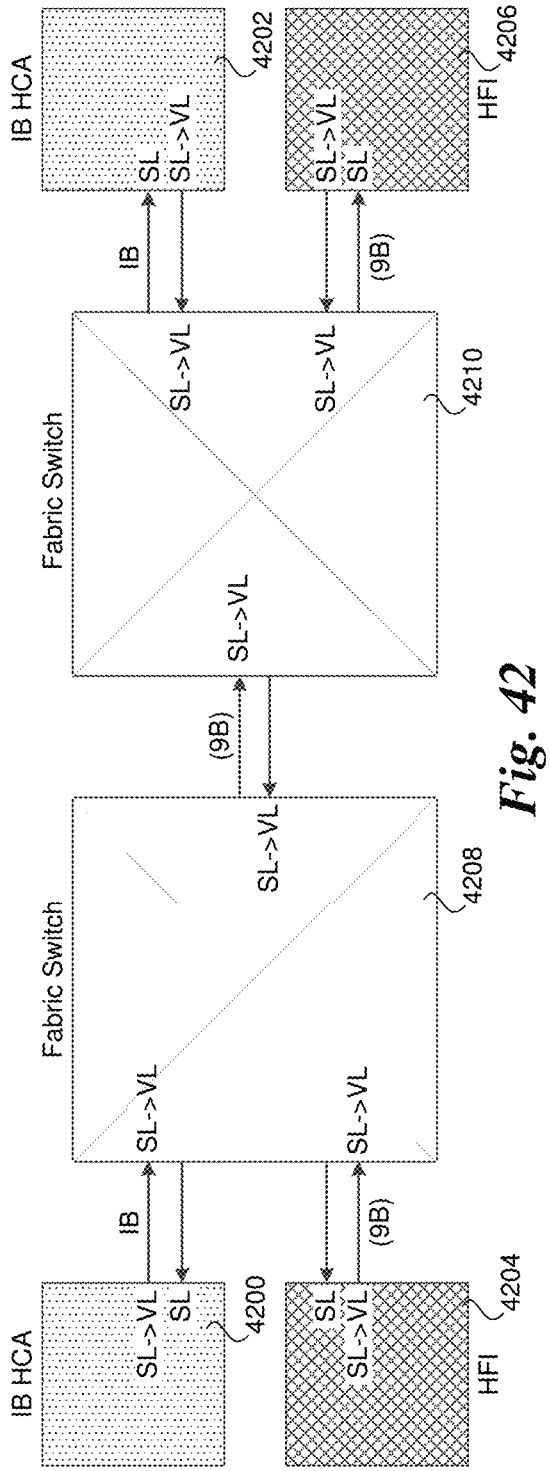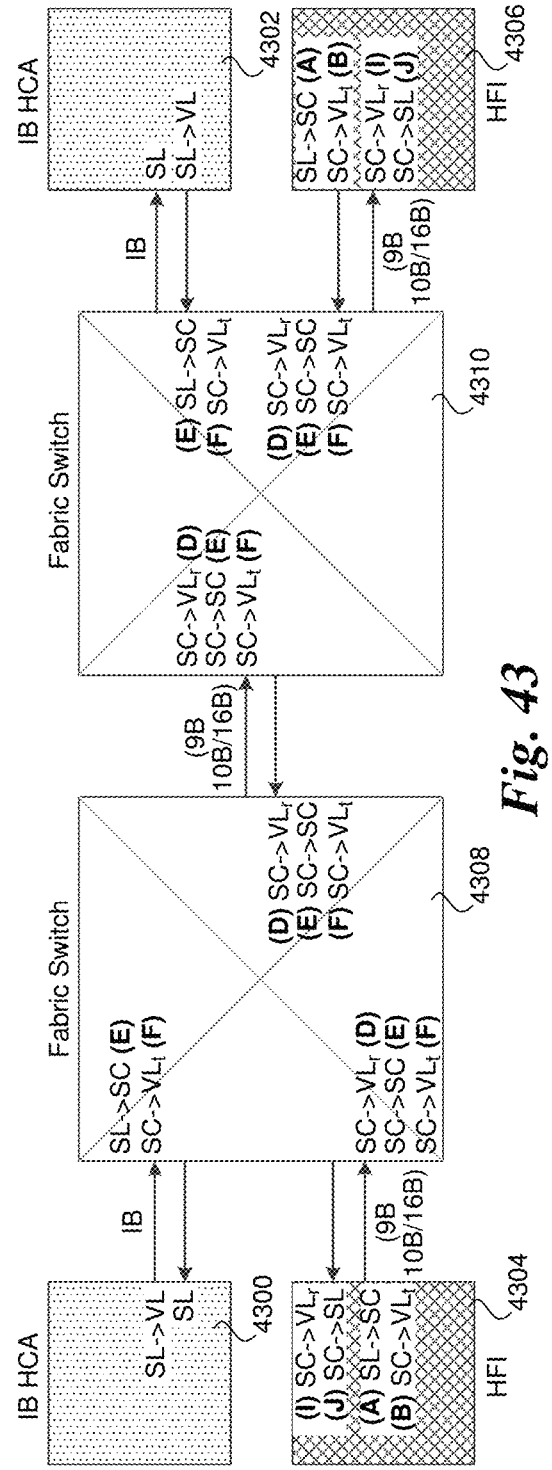
Fig. 42
Fig. 43

| Input Data | Sync | Block Payload | | | | | | | | |
|---|---|---|---|---|---|---|---|---|---|---|
| Bit Position | 0 1 2 | | | | | | | | | 65 |
| Data Block Format: | | $D_0$ | $D_1$ | $D_2$ | $D_3$ | $D_4$ | $D_5$ | $D_6$ | $D_7$ | |
| $D_0 D_1 D_2 D_3 D_4 D_5 D_6 D_7$ | 01 | | | | | | | | | |
| Control Block Formats: | | Block Type Field | | | | | | | | |
| $C_0 C_1 C_2 C_3 C_4 C_5 C_6 C_7$ | 10 | 0x1E | $C_0$ | $C_1$ | $C_2$ | $C_3$ | $C_4$ | $C_5$ | $C_6$ | $C_7$ |
| $S_0 D_1 D_2 D_3 C_4 C_5 C_6 C_7$ | 10 | 0x78 | $D_1$ | $D_2$ | $D_3$ | $C_4$ | $C_5$ | $C_6$ | $C_7$ | |
| $O_0 D_1 D_2 D_3 Z_4 Z_5 Z_6 Z_7$ | 10 | 0x4B | $D_1$ | $D_2$ | $D_3$ | $C_0$ | 0x000_0000 | | | |
| $T_0 C_1 C_2 C_3 C_4 C_5 C_6 C_7$ | 10 | 0x87 | | $C_1$ | $C_2$ | $C_3$ | $C_4$ | $C_5$ | $C_6$ | $C_7$ |
| $D_0 T_1 C_2 C_3 C_4 C_5 C_6 C_7$ | 10 | 0x99 | $D_0$ | | $C_2$ | $C_3$ | $C_4$ | $C_5$ | $C_6$ | $C_7$ |
| $D_0 D_1 T_2 C_3 C_4 C_5 C_6 C_7$ | 10 | 0xAA | $D_0$ | $D_1$ | | $C_3$ | $C_4$ | $C_5$ | $C_6$ | $C_7$ |
| $D_0 D_1 D_2 T_3 C_4 C_5 C_6 C_7$ | 10 | 0xB4 | $D_0$ | $D_1$ | $D_2$ | | $C_4$ | $C_5$ | $C_6$ | $C_7$ |
| $D_0 D_1 D_2 D_3 T_4 C_5 C_6 C_7$ | 10 | 0xCC | $D_0$ | $D_1$ | $D_2$ | $D_3$ | | $C_5$ | $C_6$ | $C_7$ |
| $D_0 D_1 D_2 D_3 D_4 T_5 C_6 C_7$ | 10 | 0xD2 | $D_0$ | $D_1$ | $D_2$ | $D_3$ | $D_4$ | | $C_6$ | $C_7$ |
| $D_0 D_1 D_2 D_3 D_4 D_5 T_6 C_7$ | 10 | 0xE1 | $D_0$ | $D_1$ | $D_2$ | $D_3$ | $D_4$ | $D_5$ | | $C_7$ |
| $D_0 D_1 D_2 D_3 D_4 D_5 D_6 T_7$ | 10 | 0xFF | $D_0$ | $D_1$ | $D_2$ | $D_3$ | $D_4$ | $D_5$ | $D_6$ | |

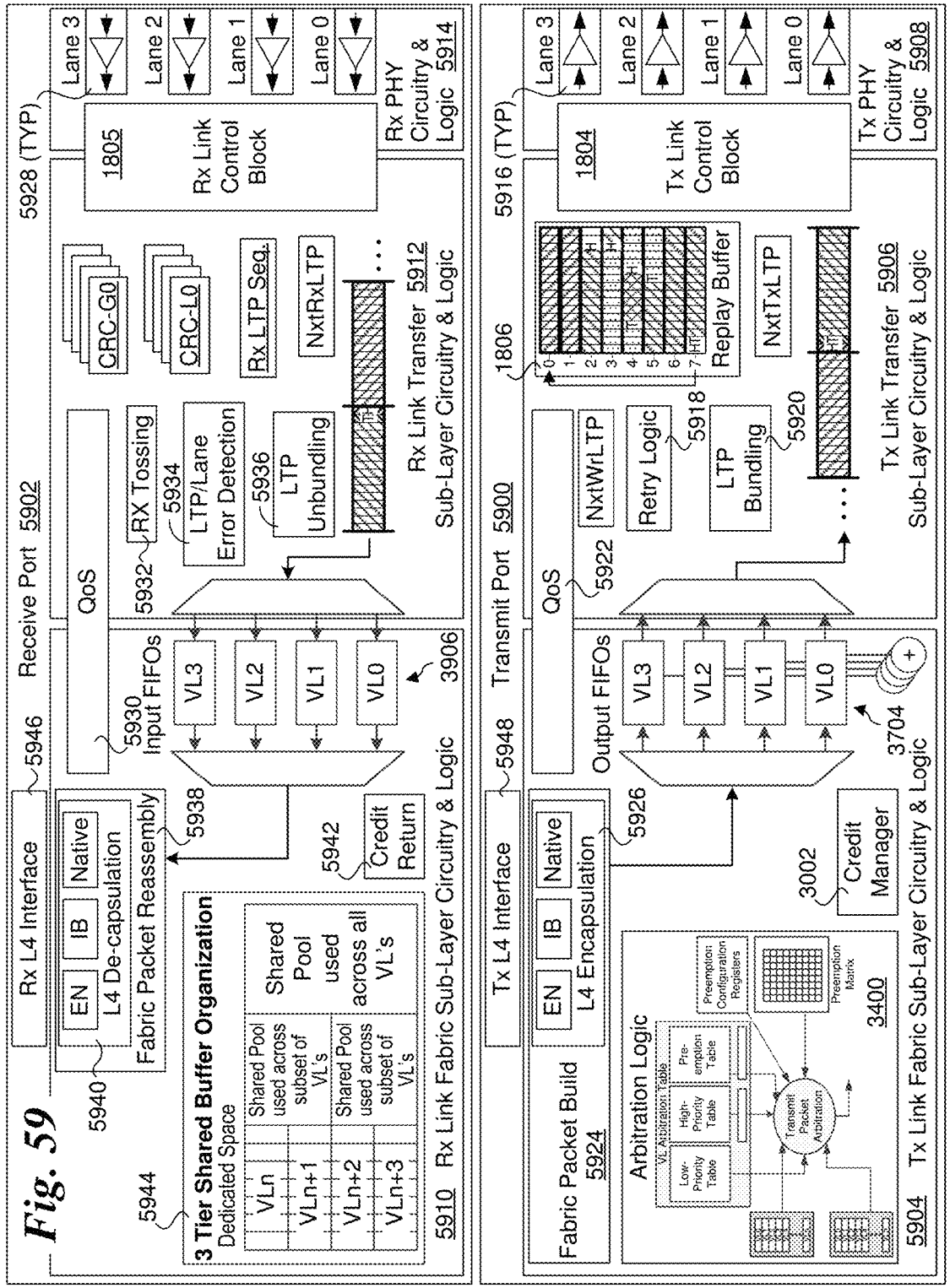

RELIABLE TRANSPORT OF ETHERNET PACKET DATA WITH WIRE-SPEED AND PACKET DATA RATE MATCH

BACKGROUND INFORMATION

High-performance computing (HPC) has seen a substantial increase in usage and interests in recent years. Historically, HPC was generally associated with so-called "Super computers." Supercomputers were introduced in the 1960s, made initially and, for decades, primarily by Seymour Cray at Control Data Corporation (CDC), Cray Research and subsequent companies bearing Cray's name or monogram. While the supercomputers of the 1970s used only a few processors, in the 1990s machines with thousands of processors began to appear, and more recently massively parallel supercomputers with hundreds of thousands of "off-the-shelf" processors have been implemented.

There are many types of HPC architectures, both implemented and research-oriented, along with various levels of scale and performance. However, a common thread is the interconnection of a large number of compute units, such as processors and/or processor cores, to cooperatively perform tasks in a parallel manner. Under recent System on a Chip (SoC) designs and proposals, dozens of processor cores or the like are implemented on a single SoC, using a 2-dimensional (2D) array, torus, ring, or other configuration. Additionally, researchers have proposed 3D SoCs under which 100's or even 1000's of processor cores are interconnected in a 3D array. Separate multicore processors and SoCs may also be closely-spaced on server boards, which, in turn, are interconnected in communication via a backplane or the like. Another common approach is to interconnect compute units in racks of servers (e.g., blade servers and modules) that are typically configured in a 2D array. IBM's Sequoia, one of the world's fastest supercomputer, comprises a 2D array of 96 racks of server blades/modules totaling 1,572,864 cores, and consumes a whopping 7.9 Megawatts when operating under peak performance.

One of the performance bottlenecks for HPCs is the latencies resulting from transferring data over the interconnects between compute nodes. Typically, the interconnects are structured in an interconnect hierarchy, with the highest speed and shortest interconnects within the processors/SoCs at the top of the hierarchy, while the latencies increase as you progress down the hierarchy levels. For example, after the processor/SoC level, the interconnect hierarchy may include an inter-processor interconnect level, an inter-board interconnect level, and one or more additional levels connecting individual servers or aggregations of individual servers with servers/aggregations in other racks.

It is common for one or more levels of the interconnect hierarchy to employ different protocols. For example, the interconnects within an SoC are typically proprietary, while lower levels in the hierarchy may employ proprietary or standardized interconnects. The different interconnect levels also will typically implement different Physical (PHY) layers. As a result, it is necessary to employ some type of interconnect bridging between interconnect levels. In addition, bridging may be necessary within a given interconnect level when heterogeneous compute environments are implemented.

At lower levels of the interconnect hierarchy, standardized interconnects such as Ethernet (defined in various IEEE 802.3 standards), and InfiniBand are used. At the PHY layer, each of these standards support wired connections, such as wire cables and over backplanes, as well as optical links. Ethernet is implemented at the Link Layer (Layer 2) in the OSI 7-layer model, and is fundamentally considered a link layer protocol. The InfiniBand standards define various OSI layer aspects for InfiniBand covering OSI layers 1-4.

Current Ethernet protocols do not have any inherent facilities to support reliable transmission of data over an Ethernet link. This is similar for the link-layer implementation of InfiniBand. Each address reliable transmission at a higher layer, such as TCP/IP. Under TCP, reliable delivery of data is implemented via explicit ACKnowledgements (ACKs) that are returned from a receiver (at an IP destination address) to a sender (at an IP source address) in response to receiving IP packets from the sender. Since packets may be dropped at one of the nodes along a route between a sender and receiver (or even at a receiver if the receiver has inadequate buffer space), the explicit ACKs are used to confirm successful delivery for each packet (noting that a single ACK response may confirm delivery of multiple IP packets). The transmit-ACK scheme requires significant buffer space to be maintained at each of the source and destination devices (in case a dropped packet or packets needs to be retransmitted), and also adds additional processing and complexity to the network stack. For example, as it is possible for an ACK to be dropped, the sender also employs a timer that is used to trigger a retransmission of a packet for which an ACK has not been received within the timer's timeout period. Each ACK consumes precious link bandwidth and creates additional processing overhead. In addition, the use of timers sets an upper limit on link round trip delay.

Recently, high-speed interconnect fabrics are being developed that provide enhancements over Ethernet and InfiniBand that are facilitated, in part, by new protocols. However, much of the current HPC software has been developed to exchange data using Ethernet and/or InfiniBand protocols, and this software would have to be rewritten to use the new protocols. In particular, there are aspects of HPC architectures that are reliant on Ethernet links, such as when connecting compute nodes across Ethernet networks. Thus, there is a need for providing an interface between the new fabrics and such Ethernet networks. At the same time, it would be preferable to have minimal impact on existing HPC software, while supporting transfer bandwidths that are provided by new high-speed Ethernet links.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 3 is a schematic diagram illustrating a plurality of flits grouped in a bundle;

FIG. 4 is a schematic diagram illustrating the structure of a Fabric Packet, according to one embodiment;

FIG. 5 is a diagram illustrating the data structure of a standard detection LTP, according to one embodiment;

FIG. 6 is a diagram illustrating the data structure of a 14-bit CRC LTP, according to one embodiment;

FIG. 7 is a diagram illustrating the data structure of an enhanced detection LTP, according to one embodiment;

FIG. 9a is a diagram illustrating an embodiment of a transmission scheme for a 4-lane link under which flits for a standard detection LTP are processed two at a time in parallel at an interface between the Link Fabric and Link Transfer sub-layers, according to one embodiment;

FIG. 9b is a diagram illustrating an embodiment of a transmission scheme for a 4-lane link under which flits for an enhanced detection LTP are processed two at a time in parallel at the interface between the Link Fabric and Link Transfer sub-layers, according to one embodiment;

FIG. 14 is a diagram illustrating use of Push and Pop interleaving, according to one embodiment;

FIG. 15 is a diagram illustrating use of a combination of Push and Pop interleaving and use VL marker interleaving, according to one embodiment;

FIGS. 18a and 18b are schematic diagram illustrating transmission of an LTP transmit scheme and use of per-lane CRCs and LTP CRCs to detect LTP lanes and errant lanes, wherein FIG. 18a depicts an original transmission of LTPs in the LTP transmit scheme and FIG. 18b depicts retransmission of LTPs in the LTP transmit stream using a replay buffer, according to one embodiment;

FIG. 19 is a diagram illustrating transmission of a standard detection LTP using 33 transfer groups (XFRs), according to one embodiment;

FIG. 20 is a diagram illustrating transmission of LTPs across a 4-lane link using 33 32-bit XFRs and four LTP sequence states, according to one embodiment;

FIG. 24 is a diagram per-lane CRCs that are calculated and stored on a XFR-group basis, according to one embodiment;

FIG. 25 is a diagram showing exemplary per-lane CRC calculations stored on a per XFR-group basis for the example of FIGS. 18a and 18b under which per-lane CRCs calculated during an original transmission of a bad LTP under a first LTP sequence state and retransmission of the bad LTP from the replay buffer under a third LTP sequence state;

FIG. 27 is a diagram illustrating transfer of a standard detection LTP over two lanes under which 17 XFRs are transferred one of the lanes and 16 XFRs are transmitted over the other lane, and employing two LTP sequence states, according to one embodiment;

FIG. 28 is a diagram illustrating transmission of a standard detection LTP over a single lane using 33 32-bit XFRs, according to one embodiment;

FIG. 32 is a diagram illustrating an example of an LF command flit format for incremental credit ACKs, according to one embodiment;

FIG. 33 is a schematic diagram illustrating an example of two distinct device types, each with different values for vAU and vCU;

FIG. 35 illustrates an example of a 5×4 preemption matrix;

FIG. 42 is a schematic block diagram illustrating an SL-to-VL legacy mode supporting 9B Fabric Packets, according to one embodiment;

FIG. 43 is a schematic block diagram illustrating a hybrid SL-to-VL legacy mode supporting 9B, 10B, and 16B Fabric Packets, according to one embodiment;

FIG. 46 is a diagram illustrating a Fabric Packet 8B Header format, according to one embodiment;

FIG. 47 is a diagram illustrating a Fabric Packet 10B Header format, according to one embodiment;

FIG. 56 is a diagram illustrating how 64b/66b block encoding is to be implemented for Ethernet links that comply with the 40 GBASE-R and 100 GBASE-R physical layer standard;

FIG. 59 is a schematic diagram illustrating an embodiment of a port including a transmit port and a receive port;

DETAILED DESCRIPTION

Figure 1:
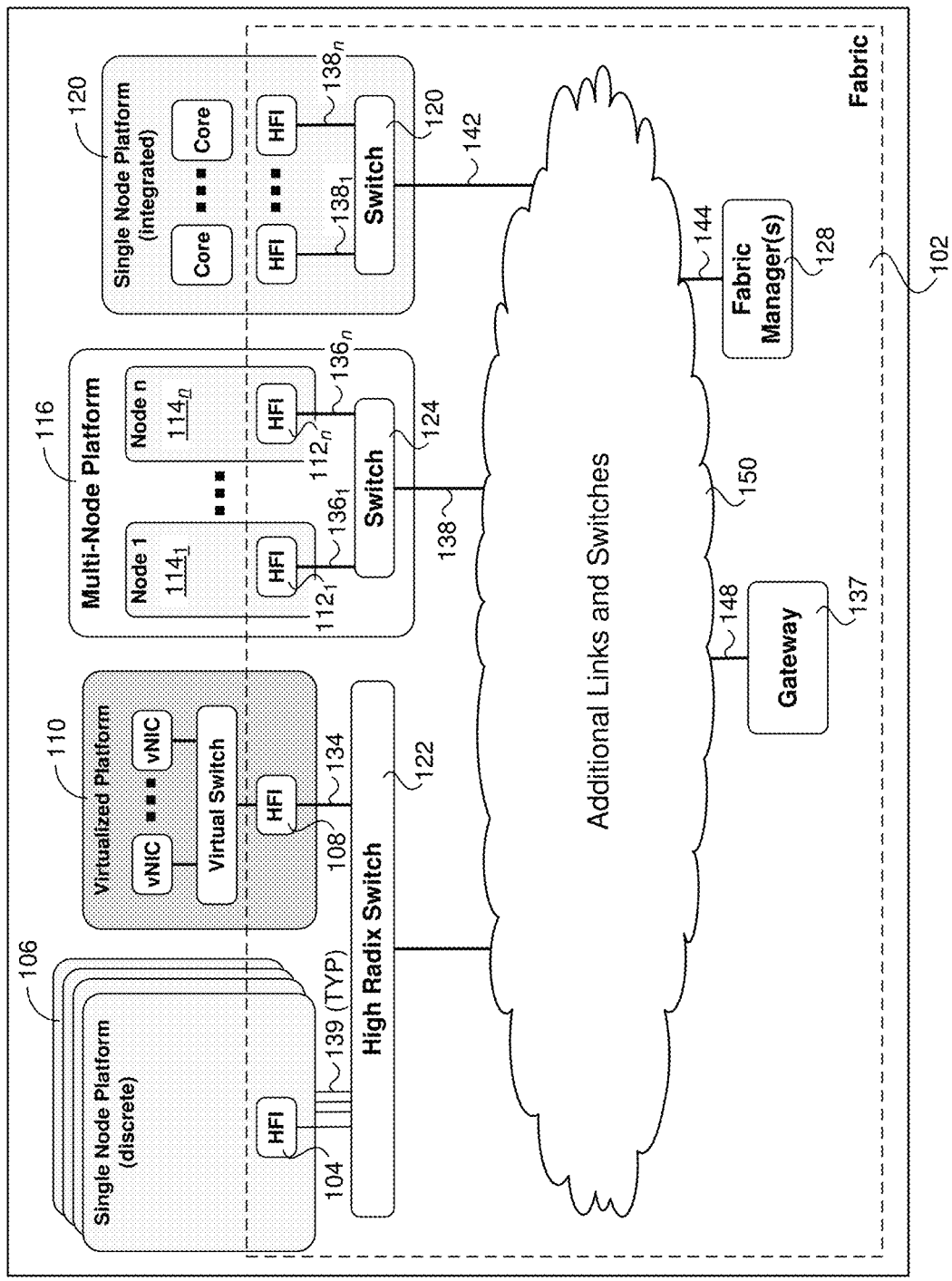
FIG. 1 is a schematic diagram illustrating a high-level view of a system comprising various components and interconnects of the fabric architecture, according to one embodiment.

Embodiments of method, apparatus, and systems for reliably transferring Ethernet packet data over a link layer and facilitating fabric-to-Ethernet and Ethernet-to-fabric gateway operations at matching wire speed and packet data rate are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that are shown in the drawing Figures but not labeled for simplicity and clarity. Conversely, "(typ)" is not to be construed as meaning the component, element, etc. is typically used for its disclosed function, implementation, purpose, etc.

In accordance with aspects of the embodiments described herein, an architecture is provided that defines a message passing, switched, server interconnection network. The architecture spans the OSI Network Model Layers 1 and 2, leverages IETF Internet Protocol for Layer 3, and includes a combination of new and leveraged specifications for Layer 4 of the architecture.

The architecture may be implemented to interconnect CPUs and other subsystems that comprise a logical message passing configuration, either by formal definition, such as a supercomputer, or simply by association, such a group or cluster of servers functioning in some sort of coordinated manner due to the message passing applications they run, as is often the case in cloud computing. The interconnected components are referred to as nodes. One type of node, called a Host, is the type on which user-mode software executes. In one embodiment, a Host comprises a single cache-coherent memory domain, regardless of the number of cores or CPUs in the coherent domain, and may include various local I/O and storage subsystems. The type of software a Host runs may define a more specialized function, such as a user application node, or a storage or file server, and serves to describe a more detailed system architecture.

At a top level, the architecture defines the following components:
- Host Fabric Interfaces (HFIs);
- Links;
- Switches;
- Gateways; and
- A comprehensive management model.

Host Fabric Interfaces minimally consist of the logic to implement the physical and link layers of the architecture, such that a node can attach to a fabric and send and receive packets to other servers or devices. HFIs include the appropriate hardware interfaces and drivers for operating system and VMM (Virtual Machine Manager) support. An HFI may also include specialized logic for executing or accelerating upper layer protocols and/or offload of transport protocols. An HFI also includes logic to respond to messages from network management components. Each Host is connected to the architecture fabric via an HFI.

Links are full-duplex, point-to-point interconnects that connect HFIs to switches, switches to other switches, or switches to gateways. Links may have different physical configurations, in circuit board traces, copper cables, or optical cables. In one embodiment the implementations the PHY (Physical layer), cable, and connector strategy is to follow those for Ethernet, specifically 100 GbE (100 gigabits per second Ethernet, such as the Ethernet links defined in IEEE 802.3bj draft standard (current draft 2.2)). The architecture is flexible, supporting use of future Ethernet or other link technologies that may exceed 100 GbE bandwidth. High-end supercomputer products may use special-purpose (much higher bandwidth) PHYs, and for these configurations interoperability with architecture products will be based on switches with ports with differing PHYs.

Switches are OSI Layer 2 components, and are managed by the architecture's management infrastructure. The architecture defines Internet Protocol as its OSI Layer 3, or Inter-networking Layer, though the architecture does not specify anything in the IP domain, nor manage IP-related devices. Devices that support connectivity between the architecture fabric and external networks, especially Ethernet, are referred to as gateways. Lightweight gateways may offer reduced functionality and behave strictly at Ethernet's layer 2. Full featured gateways may operate at Layer 3 and above, and hence behave as routers. The Gateway specifications provided by the architecture include mechanisms for Ethernet encapsulation and how gateways can behave on the fabric to permit flexible connectivity to Ethernet data center networks consistent with the rest of the architecture. The use of IP as the inter-networking protocol enables IETF-approved transports, namely TCP, UDP, and SCTP, to be used to send and receive messages beyond the architecture's fabric.

FIG. 1 shows a high-level view of a system 100 illustrating various components and interconnects of the architecture, according to one embodiment. A central feature of the architecture is the fabric 102, which includes a collection of the HFIs and gateways interconnected via the architectures links and switches. As depicted in FIG. 1, the fabric 102 components includes multiple HFIs 104 (one is shown), each hosted by a respective discrete single node platform 106, an HFI 108 hosted by a virtual platform 110, HFIs 112$_1$ and 112$_n$ hosted by respective nodes 114$_1$ and 114$_n$ of a multi-node platform 116, and HFIs 118$_1$ and 118$_n$ of an integrated single node platform 120, a high radix switch 122, switches 124 and 126, fabric manager(s) 128, a gateway 130, links 132, 134, 136$_1$, 136$_n$, 138, 140$_1$, 140$_n$, 142, 144, 148, and additional links and switches collectively shown as a cloud 150.

As discussed above, switches are a Layer 2 devices and act as packet forwarding mechanisms within a fabric. Switches are centrally provisioned and managed by the fabric management software, and each switch includes a management agent to respond to management transactions. Central provisioning means that the forwarding tables are programmed by the fabric management software to implement specific fabric topologies and forwarding capabilities, like alternate routes for adaptive routing. Switches are responsible for executing QoS features such as adaptive routing and load balancing, and also implement congestion management functions.

Figure 2:
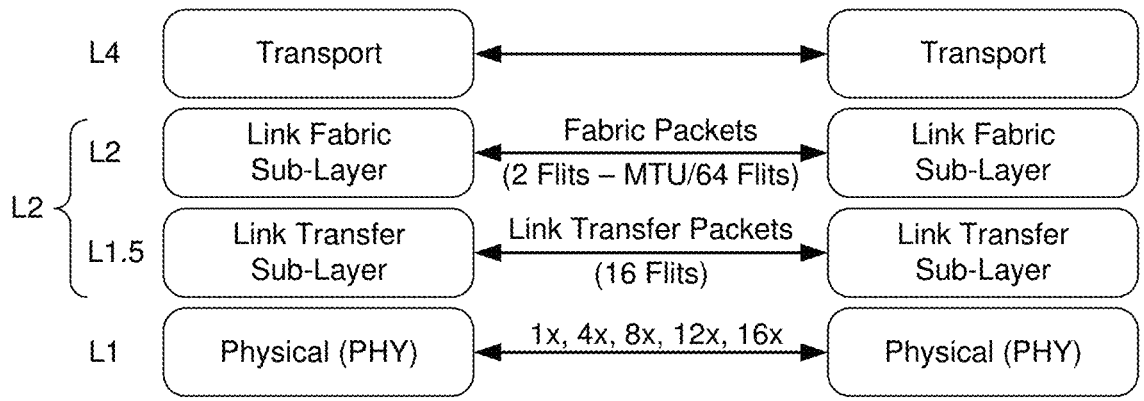
FIG. 2 is a schematic diagram depicting the architecture's layers for transferring data over the fabric links, according to one embodiment.

FIG. 2 depicts the architecture's layers for transferring data over the fabric links. The layers include a Physical (PHY) Layer, a Link Transfer Sub-Layer, a Link Fabric Sub-Layer, and a Transport Layer. At the left of FIG. 2 is the mapping of the layers to the OSI reference model under which the PHY Layer maps to Layer 1 (PHY Layer), the Link Transfer Sub-Layer and Link Fabric Sub-Layer collectively map to Layer 2 (Link Layer), and the Transport Layer maps to Layer 4 (Transport Layer).

In the architecture, signals are grouped together in the Physical Layer into ports, which behave, can be controlled, and are reported as a monolithic entity. A port comprises one or more physical lanes, wherein each lane consists of two differential pairs or fibers implemented in the physical transmission medium, one for each direction of communication. The number of lanes that comprise a port is implementation-dependent; however, the architecture of the Link Transfer Sub-layer supports a finite set of port widths. Specific port widths are supported as fundamental port widths, to allow for common targets for cable and chip design. The port widths include 1x, 4x, 8x, 12x, and 16x, where "x" identifies the number of physical lanes. Under some circumstances, such as detection of a defective lane, links may run at reduced lane widths.

Figures 3, 4:
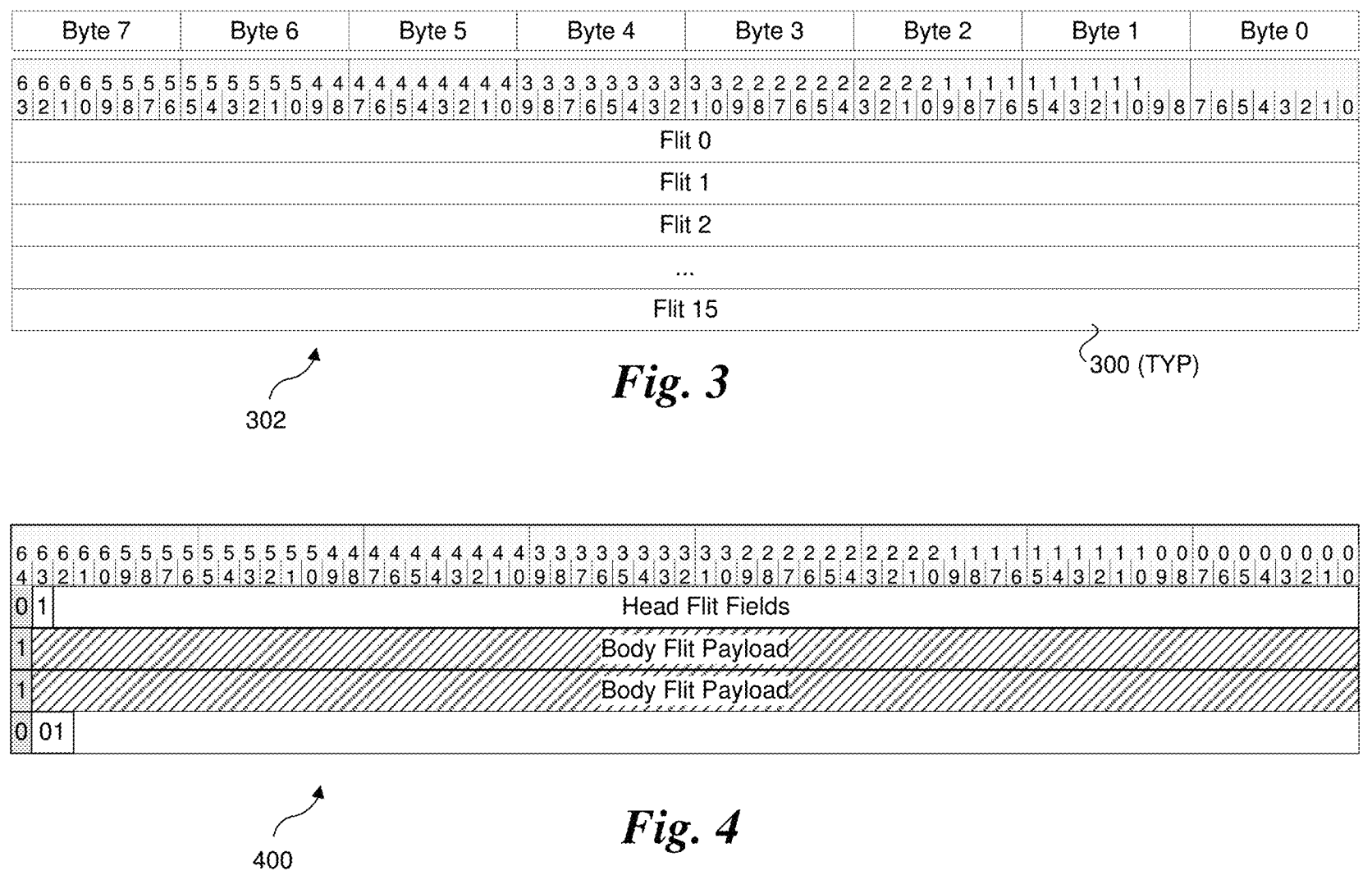

The Link Transfer Sub-Layer serves as the interface between the Physical Layer and the Link Fabric Sub-Layer. The link Fabric Packets (at the Link Fabric Sub-Layer) are segmented into 64-bit Flow Control Digits (FLITs, Flits, or flits, an approximate contraction of Flow Control Digits). FIG. 3 illustrates an example of a plurality of flits 300 grouped in a bundle 302. Each flit 300 includes 64 data bits comprising 8 bytes of data.

The Link Transfer Sub-Layer forms multiple lanes into teams that are capable of transferring flits and their associated credit return information across the link in a reliable manner. This is accomplished using 1056-bit bundles called Link Transfer Packets (LTPs), which are associated with the Link Fabric Sub-Layer. FIG. 3 also depicts the data portion of an LTP, which includes 16 flits of data. In addition, LTPs include flit type information, CRC data, and optional data (not shown in FIG. 3). Examples of LTPs are illustrated in various Figures (e.g., 5-11) and described below in further detail.

Fabric Packets are composed of 64-bit flits and a flit type bit for each flit. The first data flit of a Fabric Packet is called the Head flit. The last data flit of a Fabric Packet is called the Tail flit. Any other data flits in a Fabric Packet are called body flits. An example of a Fabric Packet 400 is illustrated in FIG. 4.

The flit type bit is provided with each flit to distinguish body flits from other flit types. In one embodiment, Body flits are encoded with the flit type bit set to 1, and contain 64 bits of data. All other flits are marked with the type bit set to 0. Head flits are encoded with flit[63] set to 1. All other (non body) flits are encoded with flit[63] set to 0. Tail flits are encoded with flit[62] set to 1. All other (non body/head) flits are encoded with flit[62] set to 0. Flit encoding is summarized in TABLE 1 below.

TABLE 1

| Flit Type Bit | Flit[63] | Flit[62] | Description |
| --- | --- | --- | --- |
| 1 | X | X | Body Data Flit |
| 0 | 0 | 0 | idle, bad packet, and control flits. |
| 0 | 0 | 1 | Tail Data Flit |
| 0 | 1 | X | Head Data Flit |

The control flits are summarized in TABLE 2. The seven control flits used solely by the link transfer layer (LT control Flits) are sent in null LTPs. The remaining control flits are divided into two groups. Fabric Packet (FP) flits include HeadBadPkt, BodyBadPkt and TailBadPkt control flits as well as the normal packet Head, Body, and Tail flits. Link Fabric (LF) command flits include Idle, VLMrkr and CrdtRet flits. FP flits and LF command flits can be intermingled together within reliable LTPs for transmission over the link.

TABLE 2

| Name | Generating | Sent in LTP | Flit Type | Description |
| --- | --- | --- | --- | --- |
| Idle | both | Reliable | LF Command | Idle. |
| VLMrkr | Link Fabric | Reliable | LF Command | VL Interleave marker. |
| CrdtRet | Link Fabric | Reliable | LF Command | VL credit return. |
| TailBadPkt | both | Reliable | Fabric Packet | Tail bad packet. |
| BodyBadPkt | both | Reliable | Fabric Packet | Body flit in a fabric packet had an unrecoverable error internal to device |
| HeadBadPkt | both | Reliable | Fabric Packet | Head flit in a fabric packet had an unrecoverable error internal to device |
| Null | Link Transfer | Single Null LTP | LT Control | Null. |
| RetryReq | Link Transfer | Null LTP Pair | LT Control | Retransmit request. |
| Retry Mrkr0 | Link Transfer | Single Null LTP | LT Control | First Retransmission marker in Pair. |
| RetryMrkr1 | Link Transfer | Single Null LTP | LT Control | Second Retransmission marker in Pair. |
| RndTripMrkr | Link Transfer | Null LTP Pair | LT Control | Round trip marker. |
| RetrainRetryReq | Link Transfer | Null LTP Pair | LT Control | Retrain retransmit request. |
| LinkWidthReq0 | Link Transfer | Null LTP Pair | LT Control | First Link width request in pair. For power management. |
| LinkWidthReq1 | Link Transfer | Null LTP Pair | LT Control | Second Link width request in pair. For power management. |

An idle command flit is used by the link fabric layer when there are no Fabric Packet flits to insert into the data stream. If the full width of the data path contains idles the link transfer layer will remove them from the flit stream that is inserted into the input buffer. If the data path contains both idles and non-idle flits, the idles will not be removed. This is implemented in order for the link transfer layer to present the identical data path composition to the link fabric layer on the far side of the link. If the link transfer layer has no flits pending from the link fabric layer, it will insert idles as original flits are sent over the link. Original flits are flits sent over the link for the first time as opposed to those that are sent from a replay buffer which comprise retransmitted or replayed flits.

A link transfer packet holds sixteen flits for transmission over the link. Reliable LTPs are held in a replay buffer for period of time that is long enough to guarantee that a lack of a retransmit request indicates it has been received successfully by the link peer. Replay buffer location pointers are maintained for each LTP at the transmitter (NxtTxLTP) and receiver (NxtRxLTP) but are not exchanged as part of the LTP. When a transmission error is detected by the receiver, it sends a RetryReqLTP to the transmitter that contains the NxtRxLTP replay buffer location pointer. In response to receiving a RetryReqLTP, LTPs in the replay buffer are retransmitted in the original order, starting with the RetryReqLTP (peer NxtRxLTP) and ending with the last replay buffer location written (NxtWrLTP−1). Null LTPs are not held in the replay buffer and are not retransmitted.

Link Fabric command flits may be mixed with FP flits in an LTP; however, LF command flits are not part of a Fabric Packet. They carry control information from the Link Fabric sub-layer at one end of a link to the Link Fabric sub-layer at the other end of the link.

In one embodiment, there are three LTP formats, including a standard detection LTP, a 14-bit CRC LTP, and an enhanced Detection LTP. An embodiment of a standard detection LTP is shown in FIG. 5. In addition to the sixteen flits each standard detection LTP has a 16 bit CRC which covers the LTP contents. For illustrative purposes, the Flits in FIG. 5 are shown as 65 bits where bit 64 is the flit type bit.

An embodiment of a 14-bit CRC LTP is shown in FIG. 6. In addition to the sixteen flits, each 14-bit CRC LTP has a two bit credit sideband channel and a 14-bit CRC that covers the LTP contents. Flow control credits are transmitted within LTPs either in special LF command flits or in an LTP credit sideband channel.

In addition to the standard detection LTP, the link may also support an optional enhanced detection LTP holding sixteen flits and having four twelve bit CRC fields. FIG. 7 shows the format of an embodiment of the enhanced detection LTP. Each of the four CRC fields covers all sixteen flits. If any of the four CRCs are bad the LTP is retransmitted. There are two CRC calculation options for the four 12 bit CRCs. The first (48b overlapping) uses four overlapping calculations where each calculation covers all bits within the LTP. The second (12b-16b CRC per lane) uses four non-overlapping calculations where each calculation is limited to all the bits that flow on one of the four lanes.

Figure 8:
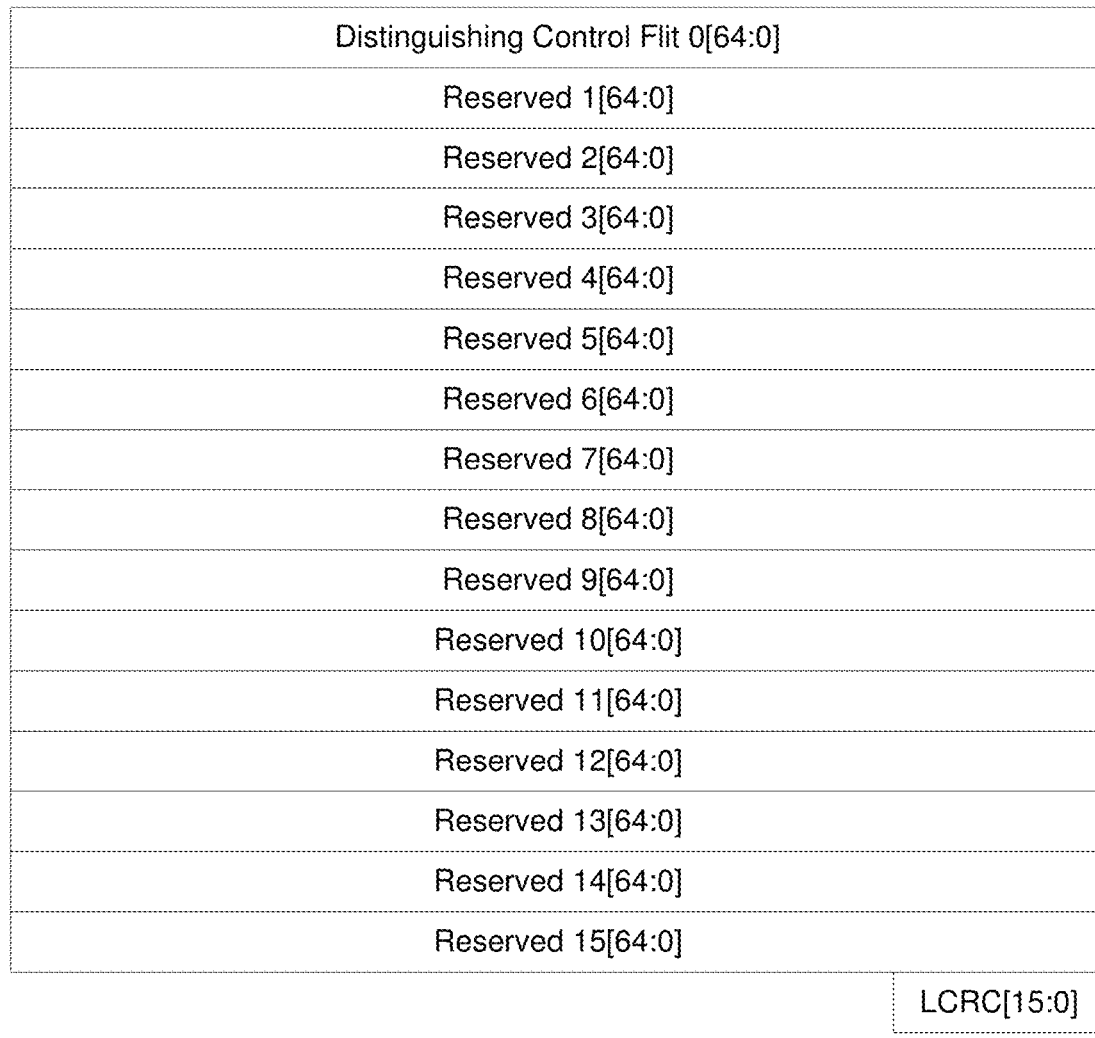
FIG. 8 is a diagram illustrating the data structure of a standard detection Null LTP, according to one embodiment.

As discussed above, LT control Flits used by the link transfer layer are sent in null LTPs. Null LTPs do not consume space in the replay buffer and are not retransmitted. They are distinguished using one of the link transfer LT control flits summarized in TABLE 2 above. Most of the null LTP types are sent in sequential pairs to guarantee that either at least one of the two is received by the link peer without an error or that a RetrainRetryReq will be automatically generated when they both have an error. An example of a standard detection null LTP is illustrated FIG. 8.

Standard detection null LTPs contain a single distinguishing control flit, 975 reserved bits and the standard detection sixteen bit CRC field. Enhanced detection null LTPs contain a single distinguishing control flit, 975 reserved bits and the enhanced detection four 12 bit CRC fields. The two sideband bits are ignored in a null LTP when using a 14 bit CRC.

Figure 10:
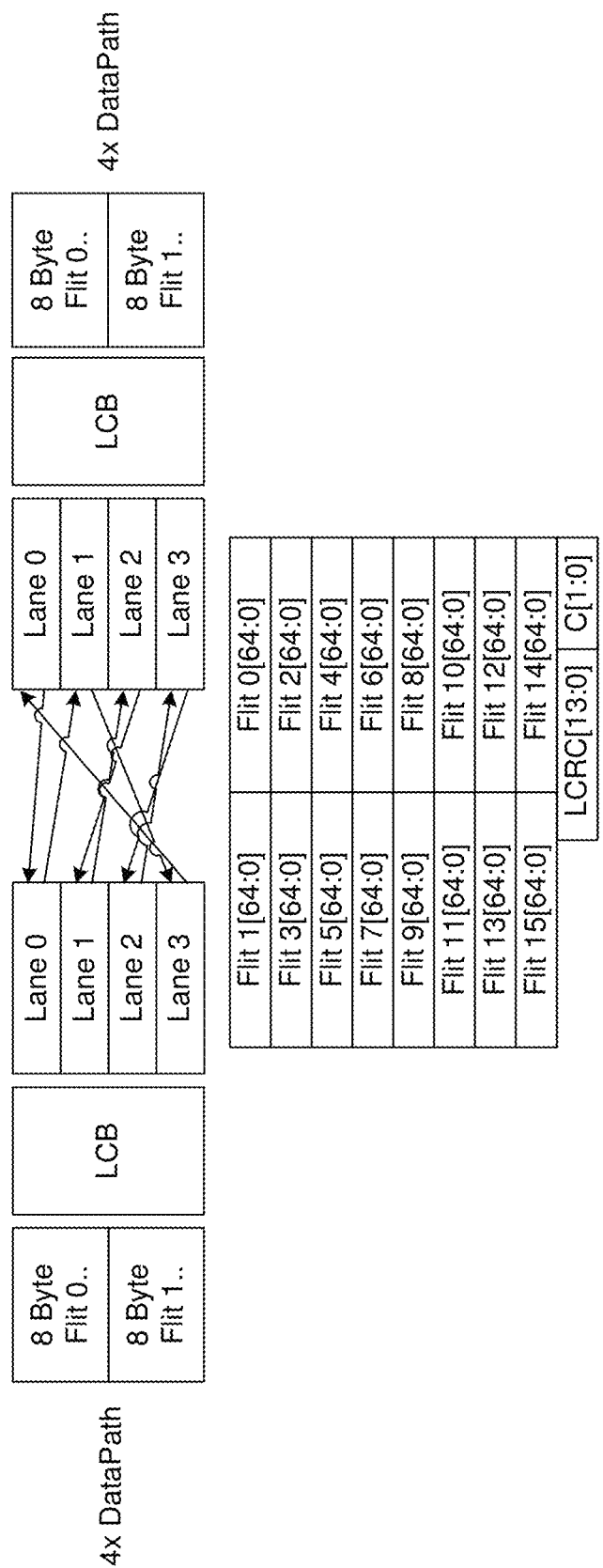
FIG. 10 is a schematic diagram illustrating transmission of a 14-bit CRC LTP with two control bits over a 4-lane link under which two flits are processed two at a time in parallel at the interface between the Link Fabric and Link Transfer sub-layers according to one embodiment.

One LTP at a time is transmitted over the link for both a 4x capable port and an 8x capable port connected to a link with four lanes. This is illustrated using a link fabric data path perspective for both standard detection and enhanced detection LTPs in FIGS. 9a and 9b, respectively (noting the CRC fields are not to scale), while an embodiment of a corresponding signal processing and transfer paths is shown in FIG. 10. A 14-Bit CRC LTP would be similar to the standard detection LTP illustrated in FIG. 8, except the LCRC[15:0] field would be replaced with a combination of an LCRC[13:0] field and a C[1:0] field. The flit transmission order starts with flit 0 and ends with flit 15.

In one embodiment, the physical transmission of data over each lane employ a serial two-level bit non-return to zero (NRZ) encoded bit pattern, which data corresponding to each lane being decoded, deserialized, and grouped into 4 bytes per lane per cycle. This results in a transfer of 16 bytes comprising two flits per cycle. For example, the illustration in FIGS. 9a and 10 assumes an implementation-specific data path that is two flits wide, under which flit 0 and flit 1 would be transmitted at the same time, flit 2 and flit 3 would be transmitted at the same time, etc. The LCRC is calculated by the link transfer sub-layer.

Figure 11:
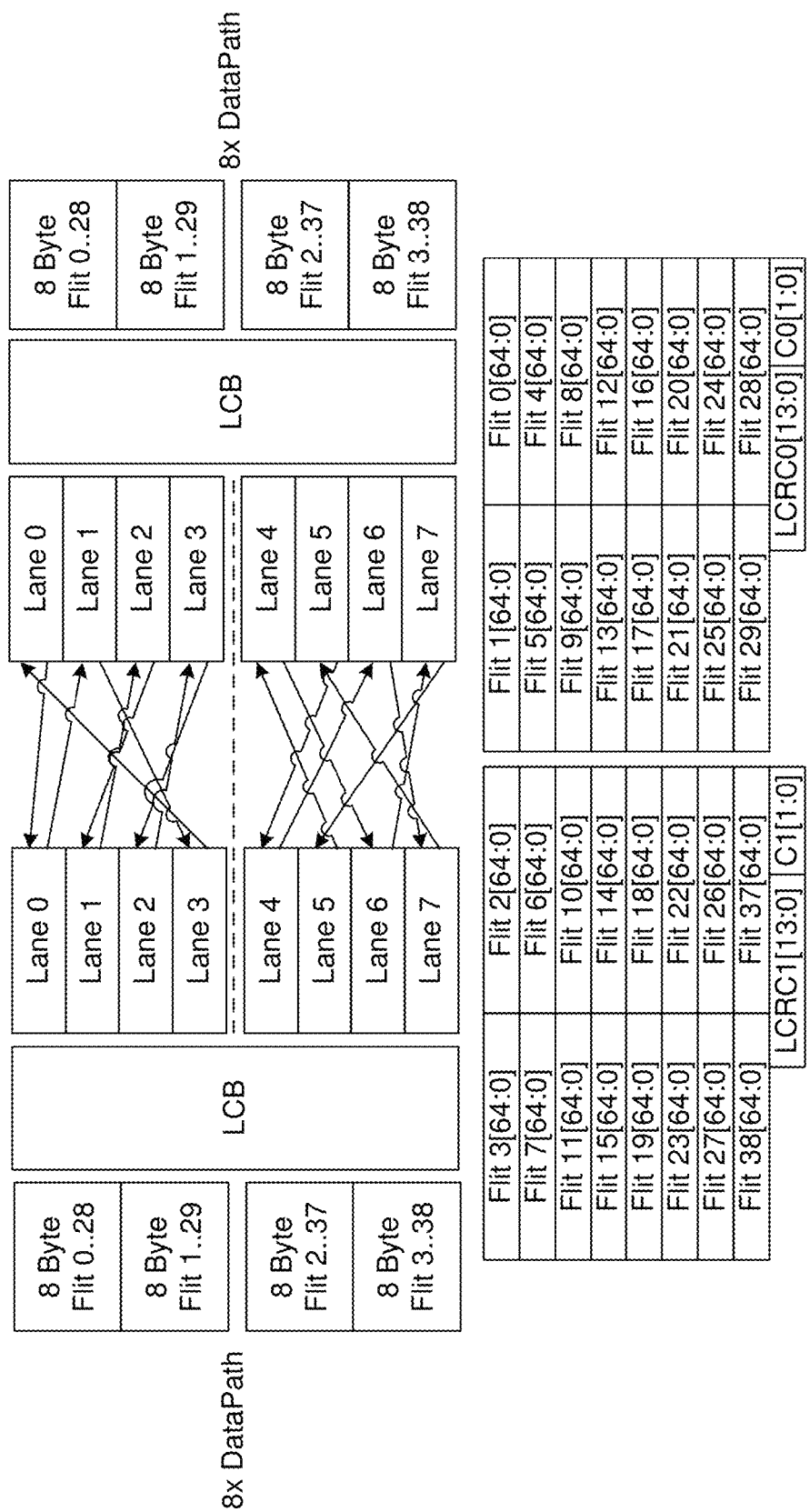
FIG. 11 is a schematic diagram illustrating transmission of two 14-bit CRC LTPs with two control bits in parallel over an 8 lane data path comprising two 4-lane links ganged together, according to one embodiment.

FIG. 11 shows an LTP transmission scheme under which two 4-lane links are ganged to support an 8x datapath under which data is transmitted over 8 lanes. As illustrated, under this scheme four flits from two LTPs are processed in parallel at the interface between the Link Fabric and Link Transfer sub-layers.

As discussed above, the architecture employs three levels of data unit granularity to support data transfers: Fabric Packets, flits, and Link Transfer Packets. The unit of transmission at the Link Transfer Layer, is an LTP. As depicted, each LTP is nominally 16 flits long, and as described above the actual size of an LTP may vary depending on the particular CRC scheme that is used, and the use of referring to an LTP of having a length of 16 flits corresponds to the number of 64-bit flits of data contained in the LTP excluding the CRC bits and the 16 bit 65's.

Figure 12:
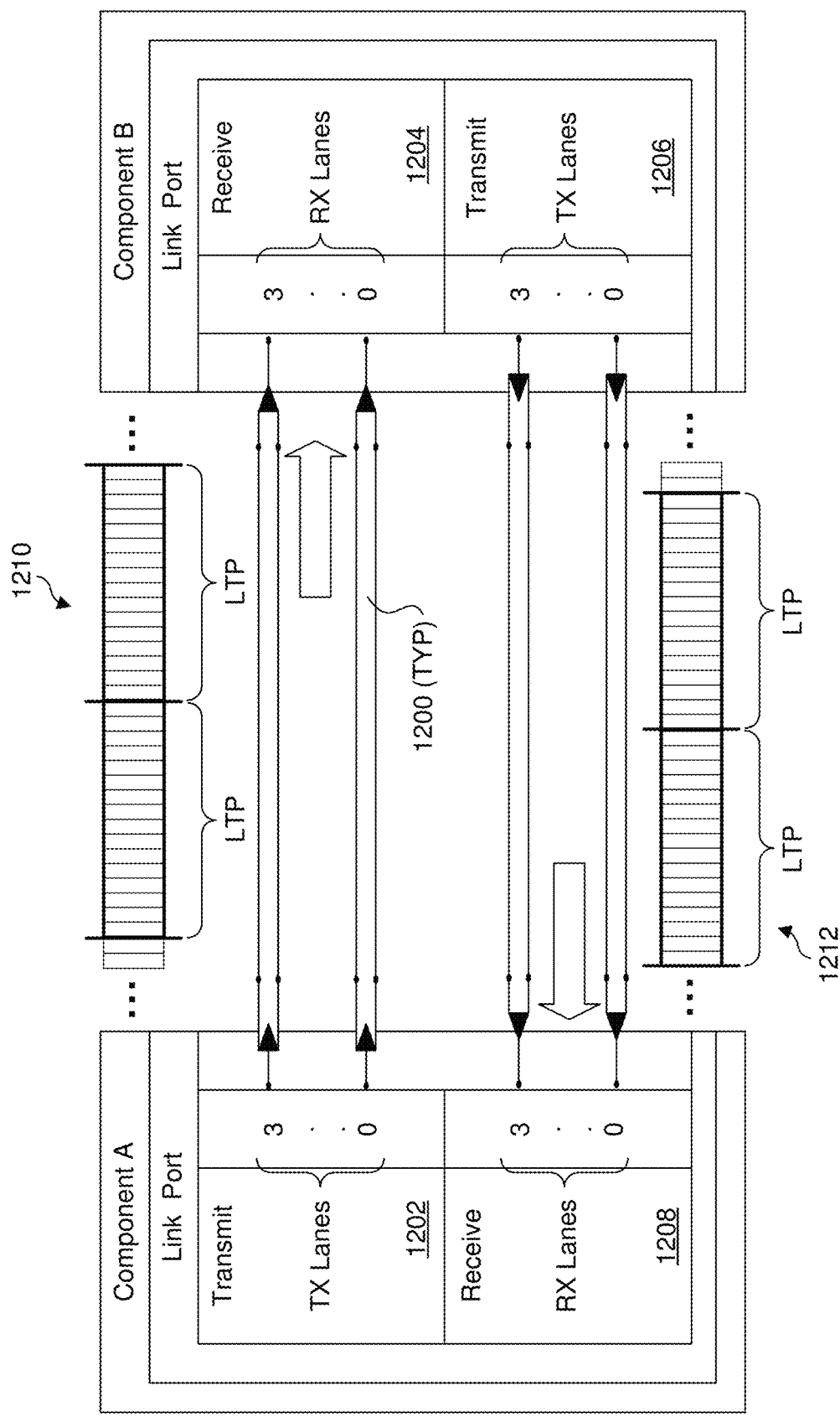
FIG. 12 a schematic diagram illustrating an example of bidirectional data transmission between two link ports employing 4 lanes, according to one embodiment.

The Physical layer (also referred to a "PHY") structure of one embodiment of a link comprising four physical lanes is illustrated in FIG. 12. The PHY defines the physical structure of the link interconnect and is responsible for dealing with details of operation of the signals on a particular link between two link peers, such as depicted by components A and B. This layer manages data transfer on the signal wires, including electrical levels, timing aspects, and logical issues involved in sending and receiving each bit of information across the parallel lanes. As shown in FIG. 12, the physical connectivity of each interconnect link is made up of four differential pairs of signals 1200, comprising lanes 0-3 in each direction. Each port supports a link pair consisting of two uni-directional links to complete the connection between two peer components. This supports traffic in both directions simultaneously. For purposes of illustration and ease of understanding, the lane "swizzle" illustrated in FIG. 10 is not shown in FIG. 12; however, it will be understood that in some embodiments transmit and receive lanes are swizzled.

Components with link ports communicate using a pair of uni-directional point-to-point links, defined as link peers, as shown in FIG. 12. Each port comprises a Transmit (Tx) link interface and a Receive (Rx) link interface. For the illustrated example, Component A has a Tx port 1202 that is connected to Component B Rx port 1204. Meanwhile, Component B has a Tx port 1204 that is connected to Component B Rx port 1208. One uni-directional link transmits from Component A to Component B, and the other link transmits from Component B to Component A. The "transmit" link and "receive" link is defined relative to which component port is transmitting and which is receiving data. In the configuration illustrated in FIG. 12, the Component A transmit link transmits data from the Component A Tx port 1202 to the Component B Rx port 1204. This same Component A transmit link is the Port B receive link.

As previously stated, the fundamental unit for transfer of data between link ports is an LTP. Each LTP is specific to transmission in one direction over a specific link defined by a transmit port and a receive port at opposing ends of the link. An LTP has a lifetime of a single link transfer, and LTP's are dynamically generated by pulling flits from applicable VL buffers and assembling them, 16 at a time, into respective LTP's. As depicted by LTP transmit streams 1210 and 1212, LTPs are transmitted as a stream of flits, with the first and last flit for individual LTPs delineated by the head and tail flit bits, as discussed above with reference to FIG. 4.

As discussed above, the architecture defines a packet delivery mechanism primarily comprising destination-routed Fabric Packets, or FPs, with a Layer 4 payload size of 0 bytes to 10240 bytes. This provides efficient support for sending a range of messages from simple ULP acknowledgements to encapsulated Ethernet Jumbo Frames. Fabric Packets represent the logical unit of payload for ingress to and egress from an HFI. Fabric packets are so named because they have a lifetime that is end-to-end in a fabric. More specifically, the lifetime of a Fabric Packet is the time it takes transfer of the FP content between fabric end points, as defined by source and destination addresses for the FP. Each transfer path of an FP will include transfer across at least one link, and may include transfer across multiple links when the transfer path traverses one or more switches.

The use of flits in combination with FPs and LTPs facilitates data transfer functionality that is unique to the architecture. In particular, separation of FPs, flits, and LTPs support use of virtual lanes, as well as various aspects of QoS and fabric robustness.

Figure 16:
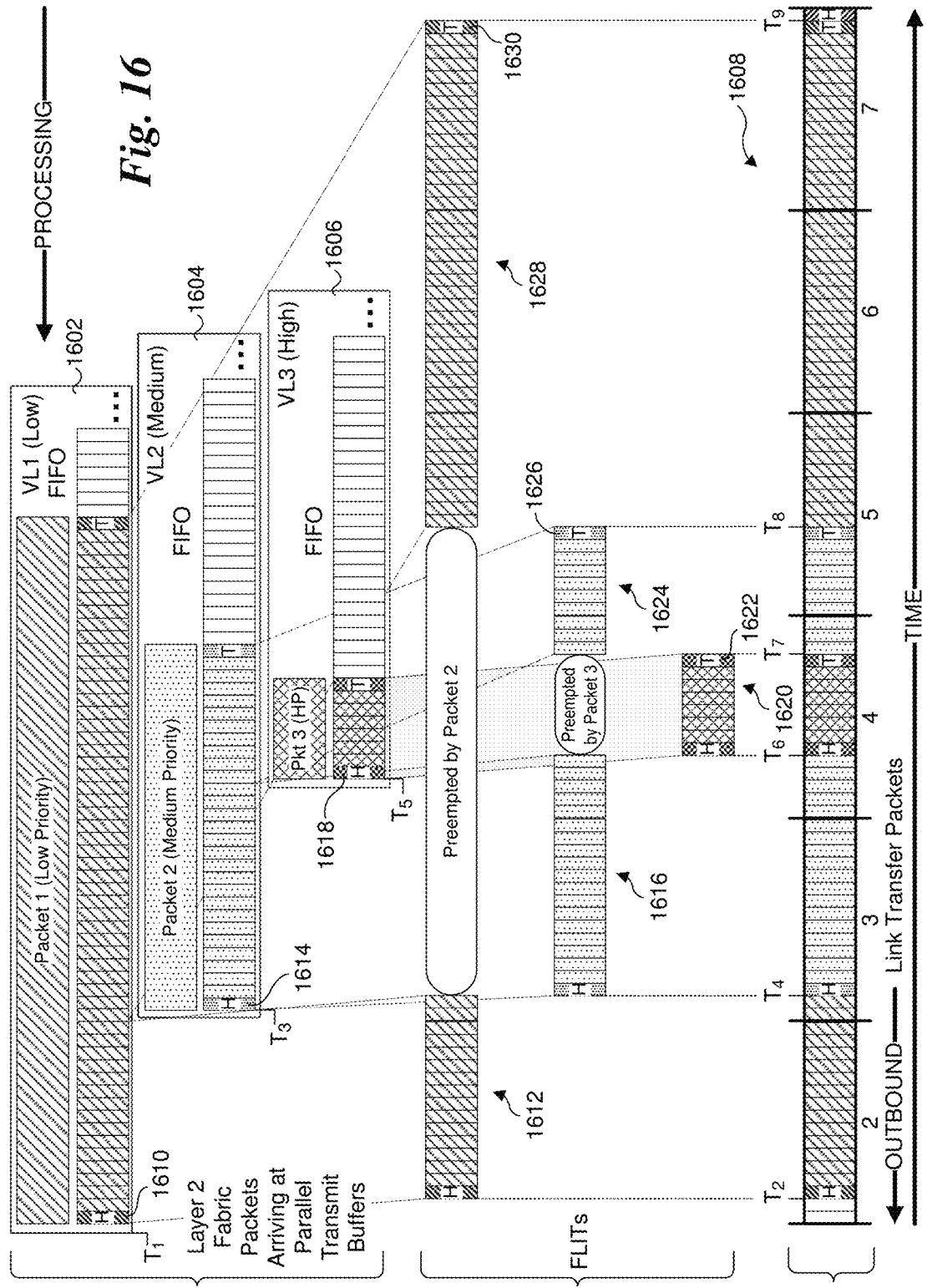
FIG. 16 is a combination schematic and timeflow diagram illustrating an example of preemptive interleaving of flits from three Fabric Packets buffered in three separate VL FIFOs corresponding to VLs having separate priority levels, according to one embodiment.

As discussed above, flits are not transmitted singularly, but are rather groups of 16 flits are packed (bundled) into Link Transfer Packets. This allows the flits to share a common link CRC. The flits in an LTP can come from many different Fabric Packets, which gives the link protocol some interesting characteristics compared to other fabrics. Through the use of an efficient packet preemption and interleaving mechanism, the architecture supports interleaving of the data transfers for different streams, virtually eliminating head-of-line blocking effects, even the blocking effect of a large single packet being physically transferred on a physical link. An illustration of the relationship between Fabric Packets, flits, and LTPs is shown in FIGS. 15 and 16, with further description of these figures described below.

The architecture uses credit-based flow control to manage the buffer resources at the receiver's side of the link and control when a transmitter may send flits. Under this approach, for a fabric port to send a flit it needs sufficient flow control credits available for the required buffer space at the receiving port. In one embodiment, receivers provide a single pool of receive buffers for the Virtual Lanes (VLs) supported on a link. The allocation of the buffer pool is managed by logic on the transmitter side of the link. Dedicated buffers are allocated for each supported VL. In addition, transmitters may manage a portion of the space as a shared pool to be allocated dynamically among the VLs. Credit-based flow control means that data transfer on the links are rigidly managed; there are no unauthorized data transfers, and it also means that the fabric is a so-called "lossless" fabric. In this case lossless means simply that during normal operations flits, and therefore packets, are never dropped due to congestion.

Control information, such as flow control credits, is carried in Link Fabric (LF) Command flits and Link Transfer (LT) Control Flits. LF Command and LT Control flits may be inserted at any point in the transmitter's flit stream. In addition, sideband information in some LTP formats may be used to transfer credits with even less overhead. LF Command and LT Control flits are generated by a link transmitter and consumed by the link receiver.

The architecture includes CRCs for Link Transfer Packets and Fabric Packets to ensure data integrity. The architecture also provides link-level retry for LTPs that are not received correctly. LTP retry significantly improves the effective bit error rate of the link, and enables the use of PHY strategies that may trade lower power consumption for a slightly degraded physical BER. LTP retry is also helpful for large fabrics where the large number of links in the fabric necessitates much better per link BER characteristics in order to maintain an acceptable system level error rate.

Preemption and Interleaving

The L2 Link layer permits flits from different packets to be interleaved when they are sent across a link as long as the packets are in different VLs. One motivation for interleaving is to maximize the usage of a given link. If a sending packet for whatever reason is interrupted by bubbles, a second packet can then be interleaved into the channel instead of having it to sit idle. A second reason for interleaving, called preemption, is to have a higher-priority packet interrupting a lower priority packet that is being transferred to reduce the latency of the higher-priority packet.

Under interleaving, all or a portion of a Fabric Packet's flits are interleaved with flits from other FPs within the stream of flits transmitted across the link. A transmitter selects flits for transmission from among the FPs available to send at a port's output queue. In one embodiment, FPs within a single VL are delivered in order, so within a Virtual Lane all of the flits from one packet are transmitted before any flit from a subsequent packet (in that VL) is transmitted. Across different VLs there is no ordering specified, so flits from packets in different VLs may be arbitrarily interleaved within the flit stream (as well as within a given an LTP, as long as ordering of flits is maintained within each VL). Some transmitter implementations may choose to limit the amount of interleaving between packets.

Under preemption, flits from a Fabric Packets with a higher priority level preempt flits from FPs with a lower priority level. In one embodiment, each Virtual Lane is associated with a respective priority level. Transmitters are configured to insert flits from higher priority VLs onto the link LTPs ahead of flits from lower priority VLs. Transmitters may choose to insert the higher priority flits at boundaries larger than a single flit. Additionally, transmitters may choose to interleave flits from VLs of the same priority, or they may inject all of the flits from one packet onto the link before sending flits from a different packet in a different VL of the same priority.

The receiver on a link separates the incoming flit stream by VL for insertion into queues and for forwarding to the next hop (for receivers in switches). Generally, for at least a given link, the Receiver implementation will support the full scope of interleaving that may be generated by a Transmitter. In some embodiments, a similar scope of interleaving is implemented across the fabric. Optionally, different links may support different levels of interleaving.

In accordance with aspects of packet preemption, flits from Packet B on a VL having a first priority level (e.g., high priority) may preempt a stream of flits from Packet A on a lower priority VL (that is, a VL having a lower priority level than the first priority level). In this case, the head flit of Packet A and zero or more body flits from Packet A may be followed by the head flit from Packet B. This head flit indicates a new packet is starting and the receiver will look for the SC field in the L2 header to determine the VL identifier. Packet B's head flit will be followed by zero or more body flits and finally the tail flit terminating Packet B. After the termination of Packet B, the transmission of Packet A is resumed with zero or more body flits followed by a tail flit.

Packet preemptions may be nested as packets are preempted by successively higher priority packets (packets on successively higher priority VLs). In one embodiment, this is modeled as a linked list with the active packet on the head of the list. When the current packet is preempted the new packet is added to the head of the list. When a preempting packet terminates it is removed from the list and the next expected packet to resume is the new head of the list. The maximum number of packets that may be held on the list at one time is equal to the number of supported VLs.

While the preceding discussion uses priority levels to describe preemption, there is no requirement that preemption be used only for higher priority packets. There may be cases where there are no flits from the current packet available for transmission (resulting in a "bubble"), yet there is a head flit available from a lower priority packet. The head flit and successive body flits from the lower priority packet may be sent. The new head flit will cause the packet to be added at the head of the list and the receiver will accurately track the new packet.

Figure 13:
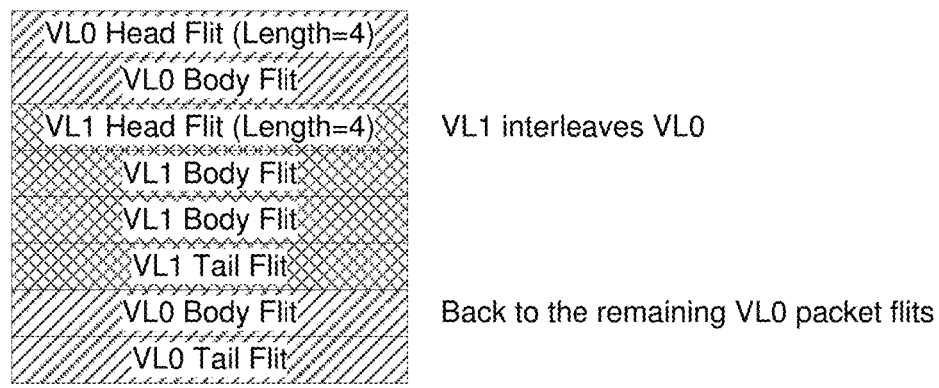
FIG. 13 is a diagram illustrating an example of an embodiment of interleaving Fabric Packet flits from two FPs sent over separate virtual lanes.

A packet is considered interleaved by a second packet when the Head flit of the second packet is sent before the Tail flit of the first packet. In the simplest case of interleaving, all Body flits following the interrupting Head flit belongs to the second packet until its Tail flit, after which the remaining packet flits of the first packet resume. This simple case is graphically depicted in FIG. 13.

The group of flits correspond to an order (top to bottom) of flits in a flit stream. The first flit in the group is the Head flit for a Fabric Packet being transferred over Virtual Lane 0, which is labeled VL0. The VL0 head flit identifies that FP as being 4 flits long (a Head Flit, two body flits, and a Tail flit). The second flit is the first body flit of FP VL0. The next flit is labeled VL1 Head flit, and it is the Head flit for an FP sent over Virtual Lane 1, which is labeled VL1. The VL1 Head flit also identifies this FP as being 4 flits long. Under one approach, when flits of an FP from a new VL are to be interleaved with flits from a current VL, the new VL becomes the active virtual lane for sending flits over the link. This is depicted by adding the Head flit for VL1 to the flit stream. As a result, FP VL1 interleaves FP VL0, which is depicted by first adding the VL1 Head flit, two VL1 body flits, and the VL1 Tail flit. The Tail flit identifies the end of the flits for the FP VL1 FP, which also completes the FP VL1 interleaving. The logic then returns to the FP flits prior to the VL1 interleave, resulting in the remaining FP VL0 body flit and Tail flit being sent out over the link.

To further illustrate how the Link Fabric Sub-Layer supports interleaving of flits from multiple Fabric Packets, FIG. 14 shows an example of Push and Pop interleaving. Interleaving in the Link Fabric Sub-Layer utilizes a push and pop scheme where an interrupting Head flit causes a push of the VL that is being interrupted and a pop of the VL in the stack when a Tail flit is encountered. To visualize how the stack works imagine a stack of papers in an inbox, along with a desk area that is used for working on a current paper. In the context of the Push and Pop interleaving, the stack of papers is referred to as the "stack" and the desk area corresponds to an active VL register in which data identifying the active virtual lane from which flits are being stored. When the VL that is being transmitted is switched in response to an interleave, the interleaved VL becomes the new active VL, while the previous active VL is pushed off the desk onto the top of the stack, hence the term 'push.' At the completion of the VL flits for an FP (e.g., when the Tail flit for the VL FP is added to the LTP transmit FIFO), the VL is removed from the desk area and the VL on top of the stack is "popped" off the stack onto the desk area, thus becoming the new active VL. This pushing and popping of VLs can continue in a nested manner. With the Link Fabric Sub-Layer supporting n VLs, the maximum number of packets that can be simultaneously interrupted is n−1.

In the example of FIG. 14, an ordered list of flits 1400 represent the order that flits from Fabric Packets stored in various VLs are added to an transmit stream of flits (or optionally, shows the order of flits in a flit stream that is received at a receive port). The following description concerns generation of an flit stream under which flits are added to an outbound stream that is bundled into LTPs (that is, LTPs to be 'injected' into the fabric). Indicia identifying the active VL are depicted at various states in an active VL register 1402. Under an initial state, indicia corresponding to VL0 is stored in active VL register 1402, indicating flits are added from the next Fabric Packet buffered for virtual lane VL0 (referred to as VL0 FP). Accordingly, the first two flits for VL0 FP are added to the flit transmit stream, at which point an interleaving event is detected initiating VL1 interleaving VL0. To accomplish this interleaving operation, indicia for VL1 replaces VL0 in the active VL register, pushing VL0 onto the stack. This switches the active virtual lane to VL1, adding the Head Flit and first body flit for the VL1 FP to the flit transmit stream. Next, in response to a second interleaving event, interleaving of VL2 with VL1 is initiated, loading VL2 into active VL register 1402 and pushing VL1 onto the stack. This results in adding all three flits for FP VL2 to the flit transmit stream. Adding the FP VL2 Tail flit completes the interleaving of VL2 with VL1, resulting in VL1 being popped off the stack into active VL register 1402. Another body flit for VL1 is added, followed by initiating VL7 interleaving VL1, which is effected by adding indicia for VL7 to active VL register 1402 and pushing VL1 back to the stack. The three flits corresponding to the entire VL7 FP are added to the flit transmit stream, completing the interleaving of VL7 with VL1 and popping VL1 off of the stack back into active VL register 1402. The Tail flit of the VL1 FP is added, completing the interleaving of VL1 and popping VL0 off the stack into active VL register 1402. This returns VL0 as the active VL, and the last two packets for the VL0 FP are added to the LTP transmit FIFO.

Instead of relying on the Pop for returning to an implicit VL that is being interrupted, the Link Fabric Sub-Layer allows a device to utilize a special LF command flit called the "VL Marker" to explicitly specify which VL is moved to the head of the list. The usage of the VL Marker is less efficient due to this extra marker flit, but it provides more flexibility for interleaving. The diagram in FIG. 15 illustrates this concept.

The VL Marker in effect allows a VL to be pulled from the default stack ordering, or a new VL that is not present in the stack to be moved to the top of the stack. The VLs that remain in the stack continues to follow the Push and Pop rules afterward. The usage of these two different mechanisms can be intermixed and are not exclusive. In the case of a particular VL being pulled from the stack and is then interleaved by another VL, it is pushed back onto the stack.

Returning to FIG. 15, the sequence of operations begins in a similar manner to the Push and Pop example of FIG. 14, wherein the initial active virtual lane is VL0 and the first two flits of the VL0 FP are added to a flit transmit stream 1500. Similar to above, next VL1 interleaves VL0 for two flits, and then VL2 interleaves VL1. However, prior to reaching the VL2 FP Tail flit, a VL marker 1502 is inserted into the flit transmit stream, indicating that VL0 is to become the new active VL. This results in VL0 being pulled from the stack and loaded into active VL register 1402, and pushes VL2 onto the top of the stack. The remaining two flits for VL0 are added to flit transmit stream 1500, finishing VL0, resulting in VL2 being popped off the stack into active VL register 1402. This adds the Tail flit for VL2, finishing VL2 and popping VL1 off the stack into active VL register 1402. Another VL1 body flit is added, following by initiation of VL7 interleaving VL1, which loads VL7 into active VL register 1402 and pushes VL1 from active VL register 1402 onto the stack. A second VL marker 1504 is next added to flit transmit stream 1500 to switch the active virtual lane back to VL1. This pushes VL7 onto the stack and pulls VL1 into active VL register 1402. The VL1 FP Tail flit is added, which completes interleaving of VL1, and VL7 is popped off the stack into active VL register 1402. The last two flits for the VL7 FP are then added.

Figure 17:
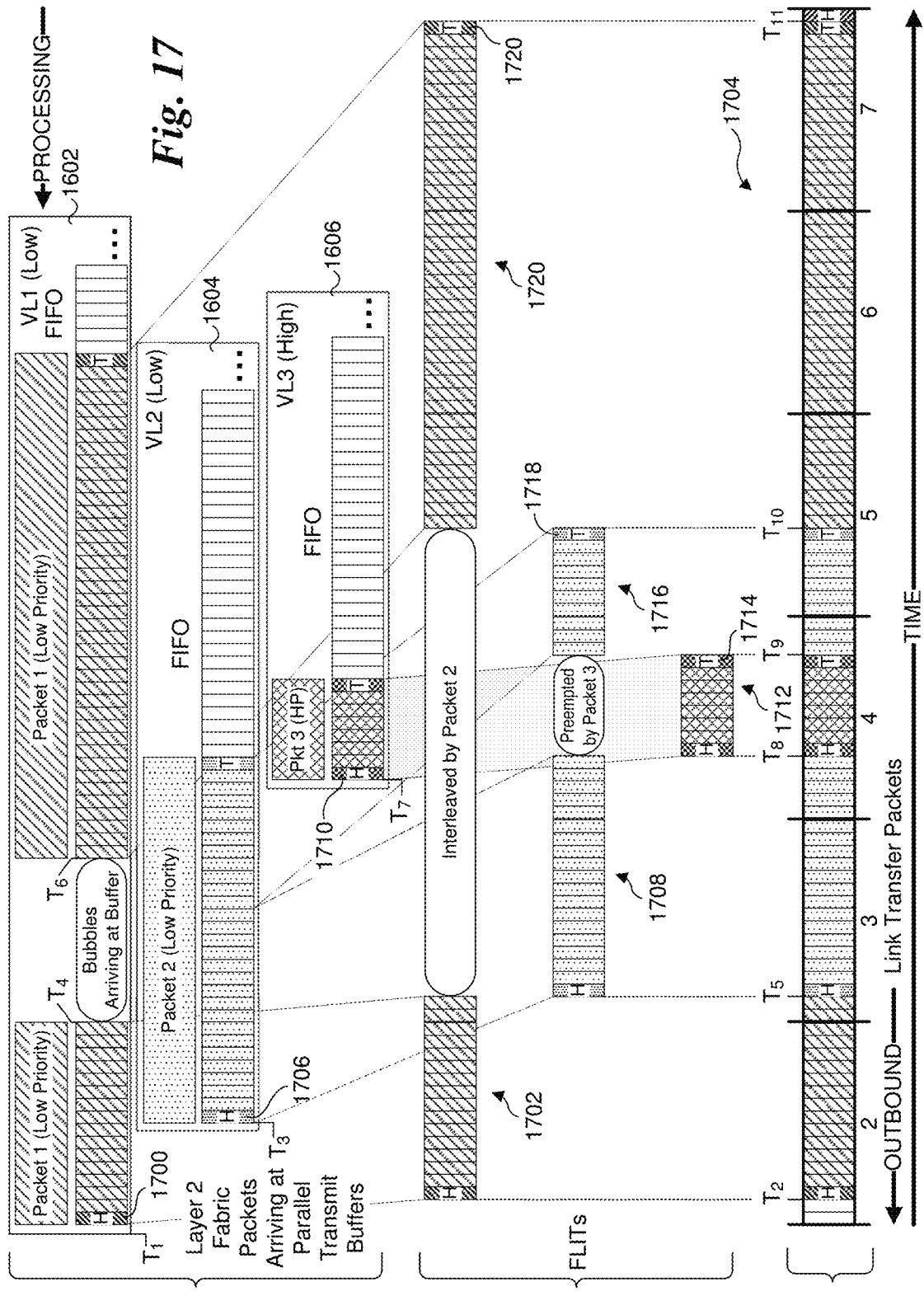
FIG. 17 is a combination schematic and timeflow diagram illustrating an example of bubble interleaving and preemptive interleaving of flits from three Fabric Packets buffered in three separate VL FIFOs under which two VLs share a priority level and the other VL having a higher priority level, according to one embodiment.

The interleaving examples shown in FIGS. 14 and 15 show an exaggerated level of interleaving for illustrative purpose, and for easier understanding of the Push and Pop interleaving scheme and the VL marker interleaving scheme. In an actual system, most interleaving will result from one of two types of interleaving events: (A) preemption; and (B)

bubbles in packet streams. Further detailed examples of preemptive interleaving and a combination of preemptive interleaving and interleaving resulting from a bubble event are shown in FIGS. 16 and 17, respective.

As described above, under preemption, content (flits) for a Fabric Packet in a virtual lane having higher priority may preempt the adding of flits of an FP in a lower-priority VL to the flit transmit stream. At an HFI, gateway, or other types of fabric endpoint, the data from which Fabric Packets are built will generally be initially buffered in some other type of format, such as an Ethernet frame that is to be encapsulated in a Fabric Packet. It is also likely that Fabric Packets may be created as part of a networking stack, similar to how Layer-3 packets such as IP packets and UDP packets are generated. At a switch, both the received and transmitted content is already formatted into flits, with additional metadata used to determine which flits are associated with which FPs, and what switch port the flits are to be sent outbound to their next hop or endpoint destination. In view of the foregoing, FIGS. 16 and 17 depict Fabric Packets as a whole, with the flit formatting of the FP content below the FPs.

The flit content for each FP is temporarily stored in a buffer allocated for the virtual lane to which the FP is assigned. Under various buffer configuration embodiments, separate buffers may be allocated to respective VLs, some VLs may share buffer space, or there may be a combination of the two, where a first portion of a VLs buffer allocation is private to that VL, while another portion is a shared buffer space. Further details concerning the allocation of VL usage for receive buffers (Rbuf) transmit buffers (Tbuf) are described below.

A fundamental aspect of using virtual lanes is that content in a given virtual lane remain in order. This means that, for a given virtual lane, one FP may not pass another FP. Moreover, the flits for the FPs also remain in the order they are originally generated. At the same time, content in different virtual lanes does not have to remain in order relative to other virtual lanes. This enables higher priority traffic to preempt lower priority traffic. Virtual Lanes are also used to eliminate routing and protocol deadlocks, and to avoid head of line blocking between Traffic Classes.

As shown in FIG. 16, there are three buffers 1602, 1604, and 1606 for respective virtual lanes VL1, VL2, VL3. Each of these virtual lanes is also assigned a respective priority level—low priority for VL1, medium priority for VL2, and high priority for VL3. An arbiter (not shown) is used to determine from which VL buffer to pull flits to be added to a flit transmit stream 1608 in which flits are bundled into LTPs 2, 3, 4, 5, 6, and 7. FIG. 16 is a "sliding window" diagram depicted the processing of link traffic for VLs VL1, VL2, and VL3 over the depicted window timeframe. In one embodiment, VL buffers are implemented as FIFO (First-in, First-out) buffers, with each FIFO slot sized to store a flit.

As discussed above, under one aspect of preemptive interleaving, FP content assigned to a higher priority VL may preempt FP content assigned to a relatively lower priority VL. Generally, if FP content corresponding to multiple FPs are buffered in respective VL egress (to be injected into the fabric) buffers, the FP content assigned to the VL with the highest priority will be added to the flit transmit stream. However, it is noted that this is not an absolute rule, as there may be situations under which preemption does not occur. At the same time, if FP content is only available for a given VL or multiple VLs with the same priority, that FP content will be added to the flit transmit stream regardless of the priority levels of other VLs (that currently do not have any buffered FP content). This situation is illustrated in FIG. 16, as follows.

At a time $T_1$, at least a first portion of Packet 1 is buffered in VL1 buffer 1602 and ready for transmission. Due to the streaming nature of data transfers under the architecture, flits may both be received at (added to) and removed from (for transmission) VL buffers. Moreover, adding flits to and removing flits from VL buffers may be somewhat asynchronous, particularly at a switch. As a result, at any given point in time a given VL buffer may or may not have content that is buffered and ready to transmit. In the example of FIG. 16, at time $T_1$, only VL1 buffer 1602 contains flits ready to transmit, while both VL2 buffer 1604 and VL3 buffer 1606 are empty. In order to initiate adding flits for an FP packet to the flit transmit stream, at least the Head flit or flits (depending on the particular FP format) need to be at the head of the VL FIFO buffer. (As described in further detail below, in one embodiment VL buffers are implemented as circular FIFOs, with the FIFO head identified by the FIFO head pointer.) In FIG. 16, a head flit 1610 is buffered at the head of VL1 buffer 1602 at time $T_1$.

At time $T_1$, a first group of flits 1612 is added to an LTP 2 of flit transmit stream 1608, with head flit 1610 at the beginning of the flits 1612 being added at time T2, with the time difference between T1 and T2 representing an amount of time it takes the arbiter to recognize the active VL is to be changed to VL1 buffer 1602 and time to copy flit data from the buffer to flit transmit stream 1608. The difference between $T_1$ and $T_2$ in FIG. 16 is not to scale; but rather is used to illustrate there will be some finite time between when FP data arrives at a VL buffer and is ready for transmission and when that data is actually added to the flit transmit stream.

At time $T_3$, a first portion of Packet 2 has been received at VL2 buffer 1604, beginning with a head flit 1615. Since VL2 has a higher priority than VL1, a preemption event is detected by the arbiter (or other logic, not shown). Depending on the implementation, a preemption event may be detected very shortly after the head flit(s) for Packet 2 reaches the head of the VL2 buffer 1604 FIFO, or there may some delay to reduce the occurrence of some level of interleaving since extra interleaving may result in causing bubbles at other ports, resulting in even more interleaving. For example, if a current packet having flits added to the flit transmit stream has only a few flits left and the would-be preempting packet is large, the logic may wait for the current packet to complete such that preemption of the current packet doesn't occur. In response to the preemption event, the active VL is switched from VL1 to VL2 using the Push and Pop interleaving scheme. Optionally, the VL marker interleaving scheme could be used.

In response to the active VL being switched from VL1 to VL2, indicia for VL2 is loaded into the active VL register and VL1 is pushed onto the stack. As depicted at a time $T_4$, a first group of flits 1616 are pulled from the VL2 buffer 1604 FIFO and added to flit transmit stream 1608. This results in preemption of the transmission of Packet 1 in favor of Packet 2, as well as interleaving flits from Packet 1 and Packet 2.

At time $T_5$, a first portion of Packet 3 has been received at VL3 buffer 1604, beginning with a head flit 1618. Since VL3 has a higher priority than VL2, a second preemption event is detected by the arbiter (or other logic, not shown). This results in the transmission of Packet 2 being preempted in favor of transmitting Packet 3, which is effected by loading indicia for VL3 into the active VL register and pushing VL2 onto the stack. As depicted beginning at a time $T_6$, the entirety of the flits 1620 for Packet 3 are added to flit transmit stream 1608, thus interleaving Packet 3 flits with Packet 2 flits.

In connection with adding tail flit 1622 to flit transmit stream 1608, the arbiter (or other logic) detects that adding the flits from Packet 3 has completed. Thus, VL3 is removed from the active VL register, and VL2 is popped off of the stack into the active VL register, returning VL2 as the active VL. This results in the remaining flits 1624 of Packet 2 being added to flit transmit stream 1608, beginning at time $T_7$, and ending at time $T_8$, at which point it is detected that the tail flit 1626 has been added and thus Packet 2 has completed. This results in VL1 being popped off the stack into the active VL register, and VL1 replacing VL2 as the active VL. The remaining flits 1628 of Packet 1 are then added to flit transmit stream 1608, completing at a tail flit 1630 at a time $T_9$. A head flit for the next fabric packet is then added as the last flit for LTP7 (the next fabric packet is not shown for simplicity).

FIG. 17 illustrates a bubble interleaving event, followed by a preemption interleaving event. When the flits for a Fabric Packet traverse a routing path including multiple hops, a portion of the flits may be preempted at one or more switches. This results in a disruption of the flit stream for a given FP. When such a disrupted flit stream is received at a receive port, there is a gap between when the portion of the flits that were transmitted prior to the preemption and the portion of the flits that were transmitted after the preemption. This results in a "bubble." In addition to this bubble example, bubbles may also result for various other reasons. In response to detection of such bubbles, interleaving may be implemented with flits from FPs having the same or lower priority level as the FP with the bubble.

As in the example of FIG. 16, at time $T_1$ at least a first portion of Packet 1 including a head flit 1700 is received in VL1 FIFO buffer 1602, and beginning at a time $T_2$ a first portion of flits 1702 is added to an LTP 2 of a flit transmit stream 1704. At time $T_3$, a first portion of flits for Packet 2 is received at VL2 FIFO buffer 1604, beginning with a head flit 1706. VL1 and VL2 both are assigned a low priority, and thus each of Packet 1 and Packet 2 are assigned the same low priority level. Although FPs and/or their flits cannot pass one another when assigned to the same virtual lane, FPs and/or their flits are permitted to pass one another when they are assigned to different virtual lanes. This situation may also result when the different virtual lanes have the same priority level. Generally, when FPs in two (or more) virtual lanes share the same priority level, the FPs are added (via their flits) to an flit transmit stream in their entirety, e.g., all flits for a first FP are added, all flits for a second FP are added, etc. The selection of which FP to send out next from multiple VLs sharing the same priority level will be a function of the arbiter selection logic, which generally will be designed to treat transmission of FPs in the VLs equally (or fairly equally). For example, in some embodiments a round-robin scheme may be implemented. Such a round-robin scheme may also consider the length of FPs, such that the buffer usage level across the multiple VLs is targeted for some level. For instance, a round-robin only approach between two VLs would alternate sending of FPs in the VLs, whereas a usage level approach may transmit a first FP from one of the VLs, followed by second and third FPs from the other VL if the first FP is significantly larger than the second and third FPs.

Under the example illustrated in FIG. 17, normally all of the flits for Packet 1 would be sent, followed by all of the flits for Packet 2 (presuming there were no preemption interleaving events and only VL1 and VL2 were being considered for arbitration). However, as illustrated, there is a bubble in the transfer of flits for Packet 1 beginning at a time $T_4$. The arbiter logic considers the existence of the bubble in combination with the availability of flits for Packet 2 in VL2 FIFO buffer 1604. In response, a bubble interleaving event is detected, which results in Packet 2 flits 1708 being interleaved with Packet 1 flits, beginning at a time $T_5$. As with preemptive interleaving, the initiation of interleaving begins by loading VL2 into the active VL register and pushing VL1 onto the stack.

While flits from Packet 2 are being added to flit transmit stream 1704, at a time $T_6$ a second (and remaining) portion of flits for Packet 1 begin to be received and buffered in VL1 FIFO buffer 1602. Although these flits are available for immediate transmission, their receipt at time $T_6$ does not create an interleaving event (or otherwise end the interleaving of flits from Packet 2). Rather, flits from Packet 2 continue to be added to flit transmit stream 1704 until a preemptive interleaving event is detected at time $T_7$ in response to detection of the availability of Packet 3 flits including a head flit 1710 in VL3 FIFO buffer 1606. As in the example of FIG. 16, VL3 has a high priority level that is also higher than the priority level for either VL1 or VL2. As a result, the availability of flits for high priority Packet 3 initiates a preemptive interleaving of Packet 3 flits 1712 with Packet 2 flits, beginning at a time $T_8$ and completing at a time $T_9$ with the addition of a tail flit 1715. At the completion of the interleaving of Packet 3, VL2 is popped off the stack and loaded into the active VL register, thus returning VL2 as the active virtual lane. This results in adding Packet 2's remaining flits 1716 to flit transmit stream 1704.

At the completion of Packet 2, as identified by a tail flit 1718 to flit transmit stream 1704 at a time $T_{10}$, VL1 is popped off the stack and loaded into the active VL register, returning VL1 as the active VL. This results in adding flits 1720 corresponding to the remaining portion of Packet 1 to flit transmit stream 1704, where the adding of flits for Packet 1 is completed when a tail flit 1722 is added at a time $T_{11}$.

Link Reliability

As discussed above, the architecture's fabric is "lossless," meaning that packets are never discarded upon reception or otherwise "lost" during transmission. This is accomplished via a combination of mechanisms that primarily include the use of credit-based flow control and the use of replay buffers. Under the credit-based approach, a sending unit (e.g., HFI, switch, or gateway) will not send flits to a receiving unit (e.g., another HFI or switch) unless the sending unit has credit for transmitting the flits; credits are on per-VL basis and are used to indicate a receiver has adequate buffer space for the VL that is to be used for the flits.

Each LTP includes one or more CRCs that are used for verifying data integrity, depending on whether standard detection or enhanced detection LTPs are used. The CRC(s) are calculated over the data content of the LTP and the resulting CRC value(s) is/are appended to the end of the LTP, following the last flit (flit 15), as illustrated in FIGS. 5-8 and described above. Upon reception, the CRC(s) are recalculated and a comparison between the CRC(s) and the received LTP and the CRC(s) in the received data is made to determine whether there are any data errors. If a transmitted CRC and a CRC calculated over the received data do no match, a data error is detected. In response to detection of a CRC mismatch, the LTP is retransmitted through use of a replay buffer.

'Reliable' LTPs are held in a replay buffer for period of time that is long enough to guarantee that a lack of a retransmit request indicates it has been received successfully by the peer. Under this approach, a receiver does not send ACKs to acknowledge a packet has been successfully received; rather, the lack of a retransmit request within a round trip time period provides an implicit acknowledgement that an LTP has been successfully transferred across a link. The use of the term 'reliable' LTPs is to distinguish LTPs that are held in the replay buffer from other LTPs that are not held in the replay buffer, such as null LTPs. Accordingly, null LTPs are not retransmitted.

Replay buffer location pointers are maintained for each LTP at the transmitter (NxtTxLTP) and receiver (NxtRxLTP) but are not exchanged as part of the LTP. When a transmission error is detected by the receiver (via a CRC mismatch) it sends a RetryReqLTP to the transmitter that contains the NxtRxLTP replay buffer location pointer. Upon receipt of the RetryReqLTP at the transmitter, the LTPs in the replay buffer are retransmitted in the original order, starting with the RetryReqLTP (peer NxtRxLTP) and ending with the last replay buffer location written. In one embodiment, a next replay buffer slot to write LTP data to (NxtWrLTP) is used, and thus the last replay buffer location written is NxtWrLTP−1.

In connection with detection of a link error indicated by a CRC mismatch, a second mechanism is implemented to determine which lane is errant. This mechanism employs a per-lane CRC that is only calculated at the receiver and does not use a comparison to a per-lane CRC in the transmitted data (as none exists). Rather, the per-lane CRC is used to compare per-lane CRCs that are calculated for an LTP with a CRC mismatch to corresponding per-lane CRCs that are recalculated for the same LTP when it is retransmitted via the replay buffer, either on a per-lane or per transfer-group basis, as discussed below.

Figure 18A:
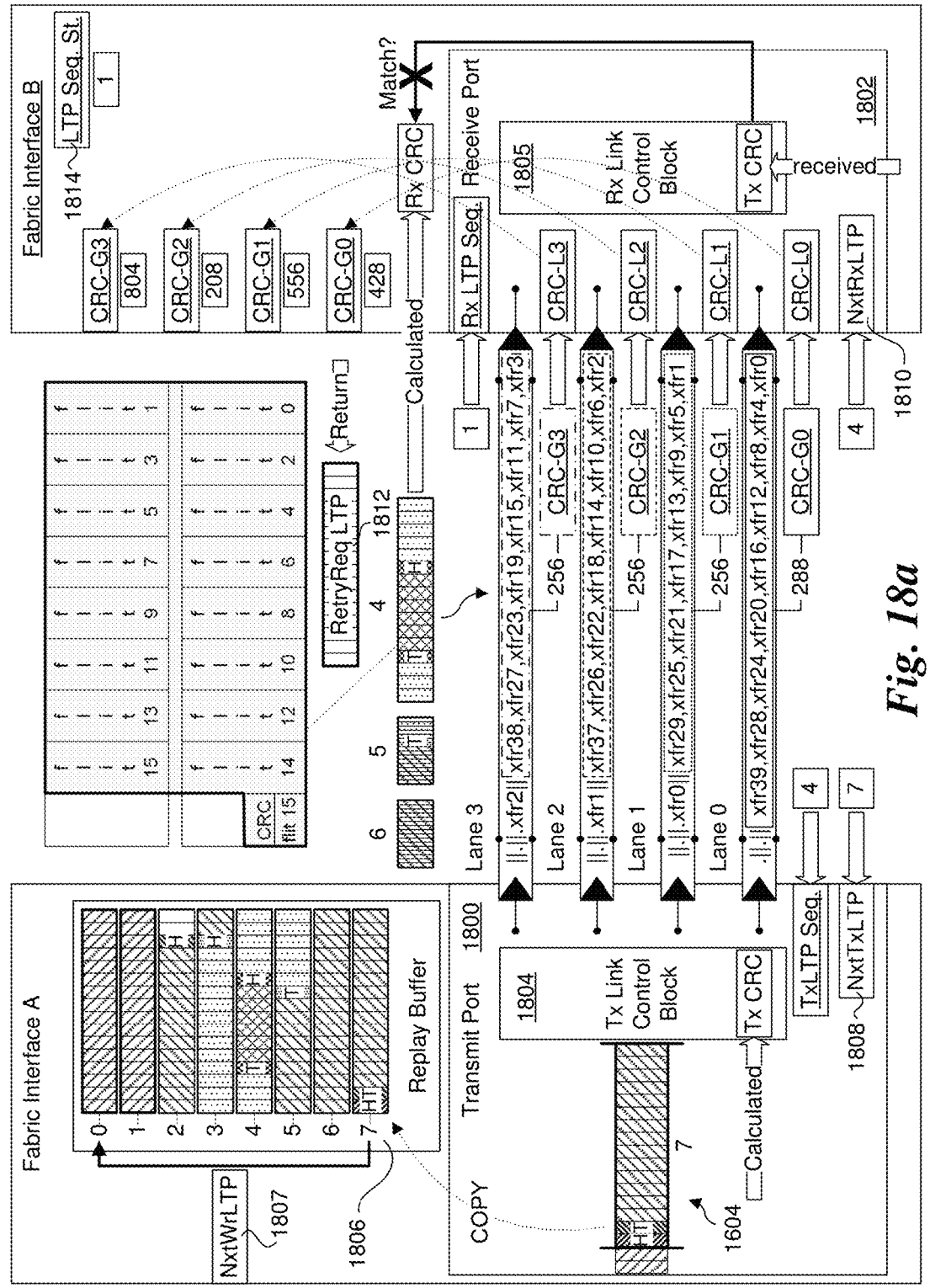
Figure 18B:
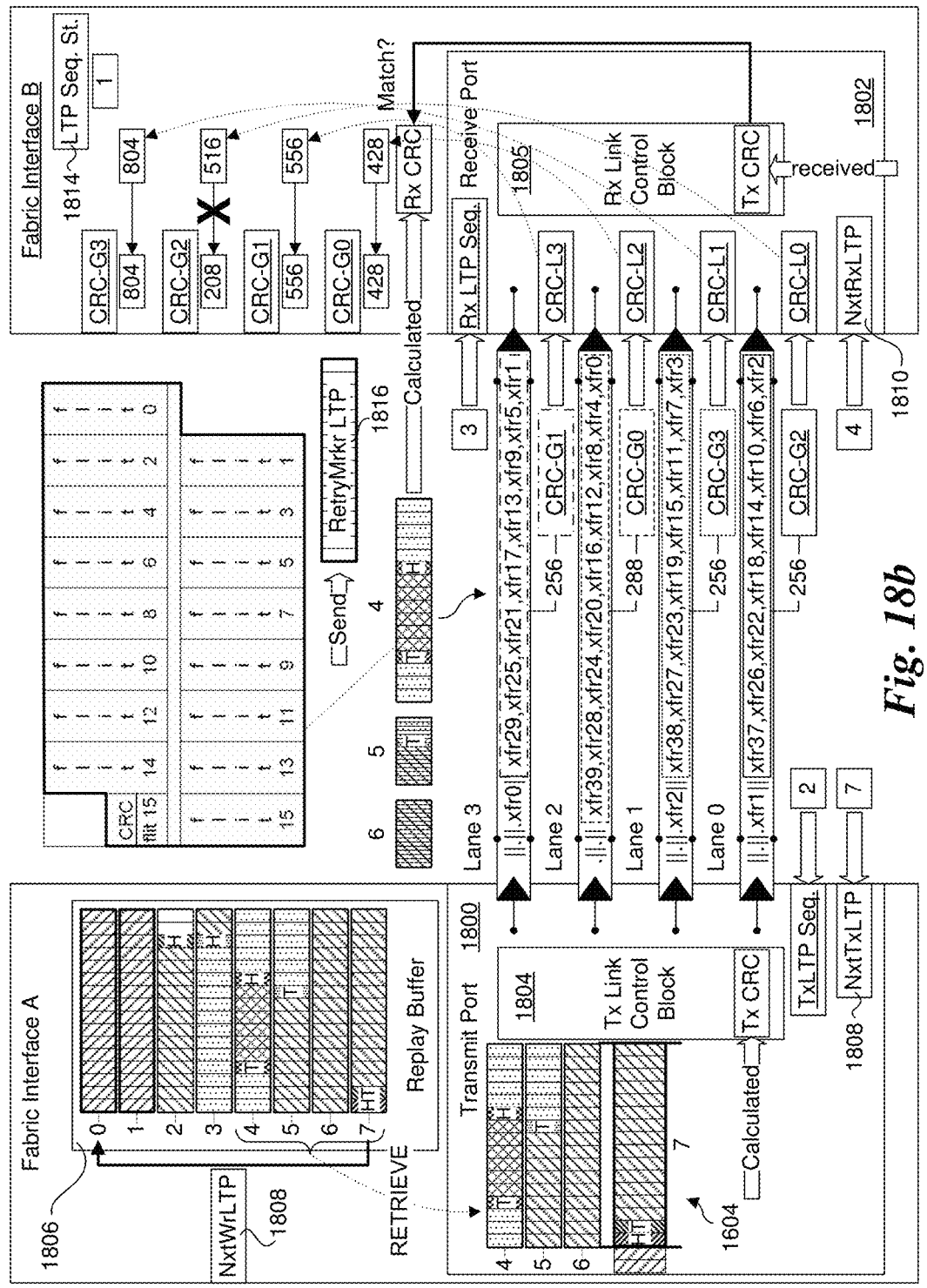

An example of usage of a replay buffer along with usage of per-lane CRCs to detect errant lanes is illustrated in FIGS. 18a and 18b. In this example, an LTP transmit stream including LTPs 2, 3, 4, 5, 6, and 7 of LTP transmit stream 1604 are being transmitted from a link interface A of a device A to a link interface B of a peer device B at the other end of the link. More specifically, the LTP transmit stream is transmitted from a transmit port 1800 of link interface A to a receive port of link interface B using a four-lane link interconnect similar to that shown in FIG. 17 discussed above. Under the architecture's links, LTP content is sent serially over multiple lanes in parallel. As discussed above, the number of lanes may vary depending on the particular link configuration; in addition, transfers on links that have a reduced number of lanes are also supported. By way of example and without limitation, a single bit is transmitted over each lane during a time period referred to as a Unit Interval (UI). In one embodiment, transfer of LTP data is segmented into a data unit referred to as a transfer unit (XFR). In one embodiment, each XFR is 32-bit quantity. In one embodiment, all bits of an XFR are transmitted using the same lane. In some embodiments, some XFRs may be transmitted over multiple lanes.

FIG. 19 illustrates a mapping of XFRs for a standard detection LTP, which has a length of 1056 bits. Each XFR is 32 bits in length and is transferred over a single lane. Accordingly, there are 33 XFRs for each LTP. FIG. 20 shows the per-lane XFR mapping for a four-lane link, according to one embodiment. Nominally, for illustrated purposes and simplicity, each flit is 64-bits. However, as illustrated in FIG. 3, each flit has an extra $65^{th}$ bit that is used in whole (for Body flits) or in part (for Head and Tail flits and control flits) to identify its flit type. During transmission, the $65^{th}$ bits are transmitted in-line, meaning, upon deserialization and reassembly of the serially-transferred bit streams transmitted in parallel over the multiple lanes, the $65^{th}$ bits are present every $65^{th}$ bit position in the 1056 bit standard detection LTP.

Figure 21:
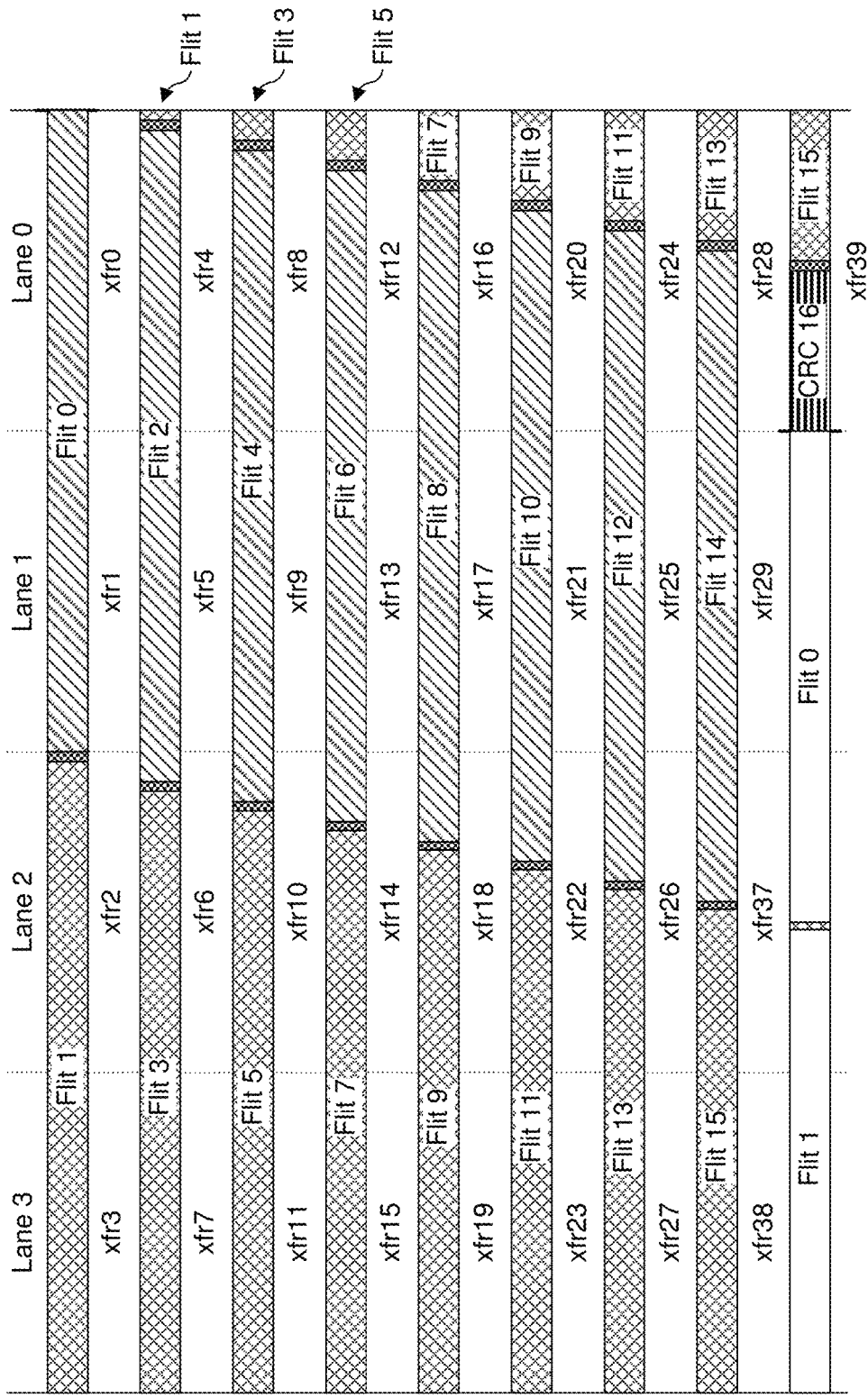
FIG. 21 is a diagram illustrating how flit data comprising 8 bytes of data plus a $65^{th}$ bit is transferred over a 4-lane link using 33 32-bit XFRs, according to one embodiment.

In one embodiment of a four-lane link, data bits for two flits are transferred over the link in parallel over 32 UI, such that 128 bits comprising four XFRs are (logically) transferred together. However, as stated above, every $65^{th}$ position is occupied by a flit type bit. As result, XFRs do not map exactly 2:1 with flits. Rather, the in-line presence of the extra $65^{th}$ bits results in a wrapped transfer, as illustrated in FIG. 21.

In further detail, in one embodiment an extra two bits are wrapped for each 128 UI, resulting in an aggregation of 16 bits after 8 groups of four-lane XFRs are completed. These 8 groups, comprise the first 32 XFRs, with the $33^{rd}$ XFR comprising the last 16 bits of flit 15 (plus its $65^{th}$ bit), followed by a 16-bit CRC (or optionally, a 14-bit CRC plus 2 control channel bits for a CRC-14 LTP). For illustrative purposes and ease of understanding, flits may be illustrated herein as being transferred in units of 64-bits; however, it will be understood that in one embodiment flits are actually transferred in units of 65-bits.

Returning to the four-lane XFR mapping of FIG. 20, the use of 33 XFRs per 1056-bit standard detection LTP results in a wrapping of one XFR for each LTP. This, in turn, shifts the starting point of each following LTP to the next lane, in accordance with an LTP starting lane sequence of Lane 0, Lane 1, Lane 2, Lane 3, return to Lane 0, Lane 1 . . . etc. This is referred to herein as a four-lane standard-detection LTP 'sequence,' or simply LTP sequence for short (as applied to the standard-detection LTP transfers over four lanes illustrated and discussed herein). For convenience, the LTP sequence states are illustrated as $1^{st}$, $2^{nd}$, $3^{rd}$ and $4^{th}$, although in one embodiment it is tracked as 0, 1, 2, 3 using two bits.

As shown in FIG. 18a, serialization and mapping of flits in LTP transmit stream 1604 is performed by a transmit link control block 1804 (or otherwise a portion of this operation is performed by another block that is not shown). Prior to being processed by transmit link control block 1804, the data content for each reliable LTP is copied into one of the LTP slots in a replay buffer 1806, wherein the slot is identified by a NxtWrLTP pointer 1807. Generally, the replay buffer may have a variable-size, or a predetermined-size. In one embodiment, the replay buffer may be selectively configured to one of multiple predetermined sizes.

As illustrated, in one embodiment, the replay buffer is implemented as a circular FIFO with a next transmit LTP (NxtTxLTP) pointer 1808 having a value that wraps from the last FIFO slot back to the first FIFO slot (wraps from slot 7 to 0 in this example). The use of a circular FIFO results in prior LTP data (corresponding to previously transmitted LTPs) being overwritten by new (next to be transmitted) LTP data; however, measures are provided to ensure that no LTP data is overwritten until an implicit acknowledgement that the LTP data has been successfully transferred is detected, as detailed below. This scheme facilitates reliable transmission of data over a link without requiring the use of explicit ACKs, thus reducing the overhead associated with use of ACKs. This also reduces the buffering at transmit ports necessary for supporting ACK-based reliable transmission schemes used for protocols above the link layer (such as TCP).

With reference to flowcharts 2200*a-e* of FIGS. 22*a*-22*e* and the transmitter and receiver state machine diagrams 2370 and 2350 of FIGS. 23*a* and 23*b*, handling of link errors including detection of errant link lanes is implemented in the following manner, according to one embodiment. During a link initialization process, various information is exchanged between the peer transmit and receive ports of the link's interfaces, establishing a bi-directional communication link. During this process, the replay buffer's NxtTxLTP pointer 1808 and a corresponding next receive LTP (NxtRxLTP) pointer 1810 on the receive side are initialized to 0. Upon successful link initialization, the link transfer mode is set to "normal" as depicted by a start block 2202 and the Link-TransferActive.normal states for the transmitter and receiver in FIGS. 23*a* and 23*b*, and LTPs are ready to be transferred across the link. For clarity, the following focuses on data being transferred in one direction; similar operations are performed in the reverse direction (using a separate set of lanes) to support bi-directional communication over the link.

As the LTPs in LTP transmit stream 1604 are sequentially transmitted, the LTPs' data are sequentially copied into replay buffer 1806, with NxtTxLTP pointer 1808 advancing one slot per LTP (or wrapping back to 0 once the last slot (MyLTPmax) is reached. For the illustrated example state in FIG. 18*a*, LTPs 2-6 have been previously transmitted from transmit port 1800, with LTPs 2 and 3 having been previously received by receive port 1802, were processed by a Rx Link Control block 1805, and were determined to be good LTPs based on LTP CRC matches. LTP 4 is about to be received, while LTPs 5 and 6 are in-flight (data for these LTPs has been sent outbound from the transmitter port 1800, but have yet to be received at receive port 1802).

Returning to flowchart 2200*a*, the main flowchart loop begins in a block 2204 in which an LTP is received at a receive port. In the example of FIG. 18*a*, this operation is depicted by LTP 4 being received at receive port 1802. As depicted in a block 2206, for each lane, a CRC is calculated based on the data received over that lane during the applicable LTP sequence state, and the CRC is written to per-lane CRC registers, as depicted by CRC lane registers CRC-L0, CRC-L1, CRC-L2, and CRC-L3. In one embodiment, the data in these registers is overwritten by the CRC calculation results for the current LTP, such that the CRC lane registers only store data for the most recently-processed LTP. In one embodiment, the per-lane CRC for a four-lane link is a 12-bit CRC that is dynamically calculated as bits for each lane are received.

In a block 2208, a CRC for the received LTP data (Rx CRC) is calculated, and compared to the Tx CRC in the transmitted LTP. The Tx CRC is calculated by transmit port 1800 using the LTP data that is to be transmitted to the receiver and is appended at the end of the LTP, as illustrated in the various LTP formats herein. The receiver extracts the TX CRC from the received LTP data and compares the Tx CRC with an Rx CRC calculated over the received LTP data. In a decision block 2210 a determination is made to whether the received Tx CRC and the calculated Rx CRC match. If they match, the LTP is deemed good, and normal processing of the LTP data is performed, as depicted in a block 2212, and the logic returns to block 2204 to process the next received LTP.

In the example shown in FIG. 18*a*, the Tx CRC and Rx CRCs do not match (CRC mismatch) for LTP 4, which indicates an LTP data error. Link data errors may result from various link conditions, and at this point the particular link condition causing the error is unknown; what is known is the LTP data that is received is different than what was transmitted, and thus the received LTP has errant data and will not be processed further. The mismatched LTP CRC corresponds to a NO result for decision block 2210, causing the logic to proceed to a block 2214 in which the LTP is depicted as being bad, as also depicted by RcvBadLTP in receiver state diagram 2350. In response to detection of a bad LTP, multiple operations are initiated and performed substantially in parallel, as depicted by the operations in each of blocks 2216 (in FIG. 22*a*, 2218, and 2220 (in FIG. 22*b*).

As depicted in block 2216, the per-lane CRC values that were calculated for a bad LTP are stored on a per-lane or per XFR-group basis. If the number of XFRs per LTP is evenly divisible by the number of lanes, then the per-lane CRC values are stored on a per-lane basis; otherwise, they are stored on a per XFR-group basis. For example, for a link with three active lanes and 33 XFRs, per-lane CRC values are stored, since 33/3=11. Conversely, for either four or two lanes, the per-lane CRC values are stored on a per XFR-group basis (33/4=7.5 and 33/2=16.5). If per XFR-group CRCs are stored, the receive LTP sequence state is stored in a register 1814.

An example of per XFR-group CRCs is illustrated in FIG. 24. As shown, the number of XFRs for which the per-lane CRCs are calculated is not equal across the four lanes; rather, one of the lanes will receive 9 32-bit XFRs (and thus 288 bits) per standard detection LTP, while the other three lanes will receive 8 32-bit XFRs (and thus 256 bits). Moreover, the lane receiving 9 32-bit XFRs will depend on the LTP sequence state. As will be discussed in further detail below, the stored per-lane CRCs are used to detect which lane or lanes produced the error by comparing the per XFR-group CRCs for an LTP having a CRC mismatch and a subsequent retransmission of the same LTP. Since the LTP sequence used for the original LTP transmission may be different than the LTP sequence used for the retransmitted LTP, per XFR-group CRCs are employed. The per-XRF group CRCs will result in comparing CRCs calculated over the same XFRs, whereas if a per-lane CRC scheme was used this may or may not result in the CRC calculations being over the same XFRs when operating a link with four lanes (25% chance of being the same) or two lanes (50% chance of being the same).

As shown in FIG. 24, the per XFR-group CRCs are labeled CRC-G0, CRC-G1, CRC-G2, and CRC-G3. The transfers over which these CRCs are calculated will depend on both the lane and the LTP sequence state. For example, for the first LTP sequence state, CRC-G0 is calculated from the 9 XFRs 0, 4, 8, 12, 16, 20, 24, 28, and 32 received on lane 0, while the calculated values for CRC-G1, CRC-G2, and CRC-G3 will depend on the 8 XFRs depicted for lanes 1, 2, and 3, respectively. Under the second LTP sequence state, CRC-G0 is calculated from the 9 XFRs on lane 1, while the calculated values for CRC-G1, CRC-G2, and CRC-G3 will depend on the 8 XFRs depicted for lanes 2, 3, and 1, respectively. A similar approach is used for both the $3^{rd}$ and $4^{th}$ LTP sequence states, as shown.

During the timeframe depicted in FIG. 18*a*, the LTP sequence state is 1, and thus CRC-G0, CRC-G1, CRC-G2, and CRC-G3 are respectively calculated from data received for LTP 4 on lanes 0, 1, 2, and 3. Exemplary calculations for LTP per XFR-group CRC-G0, CRC-G1, CRC-G2, and CRC-G3 values are shown in FIGS. 18*a* and 25, and are respectively are 428, 556, 208, and 804. These per XFR-group CRC values are stored in registers CRC-G0, CRC-G1, CRC-G2, and CRC-G3.

Figure 22A:
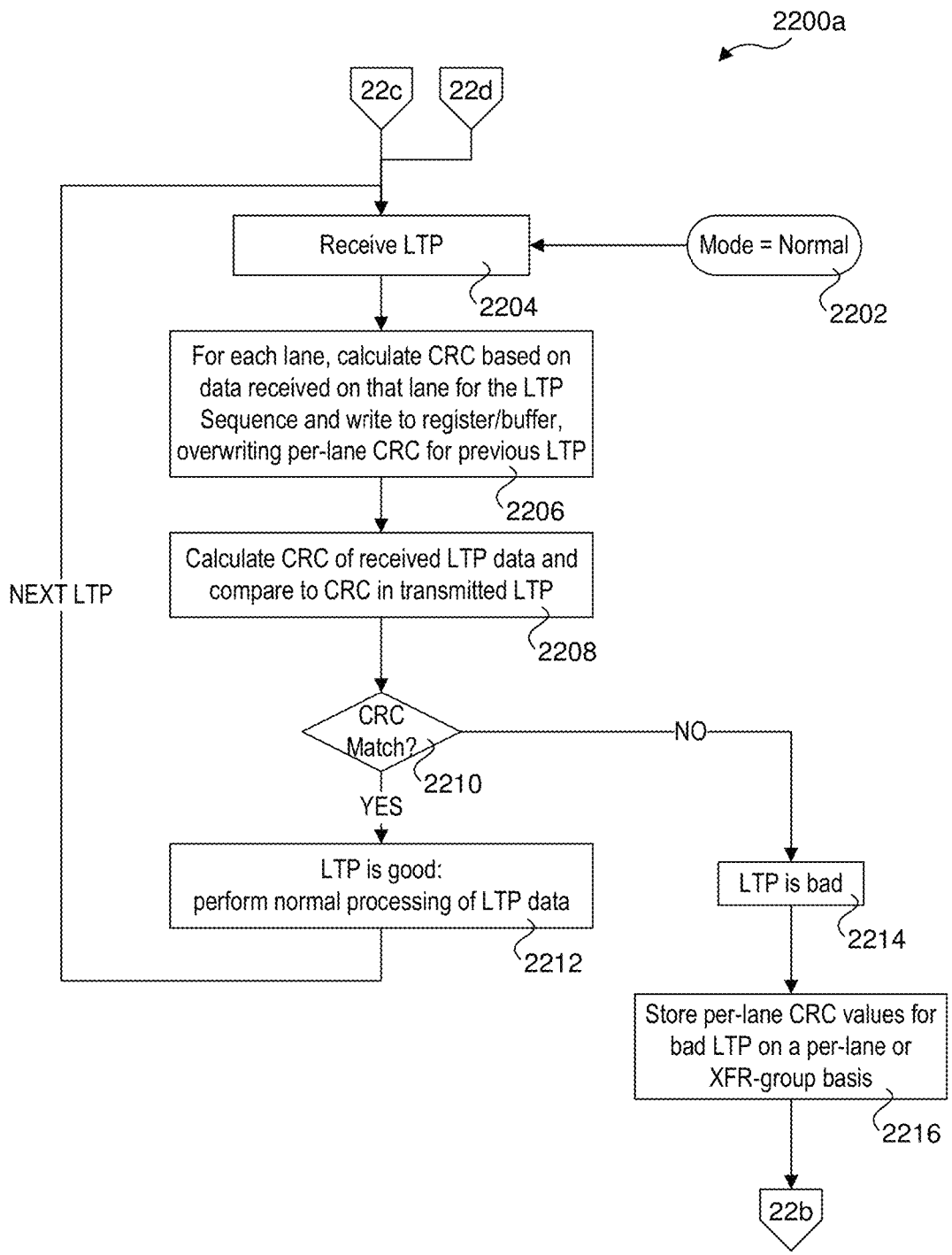
FIGS. 22a-22e collectively comprise is a multipage flow-chart illustrating operations and logic for facilitating reliable LTP transmission at the link-level using implicit ACKs with a replay buffer, and also illustrating operation and logic for detecting errant lanes, according to one embodiment.
Figure 22B:
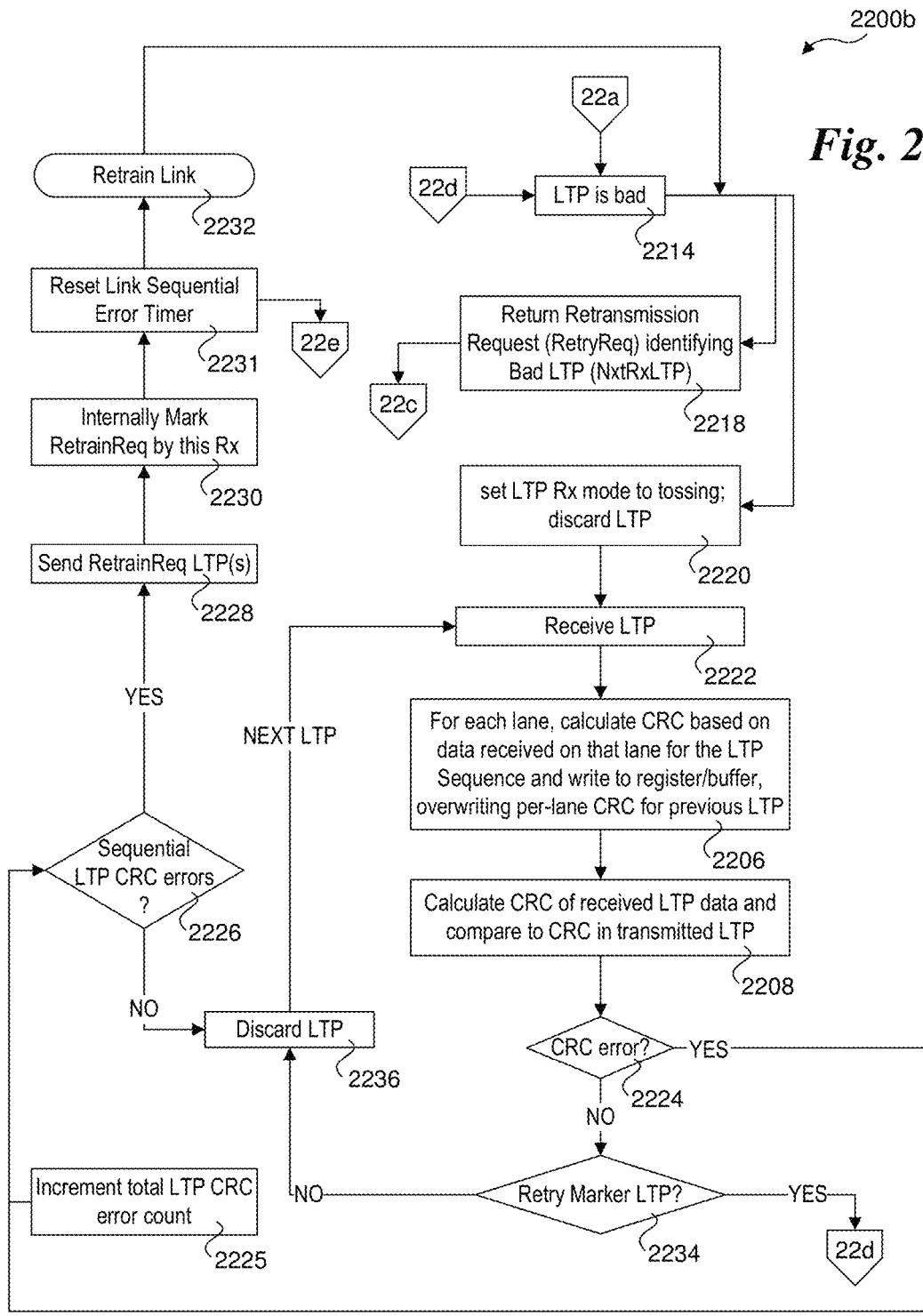
Figure 22C:
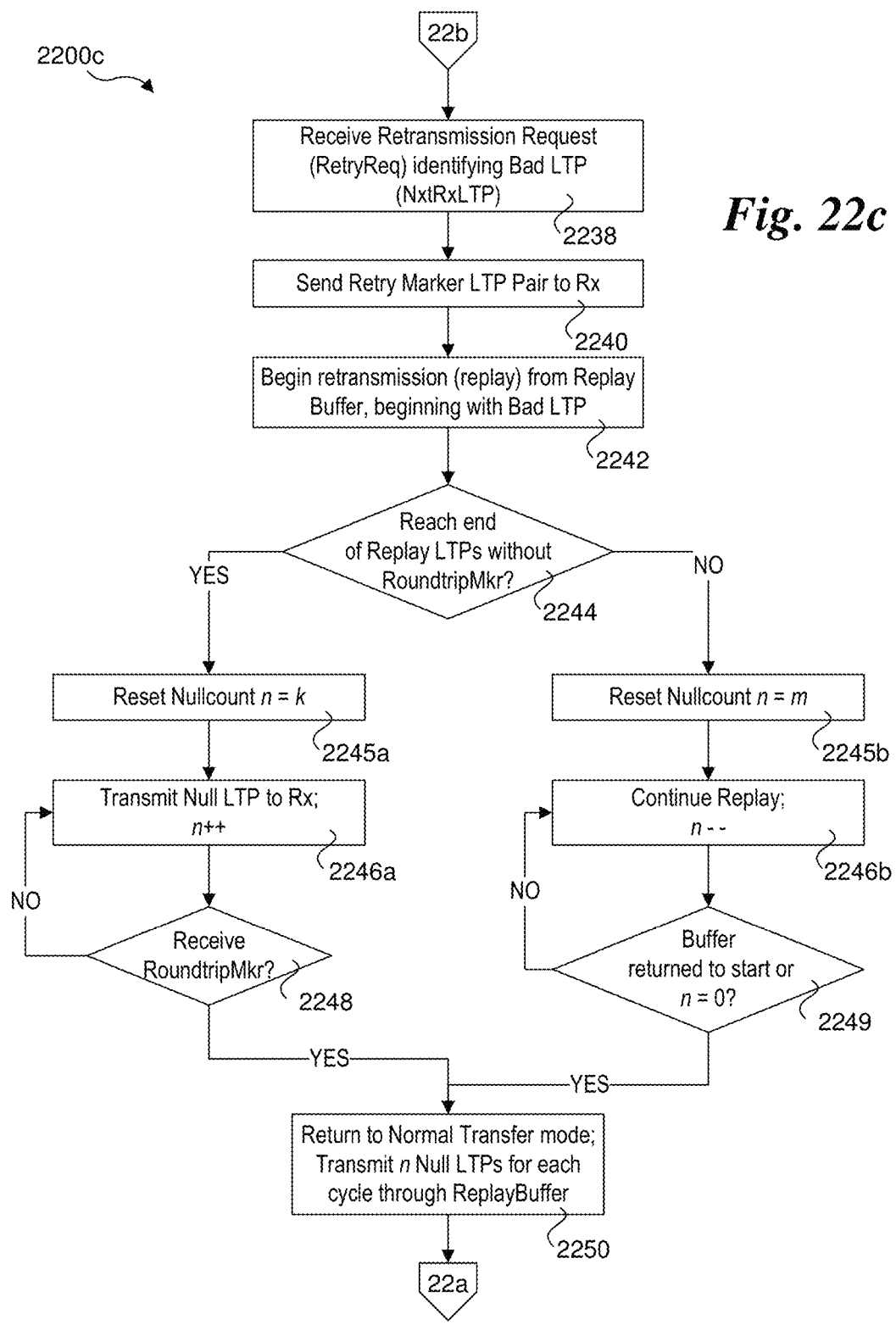

Continuing at flowchart 2200*b* in FIG. 22*b* at block 2218, a retransmit request (RetryReq LTP 1812) is returned from the receiver to the transmitter, identifying the bad LTP via the current value for NxtRxLTP pointer 1810. In one embodiment a sequential pair of RetryReq LTPs are sent, while in another embodiment a single RetrReq LTP is sent. In this example, the NxtRxLTP pointer value points to replay buffer slot 4, which stores data for LTP 4, the bad LTP. Details of the transmitter-side operations when in replay mode that are initiated in response to receiving RetryReq LTPs are shown in flowchart 2200c of FIG. 22c.

Also upon detection of a bad LTP in block 2216, the LTP receive mode is set to 'LTP-tossing' in a block 2220, resulting in received LTPs being tossed (discarded), including the bad LTP. LTP-tossing mode is depicted as an LTA.RxTossing state in receiver state diagram 2350. While the receiver is operating in LTP-tossing mode, LTPs are received, per-lane CRCs are calculated and registers updated, LTP CRC error checks are performed to detect sequential LTP CRC errors, and LTPs are discarded. These operations are performed in a loop-wise manner beginning with receiving an LTP in a block 2222. As before, the operations of blocks 2206 and 2208 are performed, followed by a determination made in a decision block 2224 to whether the received LTP has a CRC error (Tx CRC and Rx CRC mismatch). While the receiver is operating in LTP tossing mode, the logic is configured to check occurrences of sequential LTP CRC errors. For example, if the first received LTP after entering LTP-tossing mode has an error, sequential errors have occurred. The determination for detecting sequential errors is depicted by a decision block 2226, to which the logic proceeds if the answer to decision block 2224 is YES. In addition, a total LTP CRC error count in incremented in a block 2225. (It is also noted that the total LTP CRC error count is incremented in response to detection of each LTC CRC error, whether in normal mode or tossing mode).

CRCs are data integrity checks that are configured to detect errors in transmitted data units, such as packets, frames, etc. The mathematical formulation of a CRC is selected such that the CRC will detect bit transmission errors, and also takes advantage of the binary nature of digital data, enabling CRCs to be quickly calculated over binary quantities. However, CRCs are not 100% failsafe. The CRC check can fail to detect errors when the number of bit errors equals or exceeds the Hamming distance of the CRC. The Hamming distance of CRCs used in network fabrics is typically 4, meaning it takes at least 4 bit errors to open up the possibility (extremely low probability) that the errors would go undetected. Undetected link errors result in what is referred to as "false packet acceptance," meaning a packet with errors passes the CRC check (falsely), and is thus accepted for further processing. These undetected errors result in packet silent data corruption.

LTPs are approximately 1000 bits in size. At a given average bit error rate (BER) the probability of a missed detection is higher if the errors are correlated and occur in bursts (of 4 or greater) within a single link transfer packet vs. error patterns that are uniform where the errors are distributed in time across multiple LTPs.

Network fabric links are designed to provide a very low, but non-zero, BER. The desire to reduce link power provides motivation to allow higher BER, which tends to increase as power is reduced. As the BER increases the probability of a missed error detection increases. At some point this probability becomes unacceptably high. The BER across the many links within a fabric is non-uniform. The links are typically composed of multiple lanes and the BER can vary widely across the lanes within a given link. Under a conventional approach, when the fabric management software detects a link running at some threshold BER it is forced to remove the link from the fabric to avoid the unacceptably high probability of data corruption. This is done without knowledge of the error distribution within the link and forces the use of a conservative smaller BER threshold that assumes the errors are correlated. In addition, the BER of links may drift and/or degrade over time and become unacceptably high. The fabric manager can't monitor all links continuously in real-time all the time; as a result it may take some time to detect a link is operating at too high a BER. During this time the fabric is exposed to the potential for data corruption.

One check for closely-spaced bit errors is through use of the LTP CRC error check in decision block 2224 and the sequential LTP CRC error check in decision block 2226. While CRCs can be used to identify at least one error is detected, they don't identify how many errors are present. However, sequential LTP CRC errors indicate at least two errors are present in sequential LTPs. In one embodiment, in response to detection of sequential LTP CRC errors a pair of RetrainReq LTPs are sent to the transmitter in a block 2228 resulting in the flowchart logic exiting to retrain the link, as depicted by an exit block 2232 and RcvRetrainReq in transmitter state machine 2300. In one embodiment this retraining is a lightweight retrain that is less complex than the link (re)training operations employed when initializing or reinitializing a link. During training or reinitialization the link's normal active transfer state is offline, meaning that normal data transfer operations are temporarily unavailable until the link returns to is normal active transfer state upon completion of link training or link reinitialization. In addition, the receiver sets some internal indicia to indicate it sent the RetrainReq LTPs in a block 2230, and a link sequential error timer is reset in a block 2231, with further details of the link sequential error timer usage shown in FIG. 22e and discussed below. Upon completion of the training sequence, the logic returns to flowchart 2200b at blocks 2218 and 2220, wherein (a) retry request LTP(s) is/are sent back to the transmit side and the LTP-tossing mode is re-entered at the receiver.

The LTP-tossing mode loop is exited in response to receiving a retry marker LTP, and, accordingly, if the received LTP does not have a CRC error, the logic proceeds to a decision block 2234 in which a determination is made to whether each received good LTP while in LTP-tossing mode is a retry marker. Prior to receiving the retransmit request, the transmitter will continue transmitting LTPs in sequence, and these LTPs will be received along with the LTPs that are already in-flight (if any). As shown in blocks 2238, 2240, and 2242 in flowchart 2200c of FIG. 22c, upon receipt of the retransmit request (RetryReq LTP), the transmitter will send out a retry marker, followed by retransmission of LTPs in replay buffer 1806, beginning with the LTP in the slot indicated by the NxtRxLTP pointer value returned via the retransmit request. In one embodiment, a single retry marker is sent, while in another embodiment a pair of retry markers are sent sequentially. In one embodiment, the pair of retry markers are identified by the order they are sent (e.g., RetryMrkr0, RetryMrkr1). In one embodiment, each of the retry markers comprise null LTPs. An example of the use of a single retry marker, depicted by a RetryMrkrLTP 1816, is shown in FIG. 18b. It will be understood that when a pair of retry markers are sent, a second retry marker (RetryMrkr1) would immediately follow RetryMrkrLTP 1816 (RetryMrkr0).

In the example of FIG. 18a, this continuation of transmitting LTPs before receipt of the retransmit request results in receiving, in order, LTPs 5 and 6 (in flight), 7 (next transmitted), and LTPs 0 and 1. Since each of LTPs 5, 6, 7, 0 and 1 are not retry markers, the answer to decision block 2234 is NO for each, and the logic proceeds to discard the LTP in a block 2236 and then loop back to block 2222 to receive the next LTP, while remaining in LTP tossing mode. Processing of subsequently-received LTPs continues in the same manner until a retry marker LTP is received and detected in decision block 2234.

FIG. 18b depicts a timeframe at which a RetryMrkrLTP 1816 has been transmitted, received, and processed by receive port 1802, LTP 4 has been retransmitted and is being received by receive port 1802, followed by retransmitted LTPs 5 and 6 (in flight), with LTP 7 about to be retransmitted. Each of LTPs 4, 5, and 6 comprise "replayed" LTPs. As also shown in FIG. 18b, the replay buffer data in slots 0 and 1 (shown in FIG. 18a) is overwritten with corresponding flit data for LTPs 0 and 1 in connection with their original transmission, which occurred prior to receiving RetryReqLTP 1812 and transmitting RetryMrkrLTP 1816.

As before, for each reliable LTP transmission the LTP's data is copied into a slot in replay buffer 1806 as identified by NxtTxLTP pointer 1808, which is incremented for each reliable LTP. Thus, NxtTxLTP pointer 1808 will have been incremented in connection with sending each of LTPs 7, 0, and 1 (noting the NxtTxLTP pointer wraps from 7 back to 0). While LTP 1 is being transmitted (or shortly before), transmit port 1800 has received RetryReqLTP 1812. In response, transmit port 1800 returns RetryMrkrLTP 1816 (or a pair of retry markers comprising a RetryMrkr0 LTP followed by a RetryMrkr1 LTP). Since RetryMrkrLTP 1816 is a null LTP, its data content is not copied to replay buffer 1806, nor is NxtTxLTP pointer 1808 advanced. Conversely, the Tx LTP sequence state is advanced for each transmitted LTP, regardless of whether it is a reliable LTP or a null LTP.

Figure 22D:
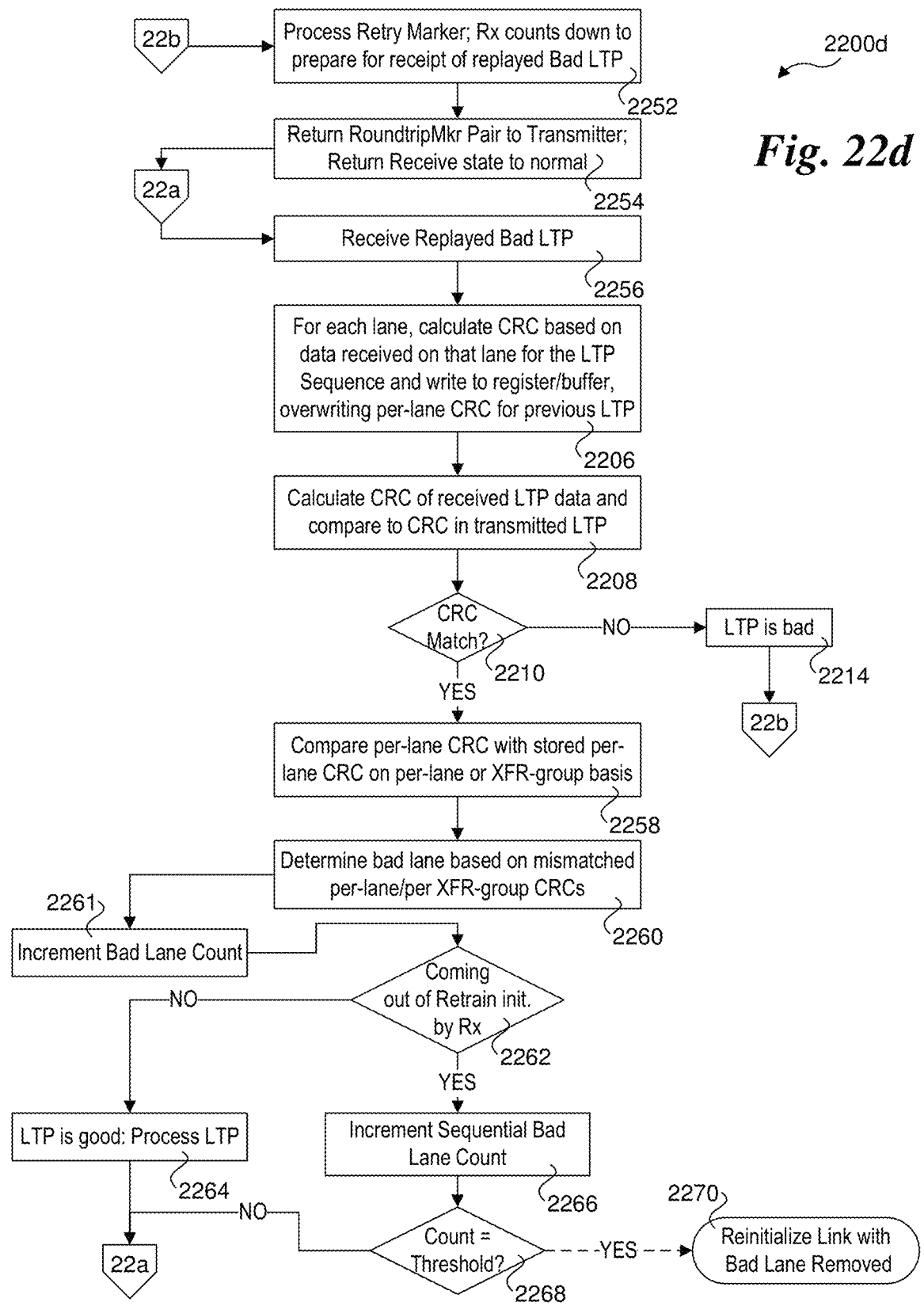
Figure 22E:
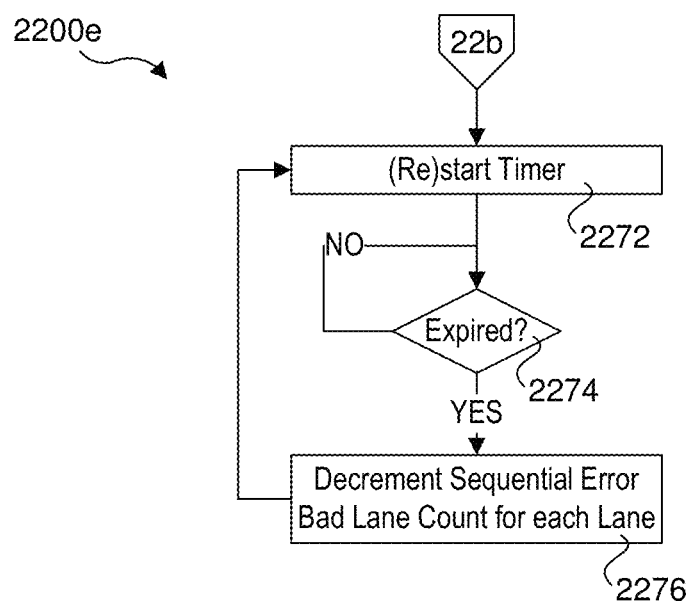

Returning to decision block 2234, upon receipt of RetryMrkrLTP 1816 it is identified as a retry marker, and the flowchart logic proceeds to flowchart 2200d in FIG. 22d. As shown in a block 2252, the retry marker is processed, and the receiver sets a countdown value to prepare for receipt of a forthcoming replayed bad LTP. In one embodiment, a bad LTP replay offset is employed relative to the retry marker, so as to indicate a retransmission of the bad LTP will commence k LTPs after the retry marker. In one embodiment employing a pair of retry markers, the bad LTP replay offset is one less for the second retry marker. As also depicted in block 2240, in view of the bad LTP replay offset, the receiver initiates a bad LTP replay countdown based on the LTP offset. This is used to detect a replay of a bad LTP in a block 2256. In addition, the receiver returns a roundtrip marker LTP in a block 2254 (or a pair of roundtrip marker LTPs) and the LTP receive mode (receive state) is returned to normal in a block 2254, with the flowchart logic returning to block 2204 to receive the next packet. This is depicted by the Send RndTripMrkr Pair state and return to the LinkTransferActive.normal state in receiver state diagram 2350. As described below with reference to FIG. 18c, the roundtrip marker LTP(s) is/are returned in response to the retry marker LTP(s) to facilitate determination to whether replay buffer LTPs can be overwritten.

Following transmission of RetryMrkrLTP 1816 (or RetryMrkr0LTP and RetryMrkr1LTP), replay (retransmission) of LTPs is initiated, beginning with retransmission of the bad LTP identified by the NxtRxLTP pointer returned in RetryReqLTP 1812 (LTP 4 in this example). While the transmitter is in replay mode, the transmitted data will comprise a retransmission of LTPs stored in replay buffer 1806. The retransmitted LTPs are sent out sequentially from transmit port 1800 based on their order in the replay buffer's FIFO and beginning with the LTP pointed to by the NxtRxLTP pointer.

For each retransmitted LTP, the transmitted data is the same as when the LTP was originally transmitted. Outside of the bad LTP replay countdown (and operations associated with receiving a replayed bad LTP), the receive-side logic is agnostic to whether received LTP data corresponds to an originally-transmitted LTP or a retransmitted LTP. Accordingly, the operations of blocks 2204, 2206, and 2208 and decision block 2210 are performed, resulting in per-lane CRC calculations, calculation of an Rx LTP CRC over the received LTP data, and comparing the Rx LTP CRC to the Tx LTP CRC. If there is an error, as indicated by a NO result in decision block 2210, the logic returns to block 2214, with the errant retransmitted LTP initiating a new replay sequence under which the bad LTP will again be retransmitted. This will essentially repeat the operations discussed above in connection with retransmission of bad LTP 4 and its following LTPs from replay buffer 1806.

Presuming the retransmitted bad LTP 4 is good, the logic flows to a block 2258. In this block the per-lane CRC values that were previously stored in registers CRC-G0, CRC-G1, CRC-G2, and CRC-G3 are compared to per-lane CRCs calculated for data received over each lane for the retransmitted LTP 4, with the comparison made on a per-lane or per XFR-group basis, depending on the number of operating lanes (noting that per-lane and per XFR-group comparisons are equivalent when the number of transfer groups are the same, such that a per XFR-group comparison could always be performed) From above, per-lane CRCs are compared on a per XFR-group basis for a four-lane link.

In connection with continued incrementing of the Tx LTP and Rx LTP sequence states for each transmitted LTP, when LTP 4 is retransmitted the LTP sequence state is 3, as compared with an LTP sequence state of 1 when LTP was originally transmitted. As a result, the XFR group transmitted across each lane has changed. This remapping of lane-XFR groups is illustrated in FIG. 25, and can also be seen by comparing the XFRs sent over each lane in FIGS. 18a and 18b. As discussed above, when LTP 4 was originally transmitted, the LTP sequence state was 1, while when LTP 4 is retransmitted (depicted by 4R in FIG. 25) the LTP sequence state is 3.

Returning to FIG. 18b, the per-lane CRCs for retransmitted LTP 4 are calculated for lanes 0, 1, 2, and 3, and then a per XFR-group CRC comparison is performed in block 2258 of flowchart 2200d, and the bad lane is identified in a block 2260 by identifying the mismatched per-lane or per XFR-group CRCs, as applicable. In the example of FIGS. 18a and 18b, the result of the per XFR-group CRC comparison indicates the CRCs for CRC-G0, CRC-G1 and CRC-G3 match, while the CRCs for CRC-G1 do not match. This indicates that lane 2 is errant, since lane 2 corresponded to the XFR group over which the CRC-G1 value was calculated for the errant LTP 4 when it was originally transmitted, noting that since there was no LTP CRC error detected in retransmitted LTP 4 there also is (presumably) no error in the data transmitted over lane 2 for the replayed LTP 4. In a block 2261 the error count for the bad lane that is identified is incremented.

Consider a scenario where a lane is intermittently errant. As discussed above, the sequential LTP CRC error check of decision block 2226 and associated logic blocks is one mechanism for detecting closely-spaced errors in data transmitted over the link. While this mechanism detects very-closely spaced errors (requiring errors in sequential LTPs), it cannot identify which lane is errant, nor how frequent sequential errors on individual lanes are occurring.

According to embodiments of a second BER check mechanism, a per-lane error frequency is monitored to determine whether the error frequency (BER) for a given lane exceeds a per-lane BER threshold. In one embodiment, this is accomplished through the use of per-lane sequential error counters and a timer (in connection with other operations and logic depicted in flowcharts 2200*d* and 2200*e* and performed in a parallel manner).

In a decision block 2262 a determination is made to whether the receiver state is coming out of a link retraining state initiated by the receiver. As shown by the logic in flowchart 2200*b* and described above, detection of sequential LTP CRC errors will result in link retraining initiated by the receiver detecting the errors. Conversely, while a single LTP CRC error will likewise initiate a retry request, retry marker receipt sequence, it will not result in initiating of link retraining. If the replayed LTP is good and the receive state is not coming out of link retraining (that is, only a single LTP CRC error has been detected), the answer to decision block 2262 is NO, causing the logic to flow to a block 2264 in which the LTP is processed as if it was an originally-sent LTP. The logic then returns to flowchart 2200*a* to process the subsequently replayed LTPs as (from the perspective of the receiver) they are being originally sent.

Now presume that two sequential LTP CRC errors were detected by the receiver, resulting in link retraining initiated by the receiver and the answer to decision block 2262 is YES, resulting in the logic proceeding to a block 2266. In this block, the sequential error counter for the bad lane that was determined in block 2260 is incremented. In a decision block 2268 a determination is made to whether the sequential error count for the lane has reached a threshold. In general, the threshold will be an integer number, such as 1, 2, etc. In one embodiment, the threshold is 2, such that 2 sequential errors on one lane within one timer period causes the lane BER threshold detection to be tripped. In response, in one embodiment the logic proceeds to an exit block 2270 under which the link is reinitialized with the lane detected as being bad removed. As a result, the number of active lanes for a link will be reduced by one lane, such as a four-lane link being degraded to three active lanes.

If the per-lane sequential error count has not reached the threshold, the answer to decision block 2268 is NO, and the logic proceeds to block 2204 to receive the next LTP with the receiver operating in its normal receive state and the transmitter still operating in replay mode.

As discussed above, in one embodiment a timer scheme is used to detect the frequency of per-lane sequential errors. From above, the logic proceeds to block 2231 in response to detection of sequential bad LTPs, and a set of parallel operations for implementing the timer scheme are initiated, as shown in flowchart 2200*e* of FIG. 22*e*. In a block 2272 a timer is started (the first time) or restarted (reset), as applicable. As depicted by a decision block 2274 and the loop back to itself, the timer is periodically checked to determine whether it has expired, or optionally the timer logic can be configured to generate an interrupt or other indicia to indicate it has expired. At the expiration of the timer the bad sequential error counter for each lane is decremented, as depicted in a block 2276. In one embodiment, the minimum bad error count is 0, so for a lane error count that is already 0, its count is not decremented.

The combination of the parallel processes detects that errors on an individual lane have exceeded a frequency threshold (e.g., identifies lanes exhibiting closely-spaced errors) in the following manner. Each time the flowchart operations results in the logic flowing through blocks 2258, 2260, and the result of decision block 2264 is YES, the sequential error count for a bad lane will be incremented. Meanwhile, in consideration of the parallel timer operations, each time the timer expires without being restarted indicates that the timer's time period has passed without a per-lane error, thus the per-lane sequential error count for each lane is decremented by one (to a minimum of zero). In one embodiment, two strikes and the lane is out, which corresponds to a lane having two sequential errors within the timer period.

In addition to a single timer, multiple timers may be used in parallel with different time periods and different associated count thresholds. For example, this would enable a longer-term view of per-lane operation to be observed, while also facilitating shorter per-lane BER threshold detection. The threshold of the number of sequential errors required in the time period may also be changed.

Under the embodiment depicted in flowcharts 2200*a-e*, reinitialization of a link in combination with removal of a bad lane results from detection of a lane exhibiting close-spaced errors. However, this is not meant to be limiting, as a lane may be removed in connection with reinitialization of and/or retraining a link under other conditions, such as when exiting via exit block 2232 following detection of sequential LTP CRC errors. For example, when the link is reinitialized the per lane error counters are checked to see if an error count has exceeded some threshold. If it has, that lane is marked bad and is not active when the link is returns to active operation.

Another aspect of reliable LTP transmission with implicit ACKs is a mechanism to ensure that an LTP in the replay buffer is not overwritten prior to an implicit confirmation that it has been received without errors. In one embodiment this is facilitated through the use of retry requests and roundtrip markers. As discussed above, in some embodiments the reply buffer has a fixed size or can be configured to be set to operate using one of multiple fixed sizes. In addition, a pair of link peers may employ replay buffers of different sizes.

Under use of a fixed-size replay buffer, the replay buffer will generally be sized to hold a number of LTPs that is greater than the number of LTPs that could be transferred during a roundtrip traversal of the link, with additional consideration for various processing latencies. This is the case illustrated in FIGS. 18*a* and 18*b*, wherein the replay buffer has 8 slots, and the number of LTPs that could concurrently be traversing a roundtrip over the link and the link path in the opposite direction is approximately 6 or 7 LTPs. As a result, if there is an error detected at the receiver, the transmitter will receive a retry request before the copy of the bad LTP in the replay buffer will be overwritten.

However, for practical reasons, fixed-size replay buffers are not sized to handle all possibly link lengths. The greater the length of a link, the greater the number of LTPs that could be sent out from the replay buffer prior to receiving a retry request. At some point, the link length will be such that use of the retry request scheme alone will not ensure that a copy of a bad LTP in the replay buffer is not overwritten prior to receiving a retry request for that bad LTP.

This is where use of the roundtrip marker fits in. Returning to flowchart 2200*c* at a decision block 2244, a determination if made to whether the replay of all of the LTPs has completed without receiving a roundtrip marker. Under the configuration illustrated in FIG. 18c, there again are 8 FIFO slots in replay buffer 1806, but the link length is such that 5 LTPs can be "on the wire" at one time, meaning that at least 10 LTPs could be in roundtrip transit and/or being processed at the receiver. As a result, all of the LTP copies in the replay buffer could be retransmitted prior to receiving a retry request for any of the LTPs, resulting in a copy of a potentially bad LTP being overwritten. This would prevent the bad LTP from being retransmitted, defeating the purpose of the replay buffer.

To accommodate this scenario, the transmitter includes logic to detect whether it has reached the end of the replay LTPs prior to receiving a roundtrip marker, as shown in decision block 2244. In essence, this determines whether the depth of the replay buffer is less than or greater than the roundtrip duration. Reaching the end of the replay LTPs is detected by the replay pointer wrapping back to the start (FIFO slot) of the first replayed LTP.

Figure 18C:
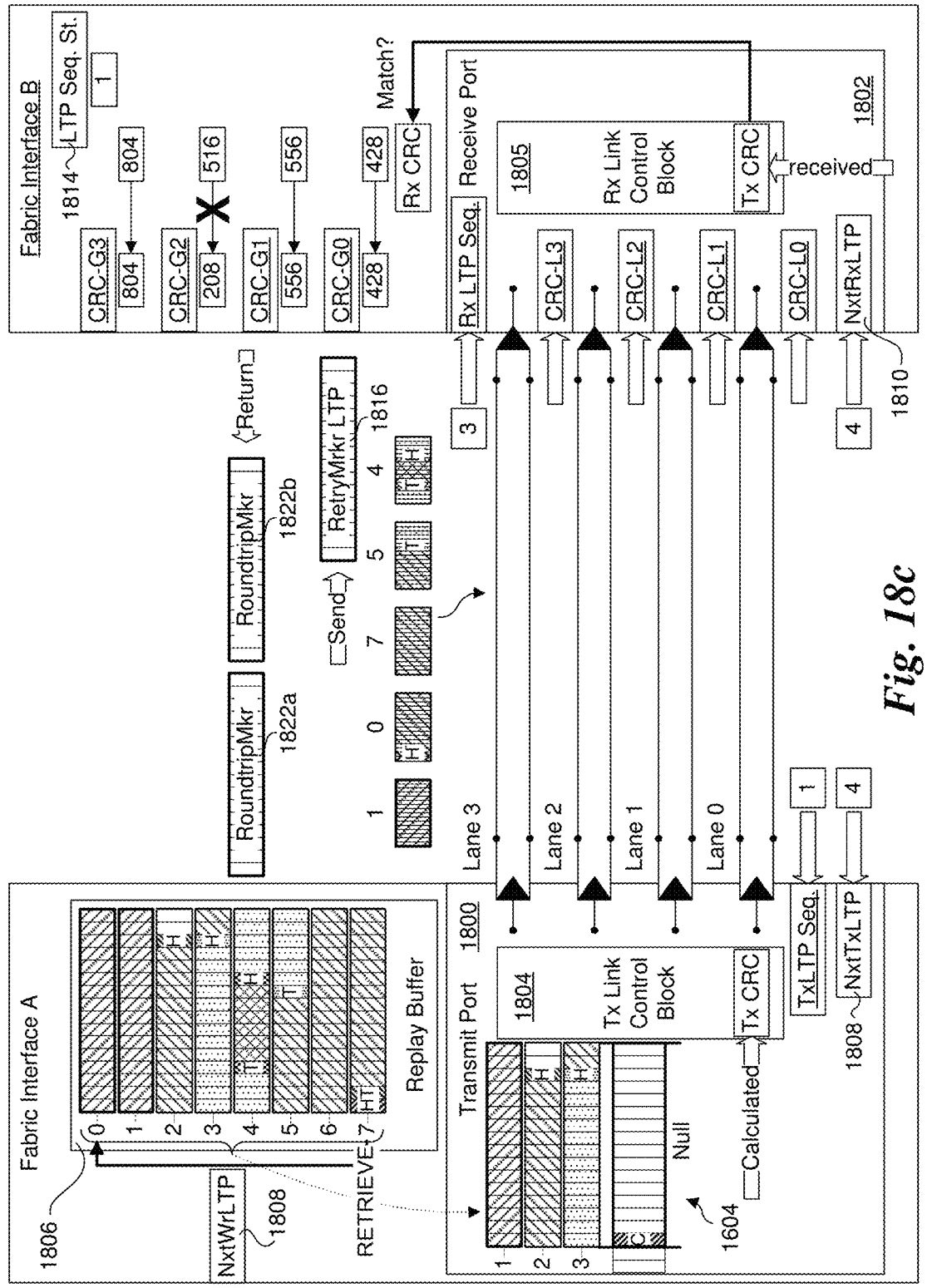
FIG. 18c is a schematic diagram illustrating use of retry markers and roundtrip markers to prevent replay buffer LTPs from being overwritten, according to one embodiment.

In FIG. 18c, the first replayed LTP slot is slot 4, and the LTPs in slots 4, 5, 6, 7, 0, 1, 2, and 3 have been sequentially retransmitted, returning the replay LTP pointer to slot 4 prior to receiving the first roundtrip marker of a pair of roundtrip markers 1822a and 1822b. This illustrates in example under which the end of the replay LTPs is reached prior to receiving a roundtrip marker, indicating that the roundtrip duration is greater than the depth of the replay buffer. This results in the answer to decision block 2244 being YES, and the logic proceeds to a block 2245a in which a Null counter (Nullcount) n for the transmitter is reset to an integer k. As depicted by a block 2246a and a decision block 2248 with a NO result looping back to block 2246a, the transmitter then proceeds to send one or more Null LTPs to the receiver until a roundtrip marker or retry request is received. In addition, for each transmitted Null LTP, Nullcount n is incremented by 1. As discussed above, a Null LTP is not a reliable LTP, and thus a copy of a transmitted LTP is not added to the replay buffer. As a result, the copy of the bad LTP that resulted in the retry request will be guaranteed to not be overwritten prior to receiving a retry request.

Figure 23A:
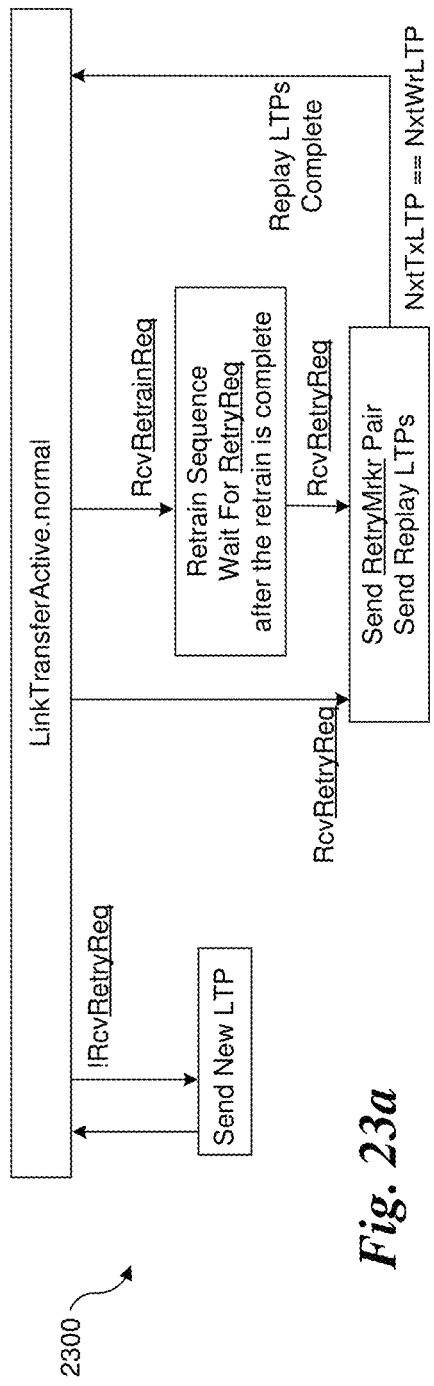
FIG. 23a is a state diagram for a transmitter, according to one embodiment.
Figure 23B:
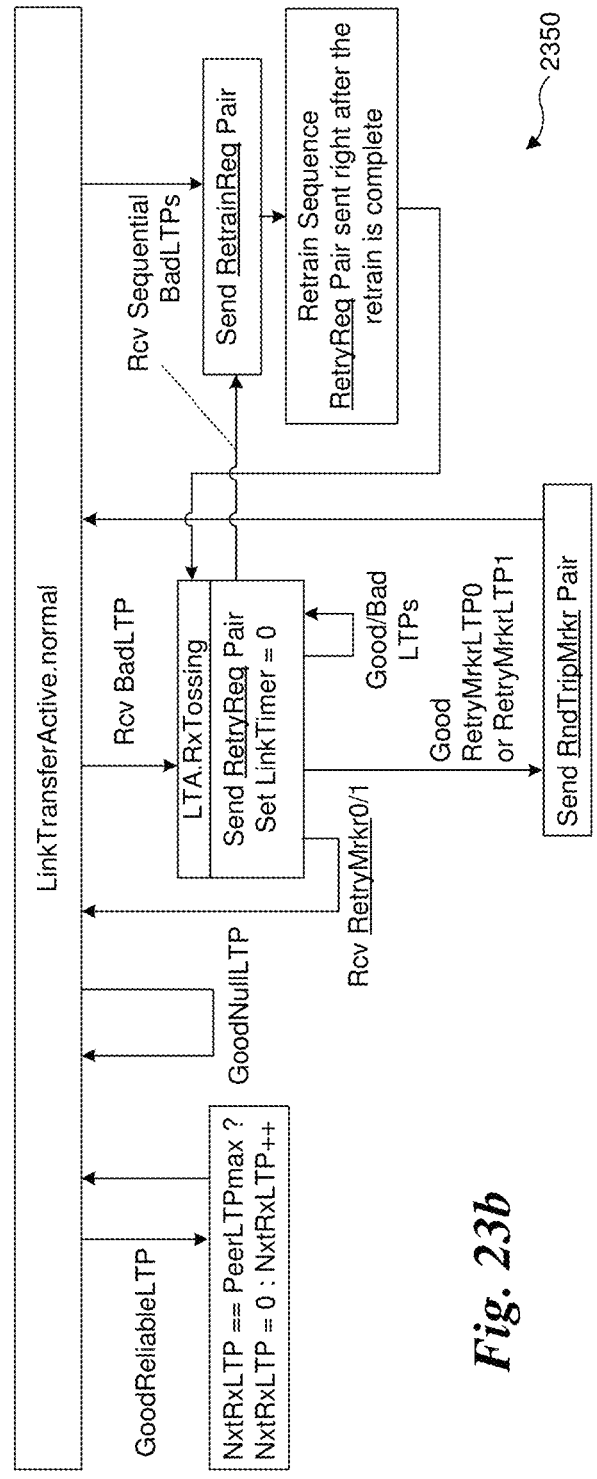
FIG. 23b is a state diagram for a receiver, according to one embodiment.

Once reception of a roundtrip marker is determined in decision block 2248a, the logic proceeds to a block 2250 in which the transmitter is returned to normal transfer mode, as also depicted by a return to LinkTransferActive.normal in the transmitter state machine 2300 of FIG. 23a, while using Nullcount n value for each cycle through the replay buffer to determine how many Null LTPs to send once the end of the replay buffer is reached. For example, let's say Nullcount n reached 4. As a result, every time the replay buffer FIFO slot reached slot 7, the transmitter would send out 4 Null LTPs. Under one embodiment retry requests and roundtrip markers have the highest priority and are never preempted, and thus the use of transmitting a number of Null LTPs defined by Nullcount n will ensure a copy of a bad LTP will not be overwritten prior to receiving a retry request for that bad LTP. As an option, Nullcount n can be reset to a value k>0 in block 2245 to provide a safety margin, such that k extra Null LTPs will be transmitted at the end of each cycle through the replay buffer. An inherent advantage of the Nullcount scheme is that it can be implemented to support a link of substantially any length (recognizing there is a practical limit to the length of a physical link, and that manufacture and/or implementation of a link having a length beyond this limit would either not be possible or realistic).

Returning to decision block 2224, if a roundtrip marker has been received prior to reaching the first FIFO slot, the answer to decision block 2244 is NO, and the logic proceeds to a block 2245b in which Nullcount n is reset to an integer m. As depicted by a block 2246b and a decision block 2249 with a NO result looping back to block 2246b, the transmitter then proceeds to continue replaying LTPs to the receiver the until the buffer pointer has wrapped and returned to its starting slot or Nullcount n has reached zero, wherein a Nullcount countdown begins with m and is decremented by 1 for each retransmitted reliable LTP. In response to a YES result for decision block 2249, the logic exits this Nullcount countdown loop and proceeds to block 2250.

The use of the Nullcount countdown results in a safety margin of approximately m LTP transfer cycles for configurations under which the buffer depth is greater than but within m LTP transfer cycles of the roundtrip duration. For example, suppose that the buffer depth is 32 slots and the roundtrip duration is equal to 30 LTP transfer cycles, and m=5. In this case, m would be 3 when the logic exited the countdown loop. This means that every time replay the buffer wraps back to its start (slot 0), 3 extra Null LTPs would be transmitted prior to overwriting the LTP in slot 0. Since the buffer depth is 32 slots, the number of LTP cycles between replay buffer slots being overwritten is 35, or 5 more than the roundtrip duration.

In response to detection of a bad lane, a link may be operated in a degraded state with a reduced number of active lanes. Moreover, this link degraded state may cascade, such that a link may be operated in an sequences such as starting with four active lanes, detecting a first bad lane and removing the bad lane, leading to a link operation with three active lanes, detecting a second bad lane and removing the second bad lane, leading to a link operation with two active lanes. This cascade could continue with detection of a third bad lane, leading to link operation over the single remaining good lane. It is also noted that a link may be operated in an asymmetrical configuration, such that one transmit direction may use a different number of active lanes than the other transmit direction.

Figure 26:
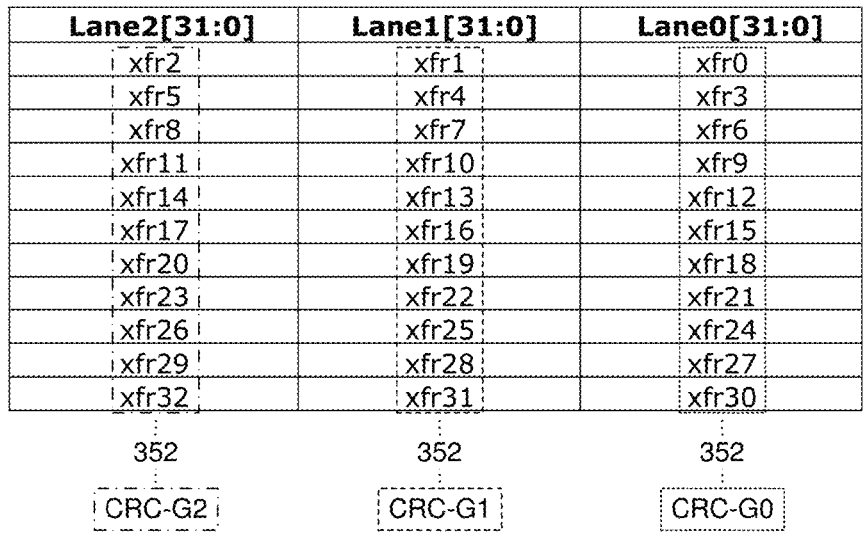
FIG. 26 is a diagram illustrating transfer of a standard detection LTP over three lanes under which 11 XFRs are transferred per lane in parallel, according to one embodiment.

FIG. 26 depicts the XFR groups for operating a link with three active lanes, according to one embodiment. In this instance, there are three XFR groups G0, G1, and G2, and the corresponding CRCs are CRC-G0, CRC-G1, and CRC-G2. Since the LTP sequence only has a single state with the XFR pattern being repeated without lane changes, the same XFR groups are transmitted over the same respective lanes. As a result, the per-lane CRC comparisons can be made on a per-lane basis, or otherwise the per XFR-group basis does not consider an LTP sequence state. Under 3 lanes, there are 11 32-bit transfers for each lane, resulting in 352 bits transmitted over each lane per standard detection LTP. In one embodiment, a 16-bit per-lane CRC is used when operating under three active lanes.

FIG. 27 depicts the XFR groups for operating a link with two active lanes, according to one embodiment. Since there are 33 32-bit transfers per LTP, the number of bits transferred over each of lanes 0 and 1 for an LTP transmit stream will alternate between 512 and 544 bits. As a result, a per XFR-group per-lane CRC comparison scheme is implemented using two LTP sequence states. In addition, a 16-bit per-lane CRC is used in one embodiment.

FIG. 28 depicts the XFR groups for operating a link with a single active lane, according to one embodiment. Since there is only a single lane over which LTP data is sent, it is the only lane that could be errant. As a result, there is no need to perform a per-lane CRC comparison. However, under a lane degradation scenarios under which a link with more than a single lane is degraded to operating under a single lane, a per-lane CRC calculation may still be calculated for the single lane, since this may be implemented in hardware in a manner under which it is always performed. In this instance, the per-lane CRC calculations are simply ignored.

As discussed above, under embodiments disclosed herein, links support reliable data transmission without use of explicit ACKs. Although an LTP cannot be lost when being transmitted across a link (absent an event such as a cable being cut), it can contain errors. Recall that the implicit acknowledgement scheme is implemented via the lack of receiving a retry request at the transmitter within a time period that is at least as long as the time it takes to complete a roundtrip from a transmitter to a receiver and back to the transmitter. Since the retry request is sent over a different set of lanes than the transmitted data, it is possible that a single retry request could have an error (identified by the CRC check), and thus be tossed. As a result, a receive side link interface could be trying to inform the transmit-side link interface that it received an errant LTP, but the notification (indicated by the retry request) would be tossed. This is where the sending of a sequential pair of RetryReqLTPs and pairs of other null LTPs (e.g., RetryMrkr0, RetryMrkr1) helps facilitate the implicit ACK scheme.

First, since these are null LTPs, they are not stored in a replay buffer, and thus not available for retransmission. However, by sending a sequential pair of null LTPs it is guaranteed that one of two events will result: 1) successful receipt of at least one or the two null LTPs without errors; or 2) if both LTPs have errors, this will be detected as sequential LTP errors, triggering retraining of the link. During (re)training, the training sequence is performed by both transmitter-receiver pairs of the link partners, thus proper operations for the link in both directions is verified before returning the link to active operation. When the retraining is complete, the transmit-sides waits (sending null LTPs in the meantime) for the guaranteed retry request from the receive-side before starting to send new (or continuing replay of) LTPs after sending the retry marker(s). Another benefit is sending a pair of these null packets is that increases the likelihood that at least one of the LTPs will be good.

Ports, Buffers, and Credit Management

Figure 29:
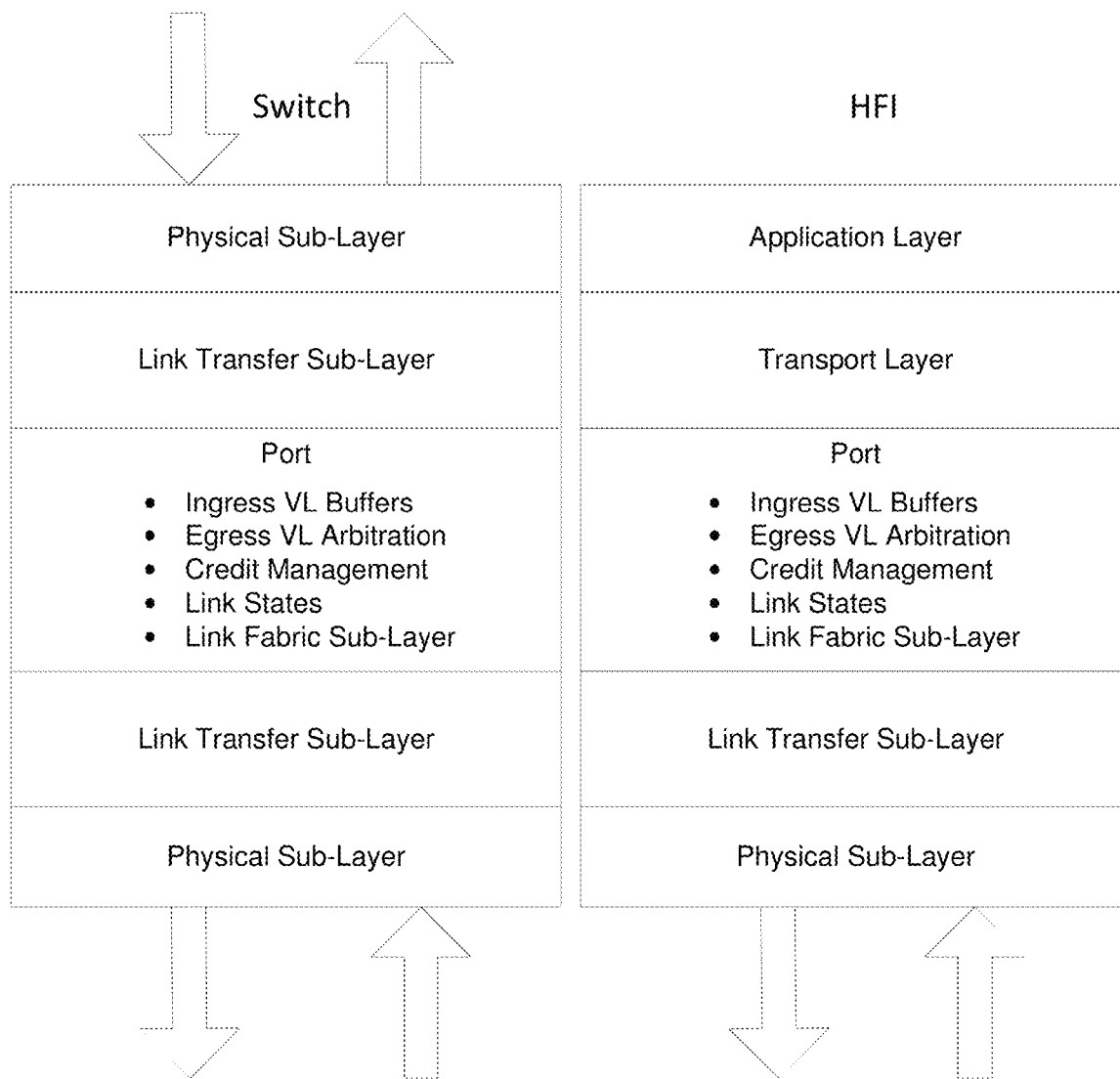
FIG. 29 is a diagram illustrating the relationship between ports and the architecture layers and sub-layers for a switch and for an HFI, according to one embodiment.

FIG. 29 illustrates the relationship between ports and the architecture layers and sub-layers for a switch and for an HFI. Switches forward packets toward fabric endpoints, and have multiple physical ports, each including an ingress (receive) port and an egress (transmit port). With further reference to FIG. 2 discussed above, each of these ports includes a Physical sub-layer (PHY) (L1) that interfaces with a Link Transfer Sub-Layer (L1.5), which interfaces with the Link Fabric Sub-Layer (L2). This section pertains to the aspect of ports that facilitate moving packet data between the Link Transfer Sub-Layer and the Link Fabric Sub-layer of the architecture for both HFI and Switch devices. Components of Ports are Ingress and Egress buffer management, SC and VL translation mechanisms, routing methods and definitions, credit management and egress port arbitration. HFI applications build packets then transfer them to the port for routing and scheduling prior to transmission to the Link Transfer Sub-Layer. In the reverse direction, ports transfer packets to receive buffers and select the egress port destination.

The architecture employs a credit-based flow control scheme for controlling the flow of packets across the fabric under which credit-based flow control policies are implemented between pairs of transmitter and receiver ports (also referred to a transmitter-receiver peers). Packets flow from device (HFI/Switch) to device (Switch/HFI) via a series of buffers, which provide temporary storage while packets traverse the fabric. Flow control is a mechanism that controls when packets in device A can be forwarded to buffers in device B. As detailed below, the buffers are allocated and managed on a VL basis, wherein each VL is allocated units of buffer space. The credit-based flow control scheme prevents VL buffers from buffer overrun and also provides fairness among competing VLs for the link.

In accordance with an aspect of flow control, a flexible mechanism is provided for credit management. Through the use of link layer retry that enables reliable incremental credit return, the architecture is able to make credit management and tracking the responsibility of the transmitter. This facilitates the flexibility to move credits around while traffic is in flight. It also means that flow control can be easily enabled or disabled per VL by simply telling the transmitter whether it should block or discard packets when no credits are available on a given VL.

The flexible mechanism for credit-based flow control defines the following characteristics:
  Takes advantage of a reliable link transfer protocol to permit efficient incremental credit exchange across many virtual lanes
  Allows management of credit allocation to be performed solely by the transmitter
  Allows reconfiguration of credits per VL while traffic is flowing, without requiring the link to be quiesced
  Can operate with or without flow control, as configured by the transmitter
  Allows the units of credit exchange and allocation to be defined by the receiver, hence allowing for interoperability between different hardware designs
  Allows credits to be dedicated to a single VL, shared across a group of VLs, and/or shared across all VLs Credits are exchanged incrementally using a logarithmic scale. The receiver communicates back to the transmitter the number of credits being returned. This mechanism is possible due to the existence of a reliable link transfer mechanism that ensures that all exchanges (credits, packets, other control messages) occur reliably.

Using incremental credit exchange permits the transmitter to do all of the tracking of credits. As a result, the credits available for a given VL may be reconfigured without impacting traffic flow and without needing to coordinate the reconfiguration with the receiver. This permits such reconfigurations to occur without impacting traffic in flight nor traffic queued at the transmitter.

Flow control may also be enabled or disabled for independent VLs. For example, in one embodiment, if flow control is disabled for a given VL, the credit manager will discard packets for a given VL if there are insufficient credits currently available. If flow control is enabled, the credit manager will backpressure the VL and wait for sufficient credits to be available prior to transmitting the (flits for the) packet. Flow control may be disabled to avoid topology deadlocks for management protocols or to provide Ethernet-like link layer behavior to facilitate protocols such as TCP/IP that use packet loss as a means to identify congestion.

Figure 30:
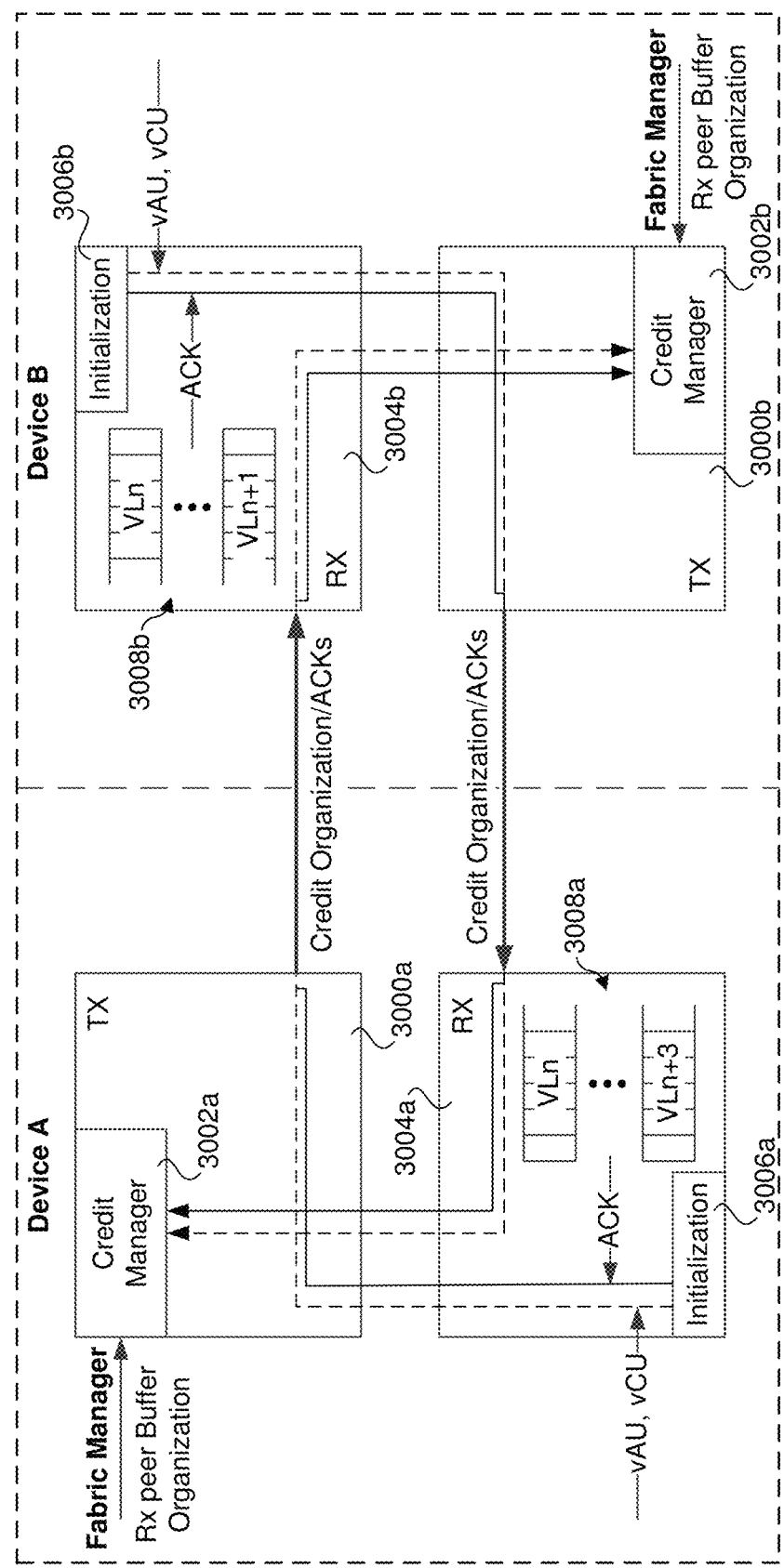
FIG. 30 is a schematic diagram illustrating exchange of credit organization and credit return ACKs between transmitter and receiver peers.

FIG. 30 shows an example of aspects of the use of credits for a link between a pair of peer devices A and B. Device A includes a transmit port 3000a including a credit manager 3002a, and a receive port 3004a including an initialization block 3006a and a plurality of VL FIFO buffers 3008a. Device B is similarly configured as depicted by like-numbered elements, but having an appended "b" rather than an "a."

Generally, each device port will include memory that is allocated for buffer usage. The total size of the buffer space for a given port may depend on various factors, such as number of VLs supported by the port's host device and the expected cable length for links connected to the port. The sizing of the VL buffers can have a major impact on the performance of the design. If the buffering is too small and does not cover Round Trip Time (RTT) from transmitter to receiver, the maximum bandwidth cannot be achieved. If the buffers are too large it may have an impact on ASIC area and power. In one embodiment, flits for Fabric Packets are only allowed to be transmitted to a next hop when there is enough buffer space for the entire FP. In another embodiment, initial transfer of flits for an FP are permitted to be transferred if there is some buffer space available to store a portion of the packet. In one embodiment, the following factors are considered when sizing VL buffers: 1) the channel rate; 2) the cable length; 3) the propagation delay; and 4) maximum Fabric Packet length (Maximum Transfer Unit or MTU). In one embodiment, the MTU is configurable per VL. Additional factors may also be considered, such as processing latencies for credit return delay and credit return processing.

Figure 31A:
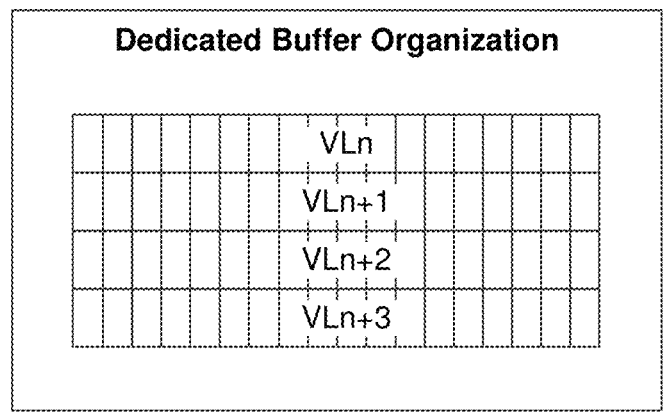
FIGS. 31a, 31b, and 31c illustrate examples of dedicated, shared two-tier, and shared three-tier buffer organization, according to one embodiment.
Figure 31B:
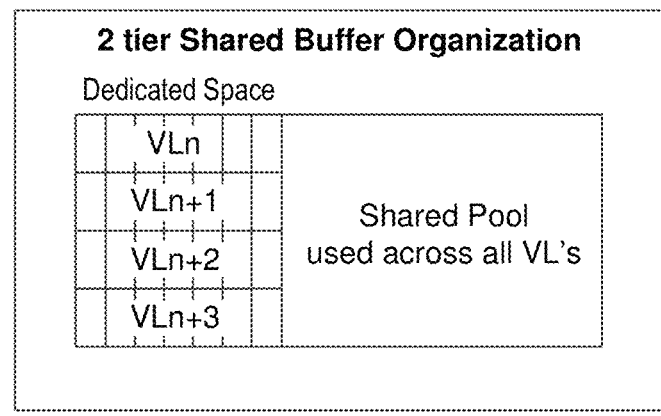
Figure 31C:
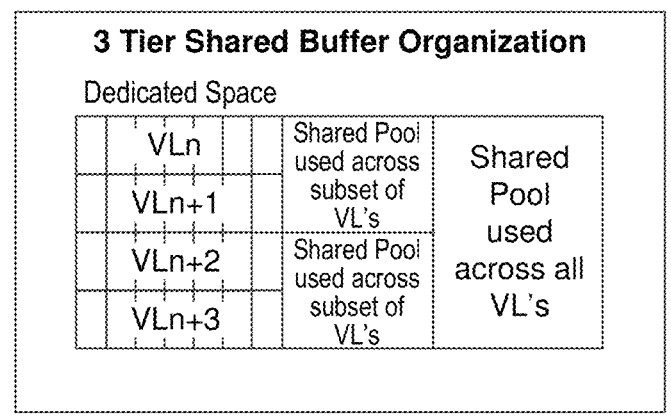

FIGS. 31a, 31b, and 31c illustrate examples of dedicated, shared two-tier, and shared three-tier buffer organization. Under a dedicated buffer organization, a respective portion of memory is allocated for each VL, noting that different VLs may be allocated different portions of memory. In one embodiment, the portion of memory for each VL is implemented as a FIFO. In one embodiment, the FIFOs are implemented as circular FIFOs with head and tail pointers.

Under a shared two-tier buffer organization, a first portion of the buffer space is allocated to VLs on a dedicated basis, while the remaining second portion is allocated such that it is shared across the VLs. In FIG. 31b, the second portion comprises a shared pool that is used across all of the VLs. However, this is merely exemplary, the shared pool may be shared among less than all of the VLs. For example, a given VL may be used for management purposes, and employ a dedicated VL FIFO space having a different size than other VLs and not being among the VLs that share the $2^{nd}$ tier buffer pool.

Under a 3-tier shared buffer organization scheme, a first portion of memory is allocated to individual VLs as dedicated space, a second portion of memory is split among two or more shared pools, each of which is shared across a respective subset of the VLs, and a third portion is used for a shared pool that is used across all or a subset of VLs. In the configuration shown in FIG. 31c, tier 2 includes two shared pools, while tier 3 includes a buffer pool that is shared across all VLs. The size of the shared pools need not be the same, while the number of VLs in each subset may likewise differ.

During ongoing link operations, each transmitter maintains a "view" of the buffer configuration and fill level (available space) of the VL buffers and shared buffer space(s) (if applicable) at the receive buffer of its peer receiver in a "neighbor" device, wherein neighbor devices are on opposing ends of a link. This is facilitated through use of the following approach. First, each of peer transmit and receive ports in the neighbor devices are apprised of an initial receive buffer configuration and VL allocation for the receive buffers in the receive port before the start of link data transfer operations. In one embodiment, the Fabric manager is responsible for one or more of specifying or identifying the buffer organization of the receiver. It then can program the transmitter's credit manager to reflect the buffer organization and the number of supported data VL's. In one embodiment, the Fabric manager performs this operation in connection with a link negotiation and initialization procedure call LNI.

When data begins to flow across the link, the buffer availability at the various receive ports dynamically change as a function of flits that are received at each receiver and flits that are removed from that receiver's buffers in connection with forwarding flits to a next hop. In connection with these changes, the receive port sends credit ACKs to its peer transmit port, wherein the credits are processed by the transmit port's credit manager to update the transmit port's view of the receive ports current buffer configuration. Due to latencies including link roundtrip transfer time and credit processing latency, the view of the receive port buffer configuration at the transmit port will be behind the actual current buffer configuration at the receive port; additional buffer space is provided to account for these latencies.

After a link is initialized and before packets can traverse it, the receiver and transmitter peers on opposing ends of each uni-directional link are made consistent with respect to the receiver's buffer organization and the desired credit organization implemented by the receiver. As discussed above, in one embodiment the buffer organization information is provided to receiver and transmitter peers by the Fabric Manager. In one embodiment, credit organization is implemented at the receiver, and corresponding credit organization information is sent from the receiver to its peer transmitter.

In further detail, the credit organization implemented by a receiver involves the use of both a buffer allocation unit (AU) and a credit return ACK unit (CU) employed in connection with returning credit ACKs for that receiver. The AU is the minimum block size that is used for buffer allocation at the receiver. The credit ACK unit (CU) is the number of receiver AUs represented by each credit returned by the receiver. In one embodiment, the receiver sends corresponding variables vAU and vCU specifying the AU and CU it is using to its peer transmitter. In one embodiment, the vAU and vCU variables use a logarithmic scale, examples of which are shown in TABLE 5 and TABLE 6 below.

As shown in FIG. 30, each of receivers 3004a and 3004b communicate credit organization information comprising a buffer allocation unit variable (vAU) and credit ACK unit variable (vCU) to respective transmitters 3000b and 3000a, where they are received by credit managers 3002b and 3002a, as shown by the dashed lines in FIG. 30. Each transmitter's credit manager is also provided with information defining the buffer organization implemented by its transmitter's peer receiver. Each transmitter's credit manager 3000 keeps track of presently available credits received from the receive port of its peer and controls flow of packets to its peer accordingly. As packets are processed by a receiver 3004, buffer space is freed, and the receiver provides credit ACKs back to the credit manager 3002 for its transmitter peer, as shown in solid lines. Based on fabric operational needs, a centralized Fabric Manager may make changes to the relative allocation of credits between various VLs during runtime operations.

After the credit manager is initialized, the credit manager is responsible for tracking the amount of buffer space on the receiving side. In one embodiment, the distribution of dedicated and shared credits is configured using the following set of configuration registers in TABLE 4. These registers are all in units of the peer's Allocation Unit (AU) value.

TABLE 4

| Configuration Register | Description |
| --- | --- |
| Dedicated_Limit[VL] | The value in this register is the amount of buffer space dedicated to an individual VL. |
| Global_Shared_Limit | The value in this register is the amount of buffer space that is being shared amongst all VLs. |
| Shared_Usage_Limit[VL] | This value limits the amount of shared space consumed by an individual VL. |

The Dedicated_Limit[VL] configuration register is used to reserve a dedicated portion of the receiver's buffer for a specific VL. To ensure QoS separation between VLs, it is recommended that the Fabric Manager configure some dedicated space for each active VL.

The Global_Shared_Limit configuration register is used in a shared pool type organization. It indicates how much of the buffer at the receiver is shared by all VLs. The sum of the dedicated limits and global shared limit cannot exceed the total buffer space. Additionally, if no global shared space is used, this register value is set to 0.

The Shared_Limit[VL] configuration register specifies a limit for the amount of space an individual VL can consume of the shared space. When this register is set to zero, the given VL does not have access to shared space. An Fabric Manager may configure this register such that an individual VL is prevented from consuming too much of the shared space, hence preventing congestion or bursts of traffic on a single VL from starving shared buffer space by other VLs. The limit for an individual VL cannot exceed the Global_Shared_Limit, however the sum of the limits for all VLs may. For example, it is valid to have the Global_Shared_Limit be 10 and have the Shared_Limit for each of 4 VLs be 5, in which case no single VL may use no more than 5 units of shared space.

When consuming credits at a transmitter, credits are consumed from the VL's dedicated credit pool first. Once all VL dedicated credits have been consumed for the given VL, credits are consumed from the shared pool which is available for the given VL. When a single packet is larger than the remaining dedicated credits, the packet may consume credits from both the dedicated and shared pools.

When replenishing credits at the transmitter, credits are replenished to the shared pool first. Once all the shared credits consumed by the given VL have been replenished, credits are replenished to the dedicated pool for the given VL.

The foregoing, which applies to a 2-tier shared buffer configuration, may be extended to a 3-tier shared buffer configuration. In this case, credits are consumed based on a given VL, then a shared pool used across a subset of VLs including the given VL, and then the global shared pool. Replenishment goes in the reverse direction: global shared pool, then shared pool used across a subset of VLs, and lastly the dedicated pool for the given VL.

One of the variables that enables a packet to flow across a link is the amount of buffer space available on the receiving side. As discussed above, each transmitter (through its credit manager, in one embodiment) maintains a view of the buffer configuration and usage for its receiver peer, which is implemented (in part) through the use of Credit ACKs. Under one embodiment, it is the credit manager's responsibility to manage the credits for each VL. When using a virtual cut-thru policy, a packet cannot compete for arbitration unless there is enough space available in the receiving buffer to sink the entire packet. When using worm-hole routing, packets compete for arbitration if the space available is >0. Under a hybrid approach, "chunks" of flits are permitted to be sent over a link if the receiver has enough credits for receiving the chunk. Under this embodiment, the size of the chunk is configurable, and the size may be dynamically reconfigured while the link is active.

When the packet wins arbitration, a number of credits are allocated from the pool of credits for that individual VL or from the shared pool applicable to the VL. The credit pool is replenished when a credit ACK is received from the receiving side. This credit ACK occurs when the receiving side removes a specified number of flits from its buffer. The credit ACK is returned on a credit return (CrdRet) LF command flit or via sideband information carried in an LTP. Information contained in the credit ACK includes the VL and amount of credit ACKed; as described below, a single credit LF command flit may include credit ACKs for multiple VLs. Devices accept credit return via the CrdRet LF command flit. When the 14b CRC LTP format is selected, devices also accept credit return via the LTP sideband information. When using the 14b CRC LTP format, devices should use the LTP sideband mechanism to return credits, but may optionally also use the CrdRet LF command flit.

As illustrated in FIG. 30 and discussed above, buffer allocation unit variables (vAU) and credit return ACK unit variables (vCU) are exchanged by neighbors prior to the start of link data transfer operations (e.g., during the LNI process). In one embodiment, these variables are implemented in the manner shown in TABLES 5, and 6 below. As depicted, both AU and CU use a logarithmic scale.

TABLE 5

| Variable passed at LNI (vAU) | Allocation Unit (AU) $AU = 2^{vAU} * 8$ |
| --- | --- |
| 0 | 8 |
| 1 | 16 |
| 2 | 32 |
| 3 | 64 |
| 4 | 128 |
| 5 | 256 |
| 6 | 512 |
| 7 | 1024 |

TABLE 6

| Variable passed at LNI (vCU) | Credit Unit (CU) $CU = 2^{vCU}$ |
| --- | --- |
| 0 | 1 |
| 1 | 2 |
| 2 | 4 |
| 3 | 8 |
| 4 | 16 |
| 5 | 32 |
| 6 | 64 |
| 7 | 128 |

If the neighbors on both sides of a link report different vAU and/or vCU variables during LNI, in one embodiment the transmitter of each port will use the AU of its neighbor when managing credits. Additionally, each transmit port will use the CU of its neighbor when processing ingress credit ACKs.

Figures 32, 33:
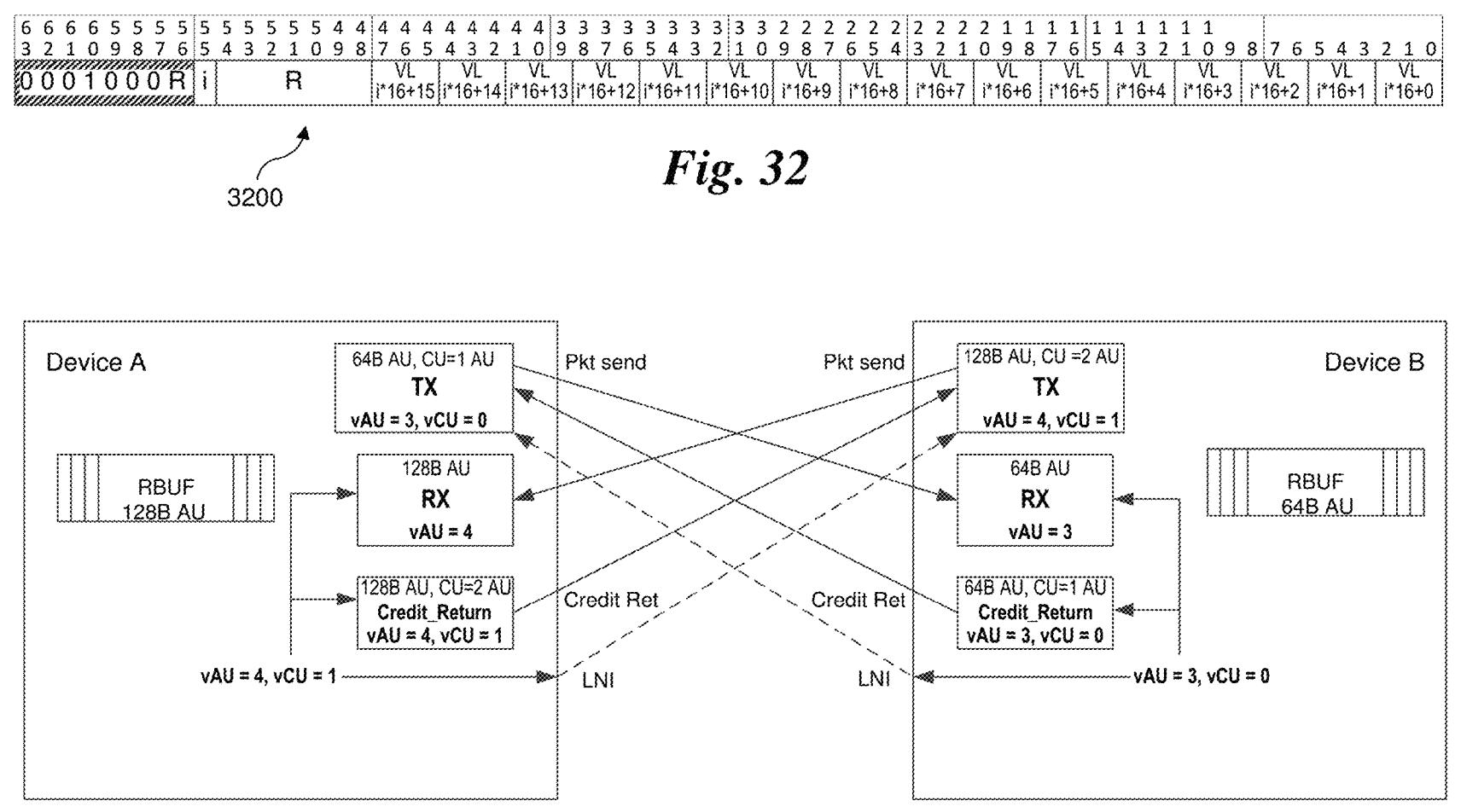

An example of this situation is illustrated in FIG. 33, which depicts an example of two distinct device types (shown as Device A and Device B), each with different values for vAU and vCU. In this example Device A boots with a vAU=4 and vCU=1. vAU is consistent with the hardware design of Device A's receive buffer (Rbuf), which is designed for 128B allocation units. Device B boots with a vAU=3 and vCU=0, where vAU is consistent with Device B's Rbuf which is designed for 64B allocation units. During LNI, each device sends its vAU and vCU variables. Upon receipt of the neighbor's vAU and vCU, each device programs its own transmitter to use the neighbor's AU value when managing credits and to process credit return from the neighbor using the neighbor's CU value. Meanwhile, the receiver (RX) and credit return units in each device uses its own native AU and CU values.

In one embodiment, returned credit units are encoded using a multi-bit field and a logarithmic scale. As example of one encoding for credit units returned (CR) is shown in TABLE 7 below.

TABLE 7

| Code in sideband and flit (CC) | Credit Units Returned (CR) |
|---|---|
| 0 | 0 |
| 1 | 1 |
| 2 | 2 |
| 3 | 4 |
| 4 | 8 |
| 5 | 16 |
| 6 | 32 |
| 7 | 64 |

The algorithm for determining the number of credits ACKed is the same whether using LF sideband or LF command flits. The difference is that when returning credit ACKs via the LF command flits, the VL is implied. An example of an LF command flit format 3200 for incremental credit ACKs, according to one embodiment, is shown in FIG. 32. As shown, the lower six bytes are partitioned into sixteen 3-bit fields, each having an offset (relative to bit 0) that identifies the VL they are associated with (when considered in combination with the multiplier 'i' at bit 55). For example, 'i' is 0, LF command flit format 3200 may be employed for specifying return credits for VLs 0-15, while if 'i' is 1 then return credits for VLs 16-31 are specified. The use of a logarithmic scale enables the 3 bits to encode credit values of 0, 1, 2, 4, 8, 16, 32, and 64. Thus, in a system with 32 VLs, credit for all VLs can be returned using only 16 bytes.

TABLE 8 illustrates an example of credits returned when vAU=3 (AU=64), and vCU=0 (CU=1). The total credits returned is a CR*AU*CU, where CR is the number of credits, AU is the allocation unit size, and CU is the Credit Unit value. For an AU of 64 bytes, a code of '111' specifies 4096 bytes of credits are being returned.

TABLE 8

| Code in sideband or flit (CC) | CR | Total Credits Returned (Bytes) CR * AU * CU | Total Credits Returned (Blocks) Bytes/AU |
|---|---|---|---|
| 0 | 0 | 0 | 0 |
| 1 | 1 | 64 | 1 |
| 2 | 2 | 128 | 2 |
| 3 | 4 | 256 | 4 |
| 4 | 8 | 512 | 8 |

TABLE 8-continued

| Code in sideband or flit (CC) | CR | Total Credits Returned (Bytes) CR * AU * CU | Total Credits Returned (Blocks) Bytes/AU |
|---|---|---|---|
| 5 | 16 | 1024 | 16 |
| 6 | 32 | 2048 | 32 |
| 7 | 64 | 4096 | 64 |

The architecture's credit-based flow control mechanism provides significant advantages over conventional approaches. For example, from a fabric efficiency perspective, the mechanism allows credits for 16 VLs to be returned in a single 8-byte message. Credits for each VL require only 3 bits and can indicate between 0 and 128 credit exchange units to be returned. In addition, the size of a credit exchange unit is configurable. In contrast, a fabric such as InfiniBand would require 128 bytes (16 eight-byte messages) to exchange a comparable amount of credits.

By having credit tracking done by the transmitter, the reassignment of available credits can be done merely by adjusting counters at the transmitter. The transmitter can also reassign credits to different VLs as they are returned. This flexibility permits the performance of VLs to be tuned in response to application needs, QoS requirements, and other changes in workload on the fabric. In contrast, conventional solutions that make use of absolute credits cannot move credits around reliably without quiescing traffic and coordinating changes between both the transmitter and receiver.

VL Arbitration

Each egress port provides arbitration used to send packets of different VLs toward the output link. A VL Arbitration Table, programmed by the Fabric Manager during initialization, contains a set of rules to regulate this arbitration process. These rules regulate the amount of bandwidth for each VL and also define the preemption priority among the VLs.

Since VL priority and scheduling is a function of the transmitter, different implementations of the architecture may provide significantly different architectures for this feature without any impact to interoperability. For example, in addition to the embodiments disclosed herein, it is envisioned that a more powerful and flexible mechanism will be defined which permits greater control and improved scheduling for VL usage.

The architecture supports features such as link level retry and preemption. These features may cause "bubbles" in the packet flow (packet fragmentation). Idles are inserted into the flow instead of VL packet data, if there is a packet bubble associated with the current VL (e.g., due to a previous preemption, link replay, etc.) and there is no other packet queued for a VL which is allowed to preempt the current VL. At an Egress port of a device, the VL that is flowing is not interrupted unless a VL that has been designated a preempting VL has a packet queued.

Figure 34:
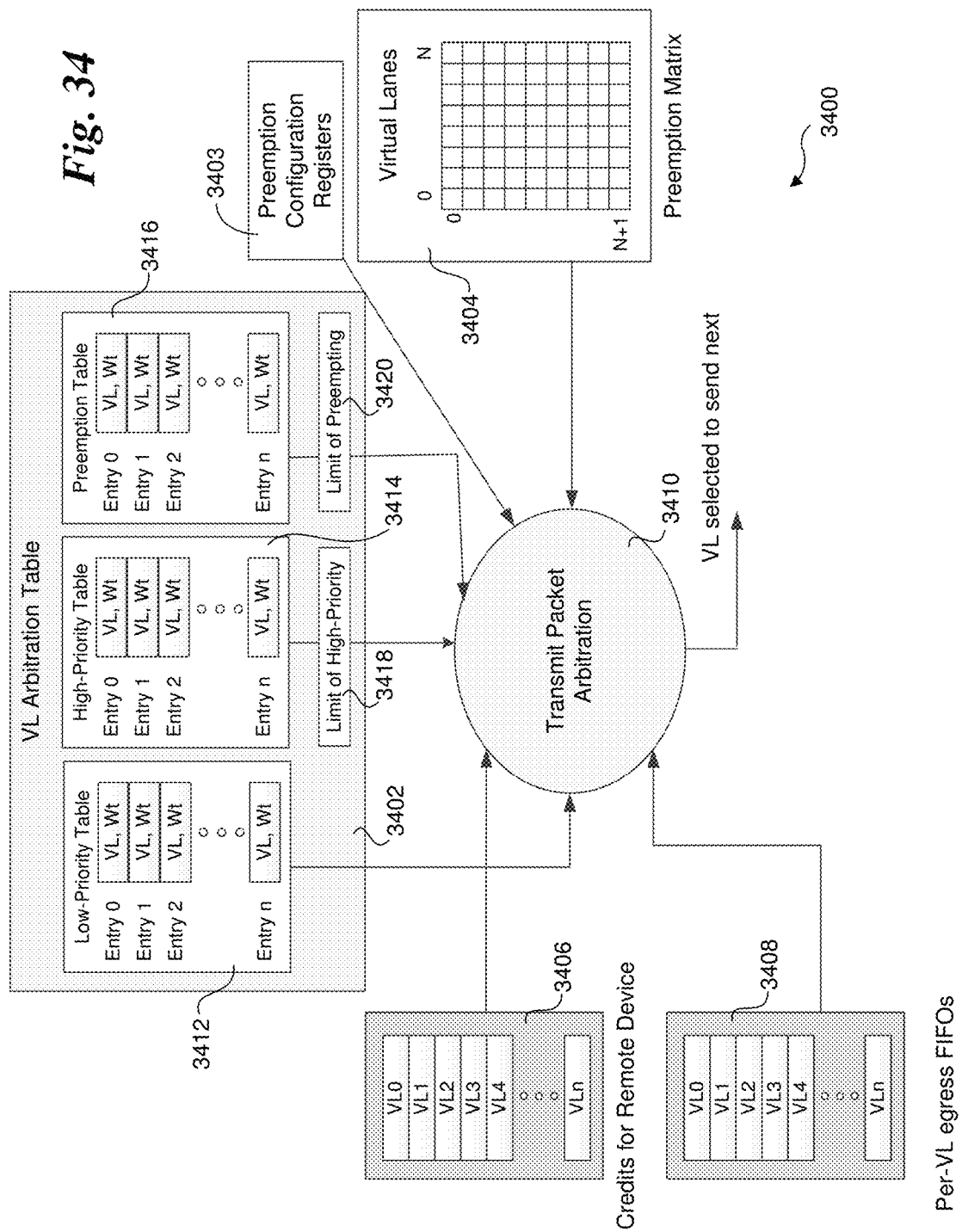
FIG. 34 is a schematic diagram illustrating a VL arbitration mechanism that supports preemption; according to one embodiment.

FIG. 34 shows one embodiment of a VL arbitration mechanism 3400 that supports preemption. The mechanism includes a VL Arbitration table 3402, preemption configuration registers 3403, a preemption matrix 3404, per-VL credits for remote device 3406, per-VL egress FIFOs 3408, and transmit packet arbitration logic 3410. VL Arbitration table 3402 includes a Low priority table 3412, a high priority table 3414, and a preemption table 3416, a Limit of High-Priority block 3418, and a Limit of Preempting block 3420.

In one embodiment, a three-level arbitration scheme is used for the Data VLs. The preempting VLs employ a weighted fair round-robin between other preempting VLs and have precedence over the two remaining priority levels. These remaining VLs occupy the lowest level priority precedence and are defined as follows: For the remaining VLs, a two level scheme is employed, using a dual level scheduling layered on top of a weighted fair scheme. Additionally the scheme provides a method to ensure forward progress on the low-priority VLs. In one embodiment, the weighting, prioritization, and minimum forward progress bandwidth is programmable by the Fabric Manager.

VL arbitration is controlled by the VL Arbitration Table 3402. In the illustrated embodiment, this table consists of five components, Preempting table 3416, High-Priority table 3414, Low-Priority table 3412, Limit of Preempting block 3420 and Limit of High-Priority block 3418. Each of Preempting table 3416, High-Priority table 3414, and Low-Priority table 3412 comprising a list of VL/Weight pairs. In one embodiment, The Preempting list has a minimum length of one and a maximum of 32, the High-Priority list has a minimum length of one and a maximum length of 128, and the Low-Priority list has a minimum length equal to the number of data VLs supported and a maximum length of 128. The High-Priority and Low-Priority table lists are allowed to be of different length. Each list entry contains a VL number (values from 0-31), and a weighting value (values 0-255), indicating the number of 64 byte units that may be transmitted from that VL when its turn in the arbitration cycle occurs. The Length field in the packet header is used to determine the number of units in the packet. In one embodiment, this calculation is maintained to 4 byte increments, while other embodiments may employ other granularities, such as 8 and 16 bytes. A weight of 0 indicates that this entry should be skipped.

The same data VL may be listed multiple times in the Preempting, High and/or Low-Priority table list as well as in two or all three lists. Configured data VLs should be listed in at least one of the tables. For example, in one embodiment, Low Priority table 3412 is sized such that each data VL can have at least one entry. If a configured data VL is not listed in any list, packets for this data VL may be immediately dropped, sent when the arbiter has no packets to send, or never sent.

Limit of Preempting block 3420 and Limit of High-Priority block 3418 indicate the number of bytes of preempting or High-Priority packets that can be transmitted without an opportunity to send a High-priority or Low-priority packet, respectively. In one embodiment, the number of bytes is the Limit value (the value stored in the Limit field) times a multiple number of bytes, such as times 16, 32, 64, etc., bytes. In one embodiment, the counting is done in a similar manner described above for weights (e.g., the calculation is done to 4 byte increments and a Preempting/High-Priority packet can be sent if a current byte count has not yet exceeded the Limit of Preempting/Limit of High-Priority value). In one embodiment, each Limit field is 14 bits in size; however other sizes may be used. Under an embodiment employing a 14-bit field, a maximum value of 16383 indicates that the byte limit is unbounded. (If is noted that for unbounded byte limits, forward progress of lower-priority packets is not guaranteed by this arbitration scheme.) In one embodiment, a Preempting/High-Priority Limit value of 0 indicates that only a single packet from the Preempting/High-Priority table may be sent before an opportunity is given to the High-Priority/Low-Priority table respectively.

In one embodiment, VL Arbitration table 3402*a* may be modified when the port is active. Additionally, such a modification will not result in fragmentation of any packet that is in transit. However, arbitration rules are not guaranteed during this change.

Preemption matrix 3404 supports a flexible control mechanism for providing rules for which VL's can preempt other VL's. In one embodiment, VL15 is reserved for fabric management and cannot be preempted by another VL. In one embodiment, the matrix is a (N+1)×N structure supporting up to N data VLs and VL15 preempting by up to N data VLs. Optionally, if there are no predefined VLs that cannot be preempted, an N×N matrix may be used. Preferably, a given implementation should size the preemption matrix based on the maximum number of data VLs the implementation supports. To control which VL's can preempt, one or more bits are asserted ('1') per row. FIG. 35 illustrates a 5×4 preemption matrix 3500 for an example device with 4 data VLs.

Entries in the preemption matrix for a VL preempting itself are ignored. The preemption rules are as follows for preemption matrix 3500:

VL 3 can preempt VL2, VL1, and VL0
VL 2 can preempt VL1, and VL0
VL 1 can preempt VL 2, and VL0

Within each Priority table, weighted fair arbitration is used, with the order of entries in each table specifying the order of VL scheduling, and the weighting value specifying the amount of bandwidth allocated to that entry. The arbitration is cycle-based where each entry in the table is processed in order.

There is no storage for remaining weight for entries within each of the Priority tables other than the 'current' weight and VL that is saved when there is a transition between priority levels. This then creates three sets of remaining weight and VL saved values: Preempt current weight/VL, High current weight/VL and Low current weight/VL. If there is a transition between priority levels, the current values are suspended and saved, the transition is made to the new priority level, and the new current weight/VL values are loaded prior to the arbitration cycle. When a transition is made back to the original priority level, the saved current weight and VL are reloaded and arbitration continues where it left off.

A separate pointer and available weight count table is maintained for each of the three tables. The pointers identify the current entry in the table, while the available weight count indicates the amount of weight the current entry has available for data packet transmission. When a table is active, the current entry in the table is inspected. A packet corresponding to this entry will be sent to the output port for transmission and the packet size (in 4 byte increments) will be deducted from the available weight count for the current entry, if all of the following conditions are true:

1. The available weight for the list entry is positive AND
2. There is a packet available for the VL of the entry AND
3. Buffer credit is available for this packet Note, if the available weight at the start of a new packet is positive, condition 1 above is satisfied, even if the packet is larger than the available weight.

When any of these conditions is not true, the next entry in the table is inspected. The current pointer is moved to the next entry in the table the available weight count is set to the weighting value for this new entry, and the above test repeated. This is repeated until a packet is found that can be sent to the port for transmission. If the entire table is checked and no entry can be found satisfying the above criteria, the next lower priority table becomes active.

Quality of Service (QoS)

The architecture supports QoS features that provide a number of capabilities, including:

Job separation/resource allocation
Service separation/resource allocation
Application traffic separation within a given job
Protocol (e.g., request/response) deadlock avoidance
Fabric deadlock avoidance
Traffic prioritization and bandwidth allocation
Latency jitter optimization by allowing traffic preemption The architecture provides a very flexible capability for QoS via Virtual Fabrics (vFabrics), Traffic Classes (TCs), Service Levels, (SLs), Service Channels (SCs) and Virtual Lanes (VLs). At the heart of QoS is the SC mechanism, which is used to differentiate packets within the fabric. In one embodiment, to support a wide variety of fabric topologies and configurations, SC assignments are managed by the fabric manager and the SC of a given packet may change as it traverses the fabric so that deadlocks can be avoided.

The application and sysadmin operations are centeredaround vFabrics. A vFabric is the intersection of a set of fabric ports and one or more application protocols. For each vFabric a set of QoS and security policies are established by the sysadmin. A given vFabric is associated with a Traffic Class for QoS and a Partition for security.

A Traffic Class represents a group of Service Levels that a given Transport Layer or application will use. Some Transport Layers may use multiple QoS levels to avoid deadlock (such as separating request and response traffic), while others may take advantage of multiple QoS levels to separate high priority control traffic from lower priority data traffic. Simpler transport layers may simply associate a traffic class with a single SL. In one embodiment, the architecture supports up to 32 Traffic Classes, but 4 to 8 are a more likely typical configuration.

Traffic Classes are realized through the end-to-end concept of a Service Level. In one embodiment, Traffic Classes may span multiple Service Levels, but a Service Level may be assigned to only one Traffic Class. In one embodiment, up to 32 Service Levels are supported. Service Levels function by prioritizing packet flow through the fabric. Service Levels are the lowest layer QoS concept visible to the architecture's Layer 4 protocols and applications.

Underlying Service Levels are Service Channels (SCs), which differentiate packets of different Service Levels as they pass through the fabric. The SC is the only QoS identifier contained in the fabric packets, hence allowing for a denser packet format than other networks. In some fabric topologies, Service Levels may span multiple Service Channels, but a Service Channel may be assigned to only one Service Level. In one embodiment, the architecture supports 32 SCs. In one embodiment, one or more of the SCs is/are dedicated to in-band fabric management.

In one embodiment, the fabric manager configures an SL2SC table in each endpoint that provides a mapping from each Service Level to a single SC. In one respect, the SL is a canonical ID for a QoS level, such that each QoS level has exactly one SL value fabric wide. An objective of the SL2SC table is to hide from Transport Layers the details of how many SCs it takes to route the topology and what the exact assignments and valid launch SCs are for that routing. In more complex configurations the valid launch SC to use for a given QOS level might even vary per sender, but all senders can still have the same canonical ID for the QoS level. Some APIs (such as Open Fabrics and PSM) may explicitly require an SL.

Some receivers may need to identify what QoS level a given packet was received on. For such receivers, an SC-to-SL table is also configured in each endpoint. This table provides a canonical translation and removes any complications from routing algorithms that use multiple SCs. Receivers may totally ignore the received QoS level, might pass it up to APIs (such as Open Fabrics), might verify it (for some SLA verification, etc.) or might even do more sophisticated processing (such as using QoS level to help select an Eth priority level in a gateway). Some receivers may use the QoS level in received packets to generate an appropriate response. For example a simple service might mimic back the QoS level in responses (and go through the send side processing above to insure a proper launch SC for the response). Other receivers may put response packets on a different QoS level in the same Traffic Class. In any case, it is not valid to simply send the response packet using the same SC as it was received on, because this could cause issues for some routing algorithms and topologies. Hence the canonical mapping to remove that issue.

Figure 44:
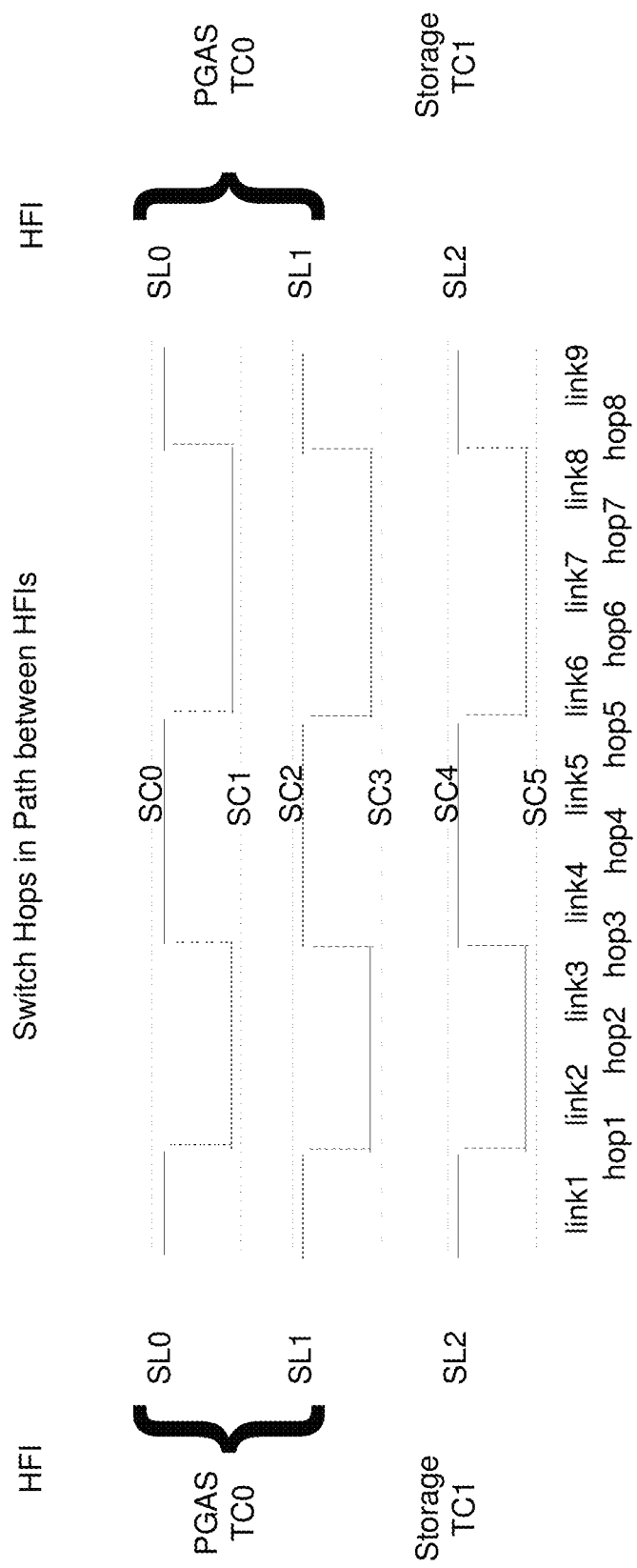
FIG. 44 is a diagram illustrating an example of TC, SL, and SC usage in a topology with credit loop avoidance.

FIG. 44 illustrates an example of TC, SL, and SC usage in a topology with credit loop avoidance. In this example, two HFI endpoints are connected via an 8 switch hop route through the fabric. Two TCs are used, one for PGAS (TC0), which requires two SLs (a request and response SL: SL0, SL1) and one for Storage (TC1), which only requires 1 SL (SL2). Each SL is assigned a pair of SCs (SC0/SC1, SC2/SC3 or SC4/SC5) for deadlock avoidance in the fabric. As the packets traverse the fabric, the SC may change link by link, however the SL and TC seen by Layer 4 and the application is consistent end-to-end.

Within a given Link, Service Channels are assigned to Virtual Lanes (VLs). VLs provide dedicated receive buffers for incoming Fabric Packets. VLs are also used for resolving routing deadlocks. In one embodiment, the architecture supports up to 32 VLs, though the actual number supported will generally be implementation-dependent. The architecture supports mapping SCs onto VLs, such that heterogeneous fabric configurations can be supported. Individual implementations may choose to support fewer than 32 VLs or may be configured to optimize the amount of buffering per VL by reducing the overall number of VLs available.

By mapping Service Channels to independent VLs, an SC can provide an independent channel through the fabric, ensuring that contention and blocking in one SC does not prevent progress for traffic in a different SC. Service Channels are used to avoid routing and protocol deadlocks and to avoid head of line blocking between traffic classes.

Each SC carries traffic of a single service level in a single traffic class. The fabric manager configures in each egress port how VL resources are divided or shared between multiple SCs which may be using the same port. The desired QoS characteristics of the SC are used by the FM to choose appropriate settings for the VL assigned to it including:

The transmission of packets across a Virtual Lane is scheduled via a configurable VLArbitration algorithm that allows the fabric manager to configure how the link should be shared and scheduled when multiple VLs have queued traffic for the given link.

Packet preemption can permit higher priority traffic to preempt a lower priority packet. This provides further reductions in head of line blocking for high priority traffic.

Share of the output port's bandwidth available by configuration of credit return rates for the VL.

Configurable VL buffering per port, such that the queue depths allowed at each switch hop can be controlled per VL.

The architecture of the fabric facilitates the implementation of heterogeneous environments where a mixture of devices support different number of VLs. Examples include switches conserving buffer space by supporting a limited number of VLs, HFI endpoints not needing the extra VLs that are intended for topological deadlock avoidance within the fabric, or some special devices that support ultra-long links by providing a large amount of buffering but for only a limited number of VLs.

Figure 36:
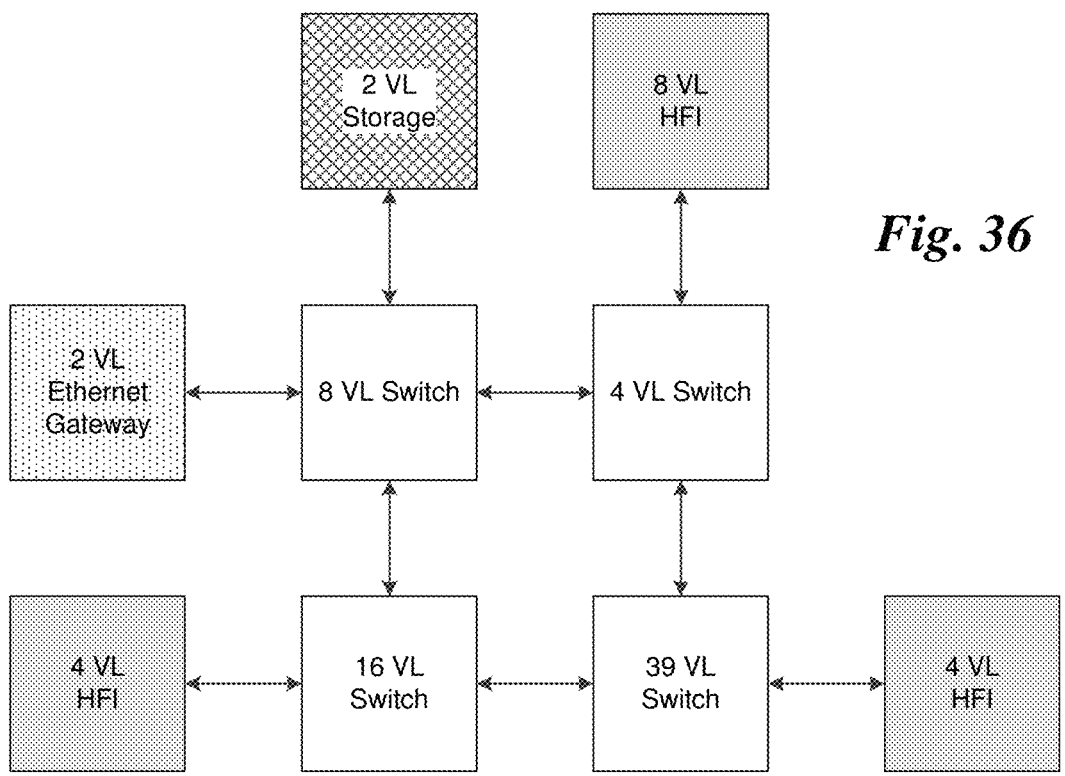
FIG. 36 is a block diagram illustrating an example of a heterogeneous fabric configuration under which different numbers of VLs are supported at different components interconnected via the fabric links.

An exemplary heterogeneous environment is illustrated in FIG. 36. As illustrated, interconnected components, such as switches, HFIs, gateways, and storage with fabric interfaces can be implemented supporting different numbers of virtual lanes, with VL-to-VL mapping up or down depending on which component has the greater number of VLs.

Generally, a Service Level (SL) need not be explicitly identified with a separate field of an L2 Link Fabric Packet format, although there may be instances in which a FP format contain an SL field, such as to support interoperability with other protocols such as some InfiniBand formats. Rather, this QoS information is implied by the SC field of the Fabric Packet. In one embodiment, this QoS level is preserved through the SC-to-SC mappings, as each packet traverses across the fabric from end-to-end. For a heterogeneous fabric, instead of limiting the entire fabric by requiring all traffic to travel on the lowest denominator of VLs being supported by the devices with different capabilities, the architecture provides a method allowing packets to expand and contract the utilization of the VL resources to help reduce the chance of head-of-line blocking and preserving the implied SL information simultaneously.

Figure 37:
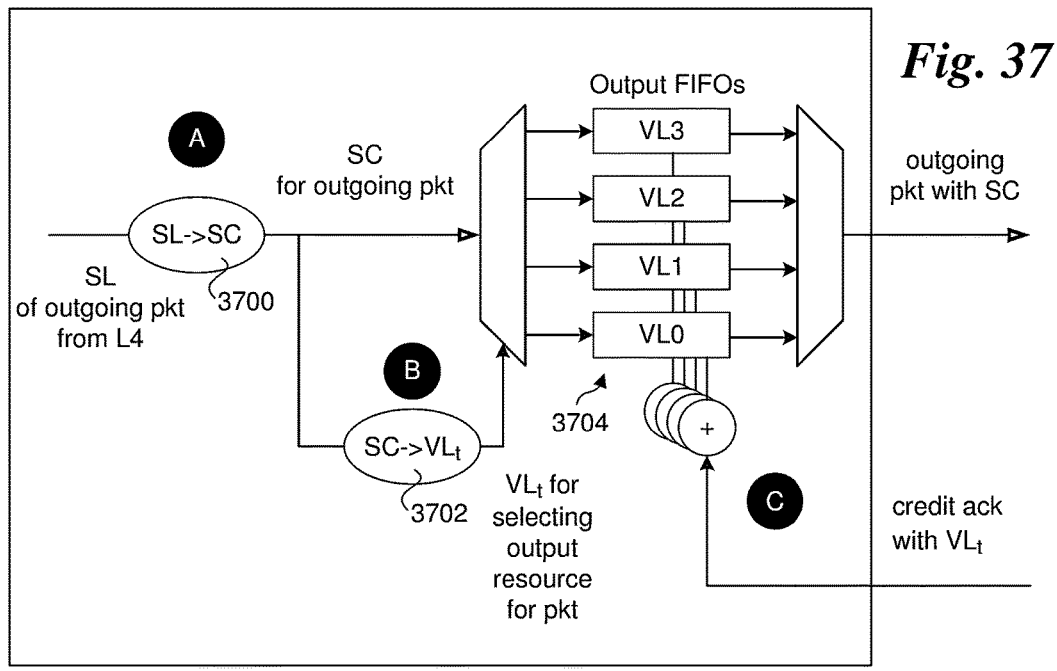
FIG. 37 is a schematic diagram illustrating an example of QoS mappings associated with injecting a packet into the fabric by the L4 Layer of an HFI, according to one embodiment.

FIG. 37 illustrates an example of injecting a packet into the fabric by the L4 Layer of an HFI, according to an embodiment. When injecting a packet into the fabric by the L4 Layer of an HFI, it first maps the SL provided by the L4 interface to an initial SC (denoted at an operation 'A') via and SL-to-SC mapping 3700 and sets the SC field of the packet with this value. The generated SC value may embed both the SL and information related to the topology of the fabric. At an operation 'B' the SC then undergoes a SC-to-$VL_t$ mapping 3702 for choosing an output VL resource that transmits this packet. An output resource usually refers to an output FIFO and the credit manager that associates with it. In the diagram of FIG. 37 there are four VL FIFOs 3704 for illustrative purposes; the actual number of FIFOs will be dependent on the number of virtual lanes supported by a device. In addition, the SC-to-$VL_t$ mapping 3702 at this output stage depends not only on the number of VLs the local device supports, but also depends on the number of VLs the remote device supports. As depicted at an operation 'C,' credits are ACKed back based on the $VL_t$ of this local device by the remote receiving device and the corresponding counters are incremented. The details of how an SL is mapped to an SC, an SC is mapped to a $VL_t$, and credits being mapped back using $VL_t$ are explained in further detail below.

Figure 38:
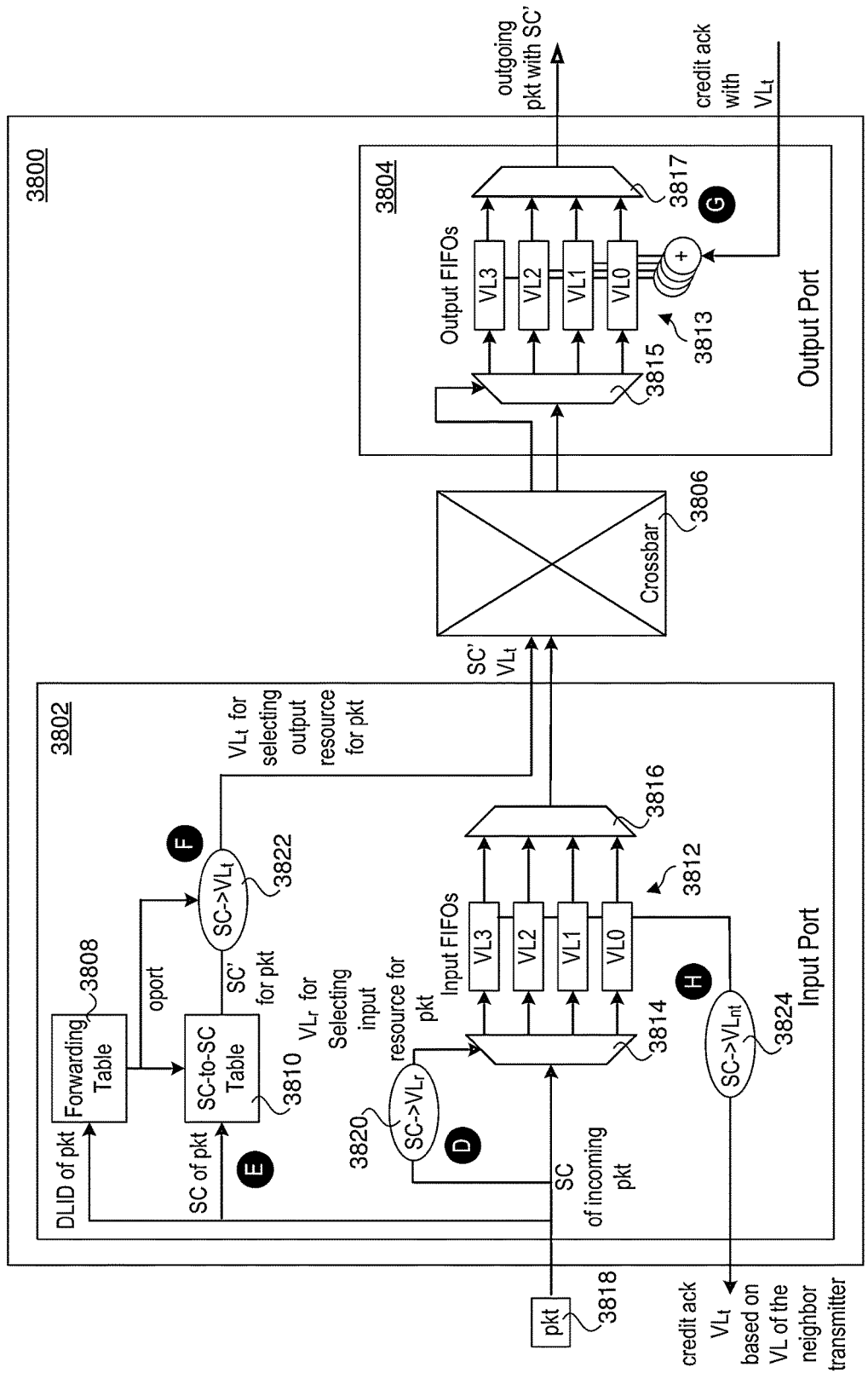
FIG. 38 is a schematic diagram illustrating QoS mappings performed in connection with internal transfer of a packet received at an input port of a switch and to be transmitted out an output port of the switch, according to one embodiment.

To maximize usage of the VL resources while simultaneously preserving the QoS level embedded in the SC field of an incoming packet, each switch performs mapping for selecting both the input and the output resources in the pipeline. An exemplary embodiment illustrating selective details of a switch 3800 are shown in FIG. 38. Each switch will include a plurality of input ports 3802 and output ports 3804, wherein the output of the input ports are coupled to the inputs of the output ports via a crossbar interconnect 3806. An input port 3802 includes circuitry and logic for effecting various input port operations, including a forwarding routing table 3808, an SC-to-SC mapping table 3810. Each input port also include a plurality of VL input FIFOs 3812 with associate circuitry and logic for effecting demultiplexer (demux) 3814 and multiplexer (mux) 3816 operations. Output port 3804 includes a plurality of VL output FIFOs 3813 with associated circuitry and logic for effecting demux 3815 and mux 3817 operations.

As shown in FIG. 38, as a packet 3818 comes in, it first goes through an SC-to-$VL_r$ mapping 3820 (at an operation 'D') to select one of the input VL resources for accepting this packet. An input resource is usually referring to the VL-specific FIFO at the input stage. This mapping depends on the number of VLs this local device supports, as explained in further detail below. For an embodiment does not have separate resources for each VL at the input stage, SC-to-$VL_r$ mapping 3820 is not needed. In parallel, forwarding routing table 3808 uses the Destination Local Identifier (DLID) of packet 3818 to determine an output port for this packet, as depicted at operation 'E'. Depending on the outcome of the routing decision and the SC of the packet, a new exiting SC' is determined based on SC-to-SC mapping table 3810. For a topology such as Fat-Tree, the new SC' is usually the same as the original SC. For a topology such as Torus, the new SC' may be an increment of the original SC to prevent potential deadlock if the output port happens to cross over a 'dateline'. The SC field of the packet is replaced with this new SC'. The new SC' then goes through another output port specific SC-to-$VL_t$ mapping 3822 at an operation 'F' to derive an egress $VL_t$ for selecting the output resource at the destination port to transmit packet 3818. The mapping for selecting the output resource depends not only on the number of VLs the local device supports, but may also depend on the number of VLs the remote device supports, as explained below.

As packets are pulled out of a particular VL input FIFO 3812, instead of ACKing the credit back to the transmitter using this VL, the switch ACKs back the credit based on the VL of the transmitting device, or $VL_{nt}$ in order to match the credit management from the transmit end. This is achieved by an operation 'H' by mapping the SC of the packet being pulled out of the input FIFO and maps it through a SC-to-$VL_{nt}$ table 3824 that is programmed by the Fabric Manager based on the VL on the transmit side. Similarly, when processing ingress packets and ingress VLMarker LF command flits, SC-to-$VL_{nt}$ table 3824 is used to map inbound SC values in order to properly track the VL interleaving of each packet as defined by the transmitter. If both this local device and the transmit device support the same number of VLs, then the mapping table at both operations 'D' and 'H' would be the same. As depicted at an operation 'G,' at the output port credits are ACKed back by the remote receiving device based on the VL of this local device and the corresponding credit counters are incremented.

Figure 39:
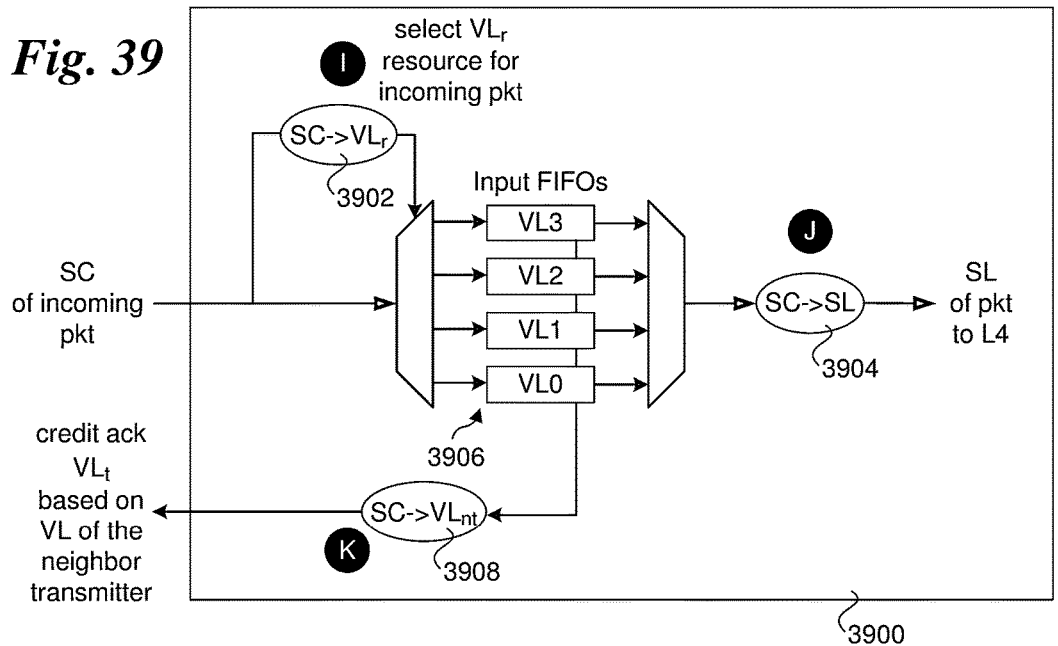
FIG. 39 is a schematic diagram illustrating an example of QoS mappings associated with receiving a packet ejected from the fabric at an HFI, according to one embodiment.

As illustrated in FIG. 39, once a packet arrives at an HFI 3900, the SC goes through a first SC-to-$VL_r$ mapping 3902 at an operation 'I' to generate a VL for selecting one of the input resources to receive this packet. This mapping is very similar to the mapping at the input stage of a switch (operation 'D' in FIG. 38). For implementation that does not have separate resources for each VL at the input stage, this mapping at operation 'I' is not needed. A second stage of SC-to-SL mapping 3904 at an operation 'J' decodes the SC value and maps it back to the original SL for this packet before handing it back to the L4 Layer. As depicted at an operation 'K,' as packets are pulled out of a particular VL input FIFO 3906, credits are ACKed back to the transmitter based on the $VL_{nt}$ of the transmitting device as in the case for the switch (similar to operation 'H' in FIG. 38). Similarly, when processing ingress packets and ingress VLMarker LF command flits, an SC-to-$VL_{nt}$ table 3908 is used to map inbound SC values in order to properly track the VL interleaving of each packet as defined by the transmitter.

When injecting a packet into the fabric by the HFI, an SL is provided by the L4 Layer for generating an initial SC value. In one embodiment the architecture supports 32 QoS levels and 32 SCs where this mapping process can either be done in software or inside the HFI. Depending on the topology of the fabric, multiple SCs might be needed per QoS level to avoid deadlock in the fabric. An example would be for a Torus topology, each QoS level would require 2 SCs for covering the case where a packet crosses the 'dateline'. In this case, 16 SLs would then map into the 32 SC-space conveying not only the QoS levels, but also providing the appropriate SC settings for preventing deadlock in the given topology. The remaining 16 SLs can either be unused by L4 or be redundantly mapped to the 32 SCs. For a topology such as Fat-Tree where only a single SC is needed per QoS level, the 32 SLs are then mapped 1:1 to the 32 SCs. Generally, the actual SL-to-SC mapping values are up to software as long as it conforms to the deadlock avoidance rules for the fabric topology.

The SC of an incoming packet into an HFI is mapped back to an SL. This reverse mapping process can be done either in software or within the HFI. For a topology that uses multiple SCs per QoS level for deadlock avoidance, in one embodiment these SCs are collapsed down to a single SL value that the application may use for processing the packet. An example would be for a Torus fabric where two SCs are used for each QoS level to prevent topological deadlock; the 32 SCs are then mapped down to 16 SL values. An individual L4 may chose to ignore the SL provided, may use it to select an SL for use in response traffic, or may perform additional L4 verification or L4 traffic separation based on the SL value given.

After a packet comes into a switch, a routing decision is made by the forwarding and routing table to decide which output port the packet is delivered to. For a topology such as Fat-Tree where the SC persists from end-to-end, the SC remains unchanged regardless of which output port it takes. However, for certain topologies such as Torus, the SC of the incoming packet needs to be incremented if the output port happens to cross a 'dateline' in order to avoid deadlock. Therefore, a SC-to-SC mapping table is provided (such as SC-to-SC mapping table 3810 in FIG. 38) for generating an egress SC' based on the ingress SC and the output port. The SC field of the incoming packet is then replaced by this new SC' in order to prevent deadlock. When selecting the output resource for sending out this packet at the output port, the VL selection is based on this new SC' as shown in operation 'F' of FIG. 38.

An SC-to-VL mapping is implemented for selecting the input resource as a packet comes in, and another mapping is needed for selecting the output resource for the packet to go out. The mapping mechanism for selecting the output resource at the HFI (operation 'B' in FIG. 37) and at the switch (operation 'F' in FIG. 38) are the same, while the mapping mechanism for selecting the input resource at the HFI (operation 'I' in FIG. 39) and at the switch (operation 'D' in FIG. 38) are also equivalent. For a device that supports the maximum number of 32 VLs, the mapping for selecting the input resource can be omitted. The mapping for selecting the output resource is still required since it is dependent on the capabilities of the neighbor.

In a homogeneous environment where all the devices in the fabric support the same number of VLs, all the SC-to-VL mappings can be set identically to simply map down the 32 SCs to the VLs that are available. In a heterogeneous environment where different devices support different numbers of VLs, the SC-to-VL mechanisms differ depending on whether the mapping is "expanding" or "contracting". The following describe these two concepts.

Figure 40:
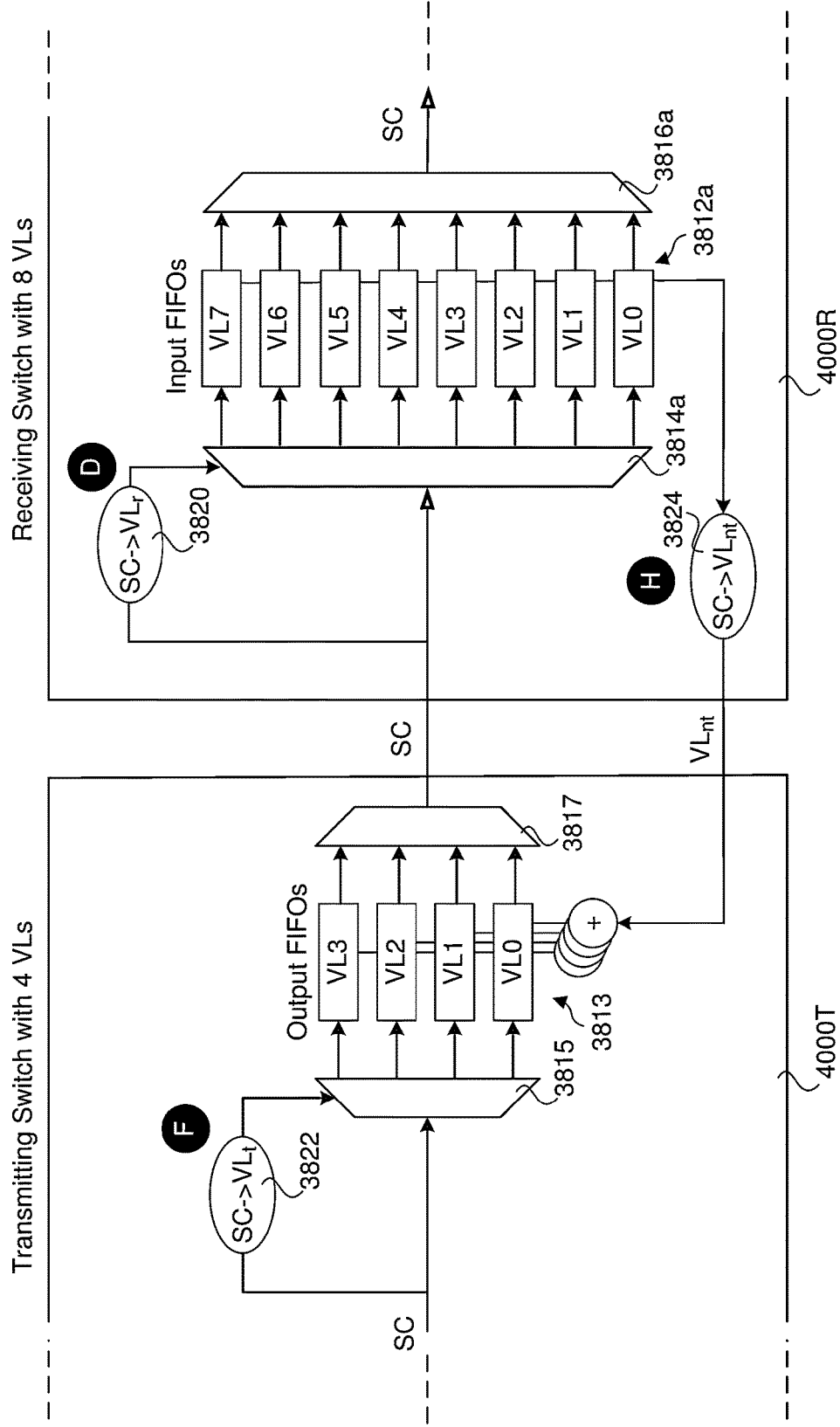
FIG. 40 is a schematic diagram illustrating an example of VL expansion mapping, according to one embodiment.

Expansion mapping describes the mapping mechanism for a transmitting and receiving pair where the receiving device supports more VLs than the transmitting device. FIG. 40 shows an example of expansion mapping between a switch 4000T including 4 VLs and operating as the transmitting device and a switch 4000R including 8 VLs and operating as the receiving device.

Internally within switch 4000T, the SC for a packet goes through an output port specific SC-to-$VL_t$ mapping 3822 at operation 'F' to derive an egress $VL_t$ for selecting the output resource. The mapping configuration may differ depending on the input buffer type at the receiving device. If the input buffers of the receiving device are discrete FIFOs, the output mapping at operation 'F' maps to all 4 VLs available at the transmit side. Each of the credit counters for the 4 VLs is set to the size of one of the input FIFOs of the receive side. The SC-to-$VL_t$ mapping result generates a control input to a 1:4 demux 3815 to select the applicable VL output FIFO 3813 associated with the egress $VL_t$. In conjunction with transmitting the packet's associate flits outbound, an input control (implemented by an arbiter that is not shown) is applied to 4:1 mux 3817 to select which VL output FIFO 3813 to pull flits from.

The packet data is transmitted from switch 4000T and received at switch 4000R, whereupon an SC-to-$VL_r$ mapping 3820 (operation 'D') is performed to select one of the input VL resources (one of VL input FIFOs 3812a) for accepting this packet. The input mapping at 'D' maps to all 8 VLs to maximize the usage of the input FIFOs and helps reduce head-of-line blocking. Under this configuration, half of the buffer credits are not being utilized. Selection of the VL input FIFO is effected by a control input generated by operation 'D' that is provided as an input to a 1:8 demux 3814a. An 8:1 mux 3816a is implemented when pulling flits from VL input FIFOs 3812a during further processing. As also shown in FIG. 40, an SC-to-$VL_{nt}$ table 3824 is used at operation 'H' to map inbound SC values in order to properly track the VL interleaving of each packet as defined by the transmitter.

If the input buffer of the receiving device is a pool of shared or re-configurable buffers, the output mapping at operation 'F' maps to all 4 VLs available at the transmit side. The credit counters for the 4 VLs are configured so that the entire receive buffer space is being utilized. Each VL is given enough credits to at least be able to send one full size packet to guarantee forward progress. The input mapping at operation 'D' maps to all 8 VLs to maximize the usage of the input FIFOs and helps reduce head-of-line blocking.

Figure 41:
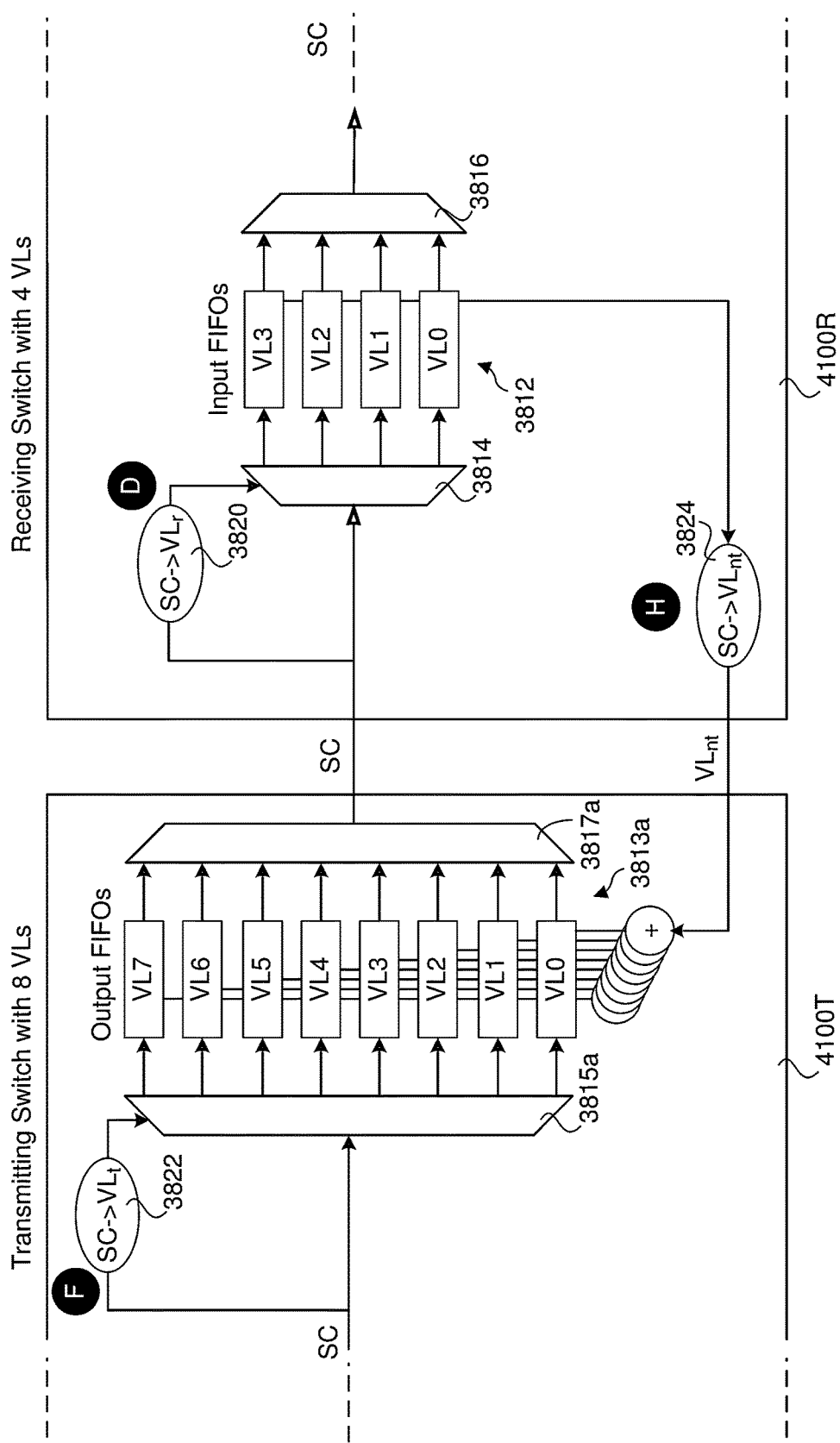
FIG. 41 is a schematic diagram illustrating an example of VL contraction mapping, according to one embodiment.

Contraction mapping describes the mapping mechanism for a transmitting and receiving pair where the receiving device supports fewer VLs than the transmitting device. FIG. 41 shows an example of contraction mapping between a switch 4100T including 8 VLs and operating as the transmitting device and a switch 4100R including 4 VLs and operating as the receiving device.

As with expansion mapping, the contraction mapping configuration may differ depending on the input buffer type at the receiving device. If the input buffers of the receiving device are discrete FIFOs, the output mapping at operation 'F' maps to only 4 VLs at the transmit side to match the VLs at the receive side. Each of the credit counters for the 4 VLs is set to the size of one of the input FIFOs at the receive side. The input mapping at operation 'D' maps to all 4 VLs accordingly. Under this configuration, only 4 of the 8 available output resources are being used.

If the input buffer of the receiving device is a pool of shared or re-configurable buffers, the output mapping at operation 'F' maps to all 8 VLs available at the transmit side. The credit counters for the 8 VLs are configured so that the entire receive buffer space is being utilized. Each VL is given enough credits to at least be able to send one full size packet to guarantee forward progress. The input mapping at operation 'D' maps to all 4 VLs. In this case, all 8 available output resources are being used.

There are times when the input buffer at the receiving end is either not sufficiently large for covering the round trip latency or just barely covers it. In that situation, if the receiving buffer is a shared or configurable structure, it is possible to conserve buffer credits by intentionally not utilizing all the resources. Consider the configuration illustrated in FIG. 40. If the shared buffer at the receiving end can barely cover the round trip latency of the link, instead of having operation 'F' map to all 4 VLs at the transmit side, it can be configured to only map to 2 (or even 1 if there is no protocol or topological deadlocking requirements). With this configuration, credits can be more efficiently shared among 2 VLs instead of 4, especially if the MTU is large. This method however, compromises the delivery of QoS.

When configuring the SC-to-VL tables to map down SCs to VLs, it is important that upper layer protocols are not crossed and deadlock avoidance rules for the fabric topology are not violated. For Layer 4 protocols such as PGAS (Partitioned Global Address Space), certain SCs are designated for request class and others are designated for response class traffic. If the two classes are accidentally mapped down to the same VL buffer, protocol deadlock may occur.

Similarly, SCs may also be assigned for deadlock avoidance in the fabric topology. An example would be that of a Torus topology, all odd numbered SCs are assigned for packets that cross a "dateline" to prevent credit loop dependencies. In this situation, even numbered and odd numbered SCs are not allowed to be mixed in any of the VL resources, or risk experiencing topological deadlock in the fabric. When down-mapping SCs to VLs, an unfortunate nature of it is that QoS is compromised. Multiple SCs belonging to different QoS levels are mapped down to share the same VL resource.

As packets are pulled out of the input buffer, credits are ACKed back from the receiver to the transmitter. With the SC-to-VL mappings being potentially different between the two ends, as is the case in FIG. 40 and FIG. 41, the ACKing of credits is based on the $VL_{nt}$ at the transmit side. This is achieved by mapping the SC of the packet being pulled out of the input FIFO and mapping it through an SC-to-$VL_{nt}$ table 3824 (at operation 'H' in FIG. 40 and FIG. 41). The credit for this generated $VL_{nt}$ is then ACKed back through the flow control mechanism provided by the L2 Link Transfer Sub-layer. For both cases illustrated in FIGS. 40 and 41, the mapping tables at operations 'F' and 'H' will match.

The architecture allows an instance of an SC-to-VL mapping table 3810 for an input port of a switch (e.g., at operation E of FIG. 38) to be configured as an SL-to-SC mapping table instead. This feature allows IB HCAs or IB Switches to be directly connected to the architecture fabric. It also permits use of legacy routing and configuration management software for fabrics where only L2 packet headers which include an SL field are being used.

The architecture also supports legacy mapping modes. For example, SL-to-VL mapping is a legacy mapping mode that works similarly to IBTA. In this mode, there is no difference between a VL and SC: They are equivalent. All SC-to-$VL_t$ and SC-to-$VL_{nt}$ mappings throughout the fabric are programmed as 1:1 or may be bypassed. All the SC-to-SC mapping tables at the input port of the switches (e.g. SC-to-SC mapping table 3810 at operation 'E' in FIG. 38) are changed to SL-to-VL mapping tables. Instead of generating an egress SC based on the SC of the incoming packet and the destination output port, an egress VL is determined based on the SL of the incoming packet and the destination output port. The SC field of the packet is tagged with this VL value before exiting the switch. Unlike the SC-to-SC mapping, which is for topological deadlock avoidance and has no knowledge of the number of VL resources the device supports, the SL-to-VL mapping has knowledge of both. Hence eliminating the need of the subsequent SC-to-VL mapping.

SL-to-VL mapping mode works with L2 Link Fabric packet formats that contain an SL field, and it is suitable for a fabric environment that uses only such formats. This means all the HFIs are only allowed to communicate among each other using such formats. With the SL being explicitly included inside the packet, preserving the SL from end-to-end is automatic. The contraction mapping and the expansion mapping in a heterogeneous environment are now built into the SL-to-VL tables instead of relying on the various SC-to-VL tables to perform the task. In this legacy mode, IB HCAs can directly be attached to the architecture fabric. An equivalent way of looking at this mode is to think of it as an SL-to-SC table along with 1:1 mappings of SC-to-$VL_t$ and SC-to-$VL_{nt}$.

FIG. 42 illustrates a high-level example of this SL-to-VL legacy mapping mode. The diagram includes two InfiniBand Host Channel Adapters (IB HCAs) 4200 and 4202, two HFIs 4204 and 4206, and two switches 4208 and 4210. The L2 Link Fabric 9B packet format includes an SL field shown in FIG. 49 and described below. This enables these 9B packets to be transferred end-to-end between any combination of IB HCAs and HFIs without having to change the SL field value.

The SL-to-VL Hybrid legacy mode supports an environment that has a mixture of IB HCAs and HFIs and uses packet formats in addition to the 9B packet format. An example of such an environment is shown in FIG. 43, which supports 9B, 10B and 16B packet formats and includes two IB HCAs 4300 and 4302, two HFIs 4304 and 4306, and two switches 4308 and 4310. FIG. 43 also depicts various operations shown in FIGS. 37-32 by inclusion of the applicable letter for the operation in parenthesis. With such a fabric, all the ports are connected in the normal mode with the exception of the switch ports that are connected to an IB HCA device. For those ports, a hybrid mode is used where instances of SC-to-SC mapping table 3810 (operation 'E' in FIG. 38) are configured to implement SL-to-SC mapping. As a packet comes in from an IB port, its SL field is mapped to one of the 32 SCs being supported by the architecture. After setting the SC field of the packet to this value, the packet goes through an SC-to-VL mapping similar to that shown at operation 'F' of FIG. 38 for choosing the output resource for this packet. This is different than the SL-to-VL as described for the SL-to-VL legacy mode above. By decoupling the mapping into two steps, the SL field of the packet is mapped to the fullest range of the 32 SCs instead of being marked down to the VL that the connecting switch supports. This allows the packet to go through expansion and contraction mapping in a heterogeneous fabric and utilize all the resources along the way. It is noted that for a fabric that contains only 9B packet traffic, this hybrid mode can also be used instead of the SL-to-VL legacy mode.

Link Fabric Sub-Layer

As discussed above, information is transmitted from endpoint to endpoint through the L2 Link layer where each message is carried by one or more Link Fabric Packets. In embodiment, these packets support sizes that are as small as 16 bytes (2 flits) to as large as 16376 bytes (2047 flits). This range is intended to meet the needs of both small messages that are common in PGAS programming languages to large messages that are necessary to transfer an encapsulated Jumbo (10 KB) Ethernet Frame. In one embodiment the size of the largest FP is limited to L4 MTU (maximum transfer unit), which is 10 KB.

As illustrated in FIG. 2, this Link Fabric Sub-Layer is the upper half of the overall L2 layer, wherein a lower half comprising the L2 Link Transfer Sub-Layer operates closer to the Physical Layer. In one embodiment, the logic pipelines for the architecture's devices such as HFIs and switches transport packets at the upper Link Fabric Sub-Layer. At the links between devices however, Link Fabric Packets are segmented into smaller units (flits), which in turn are bundled together into (LTPs), and carried using the Link Transfer sub-layer protocol.

Figure 45:
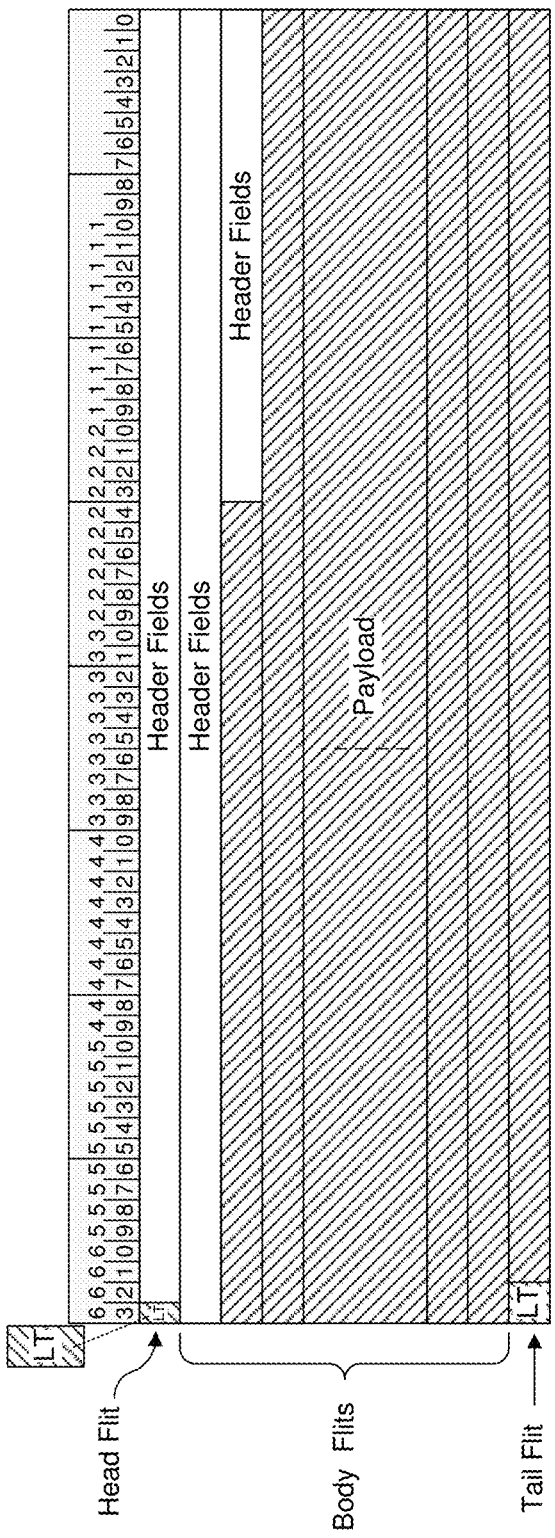
FIG. 45 is a diagram illustrating a generic Fabric Packet format, according to one embodiment.

As shown in the generic Fabric Packet format illustrated in FIG. 45, a Fabric Packet starts with a Head Flit, followed by 0 to 2045 Body Flits, and ends with a Tail Flit. Bubbles, or Idle Flits, as well as other LF Command flits are allowed interspersed with Fabric Packet flits. A set of Fabric Packet header fields are present at the beginning of each packet spanning multiple bytes that provides a variety of information to help route the packet toward the destination endpoint. Depending on the format type, these header fields may span one or more flits, beginning with the Head flits. The FP's data payload follows the header fields and continues until the end of the FP, as defined by the Tail flit. As discussed above with reference to FIG. 4 and TABLE 1, the flit type bit (flit bit [64]) in combination with the Link Type (LT) control bits (data bits [63] and [62]) identify whether a flit is a Head flit, Body flit, or Tail flit.

In one embodiment, the architecture supports four different header formats. Each format contains a different number of header fields and offers a different feature set. One of the L2 Fabric Packet formats is the 8B Header format, which has the L2 Type header field set to "00". It is designed to be more compact than the others, providing a lower packet overhead. In order for the header to fit within a single flit, this format has a reduced feature set and a shortened Length field that can carry a maximum packet size of 127 total flits. For payloads that exceed this limit, or require features that are omitted, one of the other formats is used. An embodiment of a Fabric Packet 8B Header format is shown in FIG. 46.

Figures 46, 47:
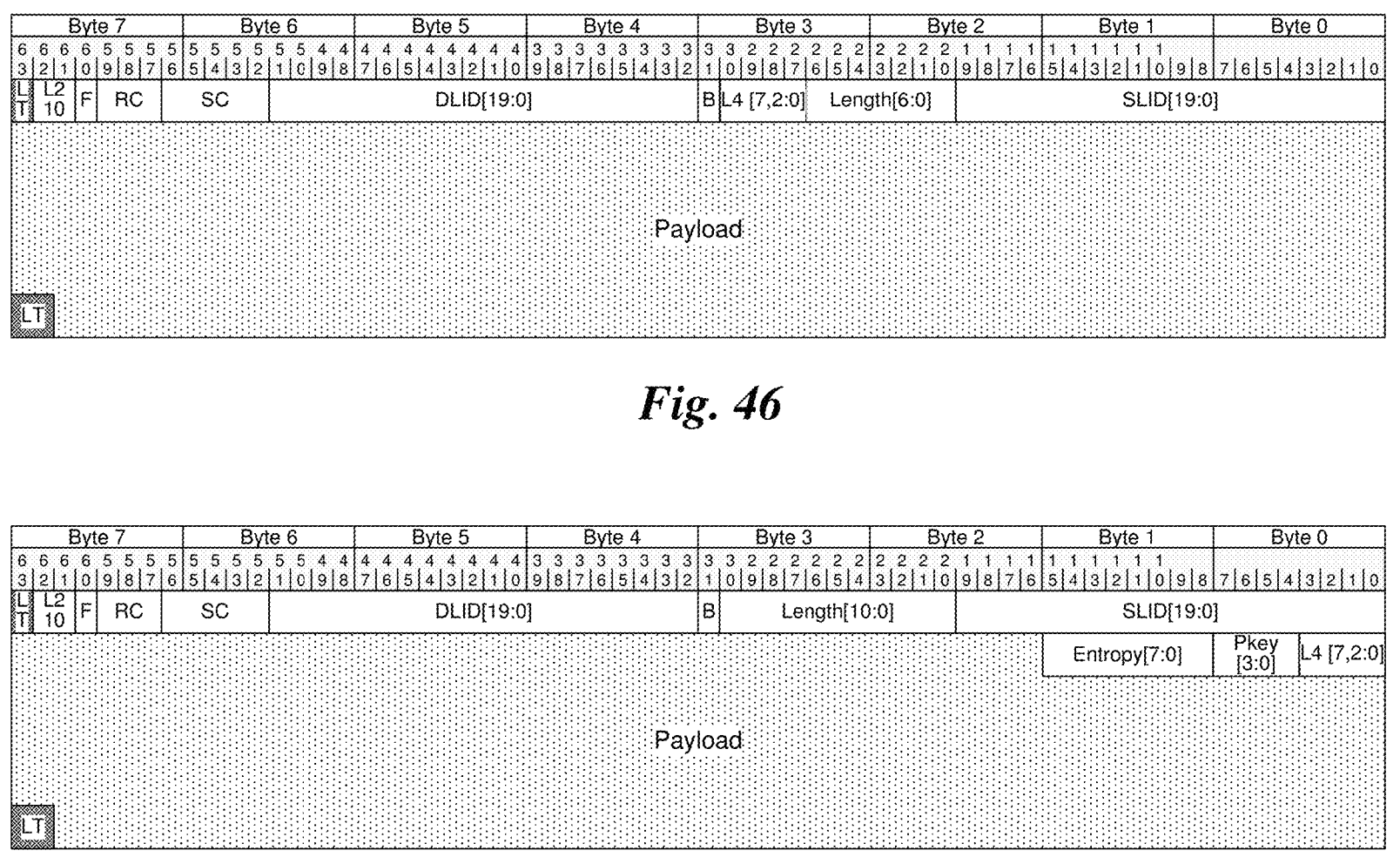

As shown in FIG. 47, the 10B Header Format has a larger Length field than the 8B format, allowing it to carry the maximum packet size of up to 2047 flits. In addition, it provides a reduced P_Key (Partition Key) and Entropy feature that the 8B does not. In one embodiment, 10B Header packets have the L2 Type header field set to "01".

Figure 48:
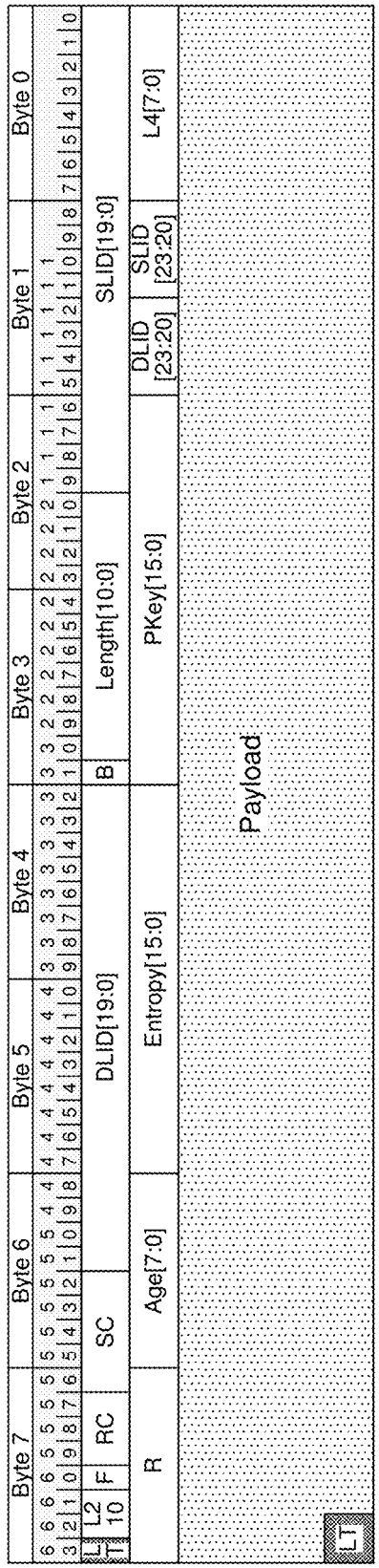
FIG. 48 is a diagram illustrating a Fabric Packet 16B Header format, according to one embodiment.

In one embodiment, the 16B Header Format contains all the features that the Link Fabric Sub-Layer supports. As shown in FIG. 48, a 16B Header Packet has its L2 Type header field set to "10". The format can be used for packets containing from 3 to 2047 flits. The header consumes exactly 16 bytes, or two flits, which provides a nice alignment for the subsequent payload. In addition, this format provides an extended 24-bit addressing space supporting a very large number of endpoints.

Figure 49:
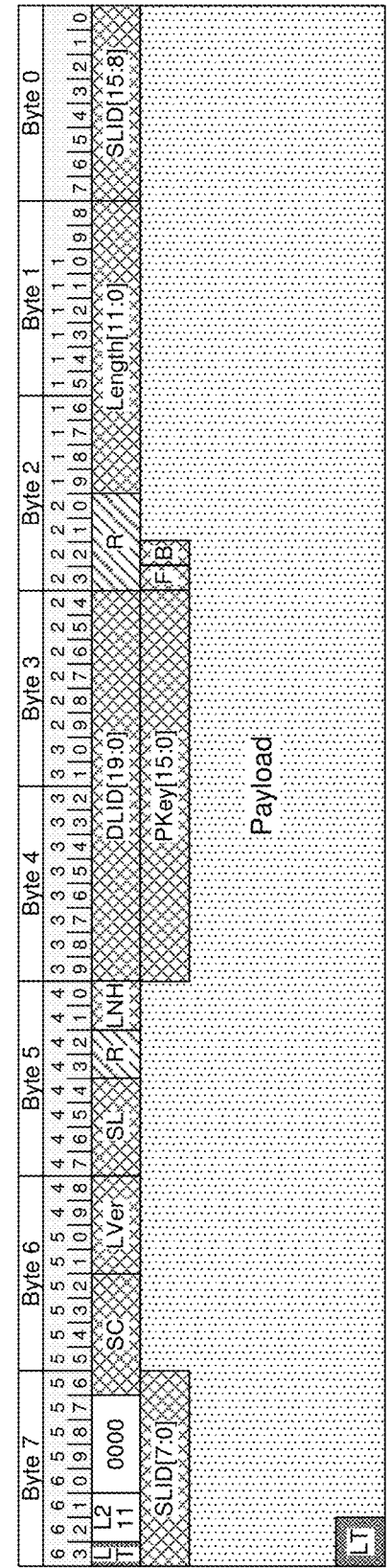
FIG. 49 is a diagram illustrating a Fabric Packet 9B Header format, according to one embodiment.

An embodiment of a 9B Header Format is shown in FIG. 49. The 9B Header Format is targeted for the purpose of carrying Infiniband (IB) traffic. The L2 Type header field for this packet format is set to "11" and followed immediately by "0000" in bits[60:57]. After this most significant byte in the Head flit, a native IB packet is directly attached. However, the native 4-bit D3 VL field is extended by one bit into bit[56] of the Head flit to match up with the 5-bit SC field the architecture supports. Due to the unified fabric architecture between IB and the architecture, selected header fields in the IB Local Routing Header and the Base Transport Header are directly used by the Link Fabric Sub-Layer when routing this packet. These fields include the SC, LVer, SL, LNH, DLID, Length, SLID, P_Key, (F)ECN, and (B)ECN fields, which are depicted with crosshatching in FIG. 49.

L2 Fabric Packets start with a header that spans one or more flits. The first flit that carries the header is marked as the Head Flit, the rest of the header is marked by zero or more Body Flits. The packet header is not required to be a multiple of the flit size, as demonstrated by the 10B Header format where the header takes up the entire first flit, and 2 bytes from the second flit. Each header is comprised of a variety of fields containing routing directives and other information about the packet. TABLE 3 below provides a summary of the fields that are contained within each packet format.

TABLE 3

| Field | Field Name | 8B | 9B | 10B | 16B |
|---|---|---|---|---|---|
| L2 | L2 Type Encoding | Y | Y | Y | Y |
| L4 | L4 Type Encoding | Y | N | Y | Y |
| SC | Service Channel | Y | Y | Y | Y |
| SL | Service Level | N | Y | N | N |
| DLID | Destination Local ID | Y | Y | Y | Y |
| SLID | Source Local ID | Y | Y | Y | Y |
| RC | Routing Control | Y | N | Y | Y |
| Length | Packet Length | Y | Y | Y | Y |
| LNH | Link Next Header | N | Y | N | N |
| F | Forward Explicit Congestion Notification | Y | Y | Y | Y |
| B | Backward Explicit Congestion Notification | Y | Y | Y | Y |
| P_Key | Partition Key | N | Y | Y | Y |
| Entropy | Entropy | N | N | Y | Y |
| Age | Age | N | N | N | Y |

The L2 Type encoding field is used to identify the Fabric Packet format. This field is 2 bits wide when bits[62:61] are set to "00", "01", or "10". When it is set to "11" however, the field is extended to 6 bits wide located at bits[62:57]. Based on this encoding, each architecture device detects the type of the packet format and the location of its header fields.

Each Fabric Packet carries a payload for an upper L4 Protocol layer. In order for the endpoint to know which L4 protocol a particular packet is carrying, an L4 Type field is included in each header. This field is 4 bits wide for the 8B and 10B Header formats, while it is extended to 8 bits in the 16B Header format, allowing it to be used by more L4 protocols. In the case of the 4-bit wide version, instead of being defined as [3:0], it carries a bit 7 and is defined as [7,2:0]. Under both the 4-bit and the 8-bit versions of the L4 Type field, a significant portion of the encoding space is allocated for the architecture's L4 Native Offload Protocol. All other L4 protocols share the remaining encoding space. The 9B header format is the only format that does not contain an L4 Type field since it is specifically targeted for the L4 IB encapsulation.

A 5-bit SC field, included in each Head flit at bits[56:52], identifies which of the 32 service channels the packet is using. Each architecture device uses this field for determining which set of SC and VL resources is used for moving the packet downstream, as described in further detail elsewhere herein.

In one embodiment the architecture supports 32 QoS levels. For the 8B, 10B, and 16B packet formats, this information is indicated by the SC field, and therefore those formats do not contain an explicit SL field. For the 9B packet format, it carries a 4-bit explicit SL field inherited from the encapsulated IB packet. Since a legacy IB HCA does not indicate the SL information within its VL field when injecting the packet into the fabric, this SL field is needed for specifying the QoS for the packet. An edge switch that receives the 9B packet from an IB HCA has the option to indicate this SL information into the SC field by using the SL-to-SC mapping discussed above. In this case, the receiving endpoint can retrieve the QoS for a packet by either examining its explicit SL field, or by decoding the SC field.

A destination local ID (DLID) field is located at each Head flit for indicating the endpoint to which the packet should be delivered. Every endpoint of the architecture fabric is identified by a one or more DLIDs that are unique within the domain of the fabric. For the 8B and 10B formats, a 20-bit DLID field is located at bits[51:32] of the Head flit. For the 16B format, a 24 bit DLID field is located at bits[51:32] of the Head flit and bits[15:12] of the second header flit. For the 9B format, a 16-bit DLID is located at bits[39:24] of the Head flit providing less addressing space than the other formats. In one embodiment, the DLID space supports both unicast and multicast/collective addressing where a unicast address identifies a single endpoint delivery and a multicast/collective DLID identifies a set of endpoints to be delivered to.

A source local ID (SLID) field is located at each Head flit for indicating the endpoint from which the packet was sent. For the 8B and 10B formats, a 20-bit source field is located at bits[19:0] of the Head flit. For the 16B format, a 24 bit DLID field is located at bits[19:0] of the Head flit and bits[11:8] of the second header flit. For the 9B format, a 16-bit SLID spans across bits[7:0] of the Head flit and bits[63:56] of the second flit. The assignment of SLIDs is very similar to the DLIDs as described in the previous section, but with the exception that a SLID will never be a multicast/collective address since a packet cannot be generated by more than one endpoint.

Many topologies provide multiple routing methods such as routing packets through minimal routes to their destinations in an attempt to reduce latency in a non-congested environment, or spreading the packets throughout the fabric to minimize congestion even though the routing paths may not be minimal. Some also offer adaptive routing where the packets between endpoints are routed based on the congestion level each packet encounters.

To facilitate routing control, the RC field is encoded as 3-bit field that specifies both the routing requirement and the preferred method for routing the given packet throughout the fabric. It is the responsibility of the L4 Transport layer to decide which routing method to use for a particular flow of traffic or application and set this field accordingly. When the top bit, RC[2], is unset, the bottom bit, RC[0], informs the fabric if the packet is to be routed in-order. For a packet that is allowed to be routed out-of-order, depending on the capability of the fabric, the packet may be routed randomly or be routed based on the congestion level of the routing choices. The middle bit, RC[1], specifies whether the packet should be routed to optimize for latency or for bandwidth. When optimizing for latency, the fabric minimizes the hop-count toward the destination. When optimizing for bandwidth, non-minimal routing may be utilized for spreading the traffic to reduce congestion.

Depending on the topology and the routing methods supported by the fabric, each switch examines what is specified in the RC field setting, but may choose to route the packet in a more restrictive manner. In one embodiment, a packet is not allowed to be routed out-of-order if the setting of this field has specified in-order routing. It is permitted however, to route packets in-order even though out-of-order is specified.

All packet formats with the exception of the 9B header format contain this field at bits[59:57] of the Head flit. Since the 9B header format is used to encapsulate IB packets, and since the existing IB protocol cannot utilize this routing control field, the field is omitted from the 9B format. In one embodiment, packets using the 9B format are processed using the Deterministic 0 routing method.

For the 8B, 10B, and 16B header formats, the Length field specifies the total number of flits in the packet, including the Head and Tail flits. With each flit being 64 bits wide, the total size of a packet is therefore equal to the length multiplied by 8B. For the 9B header format that is used to encapsulate native IB packets, the Length field is part of the encapsulated IB packet and therefore does not provide the number of flits. Instead, it specifies the size of the IB packet being encapsulated in units of 4-byte words. Due to the additional head and tail bytes when encapsulating the IB packet, the actual number of flits in a 9B header packet is always equal to "Length[11:0]/2+1".

The LVer (Link Version) field is specifically for the 9B header format and is located at bits [51:48]. This is a field directly used from the attached IB packet. Per IBTA 1.2.1, the value in this field shall be 0. Similarly, the Link Next Header (LNH) field is specifically for the 9B header format located at bits[41:40]. This is a field directly used from the attached IB packet.

The architecture supports various congestion management features. As part of the End-to-End (E2E) congestion management scheme for minimizing congestion spreading, a Forward Explicit Congestion Notification (FECN or F for short) bit, is used for marking packets that encounter congestion within the fabric. This FECN bit is used in conjunction with the Backward Explicit Congestion Notification (BECN or B for short) bit. For the 8B, 10B, and 16B formats, this F bit is located at bit[60] of the Head flit. For the 9B header format however, this bit is shared directly with the FECN bit inside the attached IB packet. The (B)ECN bit is used as a feedback mechanism to notify the source endpoint that it may be causing the formation and spreading of congestion within the fabric. For the 8B, 10B, and 16B formats, this B bit is located at bit[31] of the Head flit. For the 9B header format however, this bit is shared directly with the BECN bit inside the attached IB packet.

The concept is that when a packet travels from the source to its destination endpoint, this bit is marked when congestion is encountered based on a set of congestion criteria. Once it is set, no other switch within the fabric along the path can unset it. When the destination is reached, the endpoint has the option to inform the source endpoint of the packet either by marking the B bit of an ACK packet or send an explicit congestion notification (ECN) packet back to the source endpoint. As in the case of F bit, no switch in the fabric is allowed to unset the B bit. If the source receives enough B notifications, it recognizes that it is injecting too much traffic into the fabric and throttles back the injection rate to stop the spreading of congestion.

The Partition Key field, or P_Key, is related the partitioning of the Fabric at the L2 Link layer. Partitions may be used to restrict the set of endpoints that are allowed to communicate with each other. In addition, multiple overlapping partitions may be defined in which endpoints may be a member of more than one partition. The MSB of the field is used as a membership indicator, so the remaining 15 bits support up to 32767 partitions. A membership indicator bit value of '1' signifies full member while a '0' signifies a limited member.

The Entropy field is used for dispersive routing where the content of the field is controlled by the upper L4 Transfer layer and it stays constant from end-to-end within the fabric. By using this field, packets travelling toward an endpoint can hash over all the valid paths to help the spreading of traffic and ease congestion. Entropy may also be used by an L4 implementation to provide receive side scaling, in which case the entropy value may be used by an end point to select which receive queue and/or receive processing thread is to be used to process the packet. The 16B and the 10B Header formats offer a 16-bit and an 8-bit Entropy located at bits[47:32] and bits[15:8] of the second header flit respectively. The 8B and 9B formats do not offer this feature.

Not all routing modes utilize this Entropy field. As an example, adaptive routing for a particular topology may choose to select routing choices randomly and ignore this field. For other routing modes that do use it, the setting of the field can be as coarse grain as a combination of the SLID and DLID bits, a little finer grain as the process ID, or maybe very fine grain with a combination of the memory address bits.

The 8-bit Age field signifies the age of the packet as it traverses through the fabric and is used for age-based arbitration to provide global fairness. Certain topologies, such as Torus or Mesh, have well-known fairness problems when locally fair arbitrations are used, which can lead to large variation in packet latency, especially under large-size networks. Age-based arbitration not only reduces the packet latency variation, but it also brings down the average latency of packets.

The Age field is located at bits[55:48] of the second header flit in the 16B Header packet format, which is the only format that supports the age feature. The value of the field changes from hop-to-hop where each device accumulates the age by an amount that is proportionate to the time it has lived within that device before exiting. Once the amount reaches a configurable saturation value, this Age field acts as a hop count and is incremented by 1 at each hop. Each device takes the age of the packets into consideration during the arbitration process when forward packets downstream. If a port receives a packet with the maximum allowed limit, which is configurable by FM, the packet is considered a runaway packet due to incorrectly programmed routing tables and is dropped. This erroneous condition is then reported via an error counter.

Fields identified by an "R" comprise fields that are reserved for future use. In one embodiment, reserve field bits are set to zeros when injected into the fabric by an endpoint, ignored and remain unchanged by the switches through the fabric, and ignored by the receiving endpoint.

Each Link Fabric packet carries a payload portion encapsulating a packet for an upper L4 layer protocol. This payload, which can be as small as a few bytes to as large as almost 16K bytes (or 10 KB MTU, as applicable), comes immediately after the header fields for all the formats. The encapsulated L4 packet contains its own set of headers and payload. The format of the L4 packet is protocol specific. Examples of the L4 protocols that are supported by the architecture include the architecture's Native Offload Protocol, Ethernet, Infiniband, and Fabric Management. The type of L4 protocol a payload is carrying is specified in the L4 Type field of each Link Fabric packet header, as discussed above. The last flit of this encapsulated L4 packet often contains, though not a requirement, an invariant CRC (ICRC) not only protecting the L4 packet, but also covering the invariant header fields of the L2 Fabric packet.

Ethernet Encapsulation with Wire-Speed and Packet Data Rate Match

Various type of L4 protocol packets and frames may be encapsulated within an L2 Fabric Packet that is then transferred between fabric endpoints along one or more fabric links, whereupon the encapsulated L4 protocol content is de-encapsulated to be used for further transfer and/or processing using the L4 packet or frame. In addition to encapsulation of InfiniBand packets, embodiments of the architecture also support encapsulation of Ethernet packets.

Ethernet is a pervasive communications technology deployed between computers and devices. The architecture supports encapsulation of Ethernet packets and conveyance of those packets across the fabric. The Architecture specifies the encapsulation of those Ethernet packets in L4 transport layer packets, as detailed below.

The Fabric-Ethernet Gateways are responsible for forwarding Ethernet packets between fabric and an actual physical Ethernet. A Fabric-Ethernet Gateway may be integrated into a Fabric Switch or a conventional Ethernet Switch, or it can exist as a stand-alone fabric edge device. A Fabric-Ethernet Gateway operates as an end-node within the architecture, while providing an IO interface with the fabric.

The patterns of exchanges of L4-encapsulated Ethernet Packets across the fabric overlay one or more logical Ethernet network topologies on top of the architecture's fabric topology. By configuration, a subset of interfaces may be permitted to exchange Ethernet packets among members of the subset, and a disjoint subset of other interfaces may be permitted to exchange Ethernet packets among its members. Each subset is effectively an independent logical Ethernet network. Using Ethernet gateways, external Ethernet switches may allow exchanging packets between those two logical Ethernet networks. The mapping of Ethernet addresses to LIDs, the routing paths between LIDs and values within the Ethernet encapsulation determine the permitted exchanges of L4-encapsulated Ethernet packets and the correspondences between the logical Ethernet and fabric topologies.

The Fabric-Ethernet Gateway Architecture allows architecture end-nodes to access logical Ethernet networks through a Host Fabric Interface, and it allows multiple physical Ethernet extended LANs to be interconnected through an architecture fabric. The end-nodes of the logical Ethernet networks can include both architecture end-nodes and actual Ethernet end-nodes.

Ethernet standards are defined by the IEEE in the 802 LAN/MAN Standards Committee, and more specifically the 802.3 Working Group. The physical links in early Ethernet were shared links using Collision-Sense-Multiple-Access with Collision-Detect (CSMA/CD). Ethernet networks were extended beyond a single link using repeaters and then transparent bridges. Such bridges are more commonly referred to as Ethernet switches. The shared physical links were replaced by point-to-point links among end-nodes and switches. Recent Ethernet standards support physical link speeds of 10 Gbits/s, 40 Gb/s and 100 Gb/s, such as the IEEE 802.3ba 100 GB/s standard, which was ratified in 2010. Several additional 100 Gb/s and higher specifications are currently in the draft stage, and are projected to lead to additional high-speed Ethernet standards in the future.

The destination and source of an Ethernet packet are specified by Media Access Control (MAC) addresses. These addresses consist of six octets. The lowest-order bit of the first octet (bit 0) distinguishes multicast MAC addresses from unicast MAC addresses. A bit value of one is used for multicast MAC addresses. A multicast MAC address can only be used as a destination address, and it specifies a group of Ethernet end-nodes to receive the packet. A broadcast MAC address (ff:ff:ff:ff:ff:ff) is a particular multicast MAC address that specifies the group of all Ethernet end-nodes.

The next lowest-order bit of the first octet (bit 1) distinguishes locally administered addresses from globally unique addresses. A bit value of one is used for locally administered MAC addresses. For globally unique MAC addresses, the leading three bytes are an Organizationally Unique Identifier (OUI) and the trailing three bytes are Network Interface Controller (NIC) Specific. Blocks of globally unique MAC addresses are assigned to standards bodies, equipment vendors, organizations and individuals. The use of the locally administered bit with respect to multicast MAC addresses is inconsistent: broadcast and IPv6 set the bit, IPv4 multicast uses an OUI of 01:00:5e and does not set the bit.

Locally administered MAC addresses may be assigned in accordance with local policies. In particular, the MAC address can contain embedded information, such as a fabric LID. In addition, a specific Ethernet interface may be assigned multiple Ethernet MAC addresses. The interface receives packets with destination unicast MAC addresses that matches any of the assigned addresses and can send packets with those assigned addresses as a source MAC address.

Protocols enable resolution of network layer addresses into link layer addresses. In TCP/IP networks, the Address Resolution Protocol (ARP) for IPv4 or the Neighbor Discovery Protocol (NDP) for IPv6 is used with the IP protocol to discover the Ethernet MAC address of an IP interface by broadcasting a request containing the IP address of an interface with the expectation that only that interface or a proxy for it will respond with the required MAC address. Each IP interface is assigned a single Ethernet MAC address. Multiple IP interfaces using the same Ethernet interface may respond with the same Ethernet MAC address in their respective ARP responses.

An Ethernet packet on an Ethernet physical link is preceded by a Preamble and a Start-of-Frame (SoF) delimiter. The Preamble consists of 7 octets. The SoF delimiter consists of a single octet. An Ethernet packet on an Ethernet physical link is followed by an Inter-Packet Gap (IPG). The IPG must average to be a minimum of 12 octets.

The Ethernet packet consists of a header, a payload and a Frame Check Sequence (FCS). The header consists of a minimum of 14 bytes, consisting of the destination MAC address, the source MAC address and the 2-octet EtherType. The EtherType identifies the protocol of the payload. (The IP EtherType is 0x0800.) The header may be extended by additional fields such as the 4-octet 802.1q (VLAN) tag. (An alternate encoding replaces the EtherType with a 2-octet length field and encodes the protocol of the payload by the mechanisms of IEEE 802.2.) The standard payload consists minimally of sufficient bytes to result in a packet of at least 64 octets and up to 1500 octets of payload. Non-standard usages have allowed jumbo packets with payloads of up to 9216 bytes. The FCS is a 32-bit CRC covering the header, payload and FCS.

The original and pervasive form of Ethernet switching is transparent bridging. IEEE 802.1d and subsequently 802.1w have standardized particular protocols between switches for network topology discovery. The intent of these protocols is to identify a single active path between the switches and/or end-nodes for forwarding packets. The active topology is free of loops and is characterized as a spanning-tree. The spanning-tree has a root bridge. All switched packets may be forwarded towards the root and then outward away from the root. Once a packet starts to be forwarded away from the root, it is only forwarded away from the root. Multicast packets are forwarded throughout the extent of the spanning tree. Whenever the topology of the Ethernet network changes in a way that might result in out-of-order packet delivery, the switches stop forwarding packets for a sufficient time that all in-flight packets are dropped, rather than be delivered out-of-order.

The forwarding tables for a transparent bridge may be populated by configuration; however, they are typically populated by source MAC address learning. In source address learning, a lookup in the forwarding table is performed for the source MAC address of every packet that arrives at the switch. If there is no entry for the address, an entry is created and the receiving interface is stored within the entry. When that entry is found for the destination MAC address lookup of a packet, the packet will be forwarded to the interface in the table entry. For the source MAC address lookup, if the forwarding table entry already exists, state associated with the entry is updated to support a time-to-live mechanism. The location of a particular interface in the topology of the network may change, and the only way that change might be discovered is if the existing forwarding table entry is updated, or is deleted due to time out. When forwarding a packet, if no forwarding table entry exists for a unicast destination MAC address, the packet is flooded throughout the spanning-tree as if it were a multicast packet. The source address learning from the packet that responds to the flooded packet will provide the forwarding table entries for subsequent packets after the flooded packet.

Virtual machines (VMs) have existed since 1967, long before the introduction of Ethernet. VMware introduced its first products virtualizing x86 execution in 1999. Virtualization of the network interfaces was implemented in software. PCI-SIG has standardized I/O Virtualization (IOV) allowing I/O devices to directly interface to multiple OS instances within multiple VMs. For virtualized Ethernet interfaces, this requires that the I/O device switch packets between VM instances, both for unicast and multicast packets. The switch within such a device will employ a forwarding table to identify the correct destination or destinations for a packet.

An important capability of virtual machines is migration, moving a virtual machine instance from one physical machine to another physical machine without processing interruption. For such a migration, it is necessary for the VM to maintain the same network addresses at all layers of the protocol stack that are visible. Topological constraints on addressing such as subnet boundaries have restricted the geographical range of VM migrations.

In order to provide the greatest flexibility for such migrations, new technologies and products are being introduced that virtualize the network, in addition to the machine. Protocols such as VXLAN (VMware, Cisco, Citrix, Redhat) and NVGRE (Microsoft, Intel, HP, Dell) encapsulate the Ethernet packet with an additional L2 and L3 header, allowing the VM to migrate across L3 subnet boundaries. The physical LAN does not see the network addresses used by the VM. The hypervisor or virtualization hardware removes the encapsulation and delivers the packet to the appropriate VMs. Edge devices within the network encapsulate and de-capsulate the packets to communicate with external networks. The virtualization of the network as well as the machines allows greater flexibility for vendors to offer networks of computers within multi-tenant cloud computing.

An HFI device driver is associated with the HFI interfaces installed on each host. The HFI device driver is responsible for configuring and managing each HFI, including the fabric-to-virtual Network Interface Controller (Fab-vNIC) interface(s) associated with each HFI. During initialization, the HFI driver creates virtual Ethernet device interfaces in the kernel that map to the Fab-vNIC interface(s) in each HFI. The kernel uses these device interfaces, along with any other Ethernet device interfaces that may be installed on the host, for Ethernet-based network communications.

In the kernel, additional network interfaces can be configured as derived from a base network device interface. For Fab-vNIC-based Ethernet network device interfaces, this includes the ability to use Linux vconfig( ) to configure host VLAN interfaces, and includes the ability to use Linux bonding to aggregate multiple Fab-vNIC-based Ethernet network device interfaces on the same host for increased bandwidth and/or fail-over resiliency purposes.

An IP address can be configured for a Fab-vNIC-based Ethernet network device interface, or to a Linux bond interface, either dynamically via DHCP, or statically via standard network configuration file mechanisms.

For Ethernet addressing, a base MAC address is assigned by the fabric's Ethernet Gateway Manager to each HFI's Fab-vNIC interface. The address is available to the kernel to be used as a source address (SMAC) for transmitted packets, and as a destination address (DMAC) for received packets. Additional MAC addresses can be assigned to a network device interface by the kernel. Additional MAC addresses assigned to a Fab-vNIC-based Ethernet network device interface are registered with the fabric's Ethernet Gateway Manager by the HFI device driver. The Ethernet Gateway Manager uses registered MAC address to update mappings of Ethernet addresses to fabric addresses need to tunnel Ethernet packets across the fabric.

From the architecture's perspective, Ethernet packets are encapsulated within L2 Fabric Packets to be tunneled across the fabric. The fabric switches provide the end-to-end routing across the fabric without examination of Ethernet headers contained within the Fabric Packets. A mapping function is used during the encapsulation that maps the intended Ethernet destination address to the appropriate set of fabric address parameters necessary to properly tunnel the packet across the fabric.

Encapsulated Ethernet packets are routed over the fabric in accordance with fabric packet checks and forwarding rules. The patterns of allowed exchanges of Ethernet packets over the fabric overlay logical Ethernet network topologies on top of the fabric topology. In the simplest configuration, a single layer-2 Ethernet broadcast domain is layered over the entire fabric. This configuration allows direct any-to-any Ethernet connectivity between all nodes on the fabric that have been configured to allow Fabric-Ethernet communications. In such configurations, each fabric host may be able to use a single Fab-vNIC interface for all of its Ethernet communications. In more complex configuration, two or more Ethernet networks may overlay the fabric topology. With respect to Ethernet network topologies, any Fab-vNIC interface is a single hop from any Ethernet switch that provides communication via an external Ethernet network, and it is a single hop from any other Fab-vNIC interface that is reachable without passing through an Ethernet switch.

From a routing perspective, an Ethernet network overlaid onto a fabric results in the fabric exhibiting many characteristics similar to those of a layer-2 Ethernet switch. Components of a logical switch include logical input ports, a logical crossbar, logical output ports, and a housekeeping subsystem. The housekeeping subsystem serves as a manager responsible for the configuration, monitoring, and control of the logical switch's operations.

In a logical switch model, the Fab-vNIC network device interfaces on fabric hosts, and any Ethernet gateway ports that exist in the fabric, represent the logical input and output ports on the logical switch. The logical switch's crossbar is represented by the internal forwarding of Fabric Packets between fabric endpoints by the switches within the fabric topology. A Fabric Ethernet Gateway Manager provides the housekeeping function for the configuration, management, and control of the logical switch's operations.

In one embodiment, Encapsulated Ethernet data is transferred in Fabric Packets that use either the 10B or 16B EN Encapsulation Header formats. The 10B header allows for more efficient Ethernet data transfer, including support for transfers that maintain the Ethernet line-rate. The 16B includes additional header fields to facilitate extended functionality, with a slight sacrifice in transfer rate.

Figure 50A:
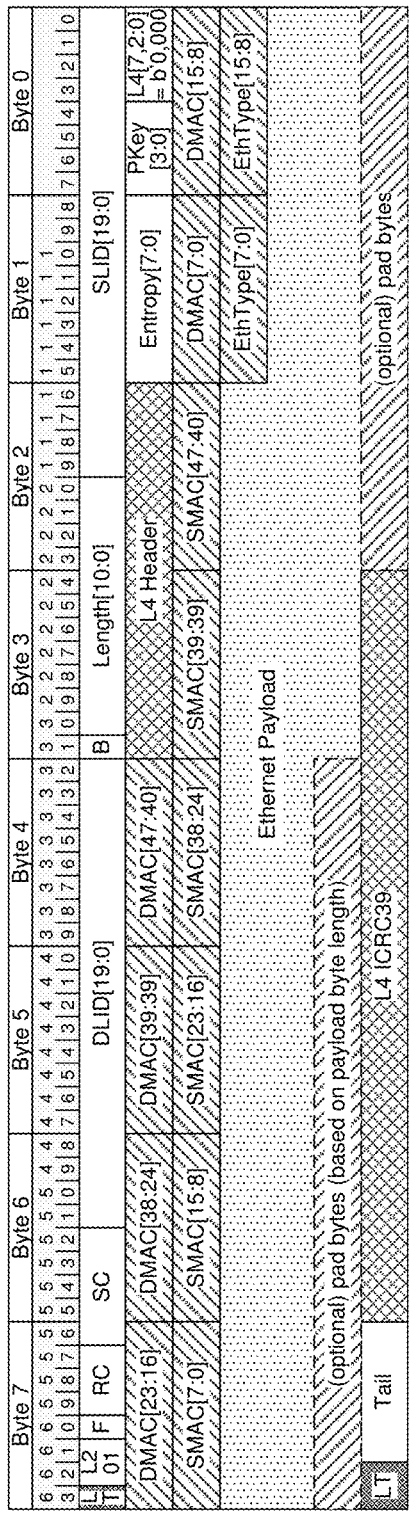
FIG. 50*a* is a diagram illustrating a 10B EN Encapsulation Header format, according to one embodiment.
Figure 50B:
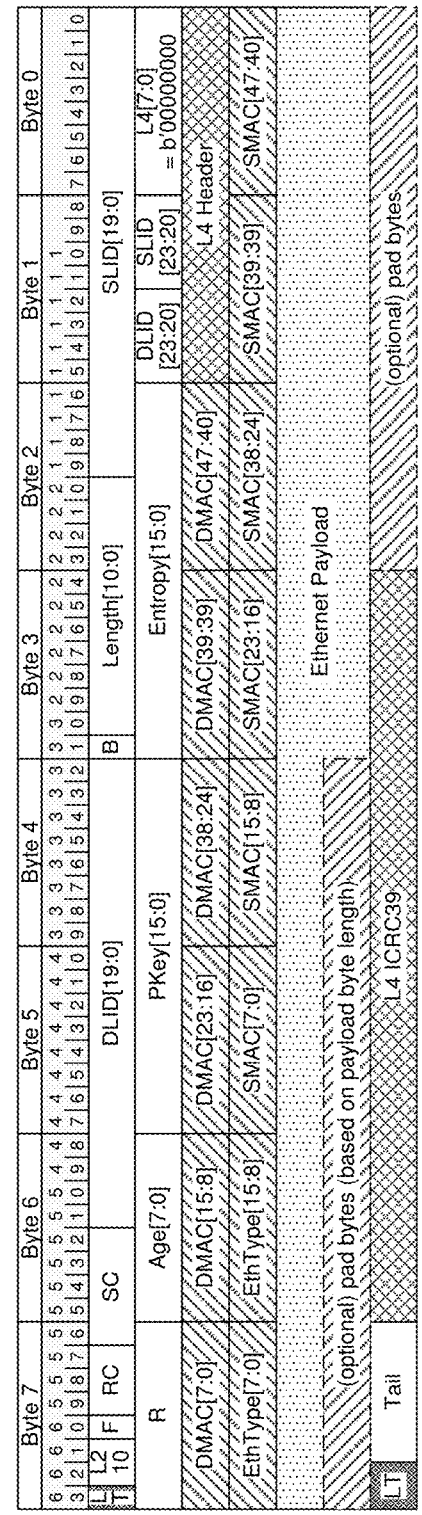
FIG. 50*b* is a diagram illustrating a 16B EN Encapsulation Header format, according to one embodiment.

Respective embodiments of a 10B EN Encapsulation Header format and a 16B EN Encapsulation Header format are shown in FIGS. 50*a* and 50*b*. In both the 10B and 16B EN Encapsulation Header formats, packets containing encapsulated Ethernet data are identified by a value of 00000000b in the header's L4 protocol type field. Following the L2 FP header in both formats, in the payload portion of the FP, is an L4 encapsulation header, a byte stream containing the original Ethernet header and payload data followed by 0-7 bytes of pad between the end of the Ethernet data and the L4 ICRC32, a 32-bit invariant CRC calculated over the hop-invariant portions of the FP headers and the FP payload (including L4 and Ethernet headers, payload, optional pad, and Tail). Control bits are passed in the Tail byte of the packet to indicate end of packet status, and the amount of pad (if any) that had to be added between the end of the byte-wise Ethernet payload and the ICRC within the Fabric Packet's payload.

As shown in FIGS. 50*a* and 50*b*, the header fields in the first 8 bytes both formats are the same. The first of these header fields is a 20-bit SLID that identifies the HFI or gateway endpoint source that introduced the Ethernet packet onto the fabric, and is assigned by the Fabric Manager during initialization. This is followed by an 11-bit length field that identifies the length of the entire FP content in flits. The 20-bit DLID identifies the intended destination(s) for the encapsulated Ethernet packet on the fabric. The destination LID may address an individual or aggregated destination (unicast to an HFI or gateway), or may address a multicast group (multi-point distribution).

The F, B, and RC fields are used for flow control and routing purposes. The F and B fields are variant fields, meaning that the initial value can be changed in the packet as it moves hop-by-hop through the fabric. As variant fields, they are excluded from the ICRC calculation. For Ethernet packets, the initial value of RC to use when sending onto the fabric from an endpoint is administratively configured. The initial value of F and B is determined by the fabric port logic.

The 5-bit SC (Service Channel) can be used to prioritize Ethernet traffic separate from other traffic types on the fabric. It is expected that the user may wish to prioritize Ethernet separate from HPC and fabric management traffic so that latency sensitive applications are not adversely affected by the concurrent transfer of large amounts of (potentially jumbo sized) Ethernet packets. As with the F and B fields, SC is also a variant field, and is likewise excluded from the ICRC calculation. For Ethernet packets, the default SC to use when sending packets into the fabric is administratively configured. When priority is indicated in a VLAN tag contained within the Ethernet header, it may be used to select the initial SC value.

As mentioned above, the L4 type is defined as 00000000b for encapsulated Ethernet packets sent over the fabric; for the 10B EN Encapsulation Header this is encoded in four 0 bits [7,2:0] in Byte 8, while it is encoded as seven 0 bits in Byte 8 for the 16B EN Encapsulation header. The PKey field may be used to administratively partition Ethernet traffic from other traffic types, to provide isolation between Ethernet networks overlaid on the same fabric, or for other partitioning purposes. The PKey field is 4 bits [6:3] for the 10B header and 16 bits for the 16B header.

An Entropy value is contained in the Entropy field that enables in-order multi-pathing of different flows between endpoints across the fabric. Entropy may also be used in support of receive side scaling. For Ethernet packets, the entropy field value may be computed by a hash function of the source and destination MAC addresses present in the L2 header of the Ethernet packet, or by any other means designed to provide diversity in the hash value while maintaining the same value for a given packet flow when in-order delivery across the fabric is important. The Entropy field is 8 bits for the 10B header and 16 bits for the 16B header.

The Age field is only present in the 16B header format. It is used by the fabric for internal routing purposes. Neither the host port nor the gateway port relies on this field being present for Ethernet communications. Age is a variant field, meaning that the initial value can be changed in the packet as it moves hop-by-hop through the fabric and this field is excluded from the ICRC calculation. For Ethernet packets, the initial Age value to use when sending onto the fabric is administratively configured. There is no implied correlation or direct mapping relationship of fields within the Ethernet data to the initial endpoint-transmitted Age value.

Figures 51, 52, 58:
FIG. 51 is a diagram illustrating details of Byte 0 and Byte 1 of an encapsulated Ethernet L4 header, according to one embodiment.
FIG. 52 is a diagram illustrating details of Byte 7 of an encapsulated Ethernet L4 header, according to one embodiment.
FIG. 58 is a diagram illustrated a credit message, according to one embodiment.

An L4 header precedes the Ethernet data in the Fabric Packet. The L4 header contains control information used by an Ethernet endpoint to process a received encapsulated Ethernet packet. As illustrated in FIG. 51, there are two formats used for the encapsulated Ethernet L4 header. The header is defined in little-endian format. In the first format, 12 bits are allocated to the Group Gateway Identifier (GGID). In the second format, a gateway number is included with 8 bits allocated to GGID.

In the illustrated embodiment, the fields within the L4 header are defined as follows:

GN_included flag (gni): When set, indicates that the format of the L4 header includes the gateway number field.

GGID_Bypass flag (gb): When set, indicates that the GGID in the L4 header does not match the GGID assigned to the message sender.

Gateway Number (GN): When the GN_included flag is set, the gateway number field is present in the L4 header. The GN field may be used to index a particular Gateway interface from within a GGID aggregation.

GGID: Identifies the GGID to associate with the Ethernet packet.

Additional bits in the L4 header are reserved (R). They should be set to zero on send, and ignored on receive.

The Ethernet headers and payload are encapsulated in the Fabric Packet as a byte stream, starting with the first byte of the DMAC (Destination MAC address) at the start of the Ethernet frame's L2 header and continuing to the last byte of the Ethernet payload. The Ethernet frame's L2 header comprises a 48-bit DMAC (6 octets (bytes)), followed by a 48-bit SMAC (Source MAC address), followed by 2 octets (16 bits) for the Ethernet Type field, for a total of 14 octets.

The encapsulated Ethernet payload is sent based on the Ethernet data's actual byte count. Short Ethernet packets may be sent over the fabric, without padding to achieve a minimum 64 octet size, improving efficiency. When forwarding from fabric onto an external Ethernet link, padding is added by the gateway, as necessary, to comply with standard Ethernet link requirements.

To properly align the position of the ICRC within the encapsulated Ethernet packet, some pad bytes may be added following the last valid byte of Ethernet payload up to the first byte of the ICRC. The amount of pad that needs to be added is a function of the byte length of the valid Ethernet data and the (16B or 10B) EN Ethernet header format used. In on embodiment, the Pad shall be set to zero on transmit and ignored on receive. Pad values are expected to be invariant in transmit across the fabric, and are included in the scope of the ICRC calculation.

The purpose of the invariant checksum (ICRC) is to verify the end-to-end integrity of the encapsulated Ethernet packet sent across the fabric. The ICRC takes the place of an Ethernet FCS for transfer of encapsulated Ethernet packets over the fabric; it covers not only the Ethernet data, but also the encapsulation around it.

The ICRC covers the all of the Fabric Packet, inclusive of the FP headers, L4 header, Ethernet data (headers and payload), any alignment pad, and end-to-end information passed in the Tail byte. The calculation of the invariant CRC excludes the variant fields in the header that can dynamically change from hop-to-hop. The variant fields include the 'F', 'B', 'SC', 'Age', and 'LT' fields, as previously discussed.

The tail byte in the last flit of the Fabric Packet indicates if there is a good end of packet, or if there is a fault associated with a received packet. For a good end of packet indication (LT value 01), there are 6 additional control bits available to communicate end-to-end information. As shown in FIG. 52, encapsulated Ethernet packets use three of these additional bits to indicate a count of how many alignment pad bytes, if any, had to be inserted between the end of valid payload data and the ICRC in the fabric packet. The other 3 bits are reserved.

Figure 53A:
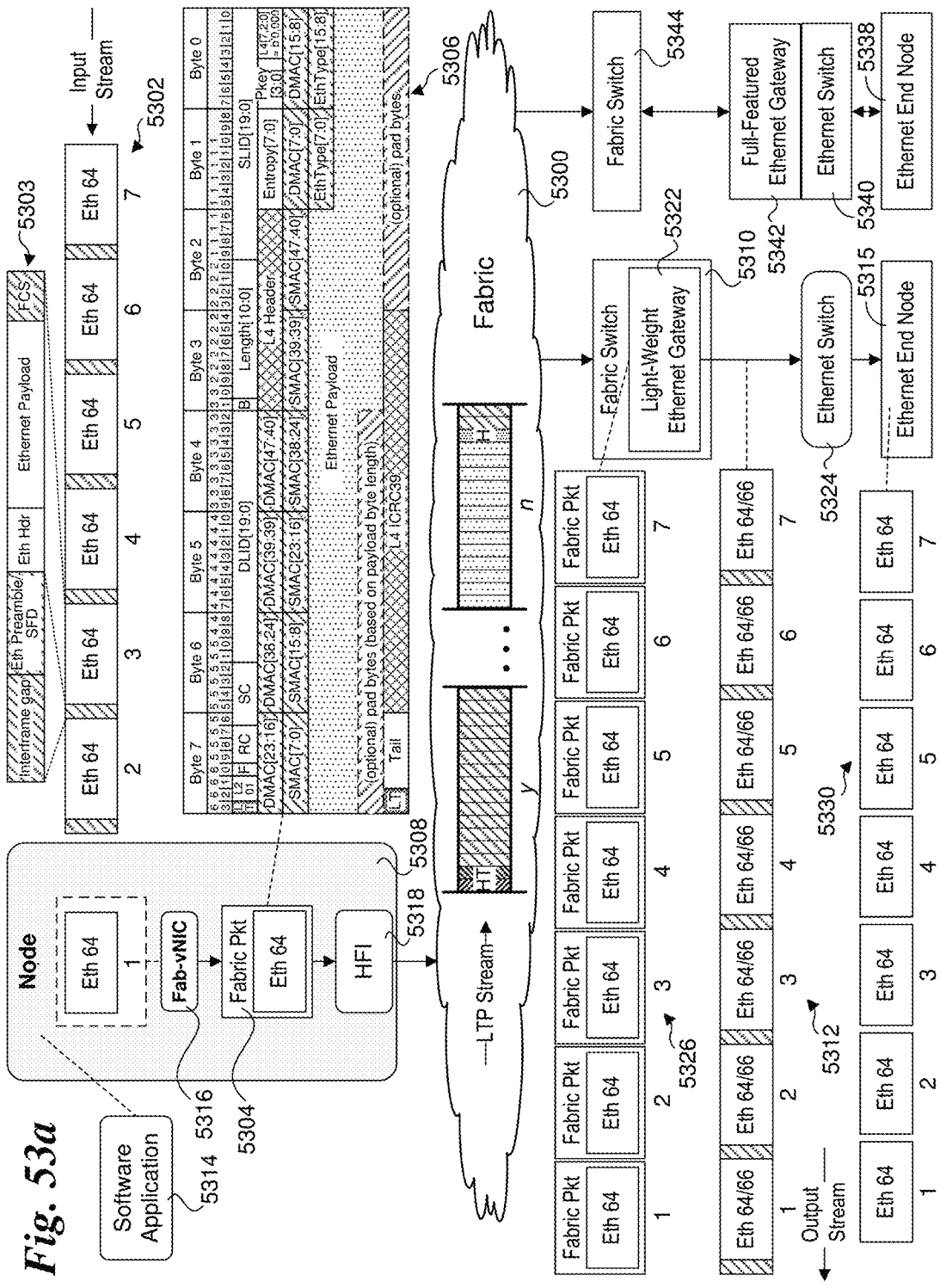
FIG. 53*a* is a schematic diagram illustrating an exemplary transfer of data over a fabric 5300 via Ethernet encapsulation, wherein the transfer is from a node endpoint to a an Ethernet end node.

FIG. 53*a* illustrates an exemplary transfer of data over a fabric 5300 via Ethernet encapsulation. Under this example, an input stream 5302 of Ethernet frames 5303 are encapsulated into L2 Fabric Packets 5304 having a 10B EN Encapsulation Header format 5306 at a first fabric endpoint comprising a node 5308, transferred to a second fabric endpoint comprising a fabric switch 5310 via fabric 5300, de-capsulated, and the original stream of Ethernet frames is recreated as an output stream of Ethernet frames 5312. The transfer of data using Ethernet encapsulation is implemented such that from the appearance of the entities that generate and process the stream of Ethernet frames, the transfer of the frames is via an Ethernet network.

Generally, Ethernet frames will be generated on the fly via software- or hardware-based facilities at a source endpoint, as part of a set of network stack operations. For example, the most prevalent type of network traffic is IP packets, which are typically generated by a software-based IP layer in the network stack in connection with a transfer of data from the source to a destination endpoint. A common example of data that is transferred over an Ethernet is a data file.

In this example, node 5308 is operating as a host for one or more virtual machines, and a software application 5314 is running on one of the VMs. The software application desires to transfer data to an Ethernet end node 5315, which might be a computer or server, or in an HPC environment might be a physical or virtual compute node. For illustrative purposes a one-way transfer of data between source and destination endpoints is illustrated in FIG. 53*a*; however, a bi-direction communication between a pair of endpoints using IP traffic will be the more general case, particularly if the data transfer is between a client and a server.

The one or more virtual machines employ virtual resources that are mapped to physical resources via use of a Virtual Machine Manager (VMM) or hypervisor, which in turn comprises an application running on a host operating system (OS) on node 5308. The virtual resources include virtual networking resources, such as layers in a network stack above the PHY layer or above the MAC layer, depending on the network hardware facilities provided at node 5308.

Under a conventional VM usage, one or more virtual NICs (vNICs) would be implemented by the VMM or hypervisor in a manner such that it appears to an OS running on a VM that the vNIC is a physical NIC. Typically, in response to a request from software application 5314 to transfer data via a network connection, an IP packet stream would be generated by networking software in the OS running on the VM. Depending on the delineation of work between the OS networking stack and the vNIC networking stack, encapsulation of IP packets into Ethernet frames would be performed by the OS or the vNIC. Subsequently, the Ethernet frames would be sent out a physical Ethernet interface (such as provided by a physical NIC or network adapter). Under some configurations, the NIC or network adaptor is configured to perform the operation of encapsulating an IP packet stream into a stream of Ethernet frames. Accordingly, in these configurations input stream 5302 would comprise Ethernet packets without the framing and the Ethernet deframing operation described below would not be employed at node 5308

Under the Ethernet encapsulation technique, the Ethernet frame content is tunneled between the architecture's endpoints communicatively coupled to the fabric. This tunneling is facilitated by encapsulating Ethernet frame content in Fabric Packets 5304. In the illustrated embodiment, this encapsulation operation is performed by a Fabric-vNIC (labeled Fab-vNIC) 5316 that interfaces with an HFI 5318.

Figure 54:
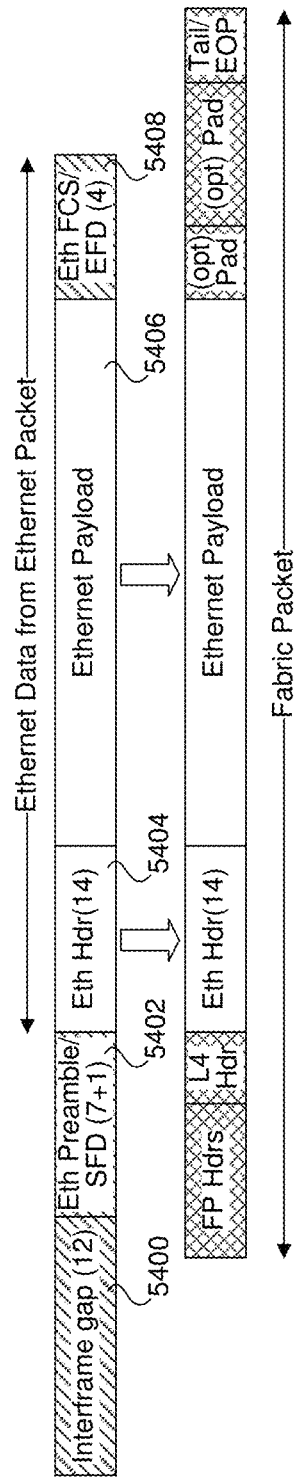
FIG. 54 is a diagram illustrating fields that are kept and discarded when encapsulating an Ethernet Packet in an L2 Fabric Packet, according to one embodiment.
Figure 55A:
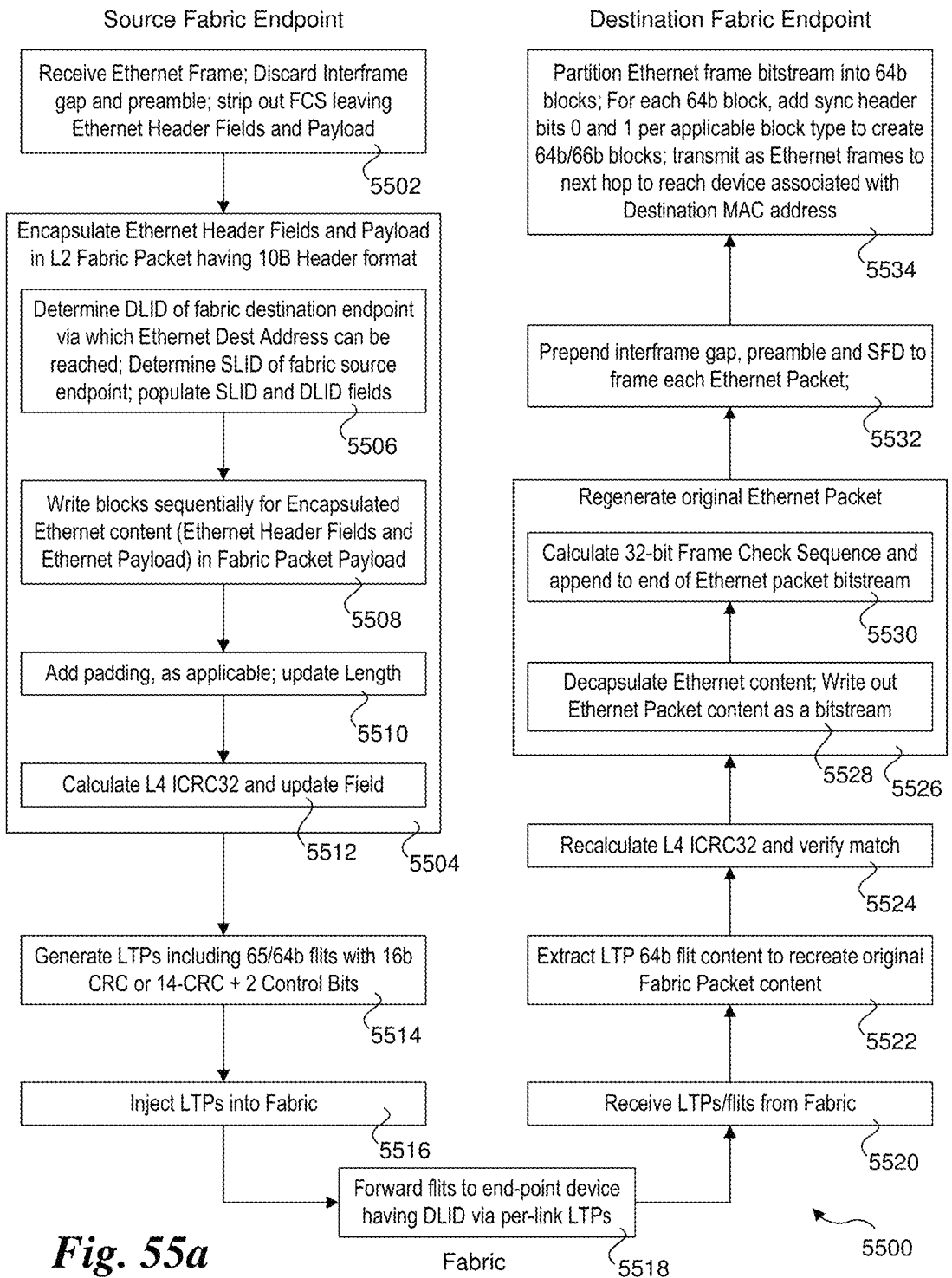
FIG. 55*a* is a flowchart illustrating operations performed in connection with the transfer of Fabric Packets with Ethernet encapsulation of FIG. 53*a*.

FIG. 55*a* shows a flowchart 5500 illustrating operations performed by the source endpoint, fabric, and designation endpoint in connection with the transfer of Ethernet frames illustrated in FIG. 53*a*. In a block 5502, an Ethernet frame is received at Fab-vNIC 5316 and processed as follows. With further reference to FIG. 54, as the input stream 5302 of Ethernet frames 5303 are received at Fab-vNIC 5316, the Ethernet frames are in their conventional format including a 12-octet interframe gap 5400, followed by a 7-octet Ethernet Preamble and a 1-octet start frame delimiter (SFD) 5402. The portion of the Ethernet frame following these first 20 octets comprises the Ethernet packet data, and includes the 14 octet Ethernet header 5404, a variable-size Ethernet payload 5406, and a 4 octet Ethernet FCS and end of frame (EFD) delimiter 5408.

As illustrated in FIG. 54 and depicted in block 5502, during the encapsulation process interframe gap 5400 and Ethernet preamble/SFD 5402 are dropped (or otherwise discarded), and Ethernet FSC/EFD 5408 is stripped out, leaving Ethernet header 5404 and Ethernet payload 5406 as the only Ethernet Packet data that is to be encapsulated in each Fabric Packet 5304.

Following block 5502, the flowchart proceeds to a block 5504 including a multiple sub-blocks 5506, 5508, 5510, and 5512. The sub-block operations are employed to encapsulate the Ethernet Header fields and Ethernet payload into Fabric Packet 5304. In the embodiments of FIG. 53*a* and flowchart 5500, Fabric Packet 5304 has a 10B EN Ethernet header format 5306; however, similar operations may be implemented for a Fabric Packet having a 16B EN Ethernet header format.

In sub-block 5506 the DLID of the fabric destination endpoint via which the Ethernet destination address can be reached is determined, along with the SLID of the fabric source endpoint. Fab-vNIC has access to a MAC forwarding table (not shown) that includes fabric endpoints used to forward encapsulated Ethernet packets to Ethernet endpoints. In this example, the Ethernet endpoint (identified by the Ethernet destination MAC address (DMAC)) is Ethernet end node 5315. Using the DMAC as a lookup input to the MAC forwarding table, in the data transfer illustrated in FIG. 53*a* the applicable fabric destination endpoint is a fabric switch 5310 that includes an integrated light-weight Ethernet gateway 5322. The fabric source endpoint is HFI 5318, and so the SLID is the SLID for HFI 5318. The DLID and SLID fields are then populated with the DLID and SLID that are determined.

Next, in sub-block 5508, the blocks for the (to be) encapsulated Ethernet content comprising the Ethernet header fields and Ethernet payload are sequentially written as a bitstream into the Fabric Packet payload for Fabric Packet 5304. Generally, the size of the blocks may correspond to how the Ethernet content is buffered in memory; e.g., for a 64-bit system each memory block may be 64-bits. In the illustrated embodiments, the blocks are 64-bits (64B) blocks; however, this is merely exemplary, as other block sizes may be used.

In sub-block 5510 padding is added, as applicable, to fill out Fabric Packet 5304 such that its size falls on an 8-byte boundary, the nominal size of a flit. The length field value is then updated based on the length of Fabric Packet 5304 in flits. In sub-block 5512, the 32-bit L4 ICRC32 is then calculated over the portion of the Fabric Packet 5304 content that does not include invariant fields, and the corresponding L4 ICRC32 field value is updated with the calculated ICRC. This completes the operations for block 5504.

At this point, Fabric Packet 5304 is ready to be transmitted via Fabric 5300 to fabric switch 5310. However, as detailed above, Fabric Packets themselves are not transferred via the Fabric in whole, but rather Fabric Packet content is transferred as flits included in per-link LTPs, as depicted by the flit stream within Fabric 5300 in FIG. 53*a*. As depicted in a block 5514, in one embodiment 14-CRC LTPs are generated including 65/64B flits with a 14B CRC and 2-bit credit sideband data appended after flit 15. Optionally, standard detection LTPs with a 16B CRC may be used. Enhanced detection LTPs might also be used, but as explained below, since 14-CRC LTPs and standard detection LTPs have the same overhead as used in 64-bit/66-bit block encoding in high-speed Ethernet links, use of these LTP formats are favored over use of enhanced detection LTPs.

In a block 5516 the LTPs are injected into Fabric 5300, and the Fabric Packet 5304 flits are forwarded to the fabric endpoint device corresponding to the DLID (fabric switch 5310) via per-link LTPs, as shown in a block 5518. For example, for simplicity and convenience, Fabric 5300 is shown as a cloud; however, internally, it generally will comprise multiple switches interconnected via multiple links. As discussed above, the flits corresponding to Fabric Packet 5304 may ultimately be transferred in different groups, depending on the VL arbitration conditions at each switch along the route.

The remaining operations in flowchart 5500 are performed by the destination fabric endpoint device. In a block 5520 the LTPs/flits are received from Fabric 5300, and in a block 5522 the 64-bit flit content is extracted from the LTPs and combined to recreate the original content for Fabric Packet 5304. Since the $65^{th}$ bits and the CRCs are extra data that is used for LTP transfers, theses data are stripped out in block 5522. The L4 ICRC32 is recalculated in a block 5524 to verify the recreated Fabric Packet 5304 content matches its original content.

As depicted by a block 5526, the original Ethernet packet content is then regenerated for each Ethernet packet using the operations depicted in sub-blocks 5528 and 5530. The process begins in sub-block 5528, wherein the encapsulated Ethernet content is de-capsulated and written out as a bitstream. This is essentially a reversal of the process shown in FIG. 54 and discussed above. Next, in sub-block 5530 a 32-bit Frame Check Sequence is calculated and the FCS is appended to the end of the Ethernet packet bitstream, along with an EOF marker.

At this point the Ethernet packet data will match the original Ethernet packet data (if no errors occurred during the data transfer). This also corresponds to the state of the data at the MAC layer when it is to be further processed by the PHY layer implemented by the Ethernet transmit PHY of the Ethernet interface at the bottom side of light-weight Ethernet gateway 5322 that is coupled in communication with an Ethernet switch 5324 disposed between fabric switch 5310 and Ethernet end node 5315.

Ethernet PHYs are generally configured to perform various coding operations to facilitate error-free transfer of data over the physical link, such as bit scrambling and adding sync bits to assist in clock recovery and alignment. By way of example and without limitation, in some embodiments various software and hardware components are configured to interface to high-speed Ethernet links, such as 10 Gb/s, 40 Gb/s and 100 Gb/s. Under IEEE std 802.3-2012 Clause 82 (Section Six), 40 GBASE-R and 100 GBASE-R physical layer devices employ 64-bit/66-bit (64b/66b) block encoding in the Physical Coding Sublayer (PCS) transmission code of the PHY.

FIG. 56 (a recreation of FIG. 82.5 in IEEE std 802.3-2012 Clause 82 (Section Six)), illustrates how 64b/66b block encoding is to be implemented for Ethernet links that comply with the 40 GBASE-R and 100 GBASE-R physical layer standard. Each block consists of 66 bits. The first two bits of a block are the synchronization header (sync header). Blocks are either data blocks or control blocks. The sync header is 01 for data blocks and 10 for control blocks. Thus, there is always a transition between the first two bits of a block. The remainder of the block contains the payload. The payload is scrambled and the sync header bypasses the scrambler. Therefore, the sync header is the only position in the block that is always guaranteed to contain a transition. This feature of the code is used to obtain block synchronization.

Data blocks contain eight data characters. Control blocks begin with an 8-bit block type field that indicates the format of the remainder of the block. For control blocks containing a Start, Terminate character, or ordered set, that character is implied by the block type field. Other control characters are encoded in a 7-bit control code. Each control block encodes eight characters.

In FIG. 56, the column labeled Input Data shows, in abbreviated form, the eight characters used to create the 66-bit block. These characters are either data characters or control characters and, when transferred across the XLG-MII/CGMII, the corresponding TXC or RXC bit is set accordingly. Within the Input Data column, $D_0$ through $D_7$ are data octets and are transferred with the corresponding TXC or RXC bit set to zero. All other characters are control characters and are transferred with the corresponding TXC or RXC bit set to one. The single bit fields (thin rectangles with no label in the figure) are sent as zero and ignored upon receipt.

Returning to flowchart 5500 at a block 5532 an interframe gap, Ethernet preamble and SFD is prepended to each Ethernet packet to build a corresponding Ethernet frame, creating an Ethernet frame bitstream. The destination fabric endpoint device's operations are then completed in a block 5534, wherein in accordance with embodiments that employ Ethernet gateways that support Ethernet PHYs employing 64b/66b encoding, the Ethernet frame bitstream is partitioned into 64B blocks, and a sync header (01 or 10, as applicable) is added at bits 0 and 1 of the 66B encoding format to create 64b/66b blocks. The 64b/66b encoded Ethernet frames are then transmitted to the next hop to reach the Ethernet endpoint device associated with the MAC destination address. In the example of FIG. 53a, the next hop is Ethernet switch 5324.

Figure 57:
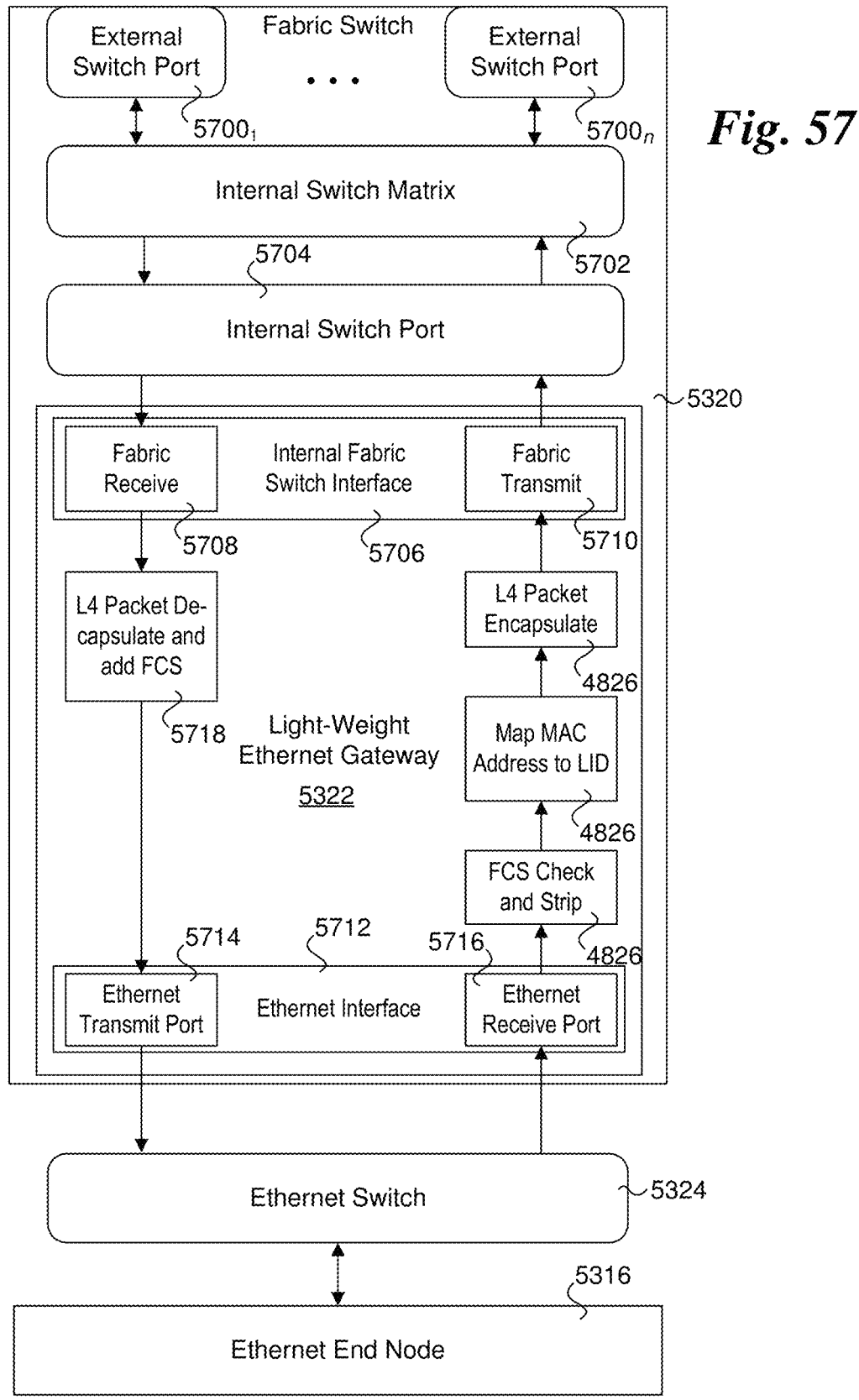
FIG. 57 is a schematic diagram of a Fabric Switch with an integrated light-weight Ethernet Gateway, according to one embodiment.

As discussed above, the operations performed by the destination fabric endpoint in flowchart 5500 are performed by fabric switch 5310, an embodiment of which is illustrated in FIG. 57. Fabric switch 5310 is a hybrid device that combines the operation of a fabric switch and the operations of an Ethernet gateway in an integrated unit. On the fabric-facing side, fabric switch 5310 includes a plurality of external switch ports $5700_1 \ldots 5700_n$, which are coupled to an internal switch matrix 5702. The internal switch matrix, in turn, is communicatively coupled to an internal switch port 5704 that interfaces with light-weight Ethernet gateway 5322 at an internal fabric switch interface 5706 including a fabric receive block 5708 and a fabric transmit block 5710. On the Ethernet-facing side, light-weight Ethernet gateway 5322 includes an Ethernet interface 5712 comprising Ethernet transmit and receive ports 5714 and 5716 that are configured to facilitate bi-direction Ethernet communications with an Ethernet device coupled at an opposing end of an Ethernet link, such as depicted by Ethernet switch 5324.

In conjunction with the operation of block 5522 of flowchart 5500, LTPs are received at an input port (not shown) of one of the external switch ports, and the operations of blocks 5524 and 5526 would be performed by logic associated with the input port. The Fabric Packet content would then be received at fabric receive block 5708 and the operations of block 5526 would be performed by an L4 packet de-capsulate and add FCS block 5718. The operations of blocks 5532 and 5534 would then be performed by logic and PHY circuitry in Ethernet transmit port 5714.

FIG. 53*a* schematically illustrates the formatting of the various packet and Ethernet frames in connection with an Ethernet source endpoint to destination endpoint data transfer. Input stream 5302 of Ethernet frames 5303 comprise Ethernet packet data that is generated from data corresponding to a file to be transferred from software application 5314. Prior to becoming Ethernet frames, various operations would be performed by networking software for an OS running on a VM on node 5308, such as Layer 4, Layer 3, and Layer 2 operations. Optionally, some of these operations are performed by Fab-vNIC 5316. The Ethernet packet content of the input stream of Ethernet frames is extracted an encapsulated in a stream of Fabric Packets 5326, which are shown once Fabric Packets 5304 are recreated at fabric switch 5310. The output of light-weight Ethernet gateway 5322 is a stream of Ethernet frames 5328 having 64b/66b encoding. Upon receipt at Ethernet end node 5315, applicable hardware and software operations would be performed to extract a stream of Ethernet packets 5330. The Ethernet packet data would be processed by higher networking layers, as applicable, and additional software operations would be performed to write the file data into memory, thus completing transfer of the data file.

Figure 53B:
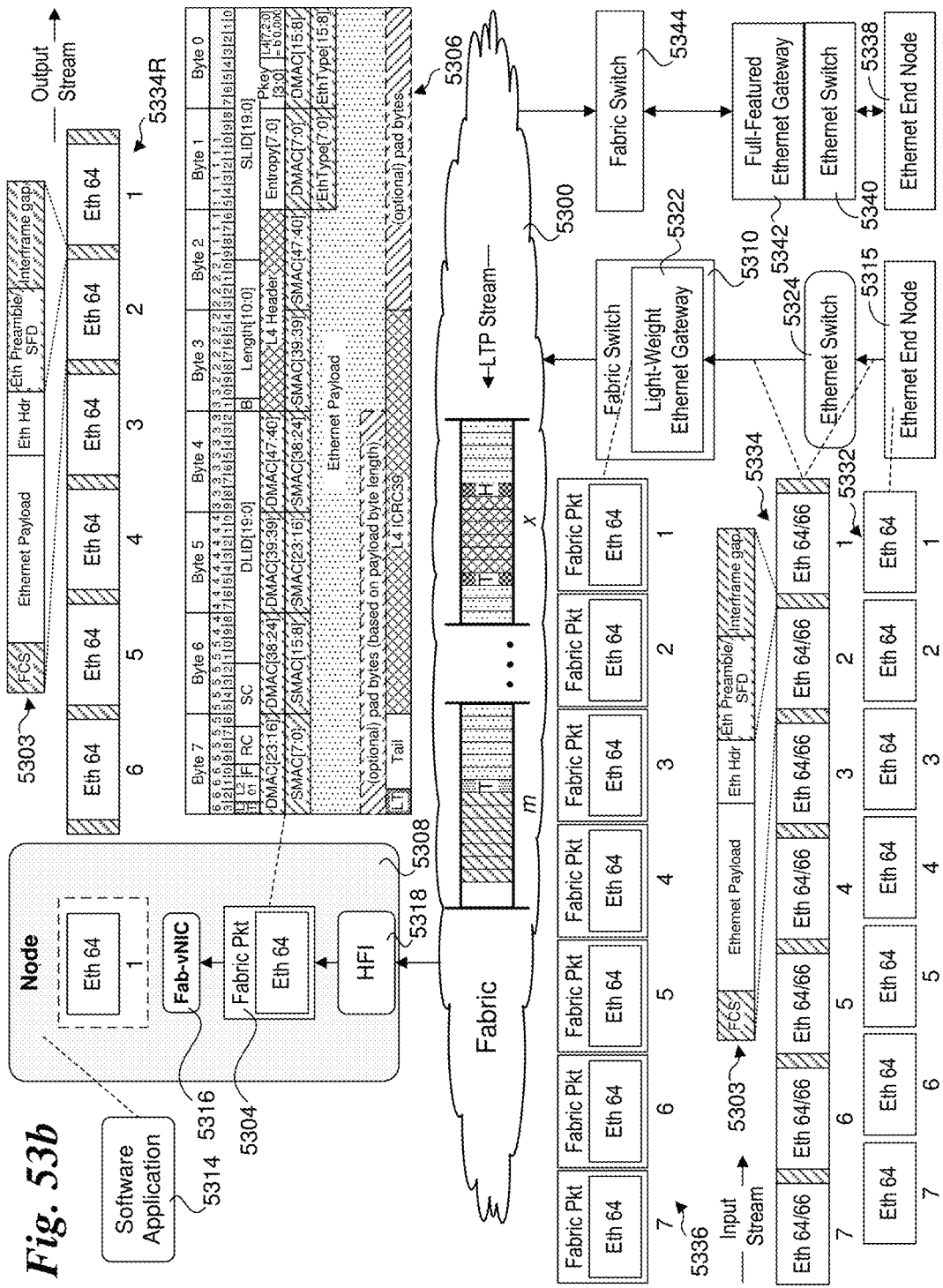
FIG. 53*b* is a schematic diagram illustrating an exemplary transfer of data over a fabric 5300 via Ethernet encapsulation, wherein the transfer is from the Ethernet end node to the node endpoint.
Figure 55B:
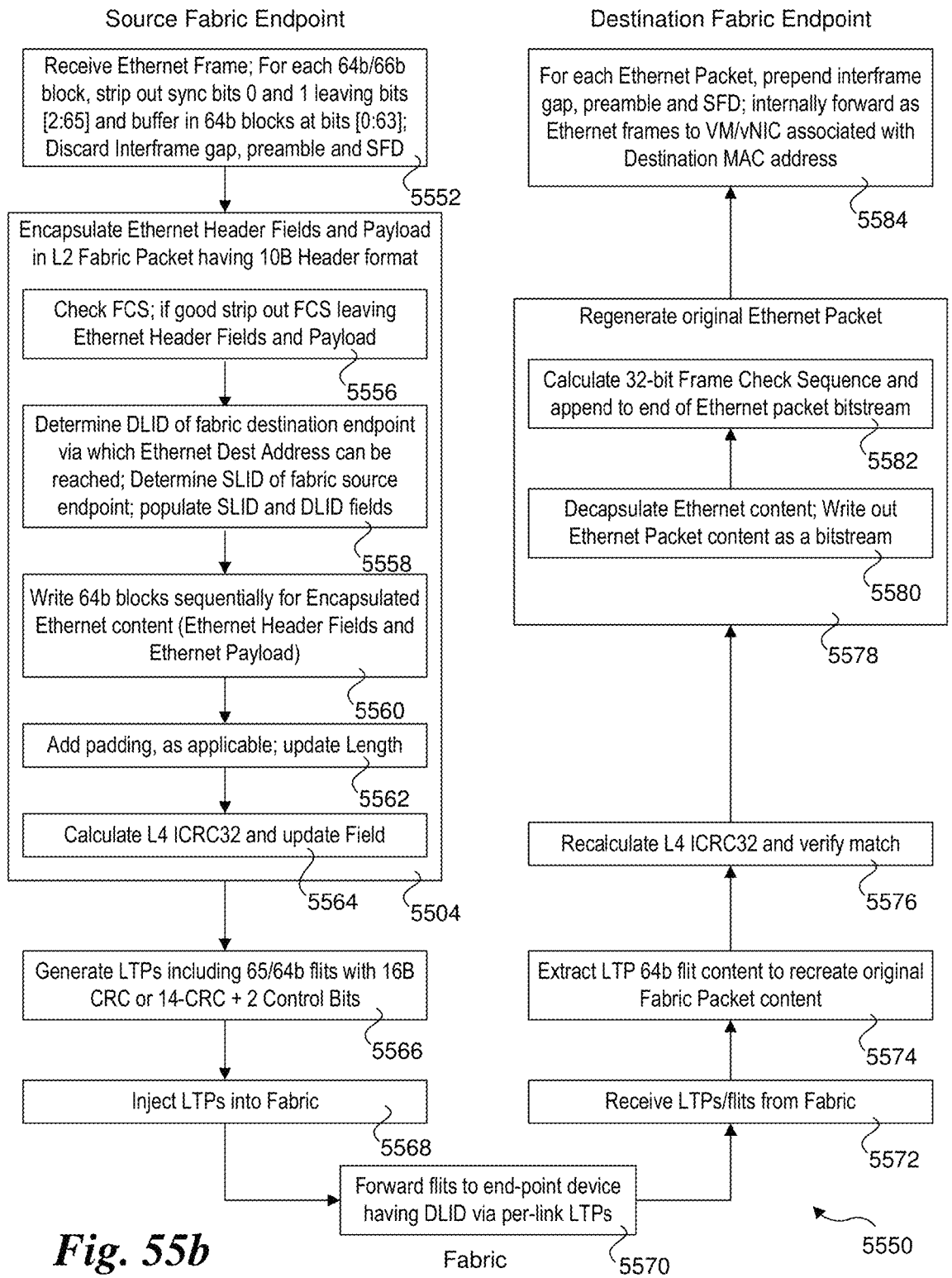
FIG. 55*b* is a flowchart illustrating operations performed in connection with the transfer of Fabric Packets with Ethernet encapsulation of FIG. 53*b*.

An Ethernet source endpoint to destination endpoint in the reverse direction (to that shown in FIG. 53*a*) is illustrated in FIG. 53*b*, with corresponding operations shown in a flowchart 5550 in FIG. 55*b*. As illustrated toward the bottom of FIG. 53*b*, a stream of Ethernet packets 5332 are generated by software (not shown) on Ethernet end node 5315. Ethernet end node 5315 supports one or more of the 40 GBASE-R and 100 GBASE-R physical layer standard, and generates an input stream of Ethernet frames 5334 having 64b/66b block encoding.

At a first block 5552 of flowchart 5550, Ethernet frames are received from Ethernet switch 5324 at Ethernet receive port 5716 of light-weight Ethernet gateway 5322. At the PHY of the receive port, the sync bits at bit positions 0 and 1 are stripped out, leaving the original 64B block content at bits [2:65], which are stored in 64B blocks at bits [0:63]. The interframe gap, preamble and SFD are then discarded, leaving the Ethernet header fields and payload data with FCS.

As depicted by a block 5554 and sub-blocks 5556, 5558, 5560, 5562, and 5564, the next set of operation is to encapsulate the Ethernet header fields and payload into an L2 Fabric Packet 5304, which in this example has a 10B EN Ethernet header format. In sub-block 5556, the FCS is checked, and if it is good the FCS is stripped out, leaving the Ethernet packet content comprising the Ethernet header fields and payload. These operations are performed by an FCS check and strip block 5720 in FIG. 57.

In a block 5558, the DLID of the fabric destination endpoint via which the Ethernet destination MAC address can be reaches is determined, along with the SLID of the fabric source endpoint. These determinations are made in a manner similar to block 5506 described above. In this example, the DMAC address is a virtual MAC address for either Fab-vNIC 5316 or another virtual MAC address associated with a vNIC operating on node 5308, while the SMAC is the MAC address of light-weight Ethernet gateway 5322. The determined DMAC and SMAC are then used as inputs to an applicable MAC-to-LID mapping table, returning the applicable DLID and SLID, which are then used to populate the DLID and SLID header fields. These operation are performed by a MAP MAC address to LID block 5722 in FIG. 57.

Next, in sub-block 5560, the 64B block data is sequentially written to the Fabric Packet payload field so as to encapsulate the Ethernet content (the Ethernet header fields and payload). Padding, as applicable, as added in a sub-block 5562, and the length field is updated accordingly. In sub-block 5564 the L4 ICRC32 is calculated and the L4 ICRC32 field is updated. These operations are analogous to operations in sub-blocks 5508, 5510, and 5512 described above. In the embodiment of FIG. 57, these operations are performed by an L4 packet encapsulate block 5724.

At this stage, the operations performed by light-weight Ethernet Gateway 5322 are completed with a stream of Fabric Packets 5336 being internally forwarded from fabric transmit block 5710 to an output port (not shown) of one of the External switch ports that will be used to inject corresponding flits to be transferred via LTPs into Fabric 5300. As depicted in a block 5566, at the output port applicable 14-CRC LTPs or standard detection LTPs are generated using 65/64B flits and LTPs are injected into Fabric 5568 in a manner analogous to the operations performed in blocks 5514 and 5516 discussed above. Also, as before, the flits are forwarded to the applicable fabric endpoint device identified by the DLID, as depicted in a block 5570.

The remaining operations shown in the right-hand column of flowchart 5550 are performed by HFI 5318 in combination with Fab-vNIC 5316. As before, LTPs with flits corresponding to the fabric packet stream 5336 flits are received from Fabric 5300 at HFI 5318, the applicable flits are extracted to recreate the original Fabric Packet content, and the L4 ICRC32 is recalculated and compared to the transmitted L4 ICRC32 to verify the Fabric Packet's data is good, as depicted in blocks 5572, 5574, and 5576. These operations correspond to normal operations performed by an input port of a Fabric link endpoint devices, such as an HFI or fabric switch.

In connection with receiving a good Fabric Packet, the original Ethernet packets are regenerated in a block 5578 via operations depicted in sub-blocks 5580 and 5582. First, in sub-block 5580 the encapsulated Ethernet content is de-capsulated, and the Ethernet packet content is written as a bitstream to a memory buffer. A 32-bit FCS is then calculated in sub-block 5582 and appended to the end of the Ethernet packet content, thus completing regeneration of the original Ethernet Packet.

Depending on how Fab-vNIC 5316 and other software components running on node 5308 are configured, this may or may not be the end of processing. For example, some VMMs include vNICs that are configured for certain types of physical Ethernet NICs with varying capabilities. More recent Ethernet NICs may be configured to support both Layer 1 and Layer 2 operations in hardware (or otherwise assisted with software-based operations that are hosted by the NIC. Such Ethernet NICs can directly interface to Layer 3 or Layer 4 networking software at the VM level, such as Layer 3 or 4 of an OS networking stack. As a result, Fab-vNIC 5316 may interface to a VM OS at Layer 3 or 4, providing a stream of IP packets to the OS networking stack, which is configured to perform further processing to write the extracted file data to a memory buffer. For less-sophisticated Ethernet NICs, all or a portion of the MAC layer (Layer 2) operations are expected to be performed via software on the host. Accordingly, the output of Fab-vNIC 5316 will be a stream of Ethernet frames, such as depicted by a stream of regenerated Ethernet frames 5334R is FIG. 53b.

To facilitate regeneration of the Ethernet frames, an additional operation is performed in a block 5584, wherein an interframe gap, preamble, and SFD is prepended to each Ethernet packet to regenerate the stream of Ethernet frames, which are then forwarded internally (via software on the node 5318) to the VM or vNIC associated with the destination MAC address for further processing to extract the original file data.

In addition to employing Ethernet gateway operations via a hybrid fabric switch-Ethernet gateway, an Ethernet gateway may be implemented as a standalone device or may be combined with an Ethernet switch. For example, a second Ethernet end node 5338 shown in FIGS. 53a and 53b is coupled to an Ethernet switch 5340 that includes a full-featured Ethernet gateway 5342. In the illustrated configuration, full-featured Ethernet gateway 5342 comprises a fabric endpoint device that is coupled to Fabric 5300 via a fabric switch 5344. Similarly, a light-weight Ethernet gateway may be implemented as a stand-alone fabric endpoint device.

In accordance with further aspects of the Ethernet encapsulation techniques disclosed herein, embodiments of Ethernet gateways are configured to support wire speed and Ethernet packet data rate matching. Yet further, wire speed and Ethernet packet data rate matching is supported using a reliable, loss-less fabric. Wire speed matching refers to a configuration under which the wire speed (also referred to as the "line-rate," "transfer rate," or "transfer speed") for each of the Ethernet link and the fabric links is the same. In one embodiment, the Ethernet link comprises a 100 Gb/s link as defined by one or more existing or future IEEE 802.3 standards, and the fabric links similarly support 100 Gb/s wire speed. In one embodiment, the SERDES (Serialization/Deserialization) schemes employed by the PHYs for the Ethernet interface and the fabric interface are the same or employ an equivalent bandwidth. In one embodiment, each of the fabric interface PHY and Ethernet PHY employ four-lane links.

As discussed above, various provisions are included in the fabric link architecture to support reliable links and a loss-less fabric. These include the use of reliable LTPs and credit-based flow control. In one embodiment of the Ethernet encapsulation technique, LTPs employ the 14b CRC with 2 credit sideband channel LTP format. Under this format, two bits in each reliable LTP provide a credit sideband channel for the exchange of VL credits. As used herein, the 2 credit sideband channel bits may also be referred to as a credit return field, and operates in the following manner.

As shown in FIG. 58, VL credit information is conveyed via groups of four consecutive valid LTPs, wherein the 4×2 credit sideband channel bits are combined to form an 8-bit credit message 5800. The first five bits specify the VL, while the remaining 3 bits specify the amount of credit being returned in accordance with the encoding scheme of TABLE 7. In one embodiment, the first group begins with the first valid reliable LTP after link transfer initialization. Each subsequent group of four consecutive valid reliable LTPs provides a new credit message. As discussed above, reliable LTPs may be retransmitted in response to detection of bad LTPs. Credit sideband bits from the discarded LTPs are not included in any credit message and are not counted as part of the four consecutive valid LTPs.

Packet data rate match corresponds to the rate at which packet data is transmitted over a link. In the case of Ethernet links employing 64b/66b block encoding, the ratio of overhead bits to data bits is 1:32. Similarly, the ratio of overhead bits to data bits in a 14b CRC LTP with two-bit credit sideband channel is 1:32. In this case there are 32 overhead bits (16 flit type bits+14-bit CRC+2 credit sideband bits), while there are 16×64=1024 data bits; 32:1024=1:32. If the wire speed of the Ethernet links and fabric links match (e.g., both 100 Gb/s) and the overhead bit ratios match, the rate at which data flows across an Ethernet gateway will likewise match. In addition, since a portion of the overhead for the LTPs is used to facilitate reliable, loss-less links, the Ethernet packet data is enabled to be transferred across a loss-less fabric at the same rate the Ethernet packet data is received at and transmitted from the Ethernet side of the gateway.

Under some configurations, a fabric may be interposed along a routing path between two Ethernet endpoints. In this case, the two fabric endpoints will include some type of Ethernet gateway (either standalone or integrated with a fabric switch or other fabric device). Under the Ethernet encapsulation with matching wire speed and Ethernet packet data rate match features supported by embodiments disclosed herein, Ethernet packet data is enabled to be transferred between the two Ethernet endpoints in a manner that, from the perspective of the Ethernet endpoints, appears to be along a routing path comprising only Ethernet links.

FIG. 59 illustrates selected aspects of a link interface port including a transmit port 5900 and a receive port 5902, according to one embodiment. The various elements shown in FIG. 59 are shown in previous figures and discussed in further detail elsewhere herein. In addition to the elements shown, both the transmit and receive ports will include additional components that are not shown due to drawing size limitations.

Each of transmit port 5900 and receive port 5902 includes circuitry and logic for effecting transmit port operations discussed herein. As presented above and shown in FIG. 2, the architecture employs a Link Fabric Sub-Layer, a Link Transfer Sub-Layer, and a PHY layer. Accordingly, the circuitry and logic for each or transmit port 5900 and receive port 5902 is depicted as being partitioned into blocks that facilitate corresponding sub-layer or layer operations. For transmit port 5900 these include Tx Link Fabric Sub-Layer circuitry and logic 5904, Tx Link Transfer Sub-Layer circuitry and logic 5906 and Tx PHY circuitry and logic 5908. Similarly, receive port 5902 includes Rx Link Fabric Sub-Layer circuitry and logic 5910, Rx Link Transfer Sub-Layer circuitry and logic 5912 and Rx PHY circuitry and logic 5914. It will be understood that the divisions between these larger blocks of circuitry and logic are not rigid, and that some functions shown within a given block of circuitry and logic may be implemented across more than one block or in another block, and the configuration illustrated in FIG. 59 is merely exemplary and without limitation to other configurations that may be implemented.

Tx PHY circuitry and logic 5908 is illustrated in a simplified form that includes four transmitters 5916 and a portion of Tx Link Control Block 1804. Generally, transmitters 5916 may comprise electrical or optical transmitters, depending on the PHY layer configuration of the link. It will be understood by those having skill in the networking arts that a Tx PHY circuitry and logic block will including additional circuitry and logic for implementing transmit-side PHY layer operations that are not shown for clarity. This including various sub-layers within a PHY layer that are used to facilitate various features implemented in connection with high-speed interconnect to reduce errors and enhance transmission characteristics. In one embodiment, scrambling and 64b/66b transmit-side operations are performed by the portion of Tx Link Control Block 1804 that facilitates PHY layer operations.

Tx Link Transfer Sub-Layer circuitry and logic 5906 is configured to implement the transmit-side aspects of the Link Transfer Sub-Layer operations described herein. These include various components and logic blocks for bundling LTPs, preparing an LTP stream for handoff to the Tx PHY, and supporting replay of LTPs in response to RetryReqs, including retry logic 5918, an LTP bundling block 5920, a replay buffer 1806, and NxtWrLTP and NxtTxLTP pointers. In addition, a portion of Tx Link Control Block 1804 and the QoS functions are implemented for the Tx Link Transfer Sub-Layer, as depicted by a QoS block 5922.

Tx Link Fabric Sub-Layer circuitry and logic 5904 is configured to implement the transmit-side aspects of the Link Fabric Sub-Layer operations described herein. The illustrated components and blocks for facilitating these operations include a Fabric Packet build block 5924 that includes an L4 encapsulation sub-block 5926 that is configured to perform L4 encapsulation of Ethernet, InfiniBand, and native architecture packets, arbitration logic 3400, a credit manager 3002 and a plurality of output FIFOs 3704. Also, as shown, a portion of QoS logic 5922 is used for QoS operations that are implemented at the Link Fabric Sub-Layer.

Rx PHY circuitry and logic 5914 is illustrated in a simplified form that includes four receivers 5928 and a portion of Rx Link Control Block 1805. Generally, receivers 5928 may comprise electrical or optical transmitters, depending on the PHY layer configuration of the link, and will be configured to receive signals transmitted over the link from transmitters 5916. It will be understood by those having skill in the networking arts that an Rx PHY circuitry and logic block will including additional circuitry and logic for implementing receive-side PHY layer operations that are not shown for clarity. This including various sub-layers within a PHY layer that are used to facilitate various features implemented in connection with high-speed interconnect to reduce errors and enhance transmission characteristics. In one embodiment, descrambling and 64b/66b receive-side operations (for receive ports employed in Ethernet gateways) are performed by the portion of Rx Link Control Block 1805 that facilitates PHY layer operations. Receive ports at HFIs and fabric switches that do not include Ethernet gateways do not perform 64b/66b receive-side operations.

Rx Link Transfer Sub-Layer circuitry and logic 5912 is configured to implement the receive-side aspects of the Link Transfer Sub-Layer operations described herein. These include various components and logic blocks for unbundling LTPs, detecting LTP CRC and per-lane CRC errors, receiver tossing mode and associated operations, and QoS operations. The illustrated components and blocks include QoS logic 5930, an Rx Tossing block 5934, an LTP/Lane error detection block 5934, an LTP unbundling block 5935, per-lane and per XFR-group CRCs, an Rx LTP sequence register, and a NxtRxLTP pointer.

Rx Link Fabric Sub-Layer circuitry and logic 5910 is configured to implement the receive-side aspects of the Link Fabric Sub-Layer operations described herein. The illustrated components and blocks for facilitating these operations include a Fabric Packet reassembly block 5938 including an L4 packet de-capsulation sub-block 5940, a credit return block 5942, input FIFOs 3906, and a portion of QoS logic 5930. In addition the organization of the buffer space for input FIFOs 3906 is depicted as employing a 3 tier shared buffer organization scheme 5944, noting that the other buffer organization schemes shown in FIGS. 31*a* and 31*b* could likewise be used, as well as other buffer organization schemes discussed herein.

For HFI's and other endpoint devices, transmit and receive ports may include additional interface logic for interfacing to higher-layer operations performed by other external components. For illustrative purposes, these interfaces are depicted by an Rx L4 interface 5946 and a Tx L4 interface 5948, which are respectively configured to interface with receive-side and transmit-side Layer 4 logic and/or components on the HFI or other endpoint device.

Figure 60:
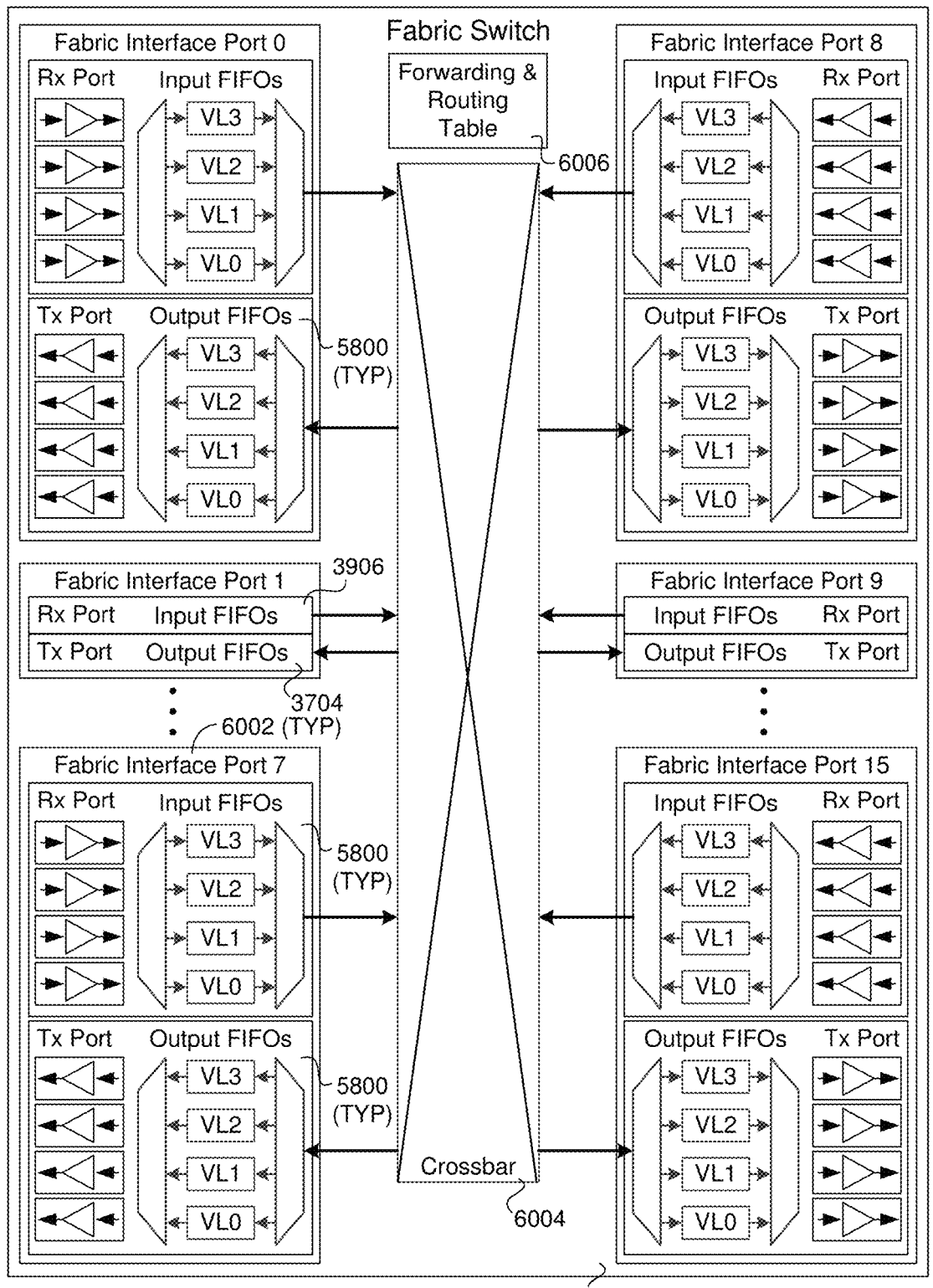
FIG. 60 is a schematic diagram of a Fabric Switch, according to one embodiment.

FIG. 60 illustrates a multi-port Fabric Switch 6000, according to one embodiment. Fabric Switch 6000 includes 16 fabric interface ports 6002, each including an Rx port 5902 and a Tx port 5900 as described above with reference to FIG. 59. Each Rx port 5902 includes a plurality of input FIFOs 3906, while each Tx port 5900 includes a plurality of output FIFOs 3704. The Rx ports 5902 and Tx ports 5900 are coupled to a crossbar 6004 which is configured to selectively connect the outputs of receive ports to the inputs of transmit ports, as illustrated. In addition to the components illustrated in FIG. 60, various arbitration logic and QoS logic is employed for controlling the port mappings of crossbar 6004, including use of a forwarding and routing table 6006, which operates in a similar manner to forwarding and routing table 3808 shown in FIG. 38 and discussed above.

Figure 61:
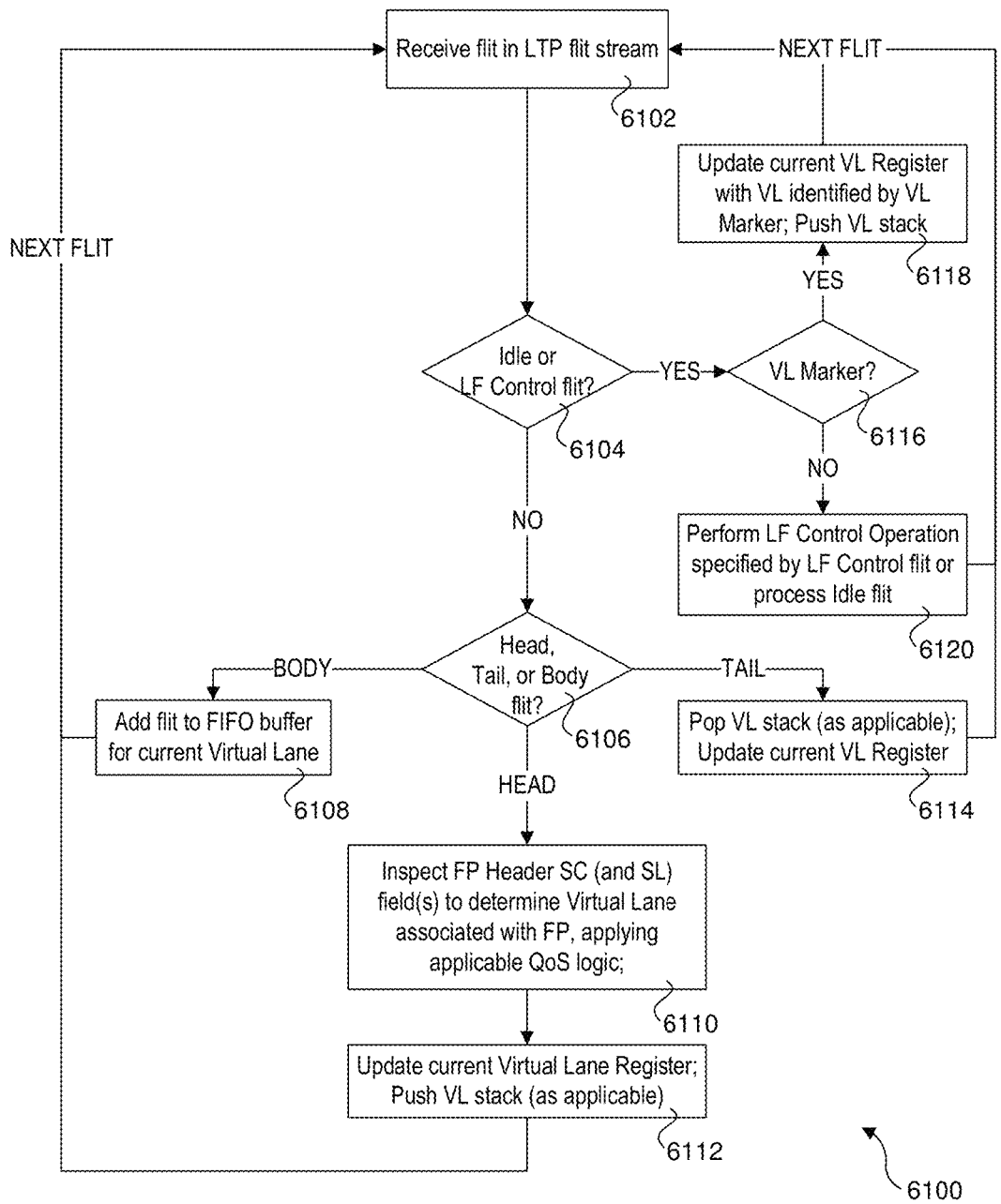
FIG. 61 is a flowchart illustrating operations performed by a Fabric Switch, according to one embodiment.

FIG. 61 shows a flowchart 6100 depicted operations and logic for handling flits that are received at a receive port and buffering them in an input FIFO. In a block 6102 a flit is received as part of an LTP flit stream and PHY layer processing has been performed to recover the LTP and flit data, enabling individual flits to be examined. In a decision block 6104 a determination is made to whether the flit is an Idle flit or an LF control flit. As discussed above with reference to TABLE 1, a flit beginning with '000' (including the bit 65 flit type bit) is either an Idle flit, an LF command flit, or an errant flit. Presuming the flit is none of these, the answer to decision block 6104 is NO, and the logic flows to a decision block 6106 wherein a determination is made to whether the flit is a Head, Tail, or Body flit. Most flits will be Body flits, and the flit is added to the FIFO buffer identified by the current VL in a block 6108, which in one embodiment is identified by indicia stored in a current VL register, as discussed above in connection to interleaving and preemption. The logic then returns to block 6102 to handle the next flit.

As discussed above, the current VL may be changed in response to a new Header flit, a Tail flit corresponding to a Fabric Packet for which a Header flit was previously received, or a VL marker (for embodiments that provide support for using VL markers). As shown in a block 6110, in response to determining the flit is a Head flit in block 6106, the Fabric Packet Header SC (and SL for IB encapsulated FPs) fields are inspected to determine the virtual lane associated with the Fabric Packet, applying the applicable QoS logic. For example, in one embodiment these operations are shown in FIG. 39 and discussed above. In a block 6112 indicia corresponding to the identified $VL_r$ is written to the current VL register to update the current VL to which flits are to be added. If applicable, the VL stack is also pushed. The logic then returns to block 6102 to handle the next flit.

While Head flits are used to change the current VL, Tail flits are used to return the current VL to a previous VL by popping the stack, as discussed above in connection with interleaving and preemption. Accordingly, in response to detecting a TAIL flit in decision block 6106, the logic proceeds to a block 6114 wherein the VL stack is popped to update the current VL register. The logic then returns to block 6102 to handle the next flit.

Returning to decision block 6104, if the flit is identified as an Idle flit or LF control flit, the logic proceeds to a decision block 6116 to determine if the flit is a VL marker. If not, the applicable operation(s) specified by the LF control flit or Idle flit are performed in a block 6120, and logic returns to block 6102 to handle the next flit. However, if the flit is an LF control flit comprising a VL marker, the logic proceeds to a block 6118 in which the current VL register is updated with the VL identified by the VL marker and the VL stack is pushed. The logic then returns to block 6102 to handle the next flit.

Figure 62:
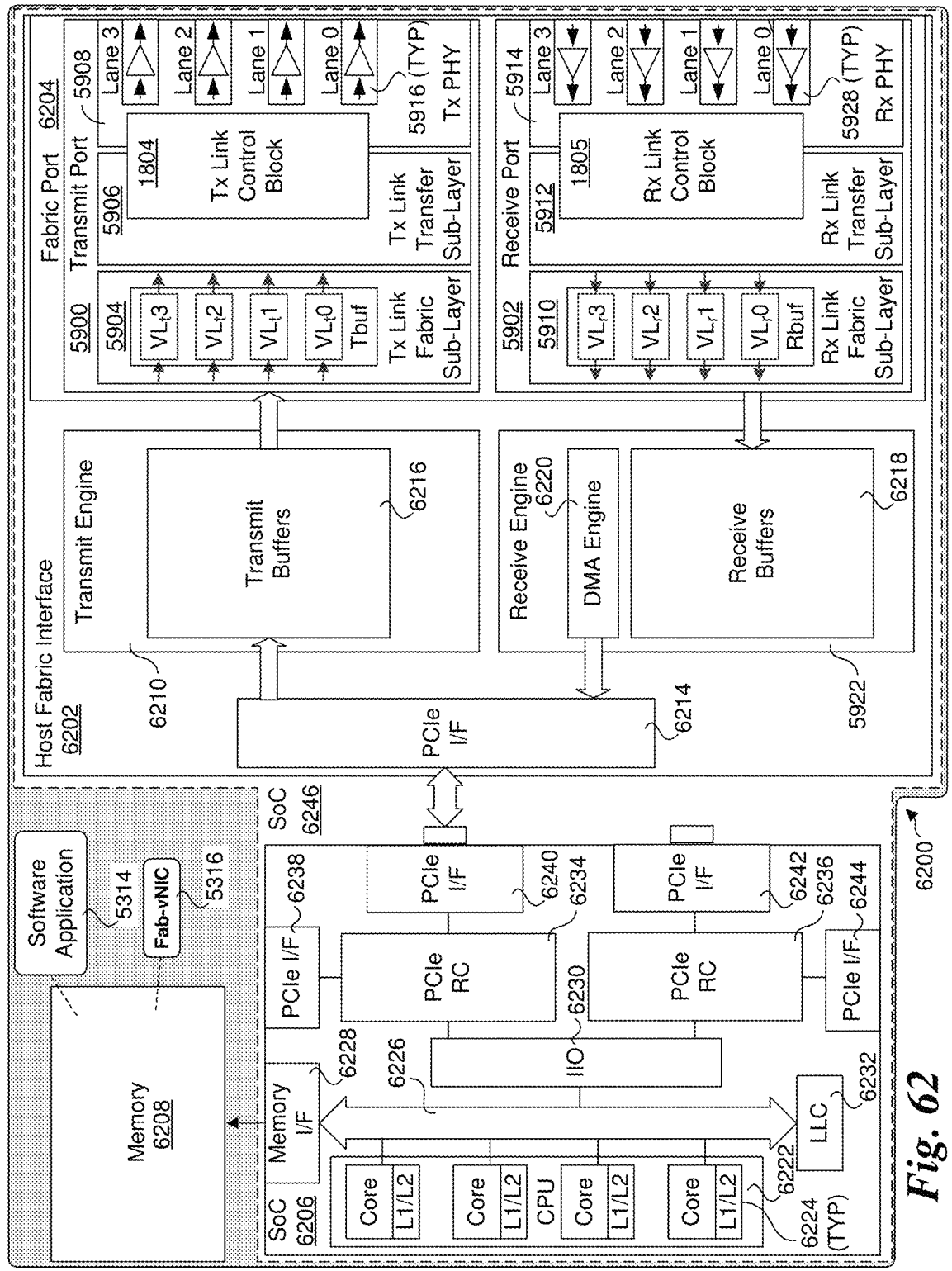
FIG. 62 is a schematic diagram of a system including an HFI, according to one embodiment.

FIG. 62 shows a node 6200 having an exemplary configuration comprising a host fabric interface 6202 including a fabric port 6204 coupled to a processor 6206, which in turn is coupled to memory 6208. As shown in FIG. 1, system nodes may have various configurations, such as but not limited to those shown by discrete single node platform 106, virtualized platform 110, multi-node platform 116 and integrated single node platform 120. Generally, each node configuration will include at least one processor, memory, and at least one HFI having similar components illustrated in FIG. 62.

Fabric port 6204 includes a transmit port 5900 and a receive port 5902 having a configuration similar to that shown in FIG. 59. Transmit port 5900 includes Tx Link Fabric Sub-layer circuitry and logic 5904 including a transmit buffer partitioned into a plurality of transmit VL buffers, Tx Link Transfer Sub-layer circuitry and logic 5906, and Tx PHY circuitry and logic 5908 including four transmitters 5916, and a Tx Link Control Block 1804. Receive port 5902 includes Rx Link Fabric Sub-layer circuitry and logic 5910 including a receive buffer partitioned into plurality of receive VL buffers, Rx Link Transfer Sub-layer circuitry and logic 5912, and Rx PHY circuitry and logic 5928 including four receivers 5928, and an Rx Link Control Block 1805.

HFI 6202 further includes a transmit engine 6210 and a receive engine 6212 coupled to a PCIe (Peripheral Component Interconnect Express) interface (I/F) 6214. Transmit engine 6210 includes transmit buffers 6216 in which L4 packets (e.g., Ethernet packets including encapsulated TCP/IP packets, InfiniBand packets) and/or Fabric Packets are buffered. In one embodiment, all or a portion of the memory for transmit buffers 6216 comprises memory-mapped input/output (MMIO) address space, also referred to a programmed IO (PIO) space. MMIO enables processor 6206 to perform direct writes to transmit buffers 6214, e.g., via direct memory access (DMA writes).

Receive engine 6212 includes receive buffers 6218 and a DMA engine 6220. Receive buffers are used to buffer the output of receive port 5902, which may include Fabric Packets and/or L4 packets. DMA engine 6220 is configured to perform DMA writes to copy the packet data from receive buffers 6218 to memory 6208 and/or one of the memory cache levels in processor 6206. For example, in some embodiments packet header data is DMA'ed to cache, while packet payload data is DMA'ed to memory.

Processor 6206 includes a CPU 6222 including a plurality of processor cores 6224, each including integrated Level 1 and Level 2 (L1/L2) caches and coupled to an coherent interconnect 6226. Also coupled to coherent interconnect 6226 is a memory interface 6228 coupled to memory 6208, an integrated input/output block (ITO) 6230, and a Last Level Cache (LLC) 6232. IIO 6230 provides an interface between the coherent domain employed by the processor cores, memory, and caches, and the non-coherent domain employed for IO components and IO interfaces, including a pair of PCIe Root Complexes (RCs) 6234 and 6236. As is well-known in the art, a PCIe RC sits at the top of a PCIe interconnect hierarchy to which multiple PCIe interfaces and PCIe devices may be coupled, as illustrated by PCIe interfaces 6238, 6240, 6242, and 6244. As shown, PCIe 6240 is coupled to PCIe interface 6214 of HFI 6202.

In some embodiments, such as illustrated in FIG. 62, processor 6212 employs a System on a Chip (SoC) architecture. In other embodiments, PCIe-related components are integrated in an IO chipset or the like. In yet other embodiments, processor 6212 and one or more HFIs 6202 are integrated on an SoC, such as depicted by the dashed outline of SoC 6246.

As further illustrated in FIG. 62, software applications 5314 and Fabric vNIC 5316 comprise software components running on one or more of processor cores 6224 or one or more virtual machines hosted by an operating system running on processor 6206. In addition to these software components, there are additional software components and buffers implemented in memory 6208 to facilitate data transfers between memory 6208 (including applicable cache levels) and transmit engine 6210 and receive engine 6212.

In general, the circuitry, logic and components depicted in the figures herein may also be implemented in various types of integrated circuits (e.g., semiconductor chips) and modules, including discrete chips, SoCs, multi-chip modules, and networking/link interface chips including support for multiple network interfaces. Also, as used herein, circuitry and logic to effect various operations may be implemented via one or more of embedded logic, embedded processors, controllers, microengines, or otherwise using any combination of hardware, software, and/or firmware. For example, the operations depicted by various logic blocks and/or circuitry may be effected using programmed logic gates and the like, including but not limited to ASICs, FPGAs, IP block libraries, or through one or more of software or firmware instructions executed on one or more processing elements including processors, processor cores, controllers, microcontrollers, microengines, etc.

In addition, aspects of embodiments of the present description may be implemented not only within a semiconductor chips, SoCs, multichip modules, etc., but also within non-transient machine-readable media. For example, the designs described above may be stored upon and/or embedded within non-transient machine readable media associated with a design tool used for designing semiconductor devices. Examples include a netlist formatted in the VHSIC Hardware Description Language (VHDL) language, Verilog language or SPICE language, or other Hardware Description Language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Italicized letters, such as 'n', 'm', 'k', etc. in the foregoing detailed description and the claims are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for reliably transferring a stream of Ethernet packets between fabric endpoints, comprising:
   for each of a plurality of Ethernet packets in the stream of Ethernet packets,
   encapsulating Ethernet packet data comprising an Ethernet header and Ethernet payload in a fabric packet at a first fabric endpoint;
   transmitting data content for the fabric packet via a forwarding path comprising a plurality of links to a second fabric endpoint;
   employing implicit ACKnowledgements (ACKs) to verify, for transmission over each link, the transmitted data content has been received at the receive side of the link without error;
   regenerating the fabric packet using the data content received at the second fabric endpoint; and
   de-encapsulating the Ethernet packet data from the regenerated fabric packet.

2. The method of claim 1, further comprising:
   receiving an Ethernet frame including an Ethernet packet at the first fabric endpoint; and
   extracting the Ethernet packet data from the Ethernet frame.

3. The method of claim 2, wherein the first fabric endpoint comprises an Ethernet gateway, and the method further comprises:
   receiving Ethernet frames inbound from an Ethernet network at the Ethernet gateway at an Ethernet link wire speed and at a received Ethernet packet data rate; and
   transmitting Ethernet packet data extracted from the Ethernet frames outbound onto the fabric from a fabric link interface of the Ethernet gateway at a wire speed that matches the Ethernet link wire speed and at a rate that matches the received Ethernet packet data rate.

4. The method of claim 3, wherein the Ethernet frames comprise a plurality of data blocks encoded with overhead bits and data is transmitted over the fabric using link packets comprising a plurality of data units and overhead bits, each of the data blocks in the Ethernet frames and data units in the link packets comprising data bits, and wherein the ratio of overhead bits to data bits in the Ethernet frames and the link packets is the same.

5. The method of claim 3, wherein the overhead bits of a link packet includes a data integrity check field and a credit return sideband channel, the method further comprising:
   employing the integrity check field to verify link packets are received at a receiving end of each link without error; and
   implementing a credit-based flow control mechanism under which credits are returned at a receiving end of a link to indicate an amount of buffer space that has been freed at the receiving end of the link, wherein the credits are returned in the credit return sideband channel.

6. The method of claim 1, further comprising:
   for each of multiple fabric packets, dividing the fabric packet into a plurality of flits;
   at a transmit side of each link, bundling flits into groups to form a plurality of link packets; and
   transmitting the plurality link packets over respective links, wherein each link packet is transmitted over a single link of the forwarding path.

7. The method of claim 6, further comprising:
employing a data integrity check to verify whether the data contained in each link packet is received at a receive side of each link without error; and
in response to detecting a received link packet has an error, retransmitting the link packet over the link.

8. An apparatus, comprising:
an Ethernet interface, including an Ethernet receive port to receive Ethernet frames; and;
circuitry and logic to,
   extract Ethernet packets from Ethernet frames received at the Ethernet receive port;
   encapsulate the Ethernet packets in fabric packets; and
   form a plurality of a link packets comprising portions of data contained in the fabric packets,
wherein the Ethernet frames comprise a plurality of data blocks encoded with overhead bits and the link packets comprise a plurality of data units and overhead bits, each of the data blocks in the Ethernet frames and data units in the link packets comprising data bits, and wherein the ratio of overhead bits to data bits in the Ethernet frames and the link packets is the same.

9. The apparatus of claim 8, wherein the Ethernet frame blocks comprise a plurality of 64-bit blocks having 2 overhead bits per block and encoded using 64b/66b encoding.

10. The apparatus of claim 9, wherein a link packet comprises overhead bits and data bits having a ratio of 1:32.

11. The apparatus of claim 10, wherein a link packet comprises sixteen 64-bit data units, each having a 1-bit type bit, a 14-bit Cyclic Redundancy Check (CRC) value, and 2 credit return side-band bits.

12. The apparatus of claim 8, further comprising circuitry and logic to:
   divide each fabric packet into a plurality of data units comprising flits; and
   bundle the flits into groups to form the plurality of a link packets,
   wherein at least one of the plurality of link packets includes flits from at least two fabric packets.

13. The apparatus of claim 8, further comprising:
a fabric link interface; and
circuitry and logic to internally forward link packets to the fabric link interface to be transmitted outbound on a fabric link,
wherein the Ethernet link interface and the fabric link interface are configured to operate using the same nominal link speed, and a rate at which Ethernet packet data is transmitted outbound on a fabric link matches a rate at which Ethernet packet data is received at the Ethernet receive port.

14. The apparatus of claim 13, wherein the nominal link speed is 100 Gigabits per second.

15. An apparatus, comprising:
an Ethernet interface, including an Ethernet transmit port to transmit Ethernet frames onto an Ethernet link;
a fabric link interface; and
circuitry and logic to,
   extract flits from link packets received at the fabric link interface, the flits comprising divided portions of fabric packets having encapsulated Ethernet packet content, the Ethernet packet content extracted from original Ethernet packets;
   reassemble flits to regenerate fabric packets;
   de-encapsulate Ethernet packet content from the regenerated fabric packets;
   regenerate the original Ethernet packets using the de-encapsulated Ethernet packet content; and
   generate a plurality of Ethernet frames, each containing a regenerated Ethernet packet,
wherein the Ethernet frames comprise a plurality of data blocks encoded with overhead bits and the link packets comprise a plurality of flits and overhead bits, each of the data blocks in the Ethernet frames and flits in the link packets comprising data bits, and wherein the ratio of overhead bits to data bits in the Ethernet frames and the link packets is the same.

16. The apparatus of claim 15, wherein the Ethernet frame blocks comprise a plurality of 64-bit blocks having 2 overhead bits per block and encoded using 64b/66b encoding.

17. The apparatus of claim 16, wherein a link packet comprises overhead bits and data bits having a ratio of 1:32.

18. The apparatus of claim 17, wherein a link packet comprises sixteen 64-bit flits, each having a 1-bit type bit, a 14-bit Cyclic Redundancy Check (CRC) value, and a 2-bit credit return field.

19. The apparatus of claim 15, wherein the link packets are formed by dividing fabric packets containing encapsulated Ethernet packet content into a plurality of flits and bundling the flits into groups, each link packet comprising a bundled group of flits.

20. The apparatus of claim 15, wherein the apparatus comprises a fabric switch with an integrated Ethernet gateway, the fabric link interface comprises an internal switch fabric interface, and wherein the apparatus further includes:
   a plurality of external switch ports;
   an internal switch port coupled to the internal fabric switch interface; and
   an internal switch matrix, configured to selectively couple external switch ports to the internal switch port.

21. The apparatus of claim 20, wherein each external switch port includes a fabric link interface, and wherein each fabric link interface and the Ethernet interface are configured to operate using the same nominal link speed, and a rate at which Ethernet packet data is received at the external switch ports matches a rate at which Ethernet packet data is transmitted outbound from the Ethernet transmit port.

22. An apparatus, comprising:
an Ethernet gateway including,
   an Ethernet interface configured to receive inbound Ethernet frames from an Ethernet network and transmit outbound Ethernet frames to the Ethernet network; and
   at least one fabric interface configured to receive inbound link packets from a fabric and transmit outbound link packets to the fabric,
wherein the apparatus is further configured to facilitate an Ethernet-to-fabric gateway function by extracting Ethernet packet data from each Ethernet frame received at the Ethernet interface, determine a fabric endpoint to which the Ethernet packet data is to be delivered and prepare link packets containing the Ethernet packet data to be transmitted onto the fabric toward the fabric endpoint, and
wherein the apparatus is further configured to facilitate a fabric-to-Ethernet gateway function by processing link packets received from the fabric to regenerate fabric packets containing encapsulated Ethernet packet data, extract the Ethernet packet data from the regenerated fabric packets and generate Ethernet frames containing Ethernet packets including the Ethernet packet data.

23. The apparatus of claim 22,
wherein the inbound link packets comprise bundled groups of flits, the flits having been generated at one or more fabric endpoints by dividing fabric packets having encapsulated Ethernet packet data into a plurality of data units comprising flits;

wherein the outbound link packets comprise bundled groups of flits generated at the Ethernet gateway by dividing fabric packets having encapsulated Ethernet packet data into a plurality of flits; and wherein the Ethernet frames comprise a plurality of data blocks encoded with overhead bits and the link packets comprise bundles of flits and overhead bits, each of the data blocks in the Ethernet frames and data units in the link packets comprising data bits, and wherein the ratio of overhead bits to data bits in the Ethernet frames and the link packets is the same.

24. The apparatus of claim 22, wherein the Ethernet gateway further includes an integrated Ethernet switch.

25. The apparatus of claim 22, wherein the apparatus comprises a fabric switch with an integrated Ethernet gateway, and wherein the apparatus further includes:

a plurality of external switch ports;

an internal switch port coupled to an internal fabric switch interface; and an internal switch matrix, configured to selectively couple external switch ports to the internal switch port, wherein each external switch port includes a fabric link interface, and wherein each fabric link interface and the Ethernet interface are configured to operate using a nominal link speed of 100 Gigabits per second, and a rate at which Ethernet packet data is received at the external switch ports matches a rate at which Ethernet packet data is transmitted outbound from the Ethernet transmit port.

26. The apparatus of claim 23, wherein the Ethernet frame blocks comprise a plurality of 64-bit blocks having 2 overhead bits per block and encoded using 64b/66b encoding, and wherein a link packet comprises sixteen 64-bit data units, each having a 1-bit type bit, and a 14-bit CRC value and 2 credit return sideband bits via which credits used in a credit-based flow control mechanism are returned.

27. An apparatus, comprising:

an Ethernet gateway configured to, receive Ethernet frames employing 64b/66b block encoding including two overhead bits for each 64-bit block;

extract an Ethernet header and Ethernet payload from each Ethernet frame, the Ethernet header and Ethernet payload comprising 64-bit blocks;

encapsulate the Ethernet header and Ethernet payload extracted from a given Ethernet frame in an outbound fabric packet;

divide each outbound fabric packet into a plurality of transmit flits; and extract receive flits from received link packets, the received flits comprising divided portions of inbound fabric packets having encapsulated Ethernet packet content, the Ethernet packet content extracted from original Ethernet packets;

reassemble receive flits to regenerate the inbound fabric packets;

de-encapsulate Ethernet packet content from the regenerated fabric packets;

regenerate the original Ethernet packets using the de-encapsulated Ethernet packet content; and generate a plurality of outbound Ethernet frames, each containing a regenerated Ethernet packet, wherein the Ethernet frames comprise a plurality of data blocks encoded with overhead bits and the link packets comprise a plurality of flits and overhead bits, each of the data blocks in the Ethernet frames and flits in the link packets comprising data bits, and wherein the ratio of overhead bits to data bits in the Ethernet frames and the link packets is the same.

28. The apparatus of claim 27, wherein a link packet comprises overhead bits and data bits having a ratio of 1:32.

29. The apparatus of claim 27, wherein a link packet comprises sixteen 64-bit flits, each having a 1-bit type bit, a 14-bit Cyclic Redundancy Check (CRC) value, and 2 credit return side-band bits.

30. The apparatus of claim 27, wherein the apparatus comprises a fabric switch with an integrated Ethernet gateway, and wherein the apparatus further includes:

a plurality of external switch ports;

an internal switch port coupled to an internal fabric switch interface; and an internal switch matrix, configured to selectively couple external switch ports to the internal switch port, wherein each external switch port includes a fabric link interface, and wherein each fabric link interface and the Ethernet interface are configured to operate using a nominal link speed of 100 Gigabits per second, and a rate at which Ethernet packet data is received at the external switch ports matches a rate at which Ethernet packet data is transmitted outbound from the Ethernet transmit port.

* * * * *